(12) United States Patent
Bowen

(10) Patent No.: US 12,056,419 B2
(45) Date of Patent: Aug. 6, 2024

(54) COMPUTER AIDED SYSTEMS AND METHODS FOR CREATING CUSTOM PRODUCTS

(71) Applicant: Best Apps, LLC, Miami Beach, FL (US)

(72) Inventor: Michael Bowen, Los Angeles, CA (US)

(73) Assignee: Best Apps, LLC, Miami Beach, FL (US)

( * ) Notice: Subject to any disclaimer, the term of this patent is extended or adjusted under 35 U.S.C. 154(b) by 501 days.

(21) Appl. No.: 17/117,616

(22) Filed: Dec. 10, 2020

(65) Prior Publication Data

US 2021/0312096 A1 Oct. 7, 2021

Related U.S. Application Data

(63) Continuation of application No. 16/377,705, filed on Apr. 8, 2019, now Pat. No. 10,867,081.

(Continued)

(51) Int. Cl.
*G06F 30/00* (2020.01)
*G06F 3/0482* (2013.01)

(Continued)

(52) U.S. Cl.
CPC ............ *G06F 30/00* (2020.01); *G06F 3/0482* (2013.01); *G06F 3/0488* (2013.01); *G06F 40/186* (2020.01); *G06F 2119/18* (2020.01)

(58) Field of Classification Search
CPC ...... G06F 30/00; G06F 3/0482; G06F 3/0488; G06F 40/186; G06F 2119/18;

(Continued)

(56) References Cited

U.S. PATENT DOCUMENTS 4,873,643 A 10/1989 Powell et al.
6,389,850 B1 5/2002 Fujiwara
(Continued)

OTHER PUBLICATIONS

Jackson Duanfeng et al., "Automatic Authentication Method and Scanner," IEEE Xplore, pp. 161-164 (Year: 2007).

(Continued)

*Primary Examiner* — Steven W Crabb
(74) *Attorney, Agent, or Firm* — Knobbe, Martens, Olson & Bear LLP

(57) ABSTRACT

A computer-aided design system enables physical articles to be customized via printing or embroidering and enables digital content to be customized and electronically shared. A user interface may be generated that includes an image of a model of an article of manufacture and user customizable design areas that are graphically indicated on the image corresponding to the model. A design area selection may be received. In response to an add design element instruction and design element specification, the specified design element is rendered in the selected design area on the model image. Customization permissions associated with the selected design area are accessed. User edits to the design element may be received and rendered in real time. Manufacturing instructions may be transmitted to a printing system using a file that includes location, rotation, and/or scale data.

30 Claims, 192 Drawing Sheets

Related U.S. Application Data

(60) Provisional application No. 62/770,658, filed on Nov. 21, 2018.

(51) Int. Cl.
  *G06F 3/0488* (2022.01)
  *G06F 40/186* (2020.01)
  *G06F 119/18* (2020.01)

(58) Field of Classification Search
  CPC .. G06F 30/12; G06F 2111/20; G06F 2113/12; G06F 3/04847; G06F 3/0484
  See application file for complete search history.

(56) References Cited

U.S. PATENT DOCUMENTS

| | | |
|---|---|---|
| 6,459,952 B1 | 10/2002 | Dundorf |
| 6,564,118 B1 | 5/2003 | Swab |
| 6,684,188 B1 | 1/2004 | Mitchell |
| 6,718,895 B1 | 4/2004 | Fortuna |
| 6,804,568 B1 | 10/2004 | Miyazaki et al. |
| 7,117,469 B1 | 10/2006 | Dahl |
| 7,321,387 B2 | 1/2008 | Novais |
| 7,835,591 B2 | 11/2010 | Lunetta |
| 8,019,182 B1 | 9/2011 | Wolfram |
| 8,100,324 B1 | 1/2012 | Leon |
| 8,174,539 B1 | 5/2012 | Samaniego |
| 8,180,474 B2 | 5/2012 | Basheer |
| 8,261,195 B2 | 9/2012 | Buehler |
| 8,838,482 B2 | 9/2014 | Schindler |
| 8,958,663 B1 | 2/2015 | Harvill |
| 9,177,082 B2 | 11/2015 | Linder |
| 9,299,009 B1 | 3/2016 | Arora |
| 9,418,375 B1 | 8/2016 | Cunico |
| 9,460,523 B1 | 10/2016 | Fujio |
| 9,623,578 B1 | 4/2017 | Aminpour |
| 9,702,071 B2 | 7/2017 | Harvill et al. |
| 9,782,906 B1 | 10/2017 | Aminpour |
| 9,868,302 B1 | 1/2018 | Aminpour |
| 9,971,854 B1 | 5/2018 | Bowen |
| D819,673 S | 6/2018 | Bowen |
| 10,008,039 B1 | 6/2018 | Neustein |
| 10,140,392 B1 | 11/2018 | Bowen |
| 10,176,617 B2 | 1/2019 | Harvill |
| 10,254,941 B2 | 4/2019 | Bowen |
| 10,437,446 B2 | 10/2019 | Bowen |
| 10,496,763 B2 | 12/2019 | Bowen |
| 10,505,726 B1 | 12/2019 | Andon |
| 10,515,110 B2 | 12/2019 | Jing |
| 10,607,411 B1 | 3/2020 | Pezzino |
| 10,608,829 B1 | 3/2020 | Yoshihama |
| 10,706,637 B2 | 7/2020 | Bowen |
| 10,713,821 B1 | 7/2020 | Surya |
| 10,769,317 B2 | 9/2020 | Bowen |
| 10,820,649 B2 | 11/2020 | Barnet |
| 10,853,626 B2 | 12/2020 | Malkemus |
| 10,853,839 B1 | 12/2020 | Galep |
| 10,867,081 B2 | 12/2020 | Bowen |
| 10,922,449 B2 | 2/2021 | Bowen |
| 11,030,574 B1 | 6/2021 | Grande |
| 11,036,896 B2 | 6/2021 | Bowen |
| 11,126,653 B2 | 9/2021 | Zhai |
| 11,227,351 B2 | 1/2022 | Li |
| 11,263,371 B2 | 3/2022 | Bowen |
| 11,270,318 B1 | 3/2022 | Schwarz |
| 11,368,735 B1 | 6/2022 | Bonner |
| 11,386,588 B2 | 7/2022 | Tejima |
| 11,409,850 B2 | 8/2022 | Li |
| 2002/0072289 A1 | 6/2002 | Jasani |
| 2002/0114537 A1 | 8/2002 | Sutula |
| 2003/0069809 A1 | 4/2003 | von Rosen et al. |
| 2003/0086123 A1 | 5/2003 | Torrens-Burton |
| 2003/0142847 A1 | 7/2003 | Rhoads |
| 2003/0144758 A1 | 7/2003 | Duggirala |
| 2003/0231185 A1 | 12/2003 | Kupersmit |
| 2004/0030997 A1 | 2/2004 | Farrah |
| 2004/0128621 A1 | 7/2004 | Orihara |
| 2005/0096885 A1 | 5/2005 | Rhodes, Jr. |
| 2005/0122543 A1 | 6/2005 | Walker |
| 2005/0289018 A1 | 12/2005 | Sullivan |
| 2006/0072847 A1 | 4/2006 | Chor |
| 2006/0101742 A1 | 5/2006 | Scott-Leikach |
| 2006/0111976 A1 | 5/2006 | Pompushko |
| 2006/0165280 A1 | 7/2006 | Miwa |
| 2006/0184425 A1 | 8/2006 | Hanechak |
| 2007/0033048 A1 | 2/2007 | Pollard |
| 2007/0033568 A1 | 2/2007 | Barrieau et al. |
| 2007/0132779 A1 | 6/2007 | Gilbert |
| 2008/0006192 A1 | 1/2008 | Zeiger et al. |
| 2008/0172208 A1 | 7/2008 | Lechine |
| 2008/0239409 A1 | 10/2008 | David |
| 2008/0252651 A1 | 10/2008 | Mills |
| 2008/0308636 A1 | 12/2008 | Lynch |
| 2009/0077510 A1 | 3/2009 | Youngman |
| 2009/0122329 A1* | 5/2009 | Hegemier ............... G06T 11/60 358/1.9 |
| 2009/0160856 A1 | 6/2009 | Hoguet |
| 2009/0254814 A1 | 10/2009 | Lai |
| 2010/0162137 A1* | 6/2010 | Ganz .................. G06F 3/04817 715/810 |
| 2010/0169185 A1 | 7/2010 | Cottingham |
| 2010/0174400 A1 | 7/2010 | Lai |
| 2010/0274535 A1 | 10/2010 | McDaniel |
| 2010/0328335 A1 | 12/2010 | Hanechak |
| 2011/0029635 A1 | 2/2011 | Shkurko |
| 2011/0060437 A1 | 3/2011 | Durham, III |
| 2011/0205242 A1 | 8/2011 | Friesen |
| 2011/0264412 A1 | 10/2011 | Fritz-Humblot |
| 2011/0282476 A1 | 11/2011 | Hegemier |
| 2012/0060102 A1 | 3/2012 | Shohfi |
| 2012/0105467 A1 | 5/2012 | Chao |
| 2012/0203371 A1 | 8/2012 | Hsu |
| 2012/0229491 A1 | 9/2012 | Hymel |
| 2012/0304052 A1 | 11/2012 | Tanaka |
| 2012/0313927 A1 | 12/2012 | Curington |
| 2013/0061142 A1 | 3/2013 | Brier |
| 2013/0061198 A1 | 3/2013 | Brier |
| 2013/0125033 A1 | 5/2013 | Kelley |
| 2013/0125072 A1 | 5/2013 | Newcomb |
| 2013/0155111 A1 | 6/2013 | Dirsa |
| 2013/0173415 A1 | 7/2013 | Harvill et al. |
| 2013/0208305 A1 | 8/2013 | Epstein |
| 2013/0243312 A1 | 9/2013 | Sato |
| 2013/0266229 A1 | 10/2013 | Pfucha |
| 2013/0336523 A1* | 12/2013 | Ruan .................. G06F 3/04847 345/620 |
| 2014/0033010 A1 | 1/2014 | Richardt |
| 2014/0058959 A1 | 2/2014 | Isbjornssund |
| 2014/0067554 A1 | 3/2014 | Heppding |
| 2014/0143082 A1 | 5/2014 | Larson |
| 2014/0153821 A1 | 6/2014 | Masuko |
| 2014/0156416 A1 | 6/2014 | Goenka |
| 2014/0168477 A1 | 6/2014 | David |
| 2014/0215682 A1 | 8/2014 | Northup et al. |
| 2014/0279180 A1 | 9/2014 | Beaver |
| 2014/0342831 A1 | 11/2014 | Weston |
| 2015/0006313 A1 | 1/2015 | Beaver |
| 2015/0062152 A1 | 3/2015 | Loeffler |
| 2015/0066189 A1 | 3/2015 | Mulligan |
| 2015/0109323 A1 | 4/2015 | Johnson |
| 2015/0134496 A1 | 5/2015 | Grinblat |
| 2015/0134688 A1 | 5/2015 | Jing |
| 2015/0332479 A1 | 11/2015 | Gershon |
| 2016/0035055 A1 | 2/2016 | Perkins |
| 2016/0072820 A1 | 3/2016 | Shaffer |
| 2016/0092935 A1 | 3/2016 | Bradley |
| 2016/0171304 A1 | 6/2016 | Golding |
| 2016/0171354 A1 | 6/2016 | Glasgow |
| 2016/0188783 A1 | 6/2016 | Li |
| 2016/0210602 A1 | 7/2016 | Siddique |
| 2016/0267684 A1 | 9/2016 | Li |
| 2016/0358187 A1 | 12/2016 | Radocchia |
| 2016/0370971 A1 | 12/2016 | Hackett |
| 2017/0032050 A1 | 2/2017 | Kol |

(56) References Cited

U.S. PATENT DOCUMENTS

| | | |
|---|---|---|
| 2017/0039628 A1 | 2/2017 | Wang |
| 2017/0046862 A1 | 2/2017 | Harvill |
| 2017/0064334 A1 | 3/2017 | Minoa |
| 2017/0076346 A1 | 3/2017 | Jennings |
| 2017/0115847 A1 | 4/2017 | Barras |
| 2017/0118357 A1 | 4/2017 | Morris |
| 2017/0124586 A1 | 5/2017 | Tepper |
| 2017/0139483 A1 | 5/2017 | Selker |
| 2017/0139886 A1 | 5/2017 | Chalmers |
| 2017/0140563 A1 | 5/2017 | No |
| 2017/0220029 A1 | 8/2017 | Allin-Jones |
| 2017/0258164 A1 | 9/2017 | Barnet |
| 2017/0259445 A1 | 9/2017 | Aminpour |
| 2017/0295119 A1 | 10/2017 | Rosenberg |
| 2017/0352058 A1 | 12/2017 | Bender |
| 2017/0366579 A1 | 12/2017 | Assuncao Aguiar |
| 2017/0370040 A1 | 12/2017 | Harvill |
| 2018/0004693 A1 | 1/2018 | Macnamara |
| 2018/0042419 A1 | 2/2018 | Sanders |
| 2018/0053056 A1 | 2/2018 | Rabinovich |
| 2018/0069899 A1 | 3/2018 | Lang |
| 2018/0096496 A1 | 4/2018 | Lobaugh |
| 2018/0129958 A1 | 5/2018 | Saxena |
| 2018/0144243 A1 | 5/2018 | Hsieh |
| 2018/0173688 A1 | 6/2018 | Melinand |
| 2018/0285747 A1 | 10/2018 | Bron |
| 2018/0308054 A1 | 10/2018 | Obrecht |
| 2018/0330234 A1 | 11/2018 | Al Barazanchi |
| 2018/0350117 A1 | 12/2018 | Ogata |
| 2018/0367704 A1 | 12/2018 | Iwafuchi |
| 2018/0373686 A1 | 12/2018 | Pittman |
| 2019/0004688 A1 | 1/2019 | Bowen |
| 2019/0012249 A1 | 1/2019 | Mercuri |
| 2019/0019242 A1 | 1/2019 | Bajpai |
| 2019/0021426 A1 | 1/2019 | Barnes |
| 2019/0026054 A1 | 1/2019 | Botha |
| 2019/0026394 A1 | 1/2019 | Barnes |
| 2019/0026395 A1 | 1/2019 | Barnes |
| 2019/0026396 A1 | 1/2019 | Barnes |
| 2019/0026397 A1 | 1/2019 | Barnes |
| 2019/0026406 A1 | 1/2019 | Barnes |
| 2019/0026407 A1 | 1/2019 | Barnes |
| 2019/0026809 A1 | 1/2019 | Barnes |
| 2019/0026810 A1 | 1/2019 | Barnes |
| 2019/0052454 A1 | 2/2019 | Wright |
| 2019/0057382 A1 | 2/2019 | Wright |
| 2019/0108292 A1 | 4/2019 | Bowen |
| 2019/0156391 A1 | 5/2019 | Davidson |
| 2019/0158470 A1 | 5/2019 | Wright |
| 2019/0205363 A1 | 7/2019 | Zukerman |
| 2019/0236879 A1 | 8/2019 | Ivanov |
| 2019/0244407 A1* | 8/2019 | Wiesel .......... G06T 11/00 |
| 2019/0258925 A1 | 8/2019 | Li |
| 2019/0302993 A1 | 10/2019 | Francis |
| 2019/0311550 A1 | 10/2019 | Cuthbertson |
| 2019/0325621 A1 | 10/2019 | Wang |
| 2019/0325626 A1 | 10/2019 | Tao |
| 2019/0356529 A1 | 11/2019 | Gulati |
| 2019/0391731 A1 | 12/2019 | Adler |
| 2020/0057828 A1 | 2/2020 | Harrison |
| 2020/0082389 A1 | 3/2020 | Regev |
| 2020/0090407 A1 | 3/2020 | Miranda |
| 2020/0126316 A1 | 4/2020 | Sharma |
| 2020/0143445 A1 | 5/2020 | Davidson |
| 2020/0147486 A1 | 5/2020 | Bleasdale-Shepherd |
| 2020/0159870 A1 | 5/2020 | Bowen |
| 2020/0159871 A1 | 5/2020 | Bowen |
| 2020/0160612 A1 | 5/2020 | Bowen |
| 2020/0184127 A1 | 6/2020 | Bell |
| 2020/0186338 A1 | 6/2020 | Andon |
| 2020/0219093 A1 | 7/2020 | Malhotra |
| 2020/0242279 A1 | 7/2020 | Malkosh |
| 2020/0250661 A1 | 8/2020 | Padmanabhan |
| 2020/0250683 A1 | 8/2020 | Padmanabhan |
| 2020/0273048 A1 | 8/2020 | Andon |
| 2020/0279008 A1 | 9/2020 | Jain |
| 2020/0282370 A1 | 9/2020 | Chan |
| 2020/0285800 A1 | 9/2020 | Monroe |
| 2020/0293024 A1 | 9/2020 | Pail |
| 2020/0311665 A1 | 10/2020 | Gray |
| 2020/0351089 A1 | 11/2020 | Wentz |
| 2020/0358783 A1 | 11/2020 | Beaver, III |
| 2020/0380080 A1 | 12/2020 | Glunz |
| 2020/0402126 A1 | 12/2020 | Choche |
| 2020/0402127 A1 | 12/2020 | Stahlman |
| 2020/0410616 A1 | 12/2020 | Theunis |
| 2021/0004995 A1 | 1/2021 | Burg |
| 2021/0012278 A1 | 1/2021 | Alon |
| 2021/0012433 A1 | 1/2021 | Zhu |
| 2021/0027352 A1 | 1/2021 | Bell |
| 2021/0027353 A1 | 1/2021 | Asbury |
| 2021/0042830 A1 | 2/2021 | Burke |
| 2021/0125192 A1 | 4/2021 | Beaver, III |
| 2021/0133875 A1 | 5/2021 | Foote |
| 2021/0166472 A1 | 6/2021 | Han |
| 2021/0174275 A1 | 6/2021 | Valencich |
| 2021/0174603 A1 | 6/2021 | Han |
| 2021/0192097 A1 | 6/2021 | Beaver, III |
| 2021/0192814 A1 | 6/2021 | Oh |
| 2021/0201336 A1 | 7/2021 | Mallett |
| 2021/0224797 A1 | 7/2021 | Berengoltz |
| 2021/0241243 A1 | 8/2021 | Wiklof |
| 2021/0241321 A1 | 8/2021 | Downing |
| 2021/0248594 A1 | 8/2021 | Yantis |
| 2021/0258155 A1 | 8/2021 | Andon |
| 2021/0264426 A1 | 8/2021 | Alt |
| 2021/0264517 A1 | 8/2021 | Harris |
| 2021/0266352 A1 | 8/2021 | Beaver, III |
| 2021/0272037 A1 | 9/2021 | Hanebeck |
| 2021/0287285 A1 | 9/2021 | Yan |
| 2021/0287406 A1 | 9/2021 | Tejima |
| 2021/0304197 A1 | 9/2021 | Pomassl |
| 2021/0326494 A1 | 10/2021 | White |
| 2021/0326849 A1 | 10/2021 | Yantis |
| 2021/0333986 A1 | 10/2021 | Lee |
| 2021/0342946 A1 | 11/2021 | Leise |
| 2021/0357542 A1 | 11/2021 | Bowen |
| 2021/0366164 A1 | 11/2021 | Takase |
| 2021/0373722 A1 | 12/2021 | Bamford |
| 2021/0383031 A1 | 12/2021 | Wilcox |
| 2021/0390549 A1 | 12/2021 | Rule |
| 2021/0398095 A1 | 12/2021 | Mallett |
| 2021/0407007 A1 | 12/2021 | Eriksson |
| 2022/0026877 A1 | 1/2022 | Small |
| 2022/0067984 A1 | 3/2022 | Choi |
| 2022/0101614 A1 | 3/2022 | Luo |
| 2022/0122483 A1 | 4/2022 | Krasley |
| 2022/0129964 A1 | 4/2022 | Harvill |
| 2022/0230240 A1 | 7/2022 | Sliwka |
| 2022/0245696 A1 | 8/2022 | Davidson |
| 2022/0251777 A1 | 8/2022 | Schultz |

OTHER PUBLICATIONS

Office Action dated Apr. 11, 2022, received in European Patent Application No. 18 739 713, in 16 pages.

Mahadeokar et al., "Open Sourcing a Deep Learning Solution for/open-sourcing-a-deep-learning-solution for Detecting NSFW Images," Sep. 30, 2016; XP055908048; Retrieved from the internet: URL: https://yahooeng.tumblr.com/post/151148689421/open-sourcing-a-deep-learning-solution-for#:~:text=Open%20Sourcing%20a%20Deep%20%20Learning%20Solution%20for%20Detecting%20NSFW%20Images&text=Automatically%20identifying%20that%20an%20image.trying%20to%20takle%20for%20decades. [retrieved on Apr. 1, 2022].

"All-In-One Designer—Design Studio Features" (retrieved from the Internet at Youtube "All-In-One Designer—Design Studio Features," designnbuyTV https://www.youtube.com/watch?v=wejvOhC6-54 Oct. 10, 2018 (Year: 2018).

DesignnbuyTV: "Web to Print Software—All-in-one Designer—Demo", YouTube, Nov. 19, 2013, pp. 1-1, url:https://www.youtube.com/watch?v=IcEX2isIP08.

(56) References Cited

OTHER PUBLICATIONS

Freeformatter ("XSL Transformer—XSL T", 2016, https://www.freeformatter.com/xsl-transformer.html).
International Search Report and Written Opinion dated Oct. 2, 2018, received in International Patent Application No. PCT/US2018/038594.
Lifewire "What Is a Mobile Device?," Retrieved from Wayback Machine Sep. 27, 2018, storing https://www.lifewire.com/what-is-a-mobile-device-2373355 (Year: 2018).
PCT International Search Report & Written Opinion, regarding International Application No. PCT/US2019/062506, dated Mar. 3, 2020, 24 pages.
Quackit retrieved from the Wayback Machine Internet Archive May 8, 2017 https://www.quackit.com/html_5/tags/html_iframe_tag.ofm (Year: 2017).
Wikipedia article on Mobile Devices Retrieved from Wayback Machine Jul. 26, 2018, storing https://en.wikipedia.org/wiki/Mobile_device (Year: 2018).

\* cited by examiner

FIG. 4E

FIG. 4AAA

FIG. 4BBB

FIG. 4CCC

FIG. 4DDD

FIG. 4EEE

FIG. 4FFF

FIG. 4GGG

FIG. 4HHH

FIG. 4III

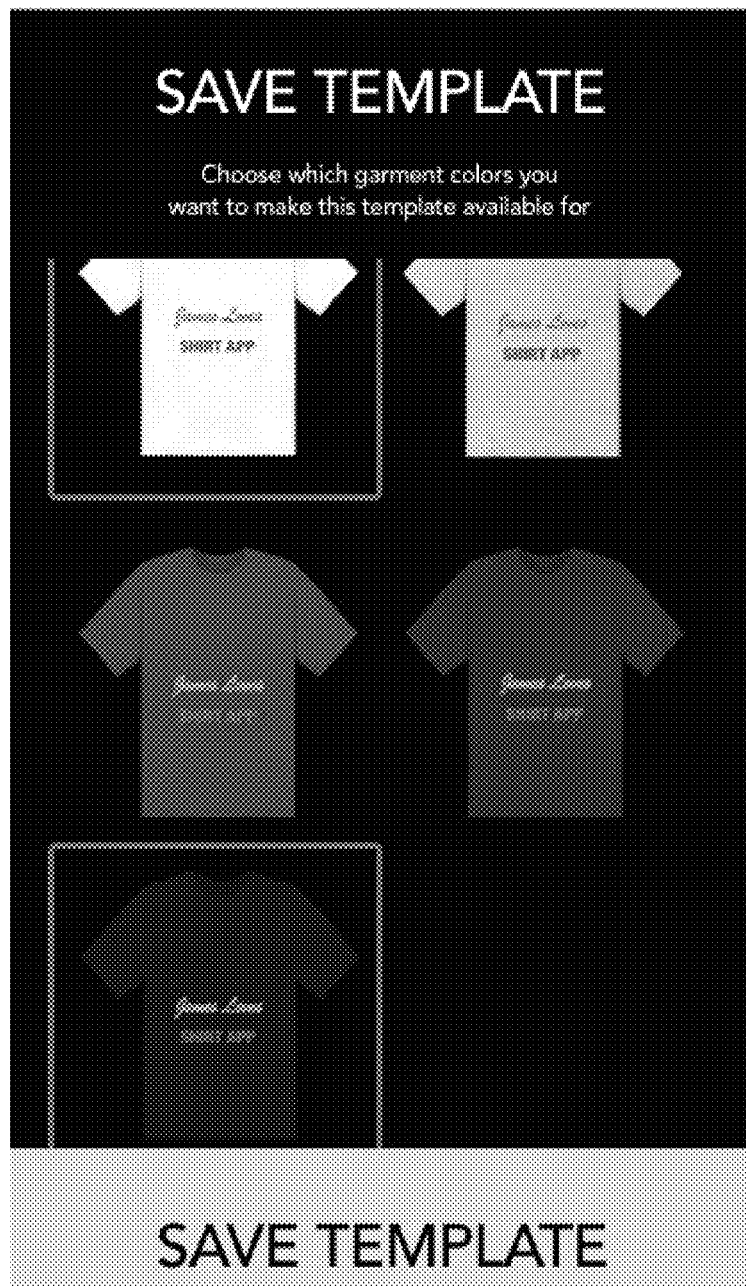
FIG. 4JJJ

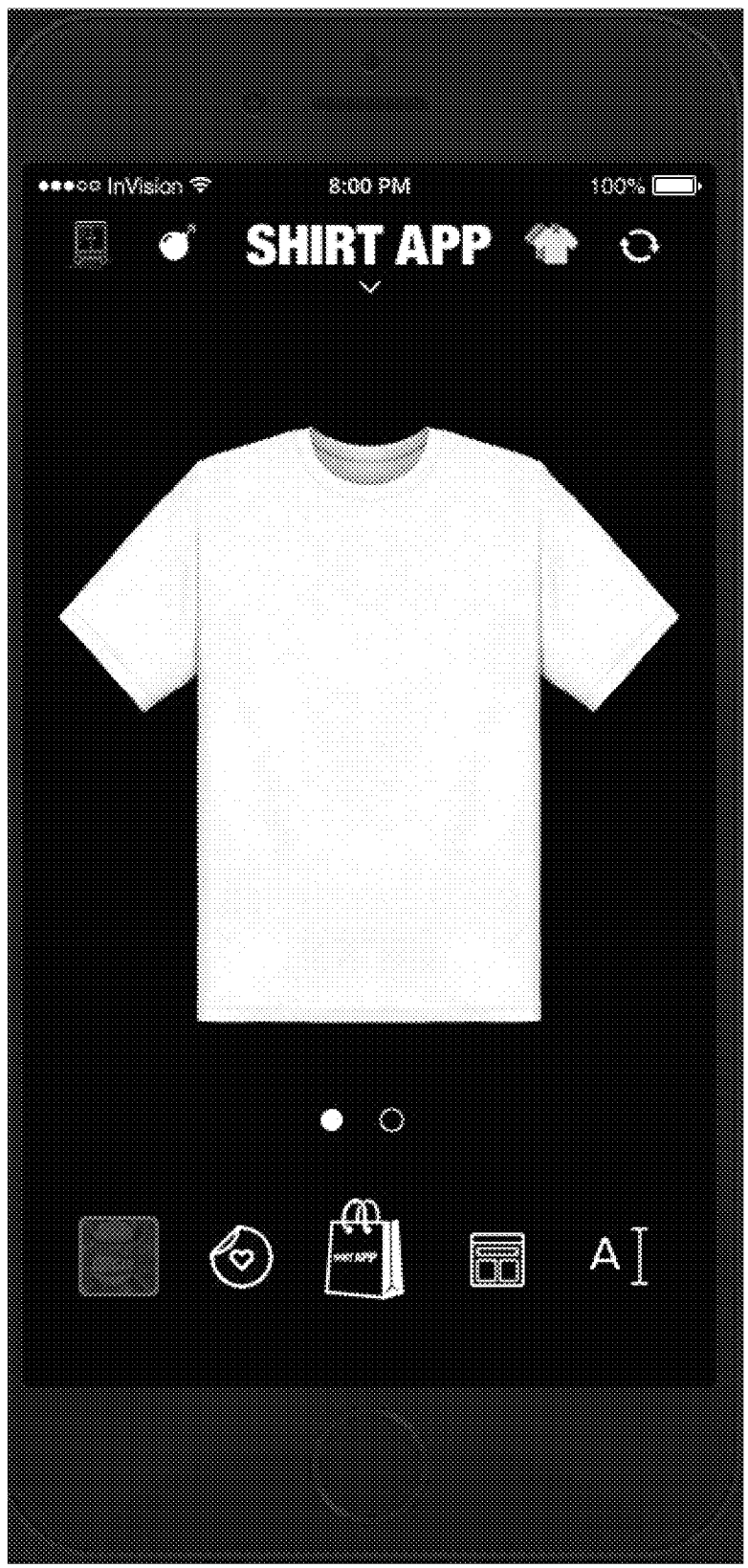
FIG. 4KKK

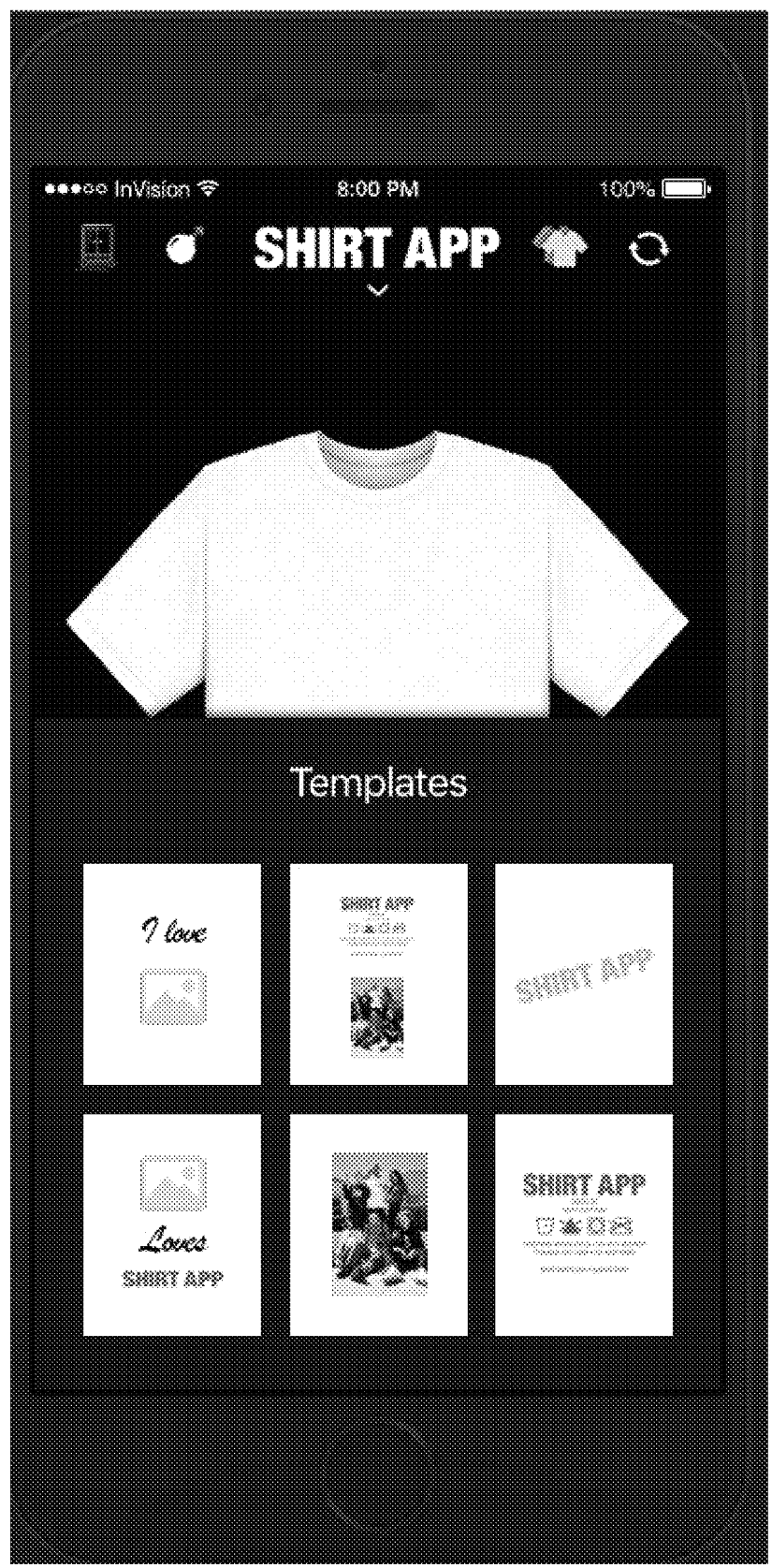
FIG. 4LLL

FIG. 4MMM

FIG. 4NNN

FIG. 4000

FIG. 4PPP

FIG. 4QQQ

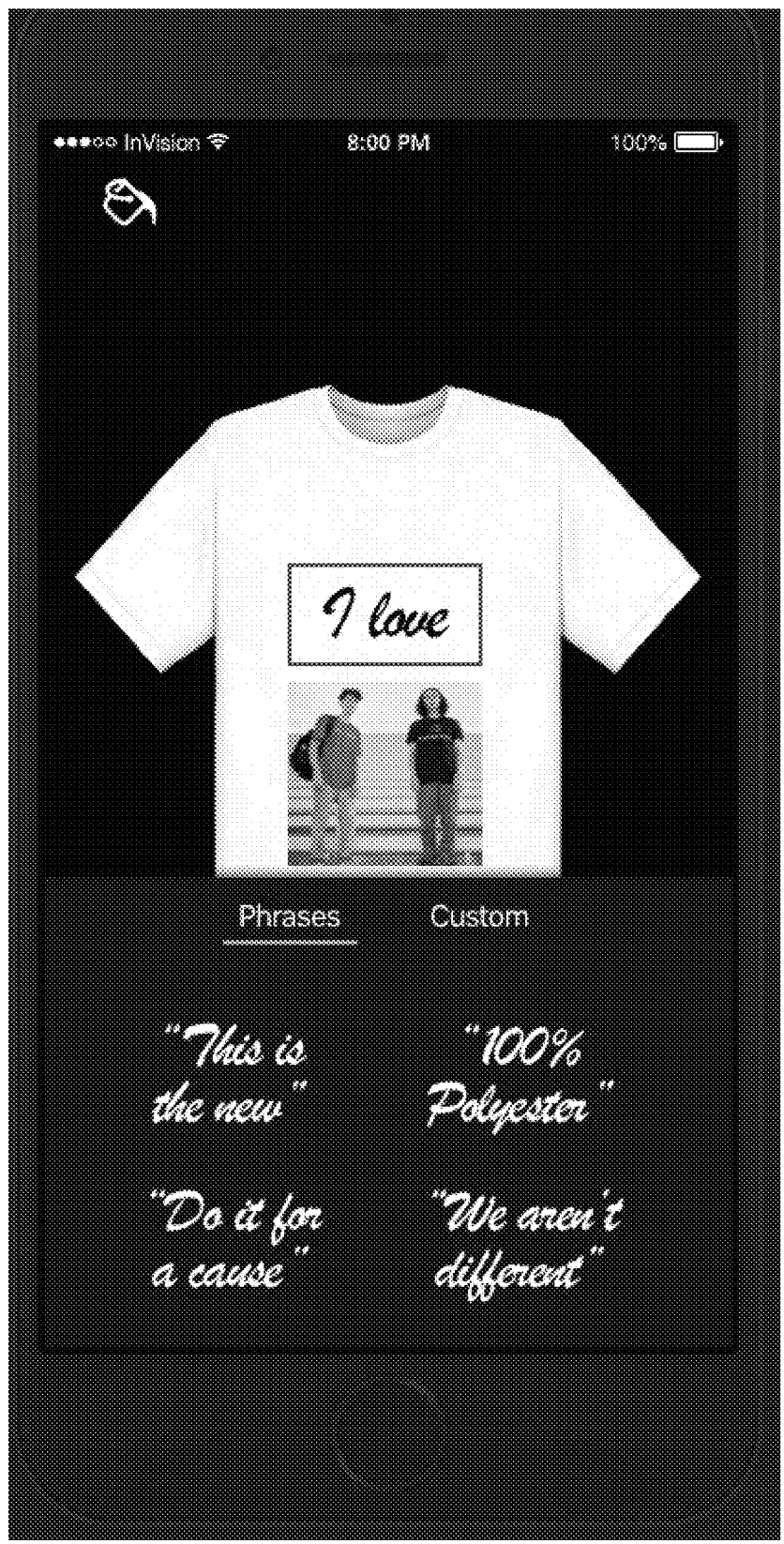
FIG. 4RRR

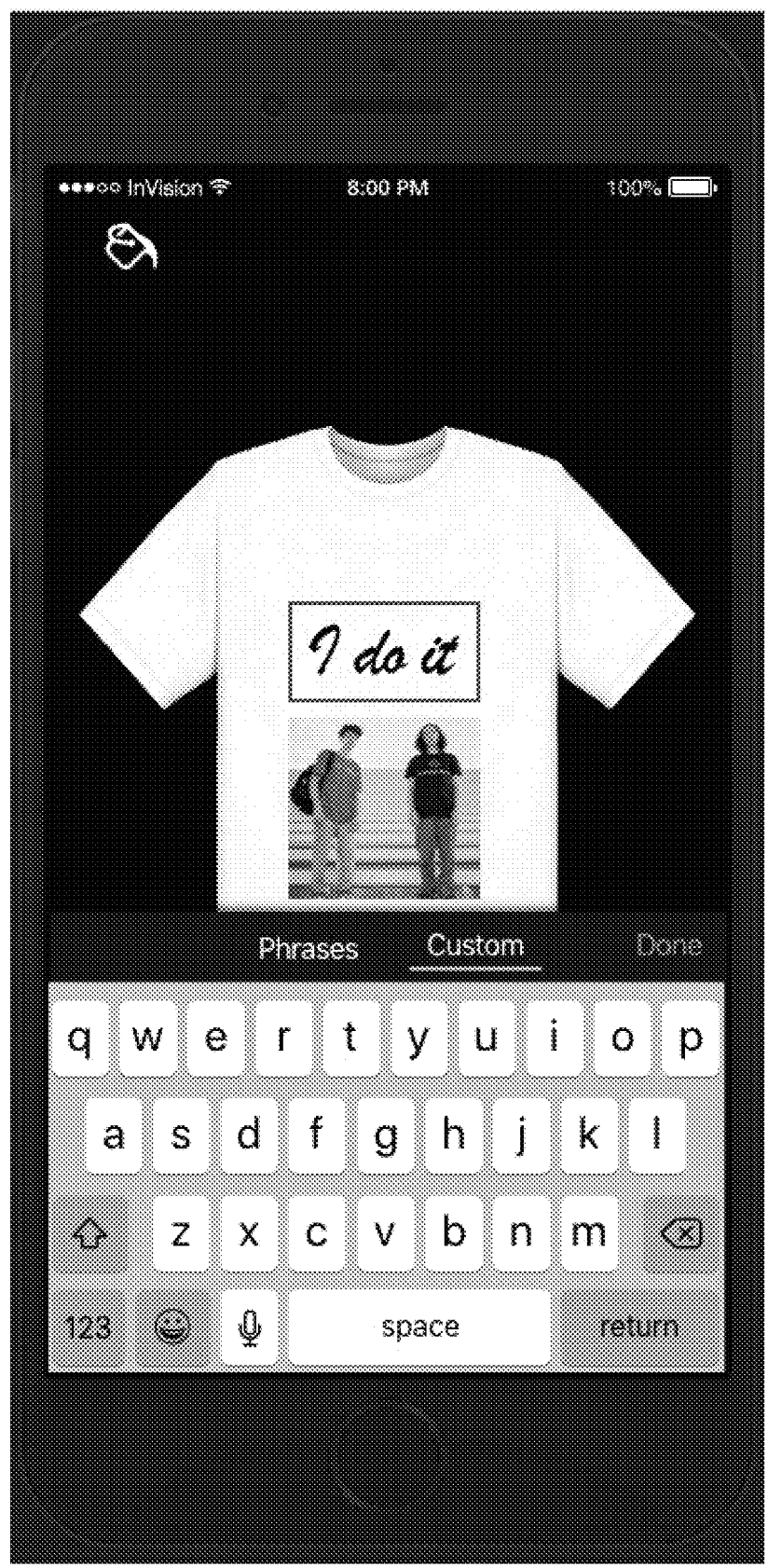
FIG. 4SSS

FIG. 4TTT

FIG. 4UUU

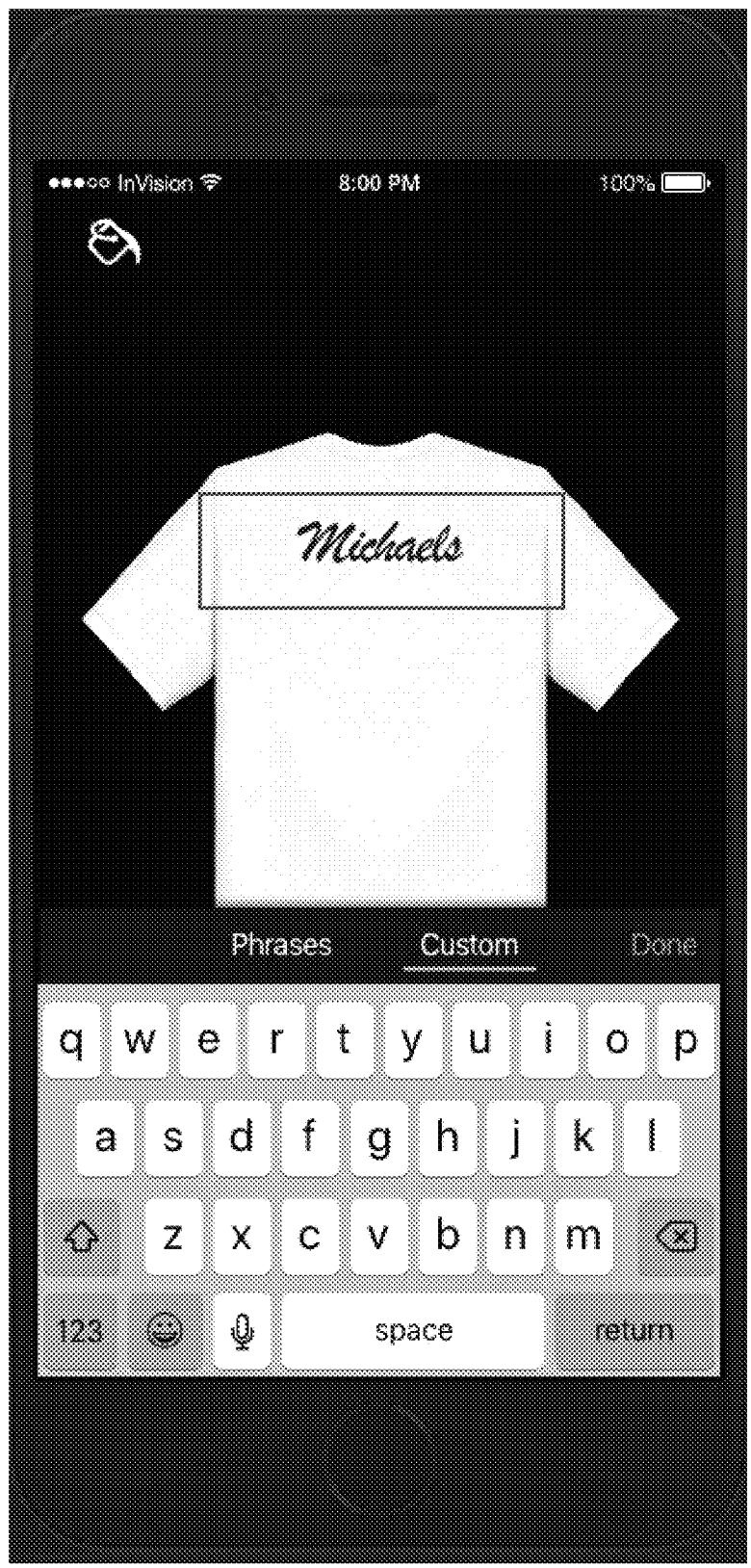
FIG. 4VVV

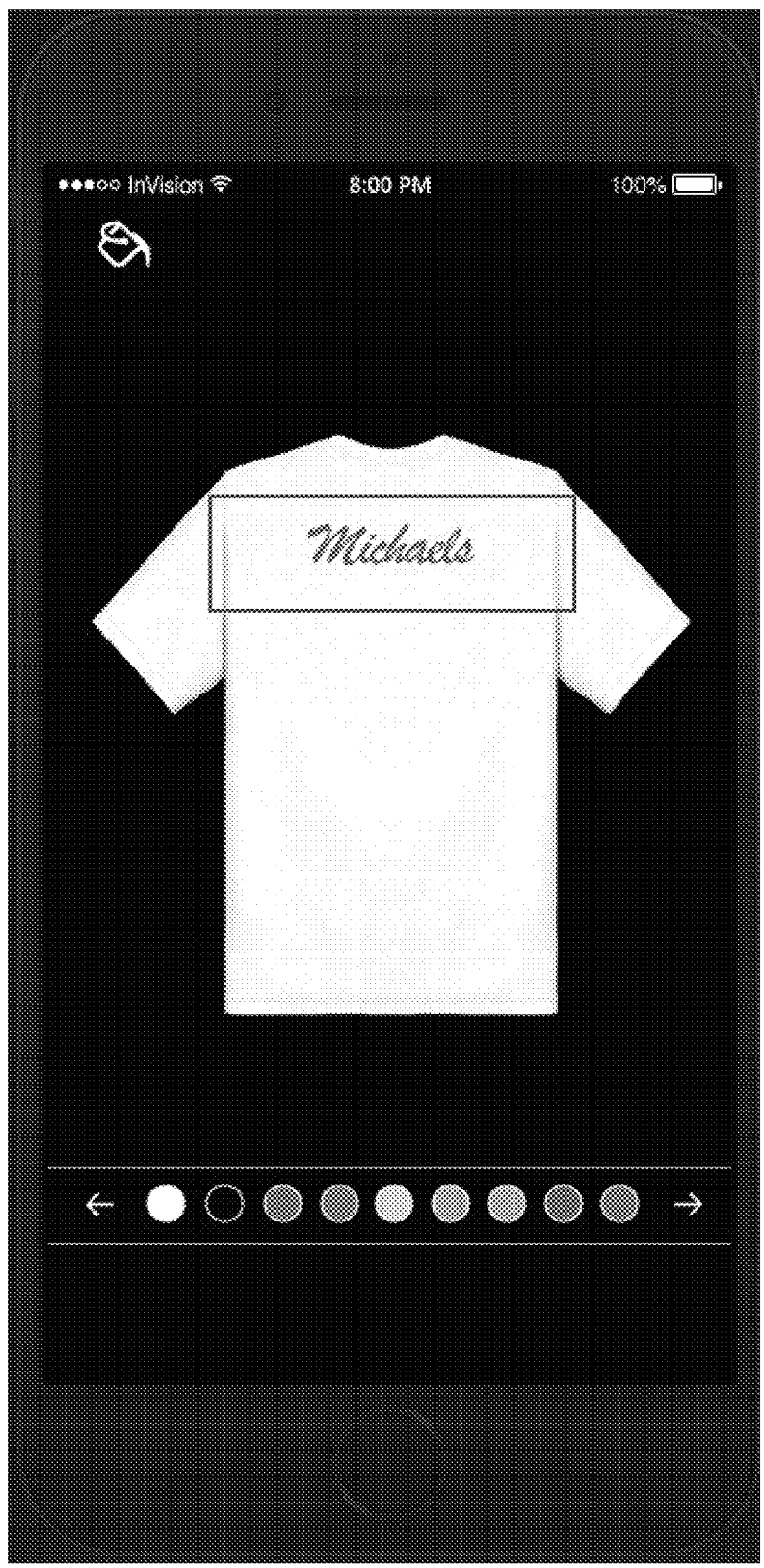
FIG. 4WWW

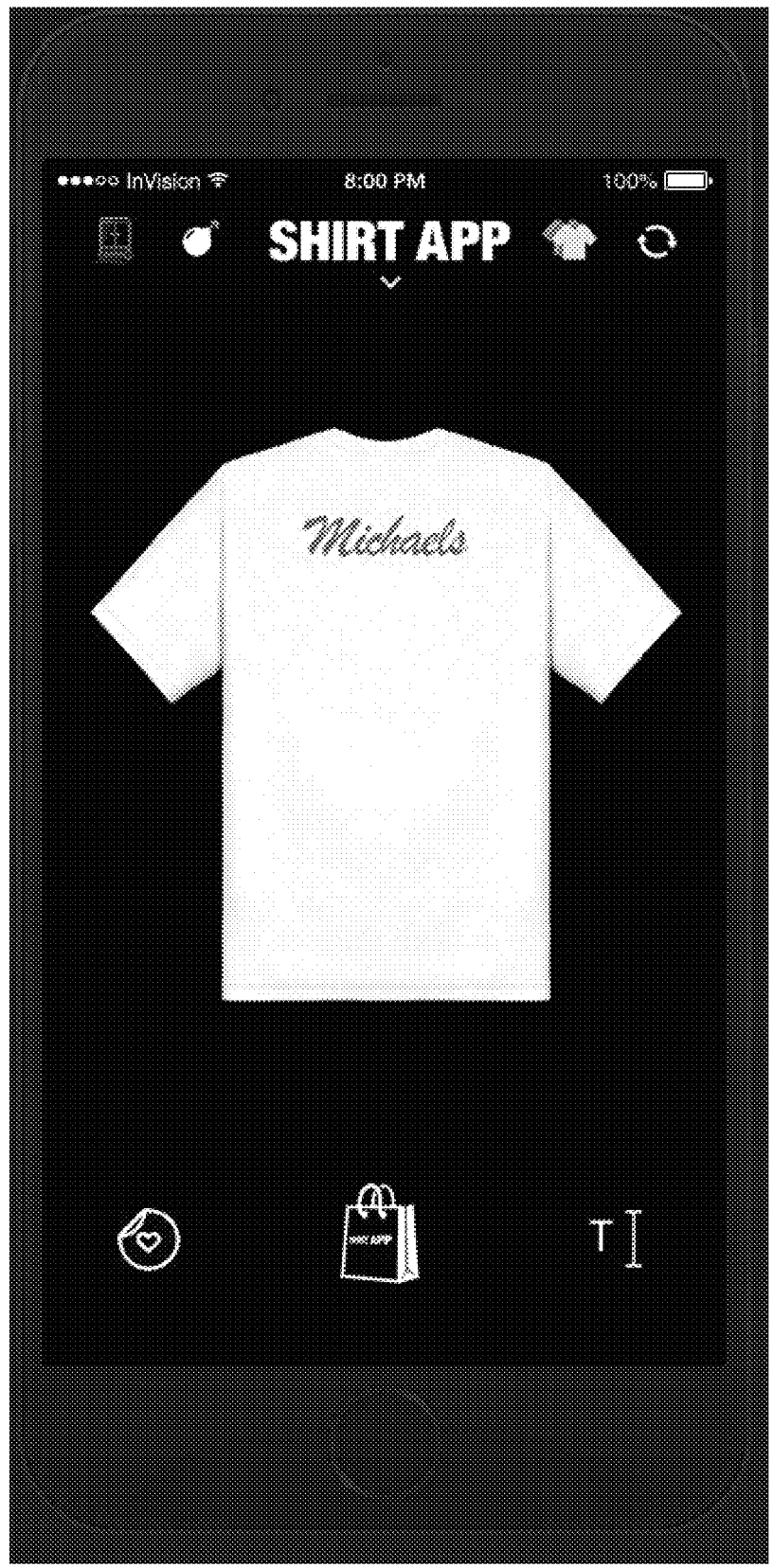
FIG. 4XXX

FIG.4YYY

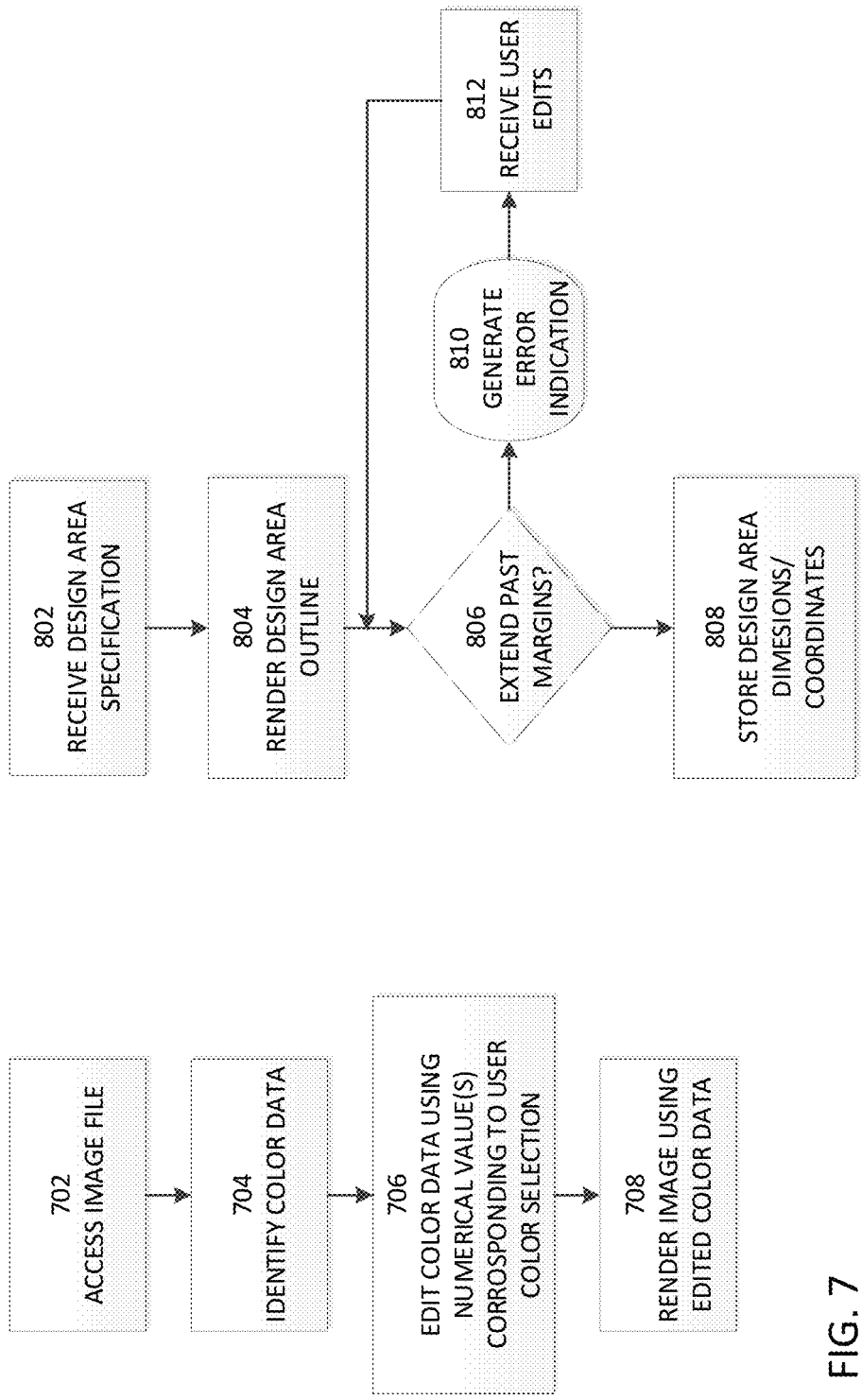

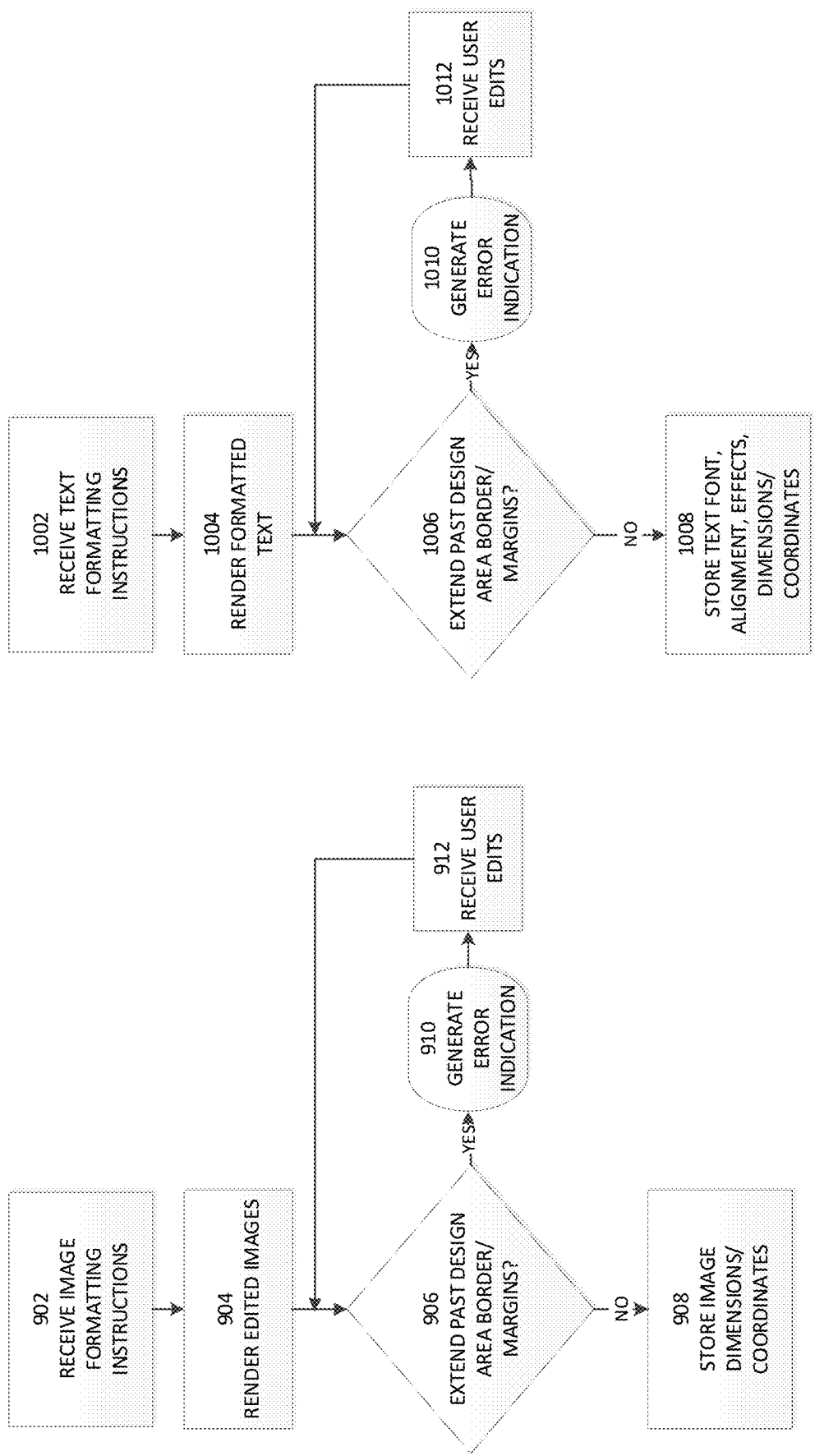

1390
ENABLE USER TO RESTRICT CUSTOMIZATION OF CONTENT PROPERTIES (E.G., SIZE, ORIENTATION, LAYERS, AND/OR POSITION)

1392
ENABLE USER TO SELECT PRODUCT COLORS FOR WHICH TEMPLATE IS TO BE MADE AVAILABLE

FIG. 13C

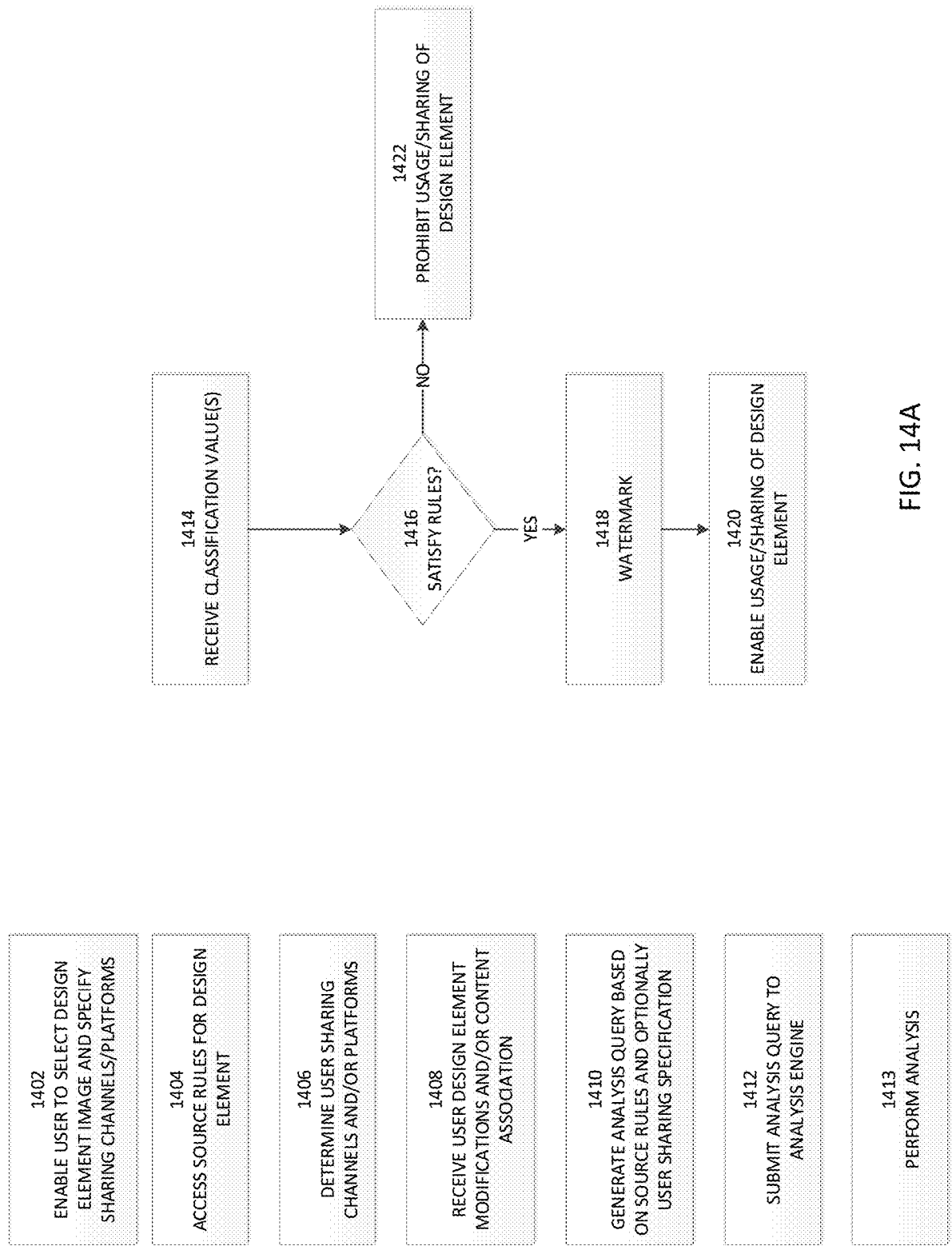

  
FIG. 16D-1　　　　　FIG. 16D-2　　　　　FIG. 16D-3

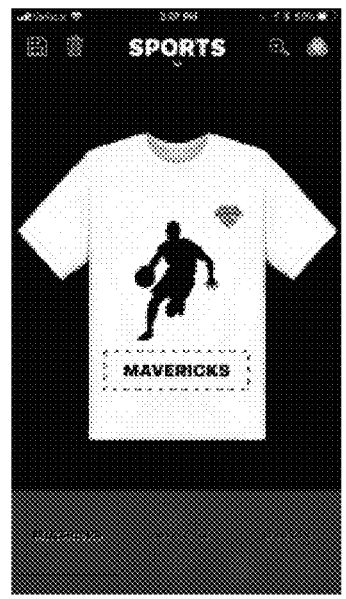 
FIG. 16D-4  FIG. 16D-5

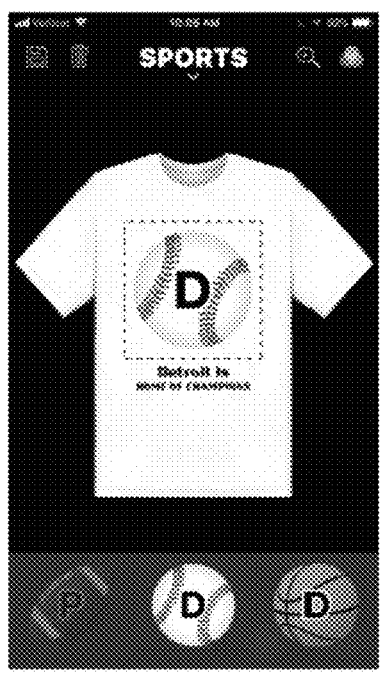
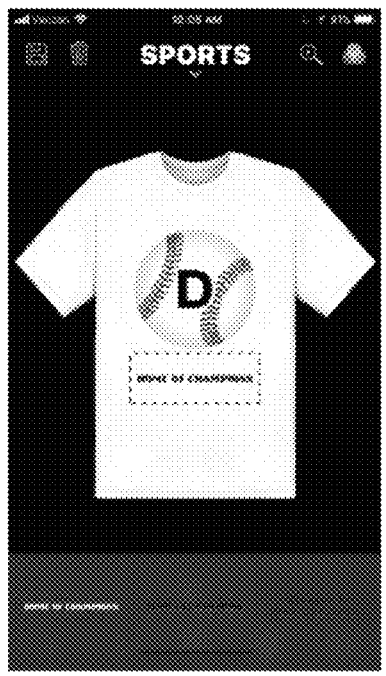
FIG. 16F-4  FIG. 16F-5  FIG. 16F-6

Name of template
battle royale 

gfx_template_id: 6

Permitted Garment Colors
● ● ● ● ○

Slot 1
    Swappable    

Images are swapped from the shop's image library
Customizable    

Slot 2
    Swappable    

| cats [Cats] |  |
| birds [Birds] |  |

Select Collection    
Customizable    

Slot 3
    Swappable    

| Dogs [Dogs ] |  |

Select Collection    
Customizable    

Slot 4
    Swappable    

| battle phrases [Do... |  |

Select Collection    
Customizable    

⚠ Template Exceptions

| cat 4 | ⚠ | dog 4 | × |

FIG. 16G

  
FIG. 16H-1         FIG. 16H-2         FIG16H-3
FIG. 16H-4

Cancel mittens

Chrome

FIG. 24J

COMPUTER AIDED SYSTEMS AND METHODS FOR CREATING CUSTOM PRODUCTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 1 CFR 1.57.

BACKGROUND

The present invention is generally related to computer aided design and manufacture of custom products.

DESCRIPTION OF THE RELATED ART

Computer-Aided Design (CAD) systems are conventionally used to design articles of manufacture. However, such conventional CAD systems often have overly difficult to use user interfaces, do not adequately ensure compliance with manufacturing processes, and do not provide adequate mechanisms for a manufacturer to provide flexibility for users to customize articles of manufacture.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a computer-aided design (CAD) computer system comprising: a computing device; a network interface; a non-transitory data media configured to store instructions that when executed by the computing device, cause the computing device to perform operations comprising: provide for display on a terminal of a first user a collections user interface enabling a first user to specify a plurality of sets of content item collections; provide for display on the terminal of the first user a product selection user interface enabling a first user to select a product image from a library of product images with which sets of content item collections may be associated; receive from the first user, via the product selection interface, a selection of an image of a first product from the library of product images; provide, for display on the terminal of the first user, a design customization user interface enabling the first user to define a first template comprising a plurality of design areas for use in product customization; enable the first user to define the first template using a design customization user interface by: assigning a plurality of sets of content to a given defined design area; specifying one or more exceptions indicating at least two content items in the plurality of sets of content which may not be used together; add the first template to an online catalog accessible by a plurality of end users, wherein the first template is configured to be used by end users to customize one or more products, including at least the first product; enable a first end user interface to be displayed on an end user device comprising a touch screen; detect a user selection of the first product via the first end user interface; cause a first image of the first product to be displayed by the end user device; detect a user touch of a first design area; determine which sets of content items are associated with the first design area; cause a first swipeable menu of content items from the sets of content items associated with the first design area to be displayed via the touch screen; detect a user touch of a first content item from the first swipeable menu of content items from the sets of content items associated with the first design area; enable the first content item to be displayed in the first design area; detect a user touch of a second design area; determine which sets of content items are associated with the second design area; access exception records associated with the first content item; using the accessed exception records, determine which content items in the sets of content items associated with the second design area cannot be used with the first content item in the first design area; cause a second swipeable menu of content items from the sets of content items associated with the second design area to be displayed via the touch screen, wherein the second swipeable menu is configured to indicate content items in the sets of content items associated with the second design area that cannot be used with the first content item in the first design area; detect a user touch of a second content item from the second swipeable menu of content items from the sets of content items associated with the second design area; determine whether the second content item can be used; based on a determination that the second content item can be used, enable the second content item to be displayed in the second design area; and cause the first content and the second content item, to be printed or embroidered on a physical instance of the first product at respective locations corresponding to the first design area and the second design area.

An aspect of the disclosure relates to a computer-aided design (CAD) computer system comprising: a computing device; a network interface; a non-transitory data media configured to store instructions that when executed by the computing device, cause the computing device to perform operations comprising: enable a design customization user interface to be rendered on a display associated with a first user, the design customization user interface configured to enable the first user to define a first template comprising a plurality of design areas for use in product customization, wherein the design customization user interface is configured to enable the first user to: assign at least one set of content to a given defined design area; specify one or more exceptions indicating at least two content items in the at least one set of content which may not be used together; enable the first template to be accessible by users via respective user devices, wherein the first template is configured to be used by users to customize one or more products; enable a first user interface to be displayed on a user device; enable detection of a selection of a first product via the first user interface, the first product associated with the first template; enable a first image of the first product to be displayed by the user device; enable detection of a selection of a first area of the displayed first product; enable a determination as to which sets of content items are associated with the first design area of the displayed first product; enable a first menu of content items from the sets of content items associated with the first design area to be displayed; enable detection of a selection of a first content item from the first menu of content items; enable the first content item to be displayed in the first design area; enable detection of a selection of a second design area; enable determination as to which sets of content items are associated with the second design area; enable exception records associated with the first content item to be accessed; enable, via use of the exception data, a determination as to which content items in the sets of content items associated with the second design area are proscribed from being used with the first content item in the first design area; enable a second menu of content items from the sets of content items associated with the second design area to be displayed, wherein the second menu is configured to indicate content items in the sets of content items associated with the second design area that are proscribed from being used with the first content item in the first design area; enable a detection of a selection of a second content item from the second menu of content items from the sets of content items associated with the second design area; enable a determination to be made as to whether the second content item can be used; based on a determination that the second content item can be used, enable the second content item to be displayed in the second design area; and enable the first content and the second content item to be printed or embroidered on a physical instance of the first product at respective locations corresponding to the first design area and the second design area.

An aspect of the disclosure relates to a computer implemented method, the method comprising: enabling a design customization user interface to be rendered on a display associated with a first user, the design customization user interface configured to enable the first user to define a first template comprising a plurality of design areas for use in product customization, wherein the design customization user interface is configured to enable the first user to: assign one or more sets of content to a given defined design area of a product; specify one or more exceptions indicating at least two content items in the one or more sets of content which may not be used together; enabling the first template to be included in an online catalog accessible by a plurality of users, wherein the first template is configured to be used by users to customize one or more products; enabling a first user interface to be displayed on an user device; enabling detection of a selection of a first product via the first user interface; enabling a first image of the first product to be displayed by the user device; enabling detection of a selection of a first area of the displayed first product; enabling a determination as to which sets of content items are associated with the first design area of the displayed first product; enabling a first menu of content items from the sets of content items associated with the first design area to be displayed; enabling detection of a selection of a first content item from the first menu of content items; enabling the first content item to be displayed in the first design area; enabling exception data associated with the first content item to be accessed, that exception data indicating content items that are proscribed from being used in conjunction with the first content item; enabling detection of a selection of a second design area; enabling determination as to which sets of content items are associated with the second design area; enabling a second menu of content items from the sets of content items associated with the second design area to be displayed, wherein the second menu is configured to indicate, using the exception data, content items in the sets of content items associated with the second design area that are proscribed from being used with the first content item in the first design area; enabling a detection of a selection of a second content item from the second menu of content items from the sets of content items associated with the second design area; and enabling the first content and the second content item to be printed or embroidered on a physical instance of the first product at respective locations corresponding to the first design area and the second design area.

An aspect of the disclosure relates to non-transitory data media configured to store instructions that when executed by a computing device, cause the computing device to perform operations comprising: enabling a design customization user interface to be rendered on a display associated with a first user, the design customization user interface configured to enable the first user to define a first template comprising a plurality of design areas for use in object customization, wherein the design customization user interface is configured to enable the first user to: assign one or more sets of content to a given defined design area of an object; specify one or more exceptions indicating at least two content items in the one or more sets of content which may not be used together; enabling the first template to be included in an online catalog accessible by a plurality of users, wherein the first template is configured to be used by users to customize one or more objects; enabling a first user interface to be displayed on an user device; enabling detection of a selection of a first object via the first user interface; enabling a first image of the first object to be displayed by the user device; enabling detection of a selection of a first area of the displayed first object; enabling a determination as to which sets of content items are associated with the first design area of the displayed first object; enabling a first menu of content items from the sets of content items associated with the first design area to be displayed; enabling detection of a selection of a first content item from the first menu of content items; enabling the first content item to be displayed in the first design area; enabling exception data associated with the first content item to be accessed, that exception data indicating content items that are proscribed from being used in conjunction with the first content item; enabling detection of a selection of a second design area; enabling determination as to which sets of content items are associated with the second design area; enabling a second menu of content items from the sets of content items associated with the second design area to be displayed, wherein the second menu is configured to indicate, using the exception data, content items in the sets of content items associated with the second design area that are proscribed from being used with the first content item in the first design area; enabling a detection of a selection of a second content item from the second menu of content items from the sets of content items associated with the second design area; and enabling the first content and the second content item to be rendered on an instance of the first object at respective locations corresponding to the first design area and the second design area.

An aspect of the disclosure relates to a computer implemented method, the method comprising: enabling a design customization user interface to be rendered on a display associated with a first user, the design customization user interface configured to enable the first user to define a first template comprising a plurality of design areas for use in object customization, wherein the design customization user interface is configured to enable the first user to: assign one or more sets of content to a given defined design area of an object; specify one or more exceptions indicating at least two content items in the one or more sets of content which may not be used together; enabling the first template to be included in an online catalog accessible by a plurality of users, wherein the first template is configured to be used by users to customize one or more objects; enabling a first user interface to be displayed on an user device; enabling detection of a selection of a first object via the first user interface; enabling a first image of the first object to be displayed by the user device; enabling detection of a selection of a first area of the displayed first object; enabling a determination as to which sets of content items are associated with the first design area of the displayed first object; enabling a first menu of content items from the sets of content items associated with the first design area to be displayed; enabling detection of a selection of a first content item from the first menu of content items; enabling the first content item to be displayed in the first design area; enabling exception data associated with the first content item to be accessed, that exception data indicating content items that are proscribed from being used in conjunction with the first content item; enabling detection of a selection of a second design area; enabling determination as to which sets of content items are associated with the second design area; enabling a second menu of content items from the sets of content items associated with the second design area to be displayed, wherein the second menu is configured to indicate, using the exception data, content items in the sets of content items associated with the second design area that are proscribed from being used with the first content item in the first design area; enabling a detection of a selection of a second content item from the second menu of content items from the sets of content items associated with the second design area; and enabling the first content and the second content item to be rendered on an instance of the first object at respective locations corresponding to the first design area and the second design area.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIGS. 5A-14B illustrate example operations.

FIGS. 16A-16M illustrate addition example user interfaces.

FIGS. 24A-24K illustrate additional example user interfaces.

DESCRIPTION

Figure 1A:
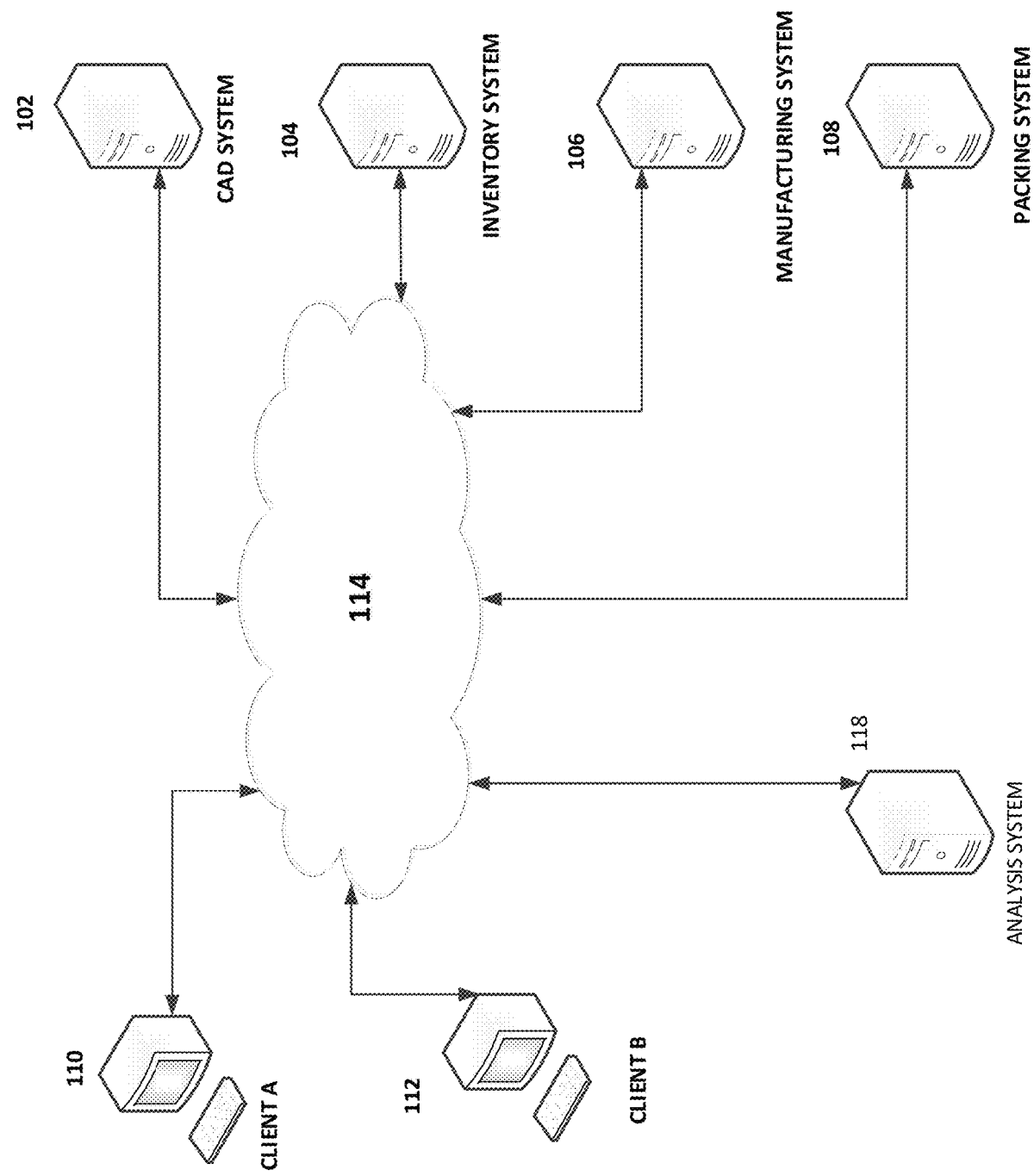
FIG. 1A is a block diagram illustrating an example embodiment of an operating environment.

Systems and methods are described that provide computer aided design of customized items. Non-limiting examples of such items may include t-shirts, hoodies, shirts, jackets, dresses, pants, glasses, phone cases, laptop skins, backpacks, laptop cases, tablet cases, hairbands, wristbands, jewelry, and the like. Techniques, processes and user interfaces are disclosed that enable more efficient and accurate generation, editing, and printing or embroidering of design elements. Because the resulting customized items will more closely reflect user-desired customizations, there may be less wastage of materials (e.g., item fabric, ink, etc.), as there will be fewer defective customized items.

An aspect of the disclosure relates to computer aided design (CAD) systems and methods that enable an item (e.g., a product) provider to submit (e.g., via an upload or by providing a link) one or more images of the item (e.g., a photograph or graphic image of the front, back, left side, right side, top view, bottom view, and/or interior view of the item) and/or portions of the item (e.g., left sleeve, right sleeve, shoe lace, strap, etc.) for posting to an online interactive catalog of one or more items. A further aspect of the disclosure relates to systems and methods adapted to enable an item provider to define certain customization options for users and define certain areas of the item which may or may not be customized by users. For example, optionally an item provider may specify the types of customizations described herein. An item provider may be an item seller, manufacturer, a branding entity (e.g., a celebrity or brand name licensor), or a collaboration initiator. A collaboration initiator may be a user that is also be an end user (item purchaser/recipient) but that has initiated an end user customization collaboration for an item of an item seller, manufacturer, or branding entity.

An example CAD system may provide a user interface including a design area and a set of tools via which a product provider can specify and/or apply design elements (e.g., text, image, and/or a graphic design elements) to a product, specify areas to which an end user may specify design elements to be applied (e.g., printed or embroidered), specify permitted end user modifications to a design element originally specified by the product provider (that the system may perform in response to an end user request), and/or specify permitted design element types and characteristics that the system may apply to the product in response to an end user request.

A design element may be in the form of a template. Templates, including image templates, text templates, and templates that include both image(s) and text may be presented to an end-user to provide the end-user with a starting point for customization, thereby simplifying the customization process. A template, by way of example, may include text, a digital sticker (e.g., a licensed cartoon character image), a logo, an image of a person, etc. A template may be editable by the end-user in accordance with item provider and/or template provider restrictions. For example, as discussed further elsewhere herein, a user interface may be provided via which an item provider may specify which colors in a given image can or cannot be changed. By way of further example, a user interface may be provided via which an item provider may specify which portions of an image may or may not be edited. By way of still further example, a user interface may be provided via which an item provider may specify design element size change restrictions (e.g., a maximum and/or a minimum height or width), restrict adding one or more specified colors to a design element, restrict changes to design element orientation (e.g., maximum and/or minimum rotation angle), restrict changes to text content (e.g., prevent changes to one or more words in a text design element), restrict changes to a design template height/width ratio, restrict changes to one or more fonts, restrict the use of one or more effects (e.g., text curvature effects, 3D effects, etc.), and/or the like. By way of yet further example, a user interface may be provided via which a user may specify placement/movement restrictions for templates, images and/or text. By way of further example, a user interface may be provided via which a user may specify that certain text and/or image notifications (e.g., copyright notices, trademark notices) or logos may not be removed and/or altered.

By way of illustration, if a sports team is offering a template (e.g., the team logo on a background) which may be added to an item, the sports team may want to permit an end-user to change the background color but not the color of the logo itself, which may be in the official team colors. Thus, the sports team may specify that the color corresponding to the team color (e.g., purple) may not be changed but other colors in the template may be changed. By way of further example, a user interface may permit an item provider to specify that portion of a template that corresponds to a person (e.g., an athlete, performer, celebrity, etc.), cannot be deleted by an end user but that other portions of the template may be deleted. By way of yet further example, a user interface may permit an item provider to specify that an end-user may distort (e.g., by changing a height to width ratio) certain templates, such as logos or cartoon characters, but may not distort specified other templates (e.g., a template that includes an image of an athlete, performer, celebrity, etc.).

Optionally, one or more of the systems and processes described herein may be configured to enable a user (e.g., a product provider, an intellectual property licensor (e.g., licensing a cartoon character, a logo, a brand name, etc.), someone acting on behalf of the product provider or licensor such as the system operator, etc.) to specify a palette of colors (e.g., solid colors, or patterns, such a plaid, stripped, rainbow, etc.), assets, content (e.g., text, graphic, image content), fonts, and/or special effects, that may be utilized by other users (e.g., end users, licensees, etc.) in customizing a product or in customizing a design element (e.g., a sticker, a template, or a portion thereof).

By way of example, a user can define a restricted content palette (e.g., text and/or image content) from which an end user may select when customizing a product or a design element being applied to the product. Additionally, a menu of available colors may be provided from which the user may select to define a restricted color palette from which an end user may select when customizing a product or a design element being applied to the product.

By way of further example, a menu of available design assets may be provided from which the user may select to define a restricted asset palette from which an end user may select when customizing a product or a design element being applied to the product. By way of yet further example, a menu of available of fonts may be provided from which the user may select to define a restricted font palette from which an end user may select when customizing a product or a design element being applied to the product. By way of further example, a menu of available of text effects may be provided from which the user may select to define a restricted text effects palette from which an end user may select when customizing a product or a design element being applied to the product. Optionally, a user may require end users to use certain restricted palettes (e.g., fonts) in performing certain types of corresponding customizations and enable end users to select any customizations of certain types (e.g., colors) utilizing the full menu made available by the system.

Optionally, the user may be able specify, via a corresponding user interface, different restricted palettes for different products, product types (e.g., t-shirt, hoodie, backpack, phone case, etc.), and/or design elements. By way of illustration, the user may be able to define a first restricted palette for a first jacket and a second restricted palette for a second jacket. By way of further example, the user may be able to define a first restricted palette to be used for t-shirts, and a second restricted palette to be used for backpacks. By way of yet further example, the user may be able to define a first restricted palette to be used for a first template, and a second restricted palette to be used for a second template. By way of still further example, the user may be able to define a first restricted palette to be used for a first "sticker" (an item of text, an image, etc.), and a second restricted palette to be used for a second "sticker".

Optionally, palettes (e.g., color, font, effect, etc.) associated with one design element item (e.g., a default asset, text, image, etc.) may be automatically associated with other design element items added to a design element palette.

While certain examples herein reference creating a restricted palette for a particular product or design element, a restricted palette may be defined for an online "store" (and products and design elements provided by the store) as a whole. For example, for a given online store or product provider, an operator may be able to specify that users (e.g., end users) may only be permitted to utilize certain colors, text, graphics, images, fonts, and/or effects to customize the store's or other product provider's products. Thus, even if a restricted palette is not defined for a specific product or design element, the end user may still be restricted to using only the palettes specified by the store in customizing the product.

By way of yet further example, if the item is a sports team jersey, a template may include the team logo, a player name, and a player number. The item provider may specify via a user interface that the team logo may not be edited in any manner, but that an end-user may edit the content of the player name and the player number.

By way of further example, if a template includes multiple words, a user interface may enable the item provider to specify that a specific words or words in the template may be edited by an end user, but that the text content of other words in the template may not be edited by an end user.

The system may store the restrictions/permissions in a text or non-text file in association with the corresponding template.

Optionally, the CAD system further comprises collaboration tools that enable end users to collaborate with each other and/or the product provider on customizations for a given product. By way of illustrative example, a collaboration initiator may be a member of a class or grade in an educational institution. The collaboration initiator may specify certain design features of a product, such as a shirt. For example, the collaboration initiator may specify that the phrase "Class of 2027 Acme School of the Plastic Arts" is to be printed on the back of a shirt, and may provide permission (via a user interface) to a first class member to specify design elements for a left sleeve of the shirt, and provide permission to a second class member to specify design elements for a right sleeve of the shirt.

CAD tools may be provided that enable a user to specify a product color for the entire product or for corresponding portions of the product. By way of illustration, if the product is a jacket, the tools may enable the provider to specify that the jacket exterior is red and that the jacket interior is black. By way of further example, the tools may be enable the provider to specify different colors for each sleeve, the product body, hood, muff, zipper, cord, etc.

The CAD system may provide tools that enable a user (e.g., an item/product provider) to specify one or more design element areas in which a respective design element may be applied. For example, a tool may be provided which enables a user to draw a bounding shape on a product, such as a hoodie jacket, which designates an area of the product as an area to which a design element may be added.

As similarly discussed above, the CAD system may provide tools that enable a user to specify which colors are to be applied to a specific design element and/or which colors may be applied any design element added by a user to a specified design area. A tool may further be provided that enables the user to specify that a given design element may incorporate only certain designated colors (e.g., gold and blue) and/or that the design element may not incorporate certain designated colors (e.g., grey and white). By way of illustration, an item provider may not want to permit colors to be applied that will not be adequately visible against the background color of the product. By way of further illustration, if the product has a gray exterior, white and gray design elements may not have sufficient contrast to be adequately visible. By way of still further illustration, certain types of clothing (e.g., a running jacket) may be safer and otherwise more functional with brighter or more reflective colors, and so the item provider may specify that certain design areas (e.g., the sleeves, the zipper area, etc.) may only be certain bright colors and/or may specify that certain dark colors (e.g., black, navy blue) may not be used on such design areas. By way of yet further example, the item provider may feel that certain colors will clash with colors of certain design elements specified by the item provider, and so may specify that such clashing colors may not be used in certain design areas, or on the product as a whole. By way of further example, the item provider may specify a maximum amount of rotation for a design element.

The design element and/or design element area may be associated with one or more specified dimensions (e.g., height and/or width, diameter, etc.). The dimensions may be specified using a bounding tool (e.g., that enables a user to graphically draw a boundary of a design element area) or via a numerical entry (e.g., via a field that enables the user to specify a height or width in units, such as inches and centimeters).

Where a design element includes text and/or design element area permits the addition of text, a user interface may be provided via which the item provider may specify one or more fonts for the text (e.g., Times New Roman, Times New Roman Italic, Arial, Arial Narrow, etc.) and/or specify one or more fonts that may not be used for the text. The design element and/or design element area may also be associated with formatting instructions (e.g., none, left justified, right justified, center justified, top left justified, top right justified, top center justified, bottom left justified, bottom right justified, bottom center justified, concave arc, concave high arc, concave low arc, convex arc, convex high arc, convex low arc, wave, shadow, rotate, make 3D, make vertical, etc.). The item provider may provide, via a user interface, restrictions on which formatting instructions may be used for different design elements and/or different design areas.

Access to certain functions, such as a given function disclosed herein, of the CAD system may be limited to certain types of users. For example, optionally only users having an item provider account are provided with tools to define design areas that an end user may modify and corresponding permissions and restrictions.

Certain aspects of the disclosure will now be discussed with reference to the figures.

An example system architecture that may be utilized to provide computer aided design and manufacturing services will now be discussed with reference to FIG. 1A. In the illustrated embodiment a computer aided design (CAD) system 102 may be hosted on one or more servers. The CAD system 102 may be cloud-based and may be accessed by one or more client terminals 110, 112 (e.g., associated with an item provider or end user) and item provider terminals 105a-105n over a network 114 (e.g., the Internet, Ethernet, or other wide area or local area network). Client terminals may be able to share software applications, computing resources, and data storage provided by the CAD system 102.

The client terminals may be in the form of a desktop computer, laptop computer, tablet computer, mobile phone, smart television, dedicated CAD terminal, or other computing device. A client terminal may include user input and output devices, such a displays (touch or non-touch displays), speakers, microphones, trackpads, mice, pen input, printers, haptic feedback devices, cameras, and the like. A client terminal may include wireless and/or wired network interfaces via which the client terminal may communicate with the CAD system 102 over one or more networks. A client terminal may optionally include a local data store that may store CAD designs which may also be stored on, and synchronized with, a cloud data store.

User interfaces described herein are optionally configured to present edits (e.g., edits to images, text, item colors, or the like) in real time as applied to an item to ensure enhanced accuracy, reduce the possibility of user error, and so make the customization process more efficient. The user interfaces may present controls and renderings to further ease the specification of customization permissions by item providers, and to ease customizations of items by end users. Optionally, a version of the user interfaces described herein may be enhanced for use with a small screen (e.g., 4 to 8 inches diagonal), such as that of a mobile phone or small tablet computer. For example, the orientation of the controls may be relatively more vertical rather than horizontal to reflect the height/width ratio of typical mobile device display. Further, the user interfaces may utilize contextual controls that are displayed in response to an inferred user desire, rather than displaying a large number of tiny controls at the same time (which would make them hard to select or manipulate using a finger). For example, if a user touches an image template in a template gallery, it may be inferred that the user wants to add the image template to a previously selected item design area and to then edit the image template, and so the selected image template may be automatically rendered in real time on the selected item design area on a model/image of a product in association with permitted edit tools.

Further, optionally user interfaces may enable a user to expand or shrink a design element using a multi-touch zoom gesture (where the user touches the screen with two fingers and moves the fingers apart) or a multi-touch pinch gesture (where the user touches the screen with two fingers and moves the fingers together) to further ease editing of a design element and ease specification of a design area or editing restrictions. Optionally, a user interface may enable a user to resize a design element using a one finger icon drag/pull.

Optionally, a resizing control may be provided which enables the user to quickly resize a design element to an appropriate size. For example, if an existing design element is sized for a shirt pocket, the resizing control may enable the user to instruct the system to automatically resize the design element for another selected area, such as a chest area or a sleeve area.

Optionally, user interfaces may be configured to respond to a user swipe gesture (e.g., a left or a right swipe gesture using one or more fingers) by replacing a currently displayed design element (e.g., a template) on an item model with another design element (e.g., another template in a set of templates). Optionally, if a user has edited a first design element and then used a swipe gesture to replace the design element with a second design element, some or all of the edits made to the first design element (e.g., height edit, width edit, color edit, or the like) may be automatically applied to the second design element.

Optionally, in response to a swipe gesture (e.g., an up or down swipe gesture) a user interface may display metadata related to the displayed item and/or item customizations (e.g., cost, shipping time, item size, etc.) or other notifications.

Optionally, in response to a gesture (e.g., an up/down or left/right swipe) the product on which the design element is displayed is changed. For example, if a design element is displayed on a model of a jacket, the gesture may cause the same design element (optionally with any user edits) to be displayed in real time on another item model (e.g., a t-shirt or a different jacket style) in place of the original jacket model.

As will be described in greater detail herein, the CAD system 102 may provide tools to graphically construct computer models of and to modify computer models of products such t-shirts, hoodies, shirts, jackets, dresses, pants, glasses, phone cases, laptop skins, backpacks, laptop cases, tablet cases, hairbands, wristbands, jewelry, and the like.

The CAD system 102 tools may include tools for specifying and/or applying design elements (e.g., text, image, and/or a graphic design elements) to a product, specify areas to which an end user may apply design elements, specify permitted end user modifications to a design element and/or specify permitted design element types and characteristics that the system may apply to the product in response to an end user request. Optionally, collaboration tools are provided that enable users (e.g., end users, or a graphic designer and an item provider) to collaborate with each other and/or the item provider on customizations for a given product.

The CAD system 102 may optionally generate, based on an end-user design or design modification, corresponding order forms and/or manufacturing instructions. Some or all of the information generated by the CAD system 102 may be provided to an inventory/ordering system 104, a manufacturing system 106, a packing/shipping system 108, and/or an analysis engine 114. Some are all of the foregoing systems may optionally be cloud based. Optionally, the CAD system 102, inventory/ordering system 104, manufacturing system 106, packing/shipping system 108, and/or analysis engine 114 may be the same system and may be operated by the same entity, or may be separate systems operated by separate entities.

Optionally some or all of the services provided by the CAD system 102, inventory/ordering system 104, manufacturing system 106, packing/shipping system 108, and/or analysis engine 114 may be accessed via one or more APIs by authorized third party systems. For example, a movie studio website may provide access to the services (including some or all the user interfaces) to enable visitors of their website to use logos and images of characters of the studio to customize physical and/or digital items. By way of further example, a third party CAD system used to customize physical and/or digital items may access the services to access restrictions and/or permissions (rules) specified for design elements that users of the third party CAD system are modifying or otherwise using. For example, the third party CAD system may generate a request for usage rules, where the request may identify the design element that a user wishes to use (e.g., customize, combine with other content, electronically distribute, print, etc.). The CAD system may generate a corresponding response to the query that includes usage rules. The third party CAD system may utilize the services to determine if a given modification or other use satisfies the rules.

The CAD system 102 may optionally generate directives in the form of manufacturing machine instructions for applying (e.g., printing or embroidering). For example, design files may be provided that include an image file (e.g., in raster graphics file format, such as a portable network graphics file) and screenshots of the user customized item. Optionally the image file may support RGB color spaces and/or non-RGB color spaces (e.g., CMYK color spaces). Optionally, the image file may be in SVG, PDF, GIF, Encapsulated PostScript, AutoCAD DFX, or ADOBE ILLUSTRATOR format. Optionally, one or more files may be compressed (e.g., losslessly compressed) and transmitted to the manufacturing system 106 in the form of a zip file, jar file or other file format. The manufacturing system 106 may then decompress the file using an appropriate decompression module.

The CAD system 102 may enable multiple users to collaborate on a design via their respective terminals, optionally in real time. As noted above, a first user may specify different design permissions for different collaborating users. For example, a design project leader may select an item to be designed (or to have a design modified), such as a sweatshirt. The project leader may identify, via a collaboration set-up user interface provided by the system 102 (directly or via an application installed on a user device) multiple other collaborating users (e.g., by email address, mobile phone number, other communication address, etc.). The project leader may assign, via a permissions user interface, certain permissions to a given collaborating user, such as what design element the collaborating user has permission to design (e.g., a right sleeve design element, a left sleeve design element, a hood design element, a chest area design element, a muff area design element, a hood drawstring, a zipper, stitching, etc.), and any design restrictions (e.g., color, font, formatting, design element dimensions, rotation angle, text effects, other design restrictions discussed herein, etc.). The system 102 may record the collaborating user identifiers, permissions, and/or restrictions in non-volatile memory in a record associated with the design leader and/or project.

The system 102 may transmit over a network respective collaboration invitations to respective invitee collaborator destination addresses (e.g., by email address, mobile phone number, other communication address, etc.). A given invitation may provide a link to the corresponding project hosted by the system 102, where the link may also uniquely identify the invitee. Activation of the link may further cause a CAD item customization interface to be presented displaying the corresponding item that is the subject of the project, with the design element(s) that the invitee is permitted to customized emphasized (e.g., via bolding, line width, text, and/or otherwise). Optionally, in addition to or instead of a link, a unique code may be generated and provided in the invitation, wherein a user interface is provided to receive the code from the invitee. The system 102 may then permit a given invitee to design the item in accordance with the invitee's respective permissions and prohibitions.

The system 102 may generate and provide collaboration information, indicating who added or modified a given design element, when the addition or modification was made, and what the addition or modification was. Optionally, controls may be provided that enable a given collaborating user to undo and redo a particular customization made by that collaborating users (but not other users). Optionally, the project leader may be provided with permissions to undo or redo customizations made by other collaborating users.

The inventory/ordering system 104 may receive and process an order for a customized item, generate prices for a customized item (e.g., based on a base item price, the number of customizations, and/or the type of customizations), maintain a user shopping cart, and generally interact with a user ordering an item and managing the ordering process. The inventory/ordering system 104, when receiving an order for a customized item customized using the CAD system 102, may determine if the item being designed/modified is in stock, and order items that are below a specified threshold (e.g., zero or some number greater than zero).

The packing/shipping system 108 may generate packing instructions to efficiently package the items being shipped to the user. For example, the instructions may specify package sizes and which items are to be shipped in which package. The packing/shipping system 108 may further generate shipping labels and/or other shipping documents.

The analysis system 118 may be configured to analyze user modifications to design elements and/or user added or selected content (e.g., images and/or text) associated by the user with the design elements. The analysis system 118 may be configured to receive a query generated by the CAD system 102 that specifies one or more different feature types to be detected. The CAD system 102 may generate the query based at least in part on rules specified by a source of the design elements. The rules may indicate how a design element may be modified and what content may be used in conjunction with the design element (e.g., overlaying the design element, or directly to one side of the design element). The analysis system 118 may generate a likelihood indication/value as to whether a given feature type is present. The likelihood indication/value may be provided to the CAD system 102, which may determine, using such indication, whether or not the modification and/or associated user added or selected content may be used and/or shared by the user. The analysis system 118 may utilize artificial intelligence and/or machine learning in performing text, image, and/or audio analysis to determine the likelihood that given a feature type is present. For example, the analysis system 118 may utilize a deep neural network (e.g., a convolutional deep neural network) and/or a matching engine in performing image, text, and/or audio analysis.

Figure 1B:
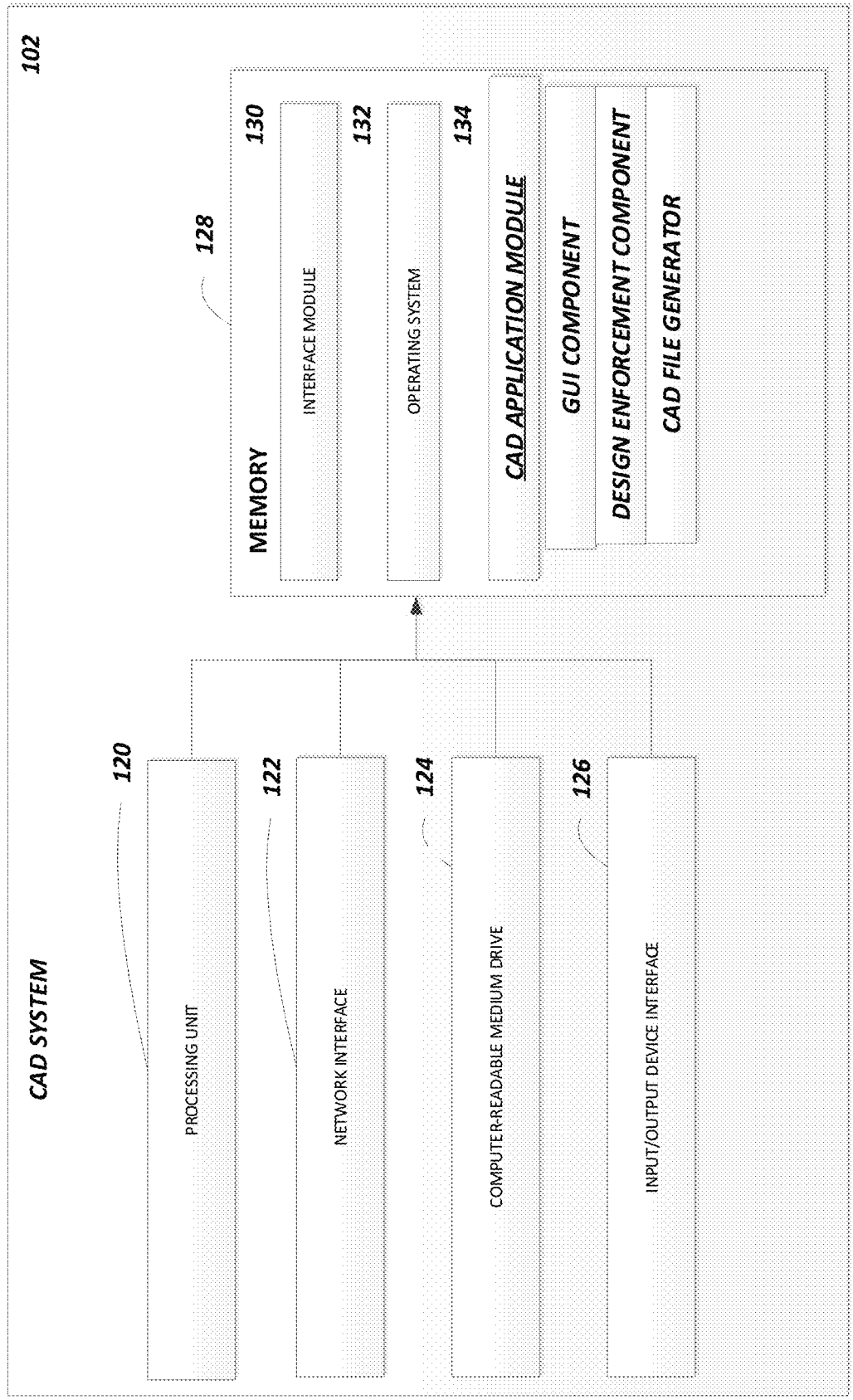
FIG. 1B is a block diagram illustrating an embodiment of example components of a computing system capable of providing product customization services.

FIG. 1B is a block diagram illustrating an embodiment of example components of the CAD system 102. The example CAD system 102 includes an arrangement of computer hardware and software components that may be used to implement aspects of the present disclosure. Those skilled in the art will appreciate that the example components may include more (or fewer) components than those depicted in FIG. 1B.

The CAD system 102 may include one or more processing units 120 (e.g., a general purpose process and/or a high speed graphics processor with integrated transform, lighting, triangle setup/clipping, and/or rendering engines), one or more network interfaces 122, a non-transitory computer-readable medium drive 124, and an input/output device interface 126, all of which may communicate with one another by way of one or more communication buses. The network interface 124 may provide the CAD services with connectivity to one or more networks or computing systems. The processing unit 120 may thus receive information and instructions from other computing devices, systems, or services via a network. The processing unit 120 may also communicate to and from memory 124 and further provide output information via the input/output device interface 126. The input/output device interface 126 may also accept input from one or more input devices, such as a keyboard, mouse, digital pen, touch screen, microphone, camera, etc.

The memory 128 may contain computer program instructions that the processing unit 120 may execute in order to implement one or more aspects of the present disclosure. The memory 120 generally includes RAM, ROM (and variants thereof, such as EEPROM) and/or other persistent or non-transitory computer-readable storage media. The memory 120 may store an operating system 132 that provides computer program instructions for use by the processing unit 120 in the general administration and operation of the CAD application module 134, including it components. The memory 128 may store user accounts, including copies of a user's intellectual property assets (e.g., logos, brand names, photographs, graphics, animations, videos, sound files, stickers, tag lines, etc.) and groupings thereof (with associated group names). Optionally, in addition or instead, the intellectual property assets are stored remotely on a cloud based or other networked data store. The copies of the intellectual property assets may optionally be stored in a relational database, an SQL database, a NOSQL database, or other database type. Because the assets may include BLOBs (binary large objects), such as videos and large images, which are difficult for conventional database to handle, some (e.g., BLOBs) or all of the assets may be stored in files and corresponding references may be stored in the database. The CAD application module components may include a GUI component that generates graphical user interfaces and processes user inputs, a design enforcement component to ensure that user designs do not violate respective permissions/restrictions, a CAD file generator that generates data files for an inputted user design, and/or an image generator that generates image data files for printing and/or sewing/embroidering machines.

The printing machines may utilize, by way of example, heat transfer vinyl, screen printing, direct to garment printing, sublimation printing, and/or transfer printing to print design elements on an item. By way of further example, embroidery machines may be used to embroider design elements on an item. The memory 128 may further include other information for implementing aspects of the present disclosure.

The memory 128 may include an interface module 130. The interface module 130 can be configured to facilitate generating one or more interfaces through which a compatible computing device, may send to, or receive from, the CAD application module 134 data and designs.

The modules or components described above may also include additional modules or may be implemented by computing devices that may not be depicted in FIGS. 1A and 1B. For example, although the interface module 130 and the CAD application module 134 are identified in FIG. 1B as single modules, the modules may be implemented by two or more modules and in a distributed manner. By way of further example, the processing unit 120 may include a general purpose processor and a graphics processing unit (GPU). The CAD system 102 may offload compute-intensive portions of the CAD application module 134 to the GPU, while other code may run on the general purpose processor. The GPU may include hundreds or thousands of core processors configured to process tasks in parallel. The GPU may include high speed memory dedicated for graphics processing tasks. As another example, the CAD system 102 and its components can be implemented by network servers, application servers, database servers, combinations of the same, or the like, configured to facilitate data transmission to and from data stores, client terminals, and third party systems via one or more networks. Accordingly, the depictions of the modules are illustrative in nature.

Certain user interfaces will now be described with references to FIGS. 2A-4E. Inputs received from a user device may be received and stored by the CAD system 102 or other system (e.g., the inventory/ordering system 104), for example, in a database record associated with a user, user entity (e.g., an online shop), and/or a project (e.g., a collaborative item design). The user interfaces may be displayed on a user device display, such as a display associated with a computing device (e.g., a smart phone, a laptop computer, a tablet computer, a desktop computer, a virtual or augmented reality headset, etc.). The user interfaces may be provided via a dedicated application (e.g., a phone "app"), via a website, or otherwise. The user interfaces may be provided and/or generated by one or more of the systems described herein (e.g., a CAD system, an ordering/inventory system, client device, etc.).

Optionally, the user interfaces and functionality described herein may be made available via a third party website/webpage using an IFrame (Inline Frame), which is an HTML document embedded inside another HTML document on a website, such as third party website. The embedded user interfaces may be surrounded on one or more sides by other content, such as branding and/or other content of one or more third parties.

Figure 2A:
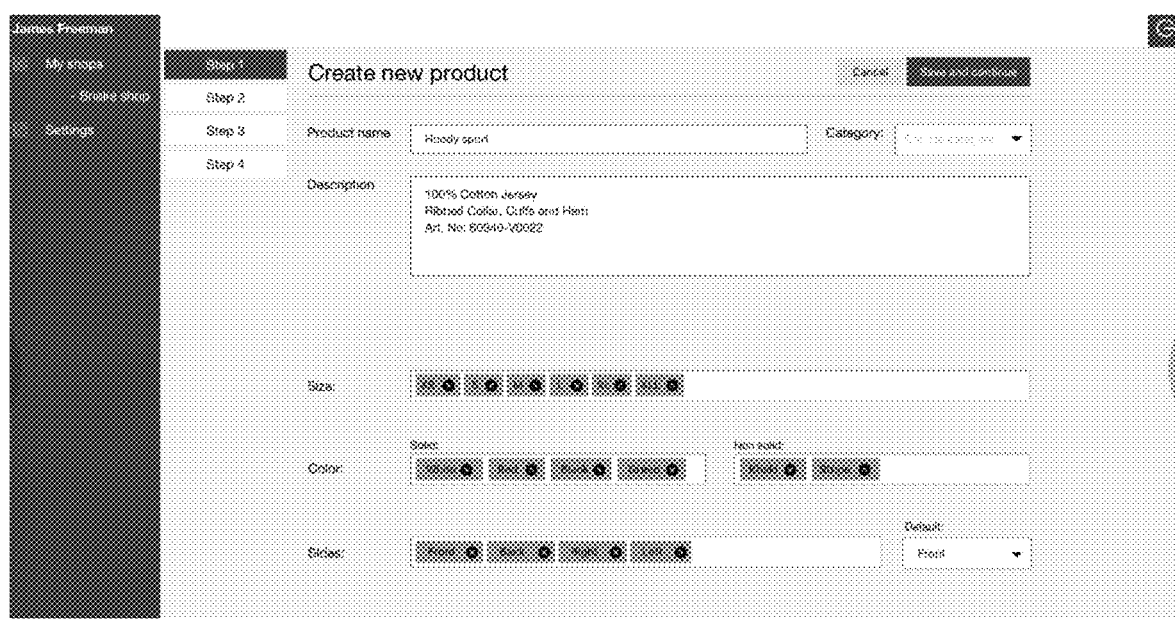
FIGS. 2A-4YYY illustrate example user interfaces.

FIG. 2A illustrates an example item creation user interface. Fields are provided via which a user, such as an item provider (e.g., a product seller, manufacturer, a branding entity (e.g., a celebrity or brand name licensor) can specify various item characteristics. For example, a field is provided configured to receive an item name from a user. A menu of predefined item categories is provided via which the user can select a respective item category (e.g., t-shirt, sweat shirt, hat, outerwear, shorts, jeans, pants, accessories, backpack, phone case, etc.). A description field is provided configured to receive free form text (e.g., tags corresponding to the item or a sequence of text describing the item). A size field is provided via which the user can specify one or more sizes that the user intends to make the item available in. Color fields are provided via which the user can specify one or more solid and/or non-solid colors that the user intends to make the item available in.

A "sides" field is provided via which the user can specify the sides of the item (e.g., front, back, right, left, top, and/or bottom) for which images are to be presented to end-users. A default field is provided via which the user can specify which side image is to be presented as a default when an end-user accesses an item detail page (e.g., an interactive online catalog page) corresponding to the item or to be presented in search results provided in response to a user product search.

The image may be a two dimensional or three-dimensional model (where the surface of a depicted item is rendered in three dimensions).

For example, a three-dimensional model of an item may utilize points in three-dimensional space, connected by triangles, lines, curved surfaces, or the like. Texture mapping may be utilized to define surfaces of the 3D model. The 3D model may be a solid model or a boundary model (which may be constructed using a mesh).

Optionally, the model may be provided using WebGL (Web Graphics Library) which utilizes a JavaScript API (which may be used with HTML5) to render an interactive 3D or 2D graphic. The interactive 3D model may enable the user to spin the model, rotate the model in any direction, scale the model in or out, add text or graphics to the model, and/or animate the model. For example, a user interface may enable the user to manipulate the model via touch or via discrete spin, rotate, scale controls. By way of illustrative example, if the item is a jacket, the image of the jacket may be a 3D image of the jacket in a worn state, as if draped over a torso. For example, the front of the jacket may be curved as if conforming to a human chest. Optionally, the image of the jacket or other item may be continuously rotated around an axis (e.g., a vertical or horizontal axis) when presented to the user so that the user can view the front, back, left and rights sides. By way of further example, if the item is a hat, the front of the hat may be curved, and the bill of the hat may project outwards. A design element (e.g., text and/or an image) may be configured to appear curved when applied to a curved portion of a 3D model.

By way of further illustrative example, if the item is a shoe, the model of the shoe may be animated to demonstrate how the shoe flexes when being worn and used to run.

Figure 2B:
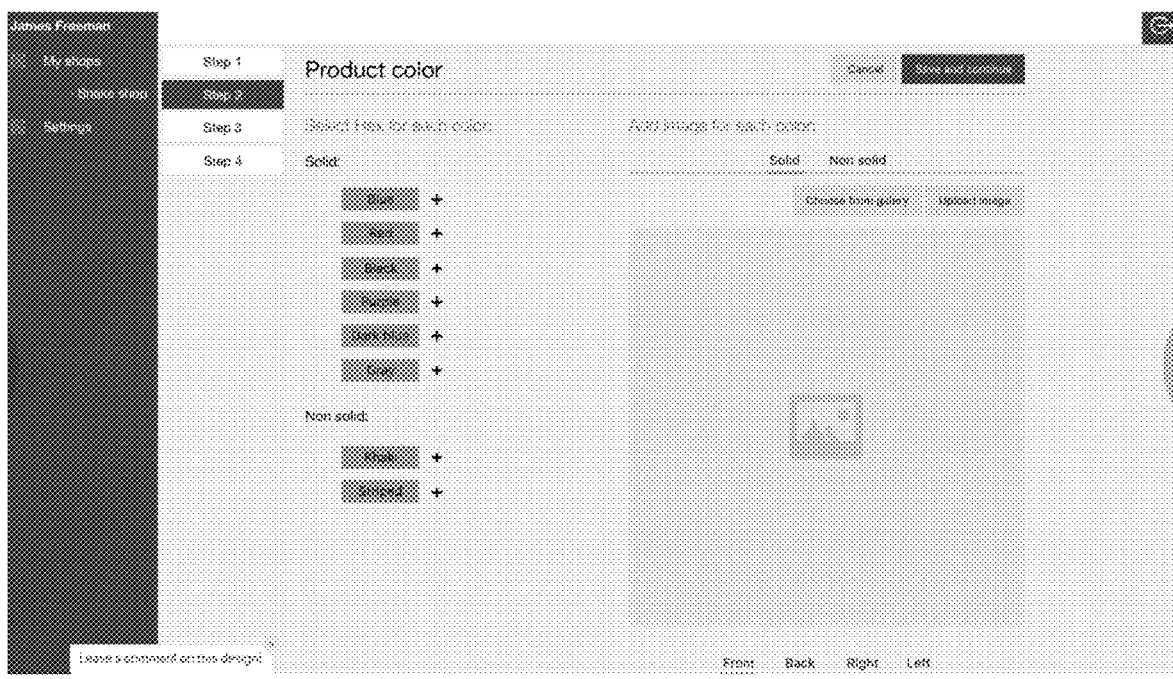

FIG. 2B illustrates a color specification user interface via which the user can add an image of the item for each selected color for corresponding item sides. Optionally in addition or instead, the system may enable the user to upload images of the item in a single color, such as white, and the system may then enable the user to specify other colors for the item. The system may then generate files corresponding to the other specified colors for the item, and may enable an end user to view item images corresponding to the specified colors. Controls are provided via which the user can upload the image of the item or select an image from a gallery/library of item images (e.g., images of generic items, such as a generic t-shirt or sweat shirt). Controls are provided via which the user can specify the side of the item (e.g., front, back, right, left, top, and/or bottom) that the image being uploaded or selected corresponds to. Controls are provided via which the user can assign a solid color (e.g., red, blue, black, purple, dark blue, gray, etc.) or non-solid color (e.g., striped, geometric, plaid, etc.) to the item.

The user interface may specify that the uploaded image be in a scalable vector graphics (SVG) format which is defined in an XML text file. The system may locate and edit a color entry in the text file to correspond to a color specified by the user, thereby causing the color of graphic added to the design area to be the specified color (e.g., via fill, stroke, and/or other properties). The color may be in the form of a standard color name (e.g., "green," "red," "blue"), or via a numerical code (e.g., as a hexadecimal value, as rgb decimal values (e.g., rgb (126, 255, 216), as rgb percentages (e.g., rgb (75%, 50%, 25%), or otherwise). Thus, the utilized image format may permit quicker editing of colors with less processing power and requiring less working memory.

In the illustrated example, a color map is provided via which the user can point to a desired color, and the corresponding numerical value (e.g., a hexadecimal value) will appear in color name field. The numerical color value may be edited by the user.

Figure 2C:
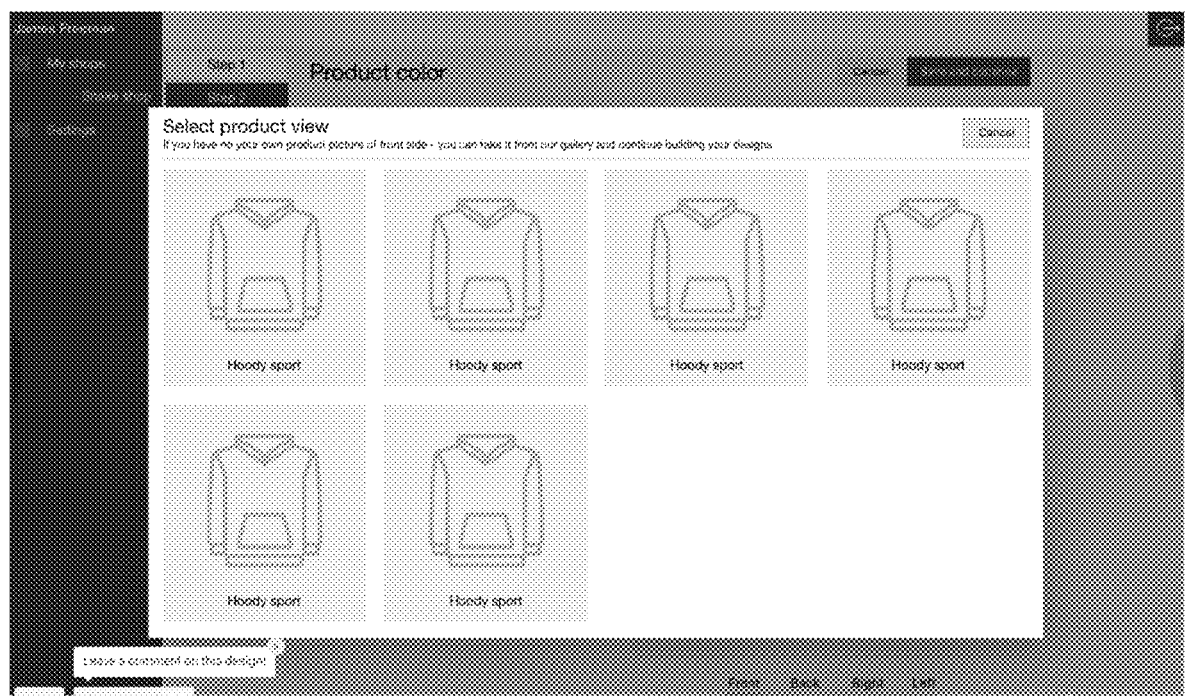

FIG. 2C illustrates a select product view user interface which may be presented in response to the user selecting the gallery/library control. The select product view user interface may present various views of an item (e.g., a product) accessed from a product view database, where the images (e.g., which may be product outlines or photographs) are selected to correspond to the product category selected by the user. The user may select an image to be associated with the corresponding side (e.g., front) specified by the user.

Figure 2D:
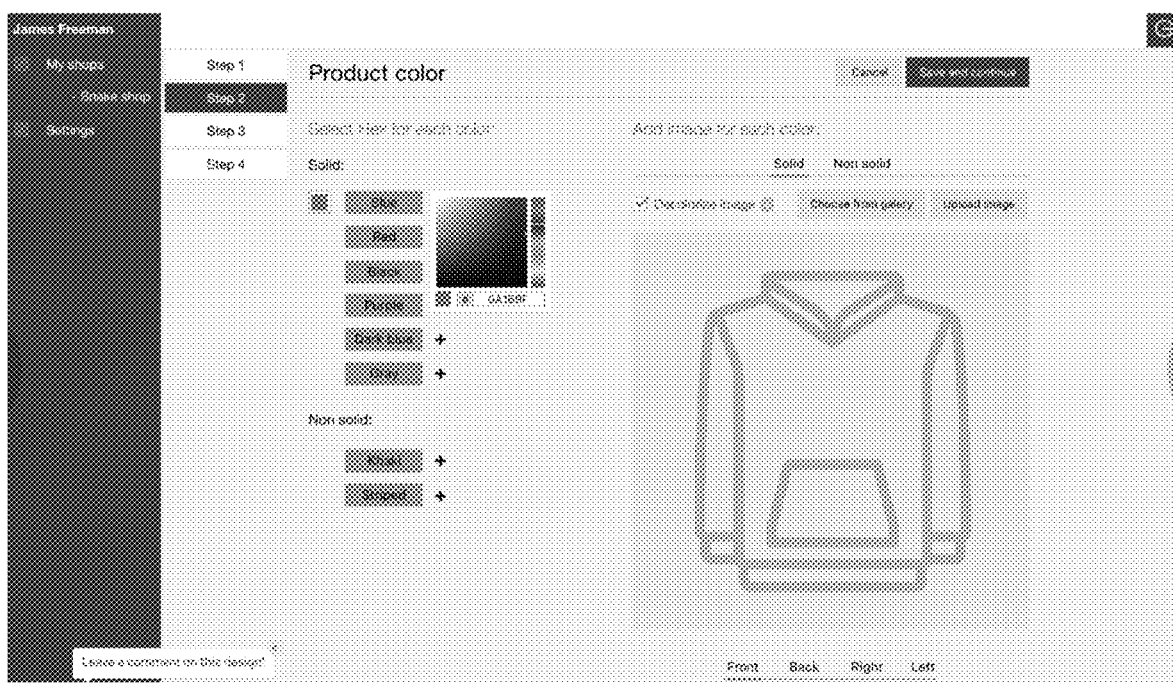

FIG. 2D illustrates the user interface of FIG. 2B with the product view selected by the user displayed. In this example, the user has selected the blue color control. A color map is displayed for a range of blue colors. The user may select a particular color shade of blue from the map. The corresponding hex value may be determined and displayed in a color value field. Optionally, the user can enter the desired color via the color value field (e.g., by entering or modifying a color hex value). The product in the product view will then be colored using the selected color in real time. A control is provided via which the user can decolorize the product in the product view. The user may activate a save control, and the user settings are saved to a data store.

Figure 2E:
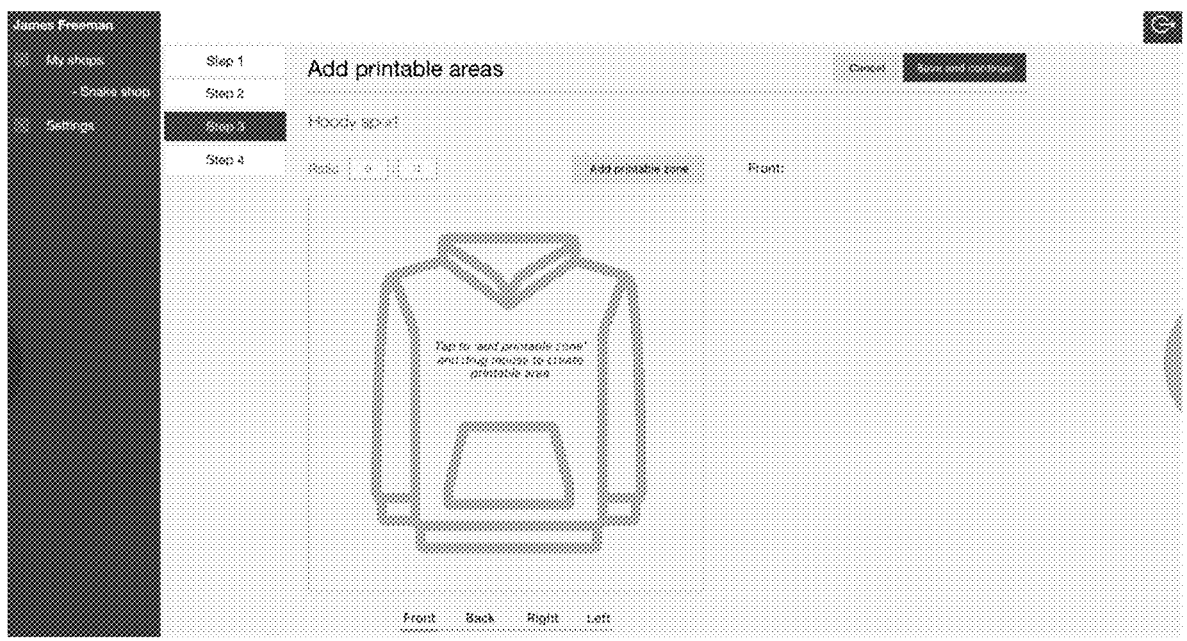

FIG. 2E illustrates an example CAD user interface that enables a user, such as an item provider (e.g., a product seller, manufacturer, a branding entity (e.g., a celebrity or brand name licensor), a template licensor (e.g., a licensor of a digital sticker, image, text, or the like), or a collaboration initiator) to specify one or more design areas (e.g., printable areas) on an item. The user interface may include side selection controls (e.g., front, back, right, left, up, down controls). In response to a user selecting a corresponding side control, the CAD system accesses and presents an image (e.g., photograph or drawing) of the corresponding item side.

A design area specification tool (e.g., an "add printable area" tool) may be provided that enables a user to draw or otherwise specify a design area perimeter. By way of illustration, a user may select the tool, specify a first corner via a pointer (e.g., mouse, stylus, finger), drag the pointer to indicate a diagonally opposite corner, and a corresponding perimeter will be drawn (e.g., using dashed lines or other indicator), which may be in the form of a rectangle or square (although other shapes may be used).

Referring again to FIG. 2E, a ratio control may be provided via which the user can specify a height to width ratio for the design area. Controls may be provided enabling the user to grab a corner or side of the perimeter and drag the grabbed portion to change the size of the design area perimeter (e.g., make the perimeter larger or smaller), rotate the perimeter, move the perimeter to a different portion of the item, and delete the perimeter. Fields are provided via which the user can assign an identifier (e.g., an alphanumeric name) for each design area.

Figure 2F:
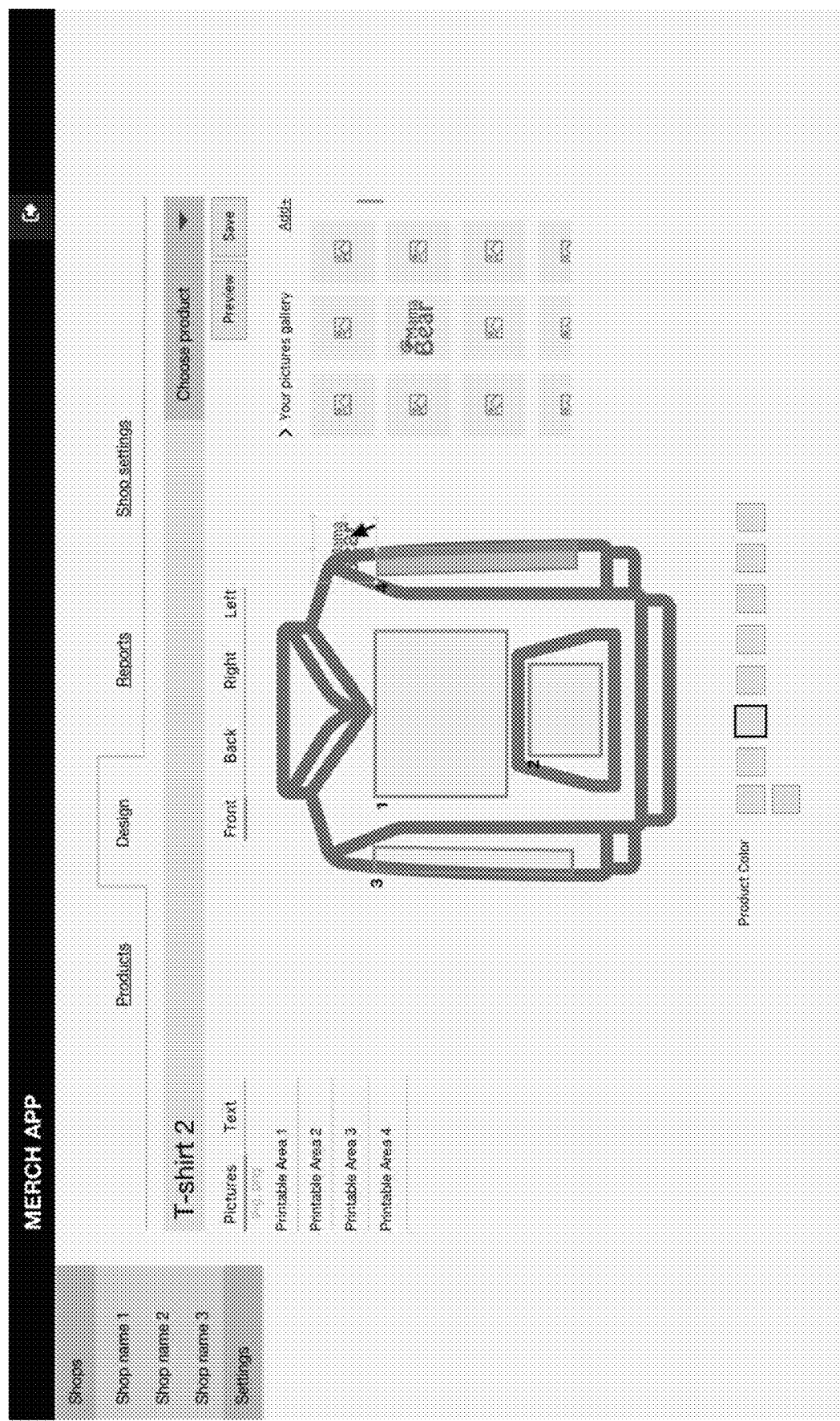

Referring to FIG. 2F, in this example, the user has added four design areas and assigned the following design area names: printable area 1, printable area 2, printable area 3, printable area 4. In this example, an image gallery previously specified by the user is displayed, and the user is dragging an image ("Mama Bear" image) to a design area. In addition, a product color palette is provided. The user may select a product color, and the illustrated product's color will change in real time to the selected color.

Figure 2G:
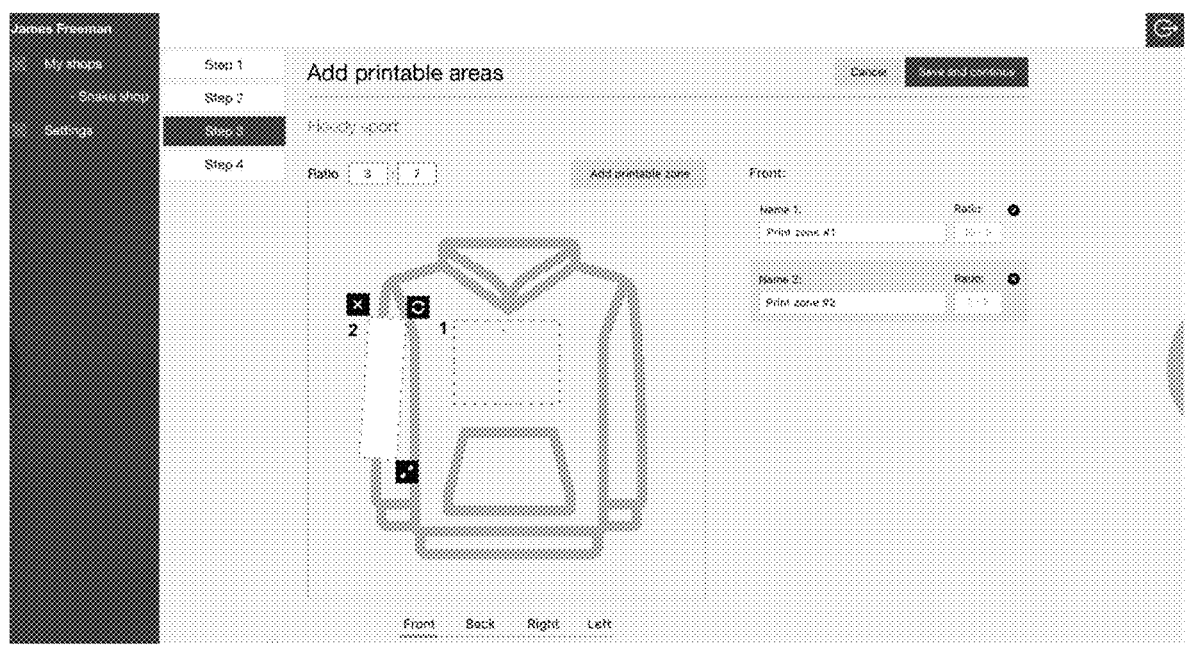

Referring to FIG. 2G, in this example, the user has added two design areas and assigned the following design area names: print zone #1, print zone #2. In this example, each listing of a design area is associated with a ratio user interface displaying the respective design area ratios. Optionally, once the ration is set for a design area it may not be modified. If the user wants to change the ratio, the user needs to delete the design area and add it back in with a different ratio. Optionally instead, the system may enable the user to modify the ratio of a design area without having to delete the design area. In this example, design area #2 has been slightly rotated by a user using the rotation control associated with design area #2. A control is optionally provided in association with a given design area listing via which the user can delete a design area.

Figure 2H:
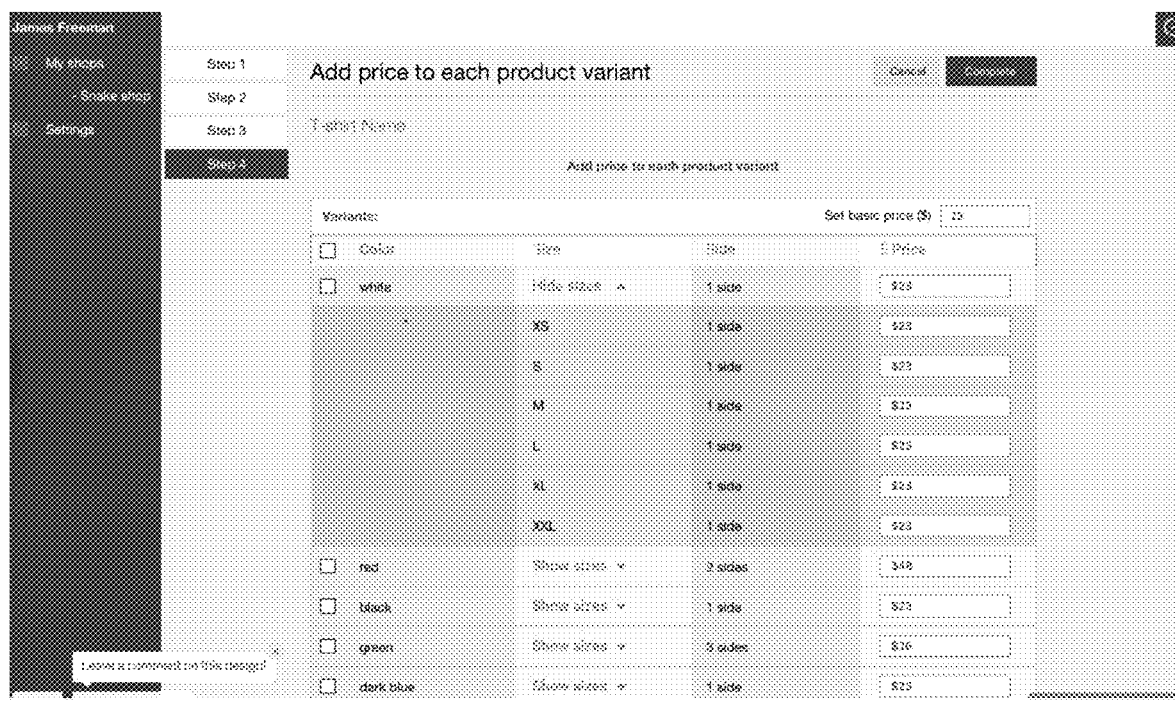

FIG. 2H illustrates a user interface via which a user can assign a base price and prices for each specified item variant (e.g., for each combination of available color, available size, and number of design areas customizable by an end user). Optionally, the user interface may enable the user to specify what type of print options may be used or made available for a given item. For example, the user interface may enable an item provider to specify whether standard ink, glow-in-the dark ink, and/or embroidery are to be made available to end users to customize a given item.

FIG. 2I illustrates a products user interface via which a user can view a listing of items that the user has authorization to edit, remove, publish, or unpublish. For example, the listing may be products to be offered by an online store associated with the user. The user interface may include data accessed from a database record associated with the user/user store. A given product listing entry may include a product name and date/time last published. A given product listing entry may include edit, remove, and/or publish controls which when activated will cause the system to respectively enable the user to edit the product via an edit user interface, remove the product entry from the listing and/or store, and publish the corresponding product so that it appears to end users via an interactive catalog. If the product has already been published an un-publish control may presented, which when activated, with cause the product to be removed from the end-user accessible catalog.

Figure 2J:
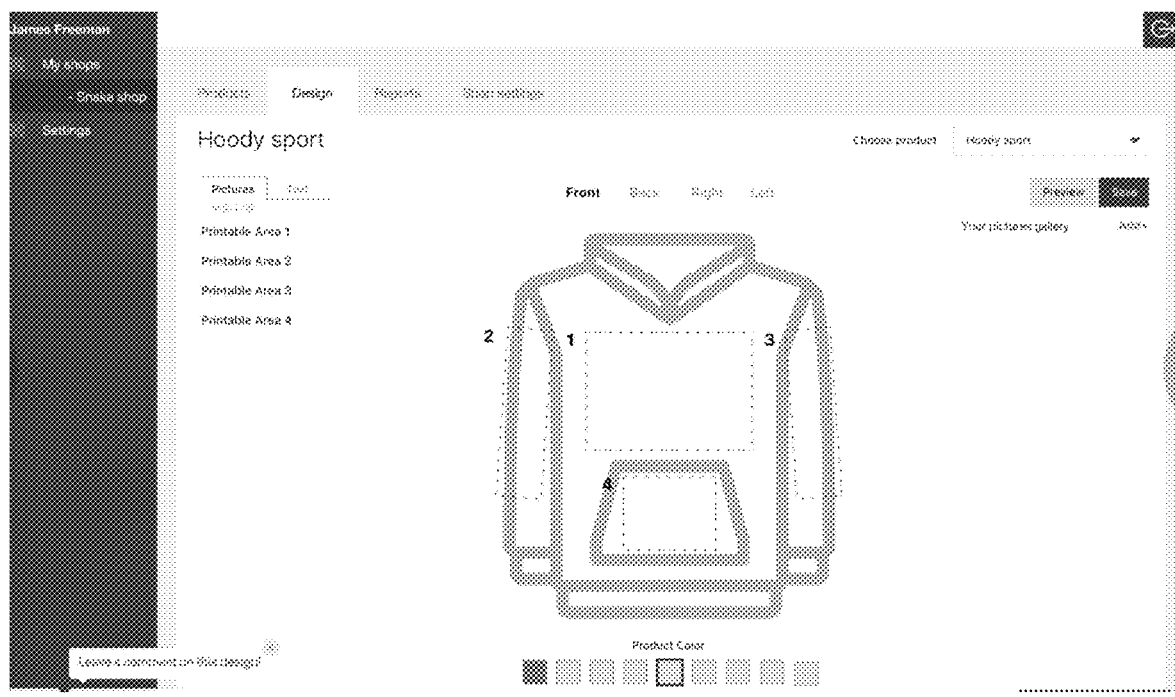

FIG. 2J illustrates an example user interface via which a user (e.g., an item provider) can edit a product corresponding to a product entry (a hoodie jacket in the illustrated example). A similar user interface may be provided to an end user to customize or edit a product design in accordance with permissions and restrictions of the item provider, as discussed elsewhere herein. In this example, the front side of the item is displayed. The front side may be the pre-specified default side that is to be initially displayed. In addition, a menu of sides is provided. The user may select a side from the menu, and the corresponding image of the selected side is displayed by the user interface, with any design areas indicated (e.g., with a border and a design area identifier).

In the illustrated example, the user interface indicates via respective borders, shading/coloring, and identifiers, that the jacket has four design areas that had been specified by the item provider (design area 1—chest, design area 2—muff, design area 3-right sleeve, design area 4—left sleeve). The user interface provides various tools (e.g., an add image control, an add text control). A preview control is provided which when activated, will cause the item to be realistically rendered with any customizations. A save control is provided which when activated will cause the system to save any user customizations. A picture gallery area is presented in association with an "add" image control which when activated enables the user to add an image to the gallery (e.g., by selecting an image from a specified location or by providing a link to an image).

Figure 2K:
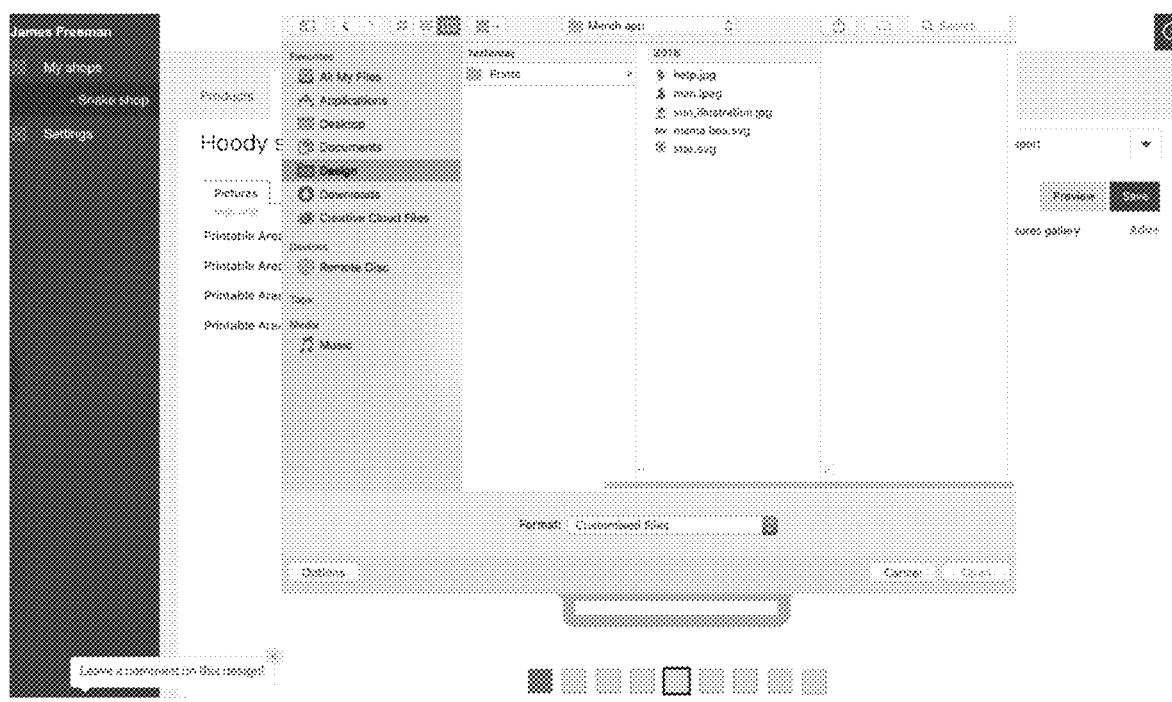

FIG. 2K illustrates an example user image selection user interface presented in response to a user selecting the add image control depicted in FIG. 2J. The user interface accesses and lists image files from a specified location. A given listing may include an image name, an image thumbnail, and/or other data (e.g., last edit date, creation date, image author, etc.). Controls are provided via which the user can navigate to another location to search for and select images.

Figure 2L:
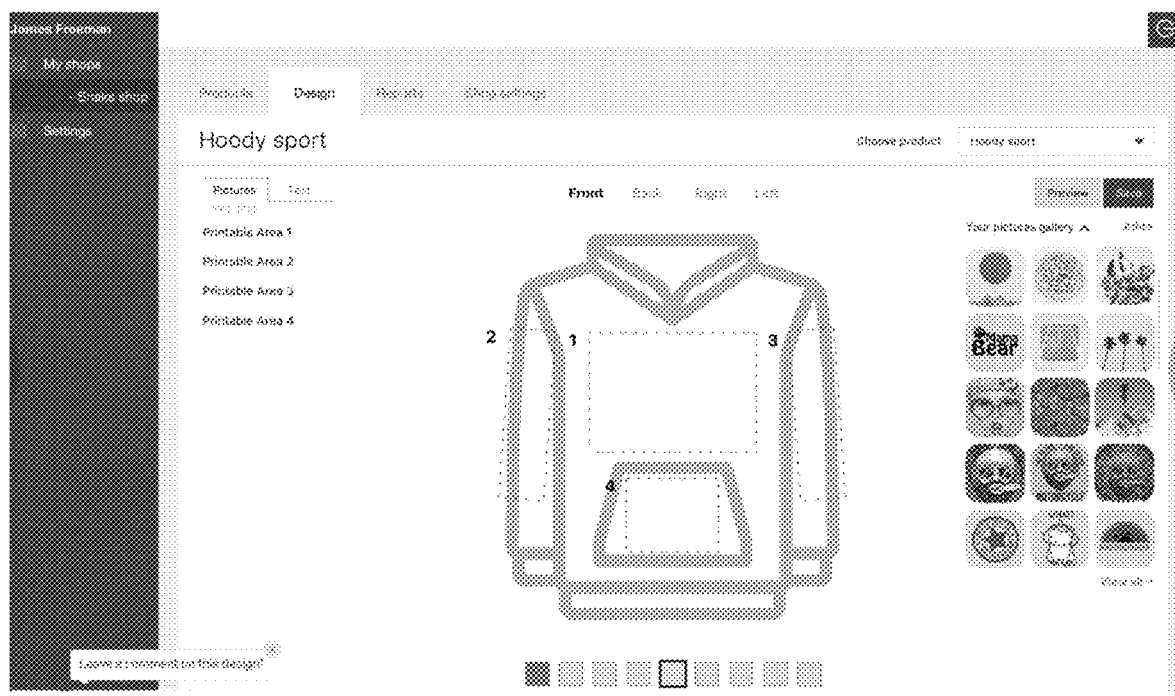
Figure 2M:
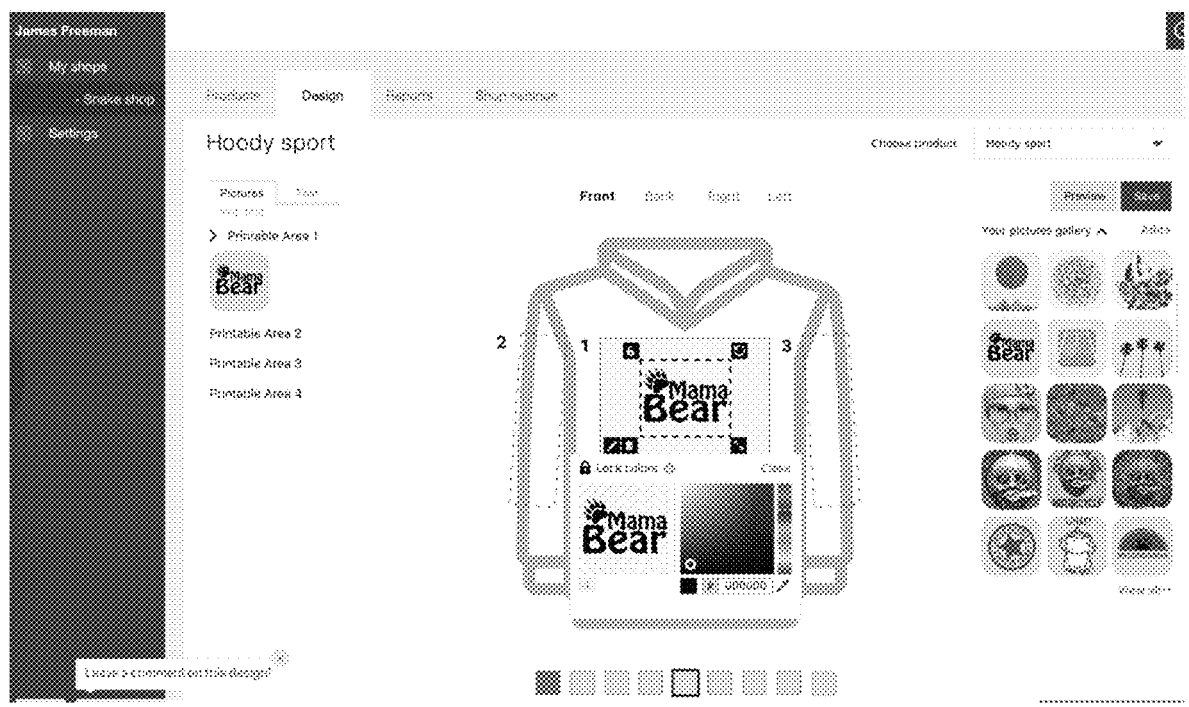

FIG. 2L illustrates the user interface of FIG. 2J with images listed in the image gallery. FIG. 2M illustrates the user interface illustrated in FIG. 2L with an image from the image gallery added to design area 1. The user has selected an add color control and in response, the user interface accesses and presents a color map corresponding to the color selected by the user. The user may select a desired shade from the color map, and the image color will be changed to the selected shade. A lock control is provided which when activated will prevent the image color from being changed unless the lock is unlocked (e.g., by clicking on the lock image and optionally entering a password if such has been set). The user may lock the design to prevent an end user from modifying the locked portions of the design. An interface may be provided via which the user can specify elements to be locked at a very granular level. For example, the interface may enable the user to lock (for a given image and/or text template) size, one or more colors (or all colors), orientation, placement, text content, font, effects, overlays, selected portions of an image or text, and/or the like.

Thus, by way of illustrative example, an item provider may specify via a user interface that an end user is not permitted to edit certain aspects of a template text. For example, a user interface may be provided via which the item provider may indicate that the content of a given item of text (e.g., a string of characters) may not be edited by an end user, but that optionally certain other forms of editing (e.g., change of color, font, size, effects, and/or rotation angle) may be permitted.

Figure 2N:
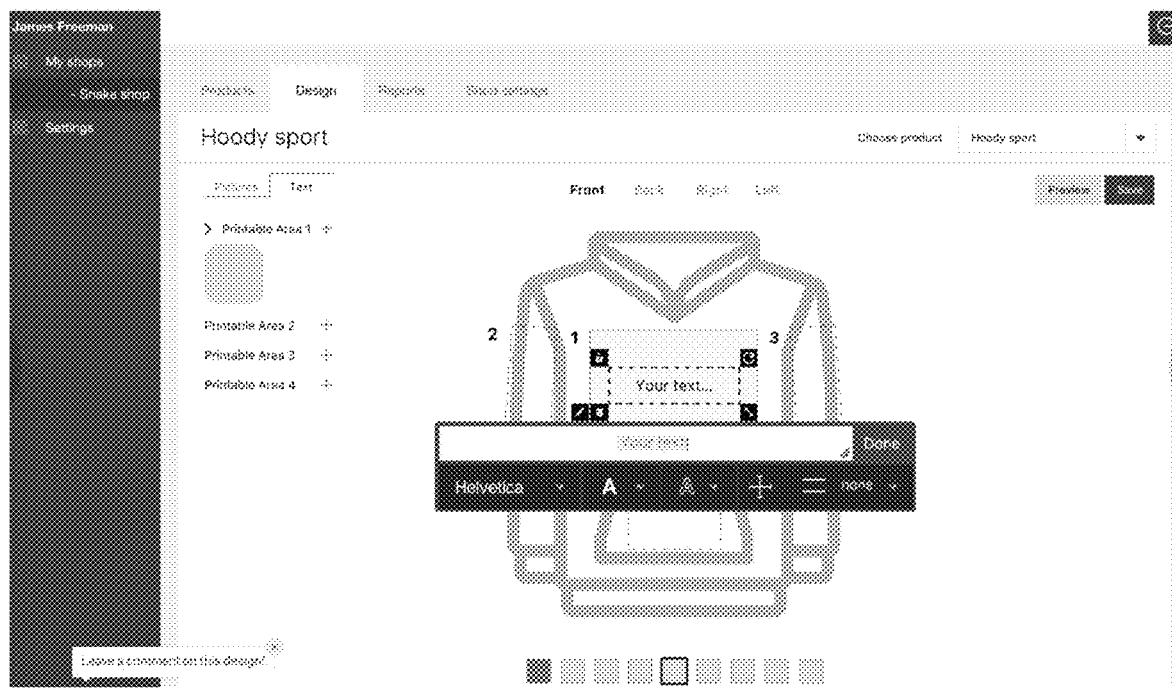

If the user selects the add text control, then the example user interface illustrated in FIG. 2N may be presented. In the illustrated example, the user has selected design area 1 (on the jacket chest), which is highlighted (e.g., via color, shading, and/or change in border from a solid to interrupted/dashed boarder) via the user interface relative to the other design areas to indicate that design area 1 has been selected. A text field is provided, wherein as the user enters text (e.g., using a keyboard, via voice input, or otherwise) the text is displayed in real time in the design area 1. In addition, in this example the user has selected a Helvetica font, selected a regular/default version of the Helvetica font (e.g., not bolded, underlined, struck through, subscripted, or superscripted). Controls are provided via which the user can specify text alignment (e.g., left, right, center), whether the text is to be solid or stenciled, and a text curvature type. Optionally, controls are provided via which the user can specify character and/or line spacing. In addition, in this example a text rotation tool is provided (which enables the user to specify a rotation angle of the text graphically and/or via a specified rotation angle). Optionally, the text is displayed in the design area, as the user enters the text, with the color, hue, saturation, font, alignment, line spacing, character spacing rotation, and/or with effects previously specified by the user. A design area deletion control is also provided which when activated will delete the selected design area from the user's instantiation of the jacket (but not from that of other users or from the interactive catalog). Text formatting changes specified by the user may be reflected in the design area on the image of the jacket in real-time.

Optionally, a user interface may be provided via which a user may upload a custom font (e.g., in the form of a textured watercolor, 3D bubble font, etc.) which may then be used by the item provider and/or an end user. For example, the user interface may enable the user to upload images to be used as fonts (e.g., PNG, SVG, GIF, or other image file). By way of illustration, a user may create images of balloons in the shape of letters. Such images may then be displayed on respective customized keyboard keys rendered on the user device. The user can create sequential "text" characters to form words or phrases by typing them in using the customized keyboard keys. Optionally, a given uploaded character image may be transparent and tools may be provided via which the user can specify or change color, hue, effect, etc. As the user types, the custom font characters may be rendered in real time is a designated design area of the item model.

Figure 2O:
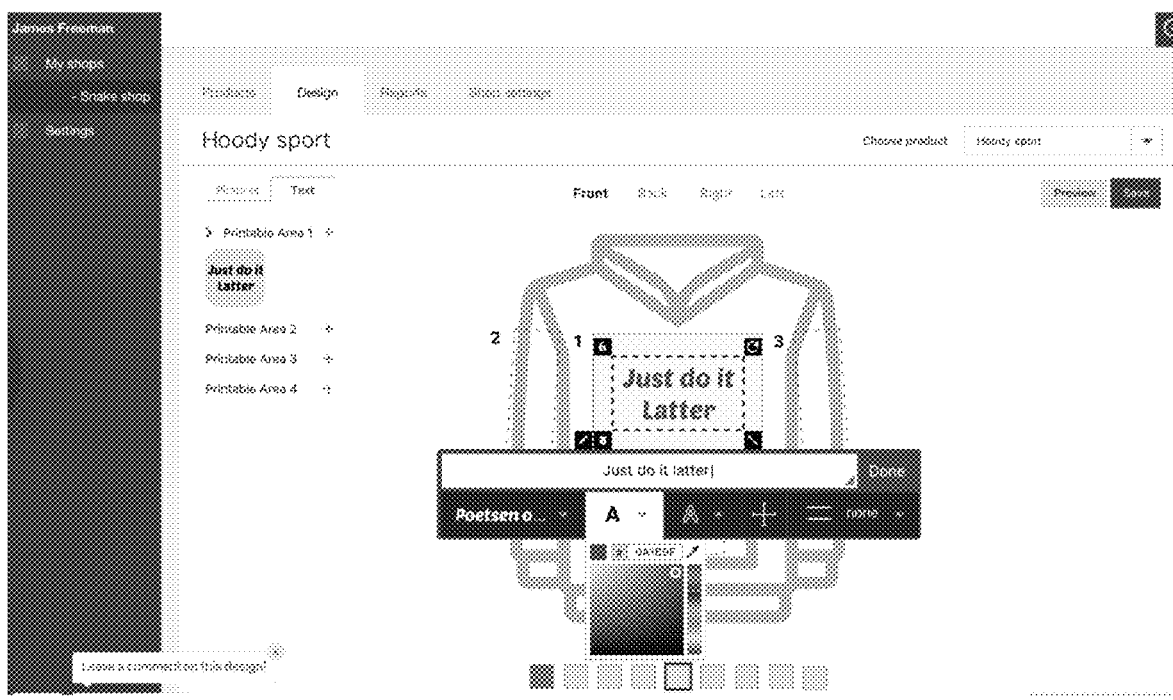

FIG. 2O illustrates the example user interface illustrated in FIG. 2N with a color map displayed in response to the user selecting the character color control. The user interface accesses and presents a color map corresponding to the color selected by the user. The user may select a desired shade from the color map, and the text color will be changed to the selected shade. The user may specify which aspects of the text and/or text formatting and effects may not be modified by an end user. For example, a lock control is provided which when activated will prevent the text color from being changed unless the lock is unlocked (e.g., by clicking on the lock image and optionally entering a password if such has been set).

Figure 2P:
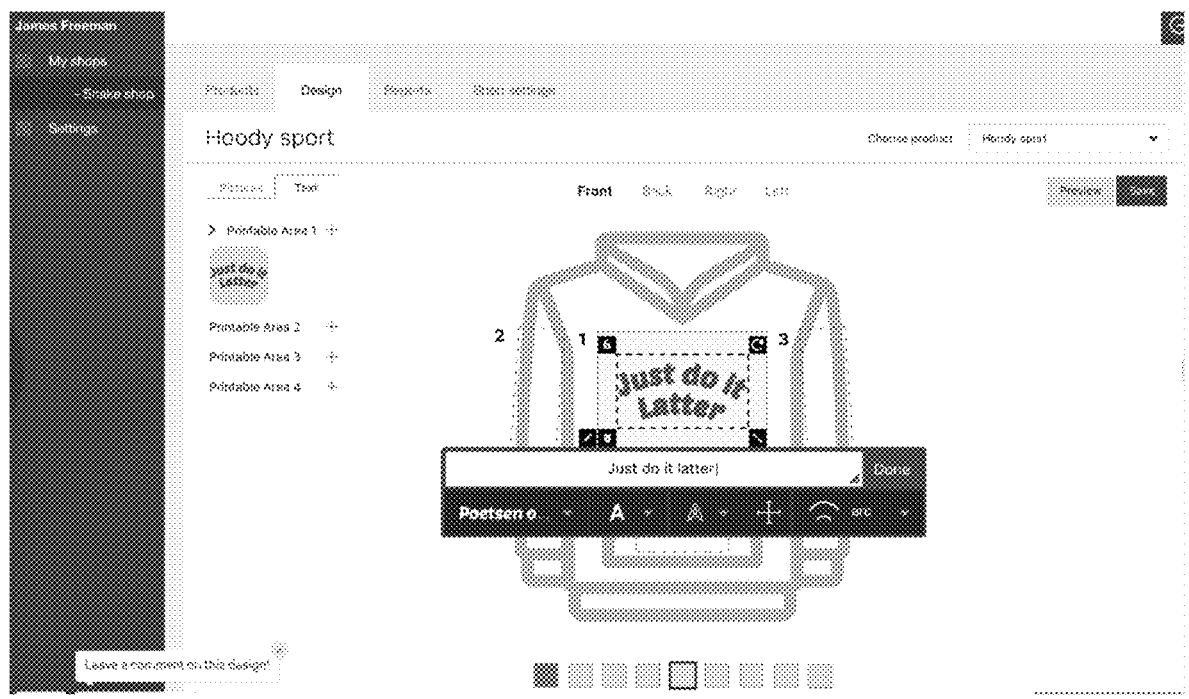

FIG. 2P illustrates the example user interface illustrated in FIG. 2O with the text curved in response to the user activating the convex text curvature control.

Figure 2Q:
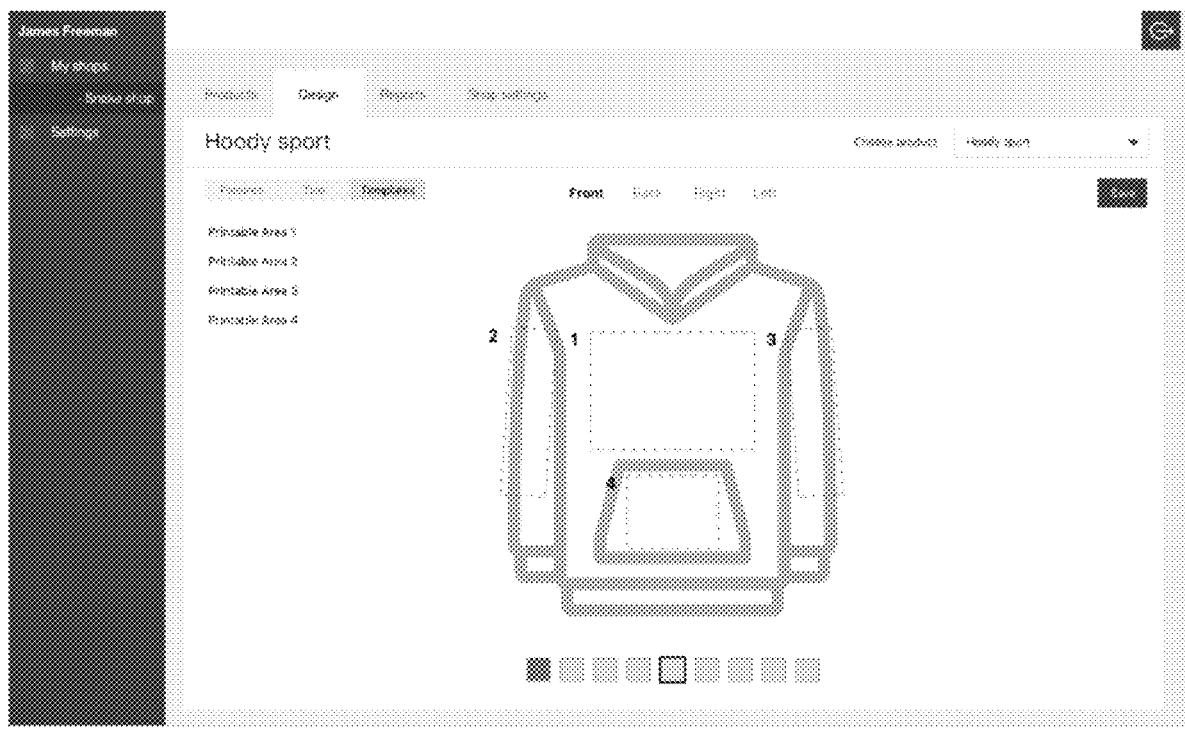

FIGS. 2Q-2Z illustrate additional user interfaces which enable an item provider to create or specify an item and create templates. FIG. 2Q illustrates a user interface with four defined design areas (referred to in the user interface as printable areas). The design areas are visually outlined on respective areas of the product. In addition, a textual list of the design areas is provided (Printable Area 1, Printable Area 2, Printable Area 3, Printable Area 4, in this example). A "choose product" menu enables the user to switch products displayed by the user interface. A side menu enables the user to select a view of a product side (e.g., front side, back side, left side, right side). Tabs ("Pictures", "Text", "Templates" tabs) are provided via which the user can specify or create pictures, text, or templates to add to design areas. In this example, the user has selected the "Templates" tab. To customize a given design area, the user may select a design area (e.g., by clicking on or otherwise selecting the design area).

Figure 2R:
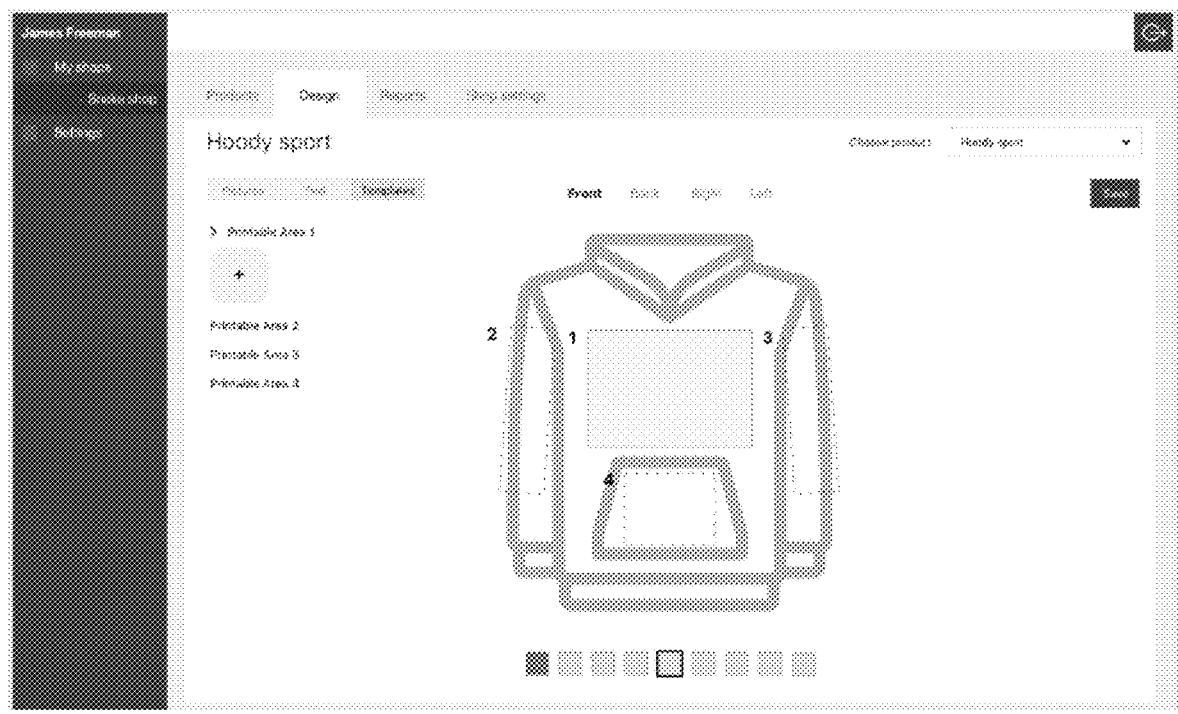

As illustrated in FIG. 2R, in response to the user selecting a design area (Printable Area 1 in the illustrated example), an indicator is displayed in association with the corresponding design area name in the design area list (via a "+" symbol in the illustrated example), and the design area itself is highlighted (e.g., via a change of the border from a broken border to a solid border, and via a change in shading of the design area).

Figure 2S:
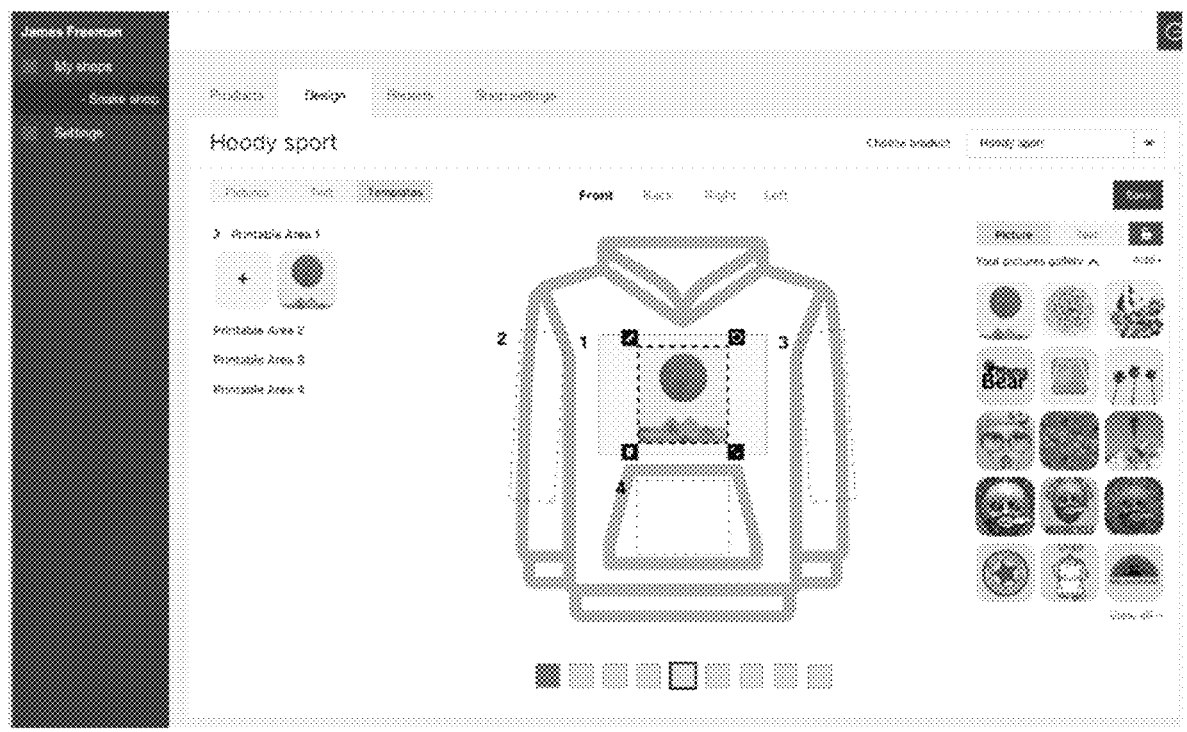
Figure 2T:
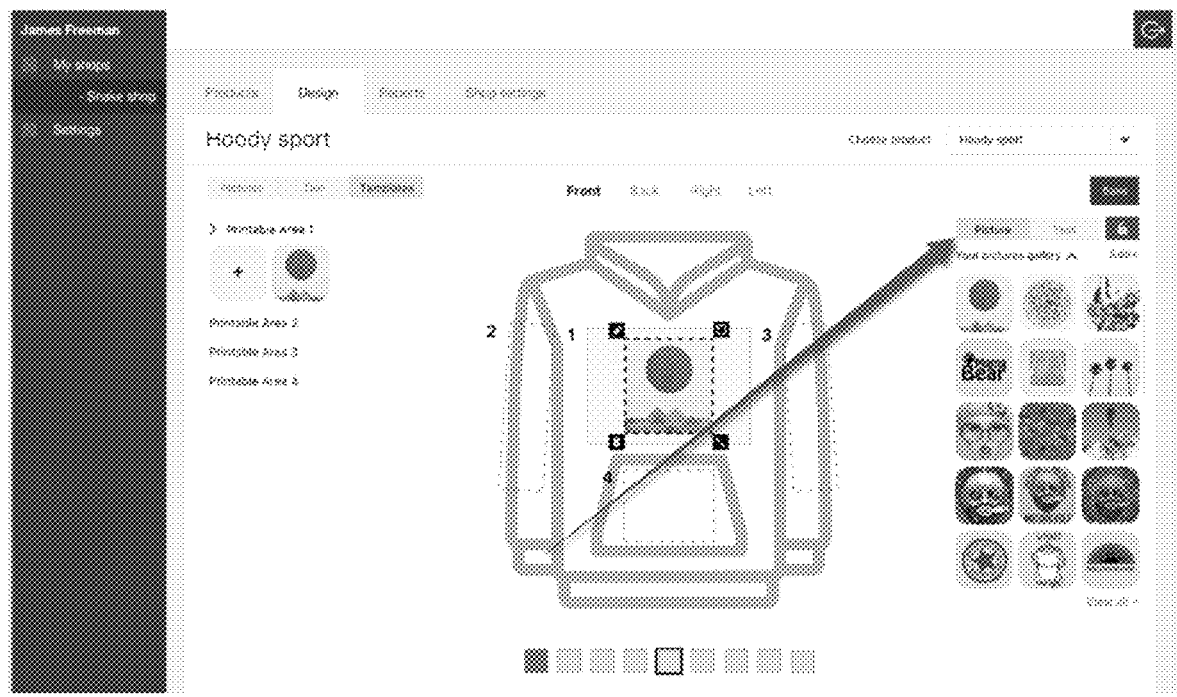

As illustrated in FIG. 2S, in response to the user selecting the selected design area indicator (the "+" symbol in this example), add "Picture" and add "Text" controls are displayed (in the form of tabs), in addition to a "lock template" control (in the form of a lock icon). As illustrated in FIGS. 2S, 2T, in order to add an image to the selected design area, the user may select the "Picture" control, as illustrated. In response, a gallery of images is displayed via the user interface. The user can drag and drop one or more images from the gallery to one or more design areas. In the illustrated example, the user has dragged and dropped one image to Printable Area 1.

Figure 2U:
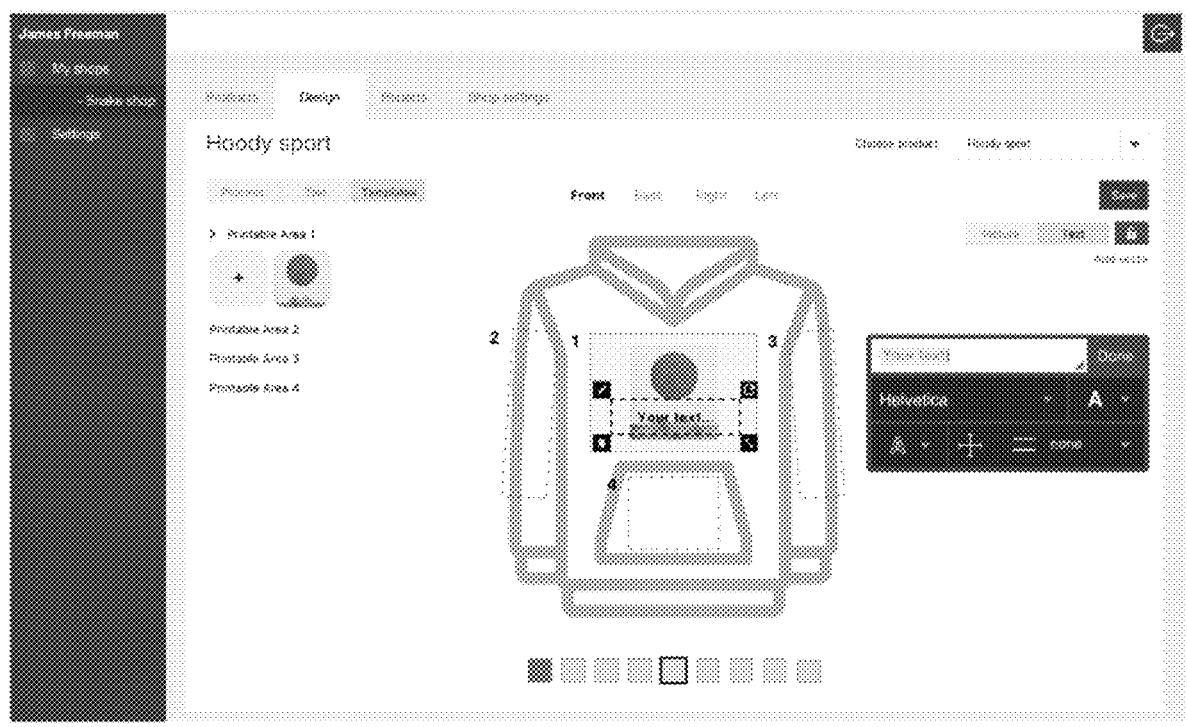
Figure 2V:
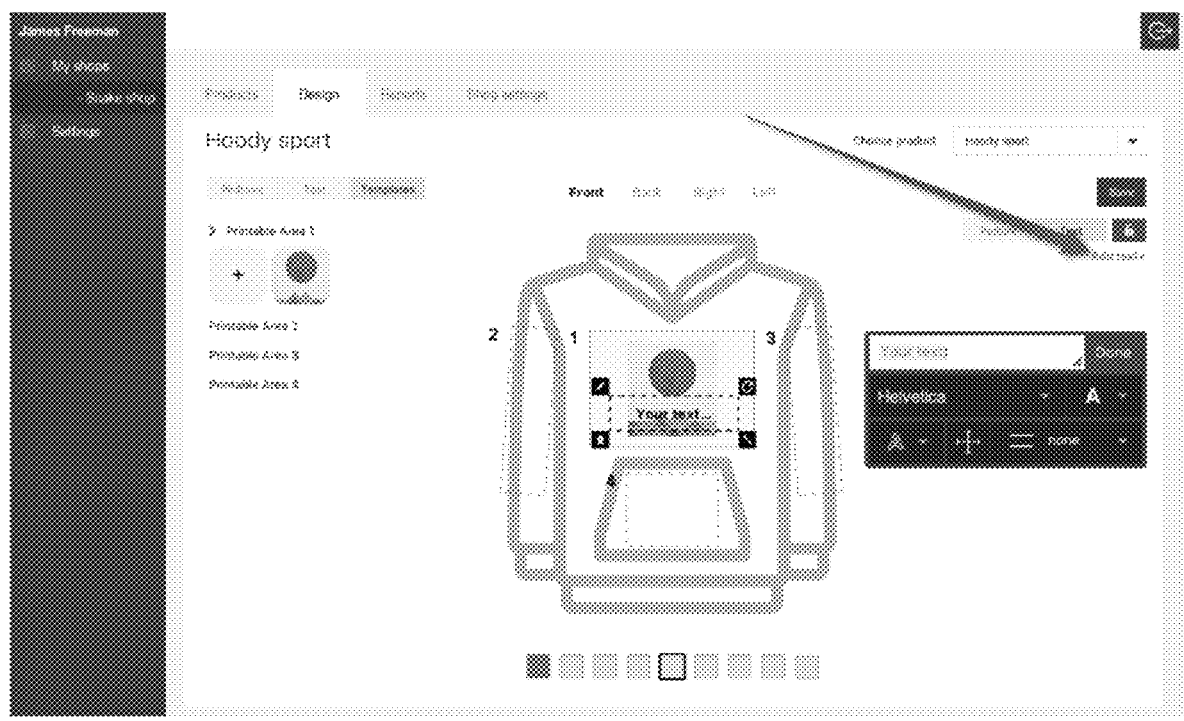
Figure 2W:
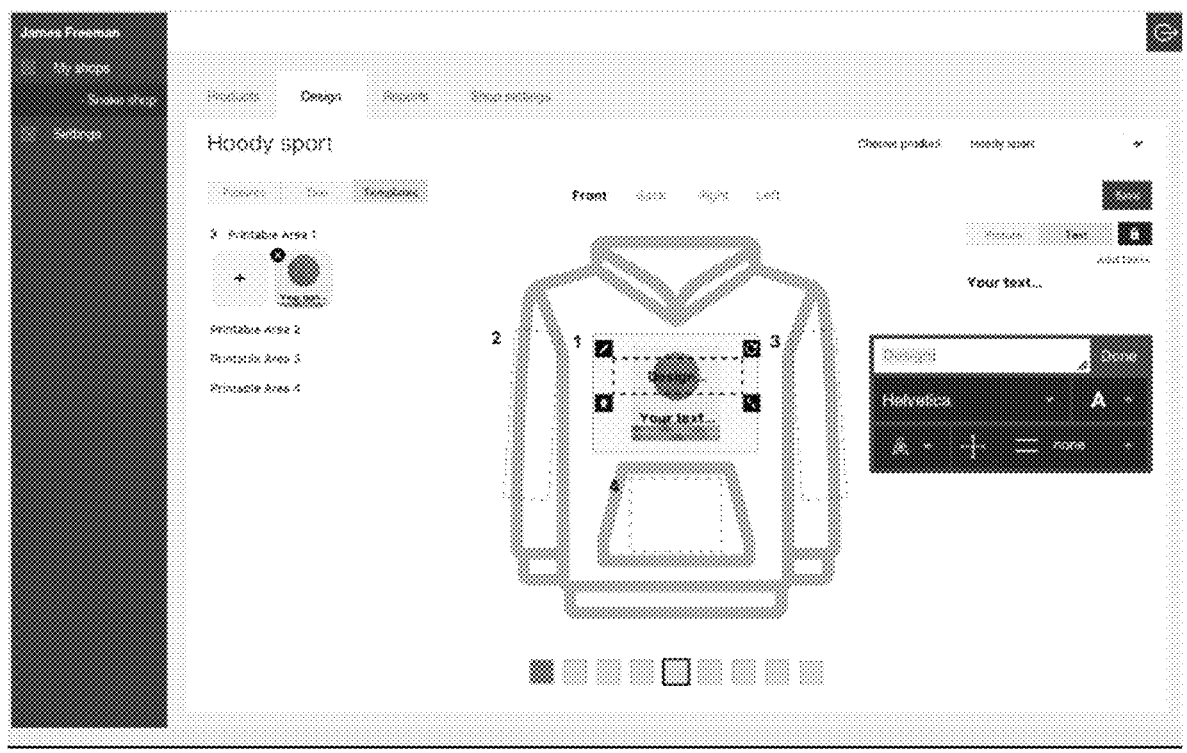

As illustrated in FIGS. 2U, 2V in order to add text to a design area, the user selects the "Text" control. In response, a text user interface may be displayed. The text user interface includes a field for receiving text, a font menu, a size menu, a text alignment menu (e.g., left, right, center), a control via which the user can specify whether the text is to be solid or stenciled, and a text curvature menu. Optionally, controls are provided via which the user can specify character and/or line spacing. A text area border is displayed in the selected design area (Printable Area 1 in the illustrated example). As the user enters text, the text is rendered in both the text field and in the text area in the selected design area at the same time. If the user wants to add another text area to a design area, the user may select the "add text" control and another text area border will be displayed in the selected design area. Thus, multiple images and multiple text phrases may be added to the same design area. The user may specify the layer order. For example, the user may specify if a text entry is to overlay an image (or a portion thereof), or whether the image (or a portion thereof) is to overlay the text entry. FIG. 3W illustrates an example where the user added two text areas overlaying an image in Printable Area 1.

Figure 2X:
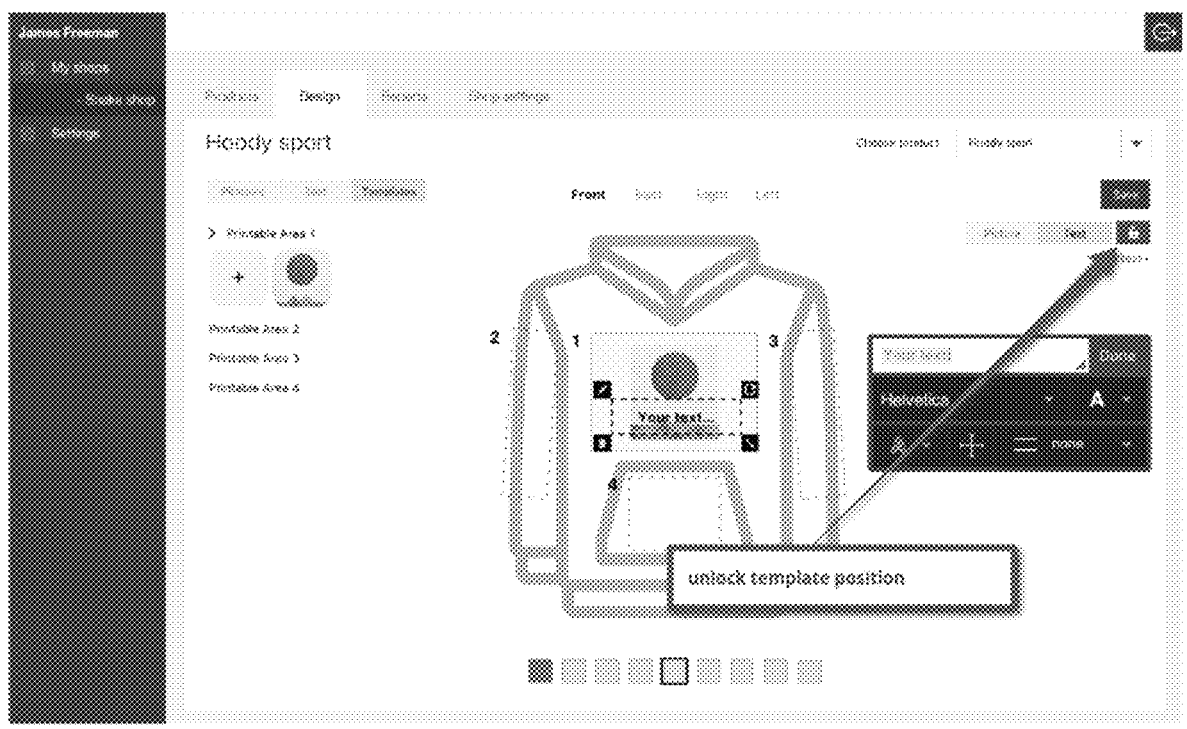
Figure 2Y:
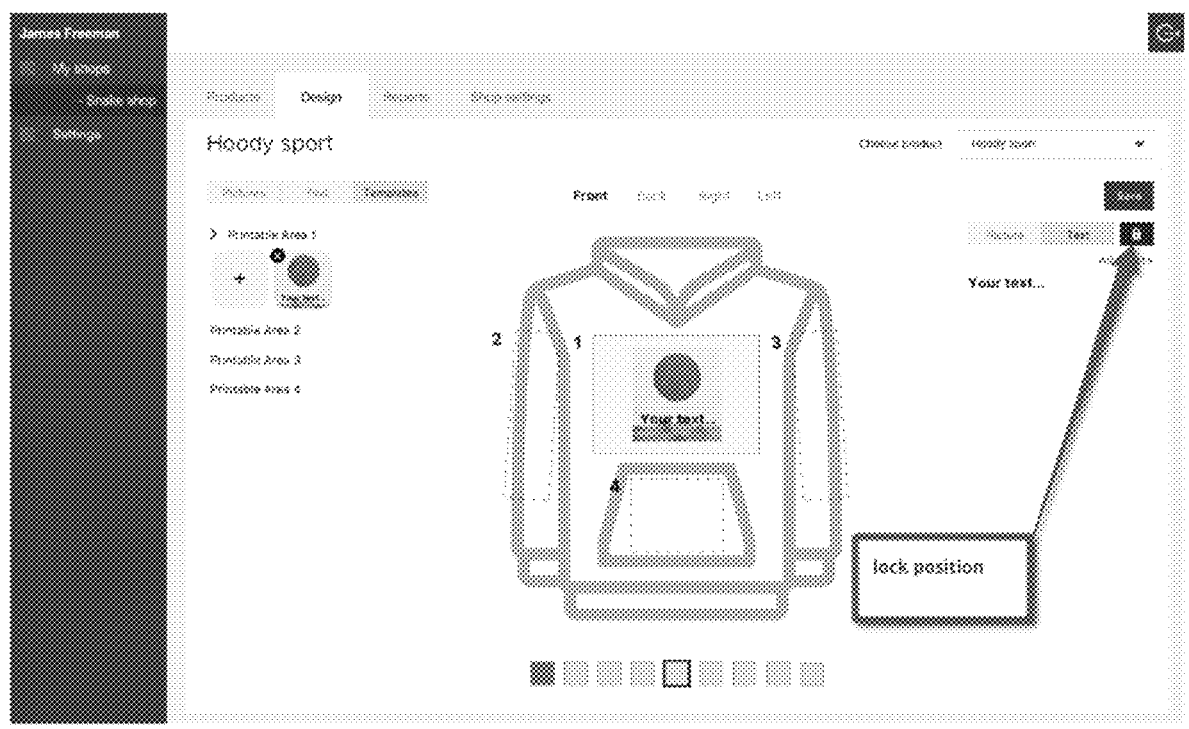

As illustrated in FIG. 2X, 2Y, the user can lock or unlock a template for each design area by selecting the design area and then selecting the lock control. For example, if the template is unlocked, selecting the lock control will lock the template. If the template is locked, selecting the lock control will unlock the template.

Figure 2Z:
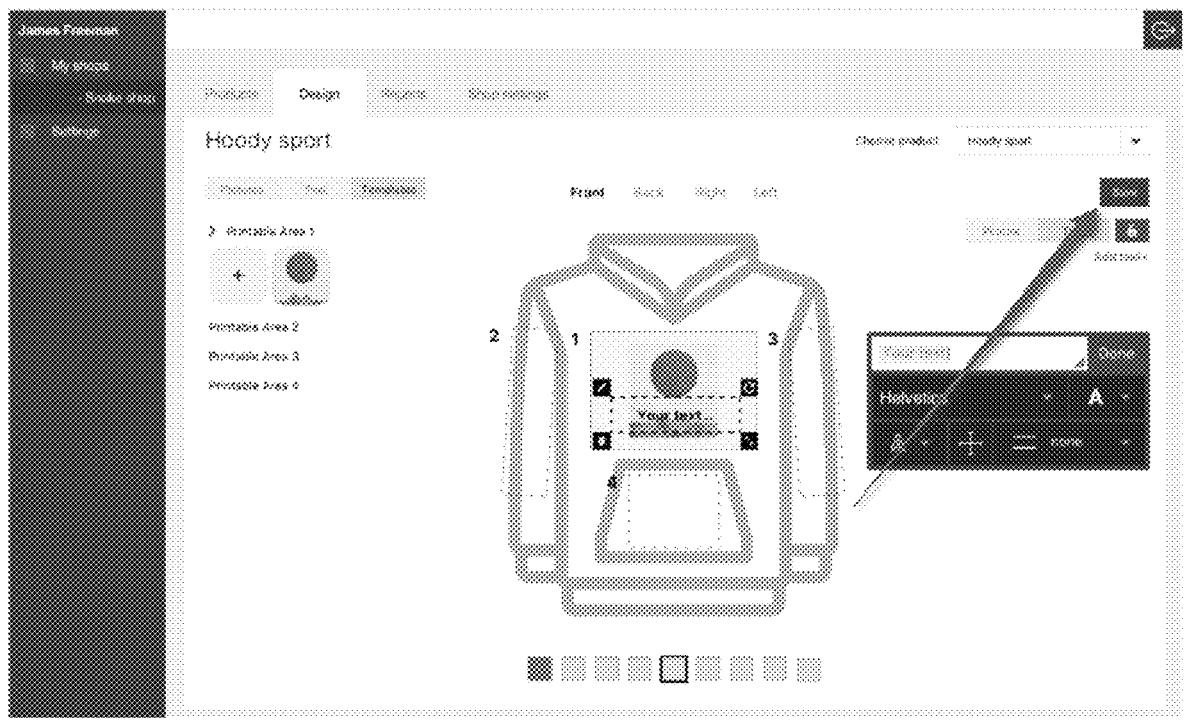

As illustrated in FIG. 2Z, the user can activate the save control to save the template. Optionally, a separate publish control is provided which when activated makes the template available to end users (e.g., via one or more interfaces described elsewhere herein).

Optionally, a user interface may be provided which enables an item provider to specify an expiration date/time for a given template (which may include an image and/or text). For example, a user interface may be provided which includes a date field and/or a time field that enable an item provider to specify for a given template a date and/or time at which the template is to no longer be made available to end-users for use in customizing an item. Optionally, fields may be provided that enable an item provider to specify a number of days and/or hours after which the corresponding template is to no longer be made available to end-users.

Optionally, the user interface may enable the item provider to select multiple displayed templates (e.g., by selecting respective check boxes displayed in association with a template and/or a template name) and associate a single expiration date/time with a set of selected templates. Item provider inputs associated with setting an expiration period may be stored and utilized as described herein.

Optionally, a user interface may be provided via which the item provider can specify a process for handling scenarios where an end user is still in the process of applying a template to an item model, editing a template selected for an item model, or ordering an item customized with a template, upon the occurrence of an expiration event. For example, the user interface may enable the item provider to specify that the expired template may no longer be used to customize an item as soon the expiration date/time is reached. Optionally, the user interface may enable the item provider to specify that the expired template may be utilized to customize an item for a certain period of time (e.g., 10 minutes, 1 hour, 1 day, or the like) after the expiration date/time is reached if an end user is already in the process of applying, editing, and/or ordering an item with the template. Optionally, a countdown timer may be provided for display to the user that indicates how long the user has before an item customized with the expired template may no longer be ordered.

Such expiration periods may be used to heighten interest in templates or may be tied to expiration of a license to such templates. For example, an item provider may want to tie the availability of a given template to a given real world event, such as a sporting event or concert tour, wherein after the event is over, the corresponding template(s) are no longer to be made available to end users.

Optionally, different design elements may be associated with different prices specified by an item provider. For example, a licensed design element of a cartoon character may be more expensive than a design element that uses a public domain graphic or photograph. Thus, a user interface may be provided via which the item provider may specify a price for an individual design element, for a selection of design elements, or for all design elements. The user interface may also enable the item provider to associate a tag (e.g., an icon) reflective of the price. For example, a single star may correspond to the least expensive design elements, two stars may correspond to medium-priced design elements, and three stars may correspond to high-priced design elements. The tags may be displayed to an end user in association with respective design elements in a gallery of design elements.

Figure 3A:

FIG. 3A illustrates an example user interface that may be presented to an end-user that wants to customize an item offered by an item provider. The example user interface may display a catalog of items offered by a single item provider (e.g., selected by the user from a listing of item providers) or by multiple item providers. A given entry in the user interface may include a corresponding item image, a short description, an indication as to available colors, an indication as to available size, and/or an indication as to the location of one or more customizable design areas. The item images may have been previously uploaded or selected by the item provider and designated as default images.

Figures 1, 3B:

Referring to FIG. 3B-1, illustrating an item customization user interface, in this example, the user has selected a hoodie sport jacket. In this example, an image corresponding to the front side of the jacket is accessed from memory and displayed as a default side, optionally in an item provider specified default color or a color specified by the user. The image may be a two dimensional or three-dimensional model (where the surface of a depicted item is rendered in three dimensions).

For example, as similarly discussed above, a three-dimensional model of an item may utilize points in three-dimensional space, connected by triangles, lines, curved surfaces, or the like. Texture mapping may be utilized to define surfaces of the 3D model. The 3D model may be a solid model or a boundary model (which may be constructed using a mesh).

Optionally, the model may be provided using WebGL (Web Graphics Library) which utilizes a JavaScript API (which may be used with HTML5) to render an interactive 3D or 2D graphic. The interactive 3D model may enable the user to spin the model, rotate the model in any direction, scale the model in or out, add text or graphics to the model, and/or animate the model. For example, a user interface may enable the user to manipulate the model via touch or via discrete spin, rotate, scale controls. Optionally, the model of an item will automatically rotate around an axis when a user selects the item (e.g., from a catalog).

By way of illustrative example, if the item is a jacket, the image of the jacket may be a 3D image of the jacket in a worn state, as if draped over a torso. For example, the front of the jacket may be curved as if conforming to a human chest. A design element (e.g., text and/or an image) may be configured to appear curved when applied to a curved portion of a 3D model. Optionally, the image of the item (e.g., a jacket) may be continuously rotated around a vertical axis when presented to the user so that the user can view the front, back, left and rights sides of the item, as illustrated in FIGS. 3B-3, 3B-4, and 3B-5.

By way of further illustrative example, if the item is a shoe, the model of the shoe may be animated to demonstrate how the shoe flexes when being worn and used to run.

The front side may be the pre-specified default side that is displayed. In addition, a side selection control is provided. The user may activate the side selection control to scroll through (or otherwise select from) available side images, where the corresponding image of the selected side is displayed by the user interface, with any design areas indicated (e.g., with a border and/or a design area identifier). In the illustrated example, the user interface indicates via respective borders, shading/coloring, and identifiers, that the jacket has four design areas that had been specified by the item provider (design area 1—chest, design area 2—muff, design area 3—right sleeve, design area 4—left sleeve). The user may select (e.g., by clicking on) a design area to add to or modify the design area. A toggle control may optionally be provided which when activated by the user causes the design area indicators (e.g., borders) to turn on or off (where when a toggle off command is issued, the design area indicators are not displayed).

Controls are optionally provided which when activated enable the user to command the user interface to display a description of the item, change the size of the item (e.g., XS, S, M, L, XL, 2XL, etc., where the size information may include gender an age information (e.g., unisex, men, women, juniors, youth, toddler, infant)), change the color of the item, and/or display a menu of available products. An item cost may be accessed from memory or calculated and displayed. A control may be provided via which the user can add the item to the user's shopping cart.

Figures 2, 3B:
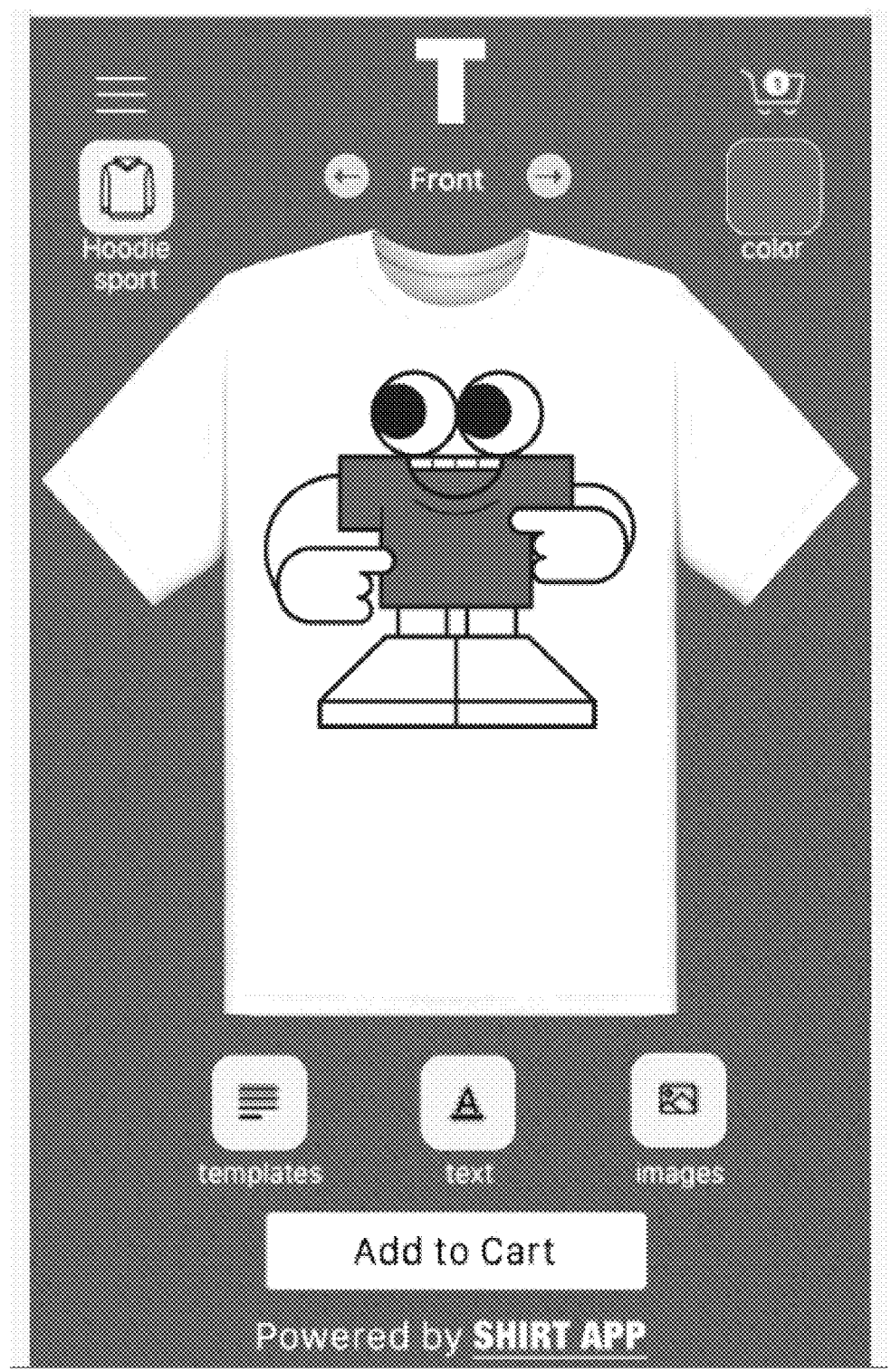
Figures 3, 3B:
Figures 3, 3B, 4:
Figures 3, 3B, 4, 5:
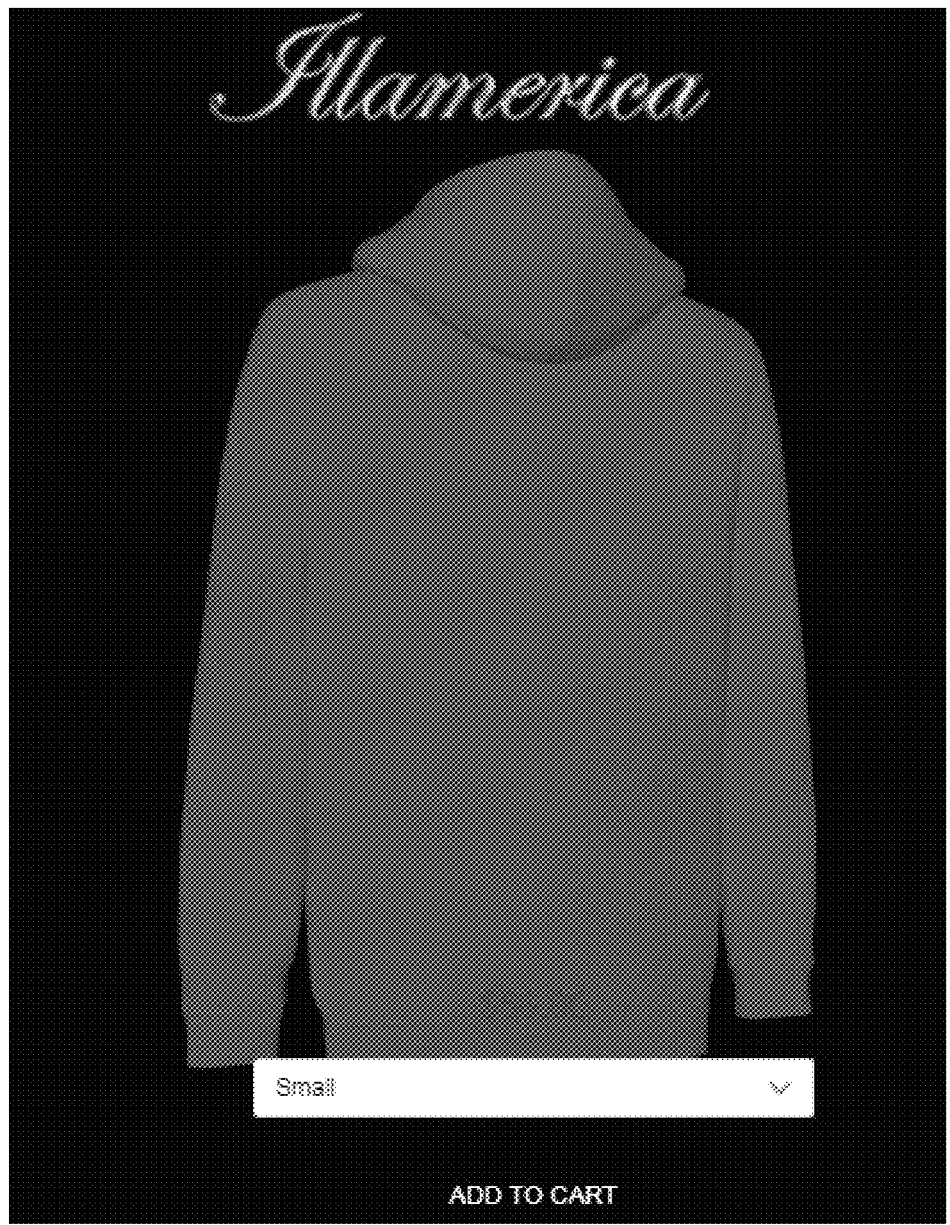

FIG. 3B-2 illustrates another example item customization user interface. In this example, the size and description controls are not displayed, and a template control is provided. When the user selects the template control, a gallery of templates may be displayed as described elsewhere herein. In this example, the item provider has specified a header logo and a background associated with a character (e.g., a cartoon character) included on the item and associated with the item provider store.

Figure 3C:

Referring to FIG. 3C, in this example, the user has selected the description control, and in response, the user interface provides a textual description of the item (e.g., the item material(s), a description of the color type, cuff type, and hem type, and an article number (e.g., a sku)), which may have been provided by the item provider.

Figure 3D:
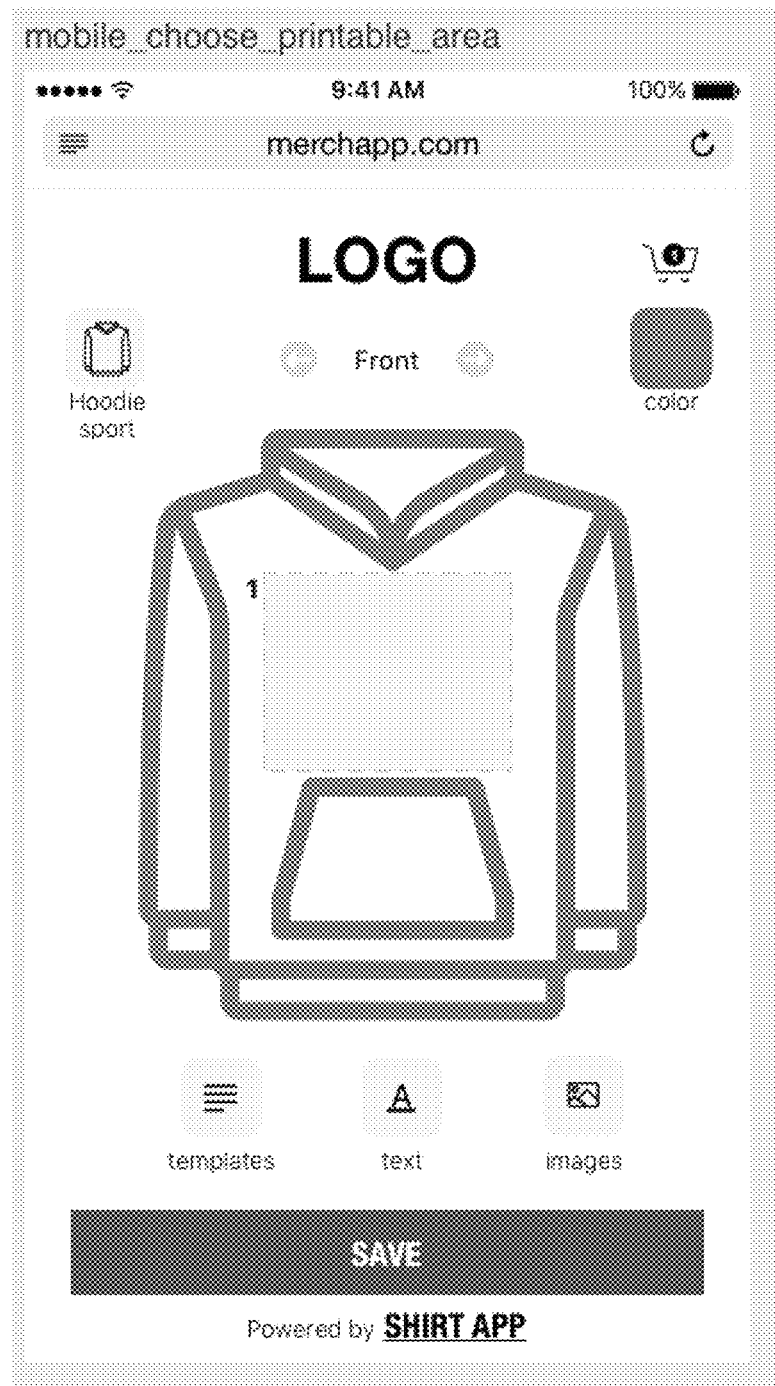

In response to the user selecting a design area (e.g., design area 1 on the chest), the example user interface illustrated in FIG. 3D may be presented. The selected design area is highlighted (e.g., via color, shading, and/or change in border from a solid to interrupted/dashed boarder) via the user interface relative to the other design areas to indicate that the design area (e.g., design area 1) has been selected. The user interface provides various editing tools (e.g., an add template control, an add image control, an add text control) to enable the user to customize the selected design area. A save control may be provided. In response to the user selecting the save control, the information corresponding to the user interface may be saved for later access.

Figures 1, 3E:
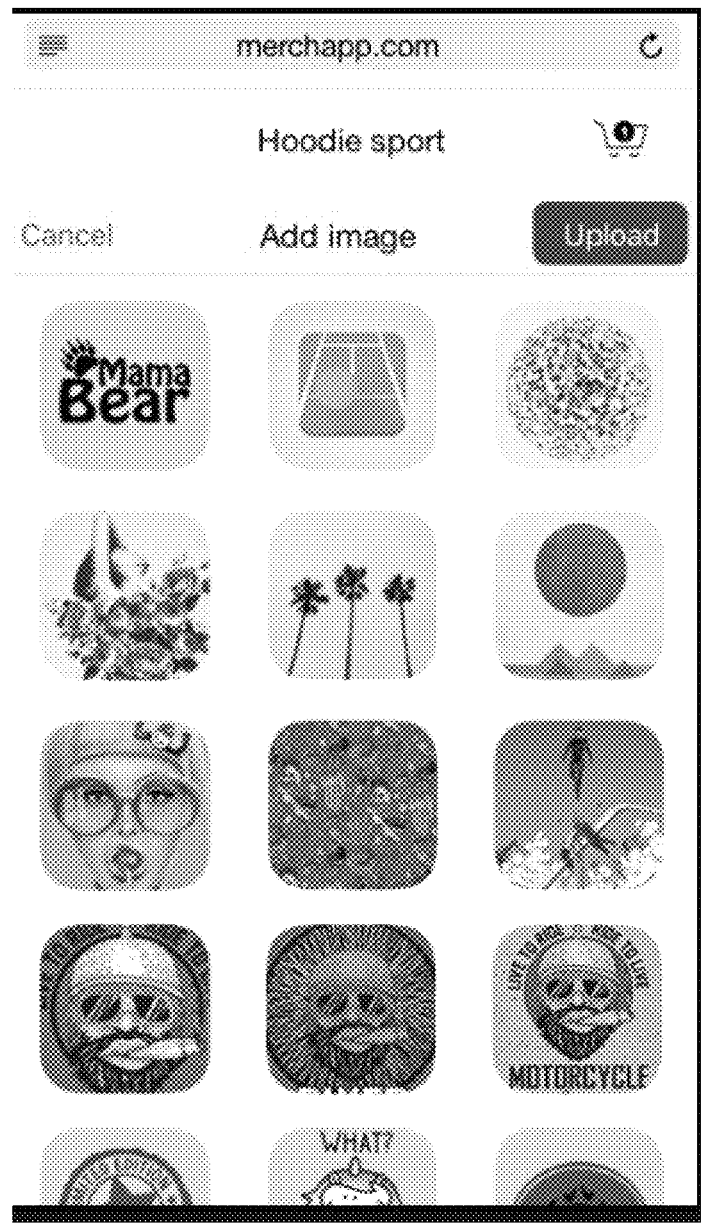
Figures 2, 3E:
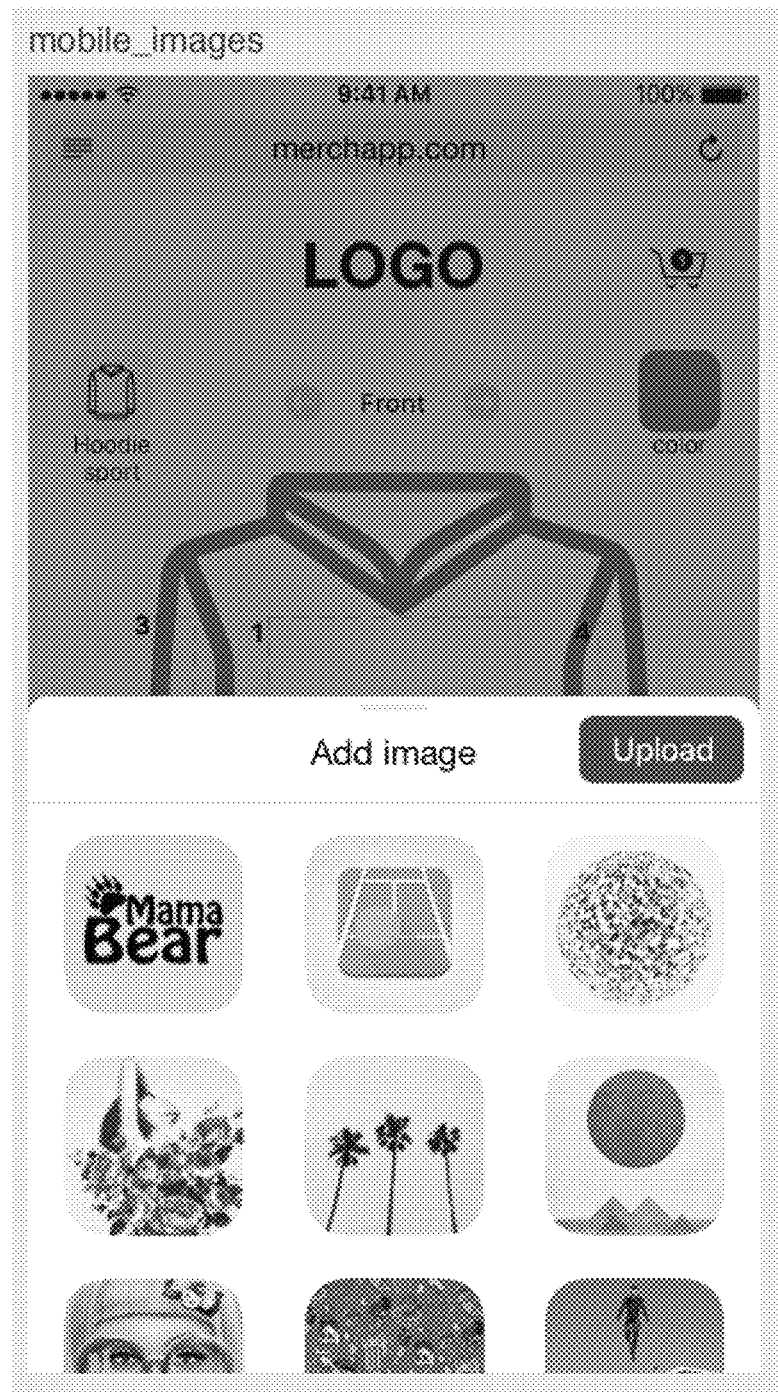
Figures 3, 3E:

In response to the user selecting the images control, the example user interface illustrated in FIG. 3E-1 may be presented. Controls are provided via which the user can upload an image to be added to the item or the user can select an image from a displayed gallery of image templates (e.g., by clicking on or pointing at an image template), which may optionally have associated text, which may include editable text and/or non-editable text.

The gallery of images may be organized in order of popularity (e.g., most popular in the last specified number of hours/days or overall), newness, exclusivity (where images that are only available for printing on products via the system are displayed first or last), soonest to become unavailable (e.g., where a given image may be associated with a date/time at which the image will no longer be available to print on the item), cost (where certain images may be associated with a higher cost than other images), user ratings, or otherwise. A control may be provided via which a user can specify which criteria are to be used to order the image templates. A control may be provided via which a user can specify the ascending or descending ordering for the selected criteria. For example, if the user selects newness as the ordering criterion, the user may activate an ascending/descending control to cause the user interface to present the newest template first, the second newest template second, and so on, or to present the oldest template first, the second oldest template second, and so on.

A filter control may be provided to cause only templates meeting specified filter conditions to be presented. For example, a filter may be specified so that only templates that have a specified future unavailability date are to be displayed. By way of further example, a filter may be specified so that only exclusive templates are to be displayed. By way of further example, a filter may be specified so that only templates whose color, size, orientation, text, subject matter (e.g., sports, music, movies, etc.), and/or other specified feature, are user-editable are to be displayed. A given filter control may be in the form of a slider control (e.g., slide slider to one side to see all the templates, slide to the other side to see only the most expensive templates, slide to the middle to average prices templates), a text field, a menu entry, or otherwise.

Optionally, the system may automatically filter out certain templates. For example, the system may filter out templates associated with expiration dates/times that have passed or will pass within a threshold period of time (e.g., the next 30 seconds, 1 minute, 5 minutes, or other threshold period of time). The system may filter out templates that are not permitted for use on the item or for the selected design area.

By filtering out unavailable templates and/or templates that do not meet certain criteria, the amount of network bandwidth needed to transmit the templates to the user device is reduced, the amount of user device memory needed to store the templates is reduced, and the amount of display area needed to display templates is reduced.

Optionally, the gallery of image templates may include a corresponding listed expiration date/time for those image templates that are associated with an expiration date/time. Optionally, a continuously updated countdown clock may be displayed in association with a given template or set of templates that reflects the corresponding expiration date/time. The countdown clock may textually display the number of days and/or hours/minutes/seconds until the expiration date/time will be reached.

Optionally, a given template may be displayed in association with its corresponding cost. Optionally, tags (e.g., a number of stars) may be displayed to an end user in association with templates that indicate cost levels.

The user interface may specify that the uploaded image be in a scalable vector graphics (SVG) format which is defined in an XML text file. The system may locate and edit a color entry in the text file to correspond to a color specified by the user, thereby causing the color of graphic added to the design area to be the specified color (e.g., via fill, stroke, and/or other properties). The color may be in the form of a standard color name (e.g., "green," "red," "blue"), or via a numerical code (e.g., as a hexadecimal value, as rgb decimal values (e.g., rgb (126, 255, 216), as rgb percentages (e.g., rgb (75%, 50%, 25%), or otherwise). In the illustrated example, a color map is provided via which the user can point to a desired color, and the corresponding numerical value (e.g., a hexadecimal value) will appear in color name field. The numerical color value may be edited by the user.

Optionally, a user interface may be provided (e.g., in the form of a drop down or pop-up user interface) that indicates restrictions with respect to a given image template. For example, the user interface may indicate where the image template may be used (e.g., only on a breast pocket), whether the size may not be changed, whether the height/width ratio may not be changed, whether one or more colors cannot be changed, other restrictions discussed herein, etc.

FIG. 3E-2 illustrates the user interfaces corresponding to FIGS. 3D and 3E-1, where a portion of the gallery of images may be displayed overlaying the user interface of FIG. 3D so that the user can efficiently view at least a portion of the item being edited and the gallery images at the same time. An interface may be provided via which the user can cause the gallery of images or the user interface of FIG. 3D to be displayed in full screen or near full screen mode, as illustrated in FIG. 3E-3.

Figure 3F:
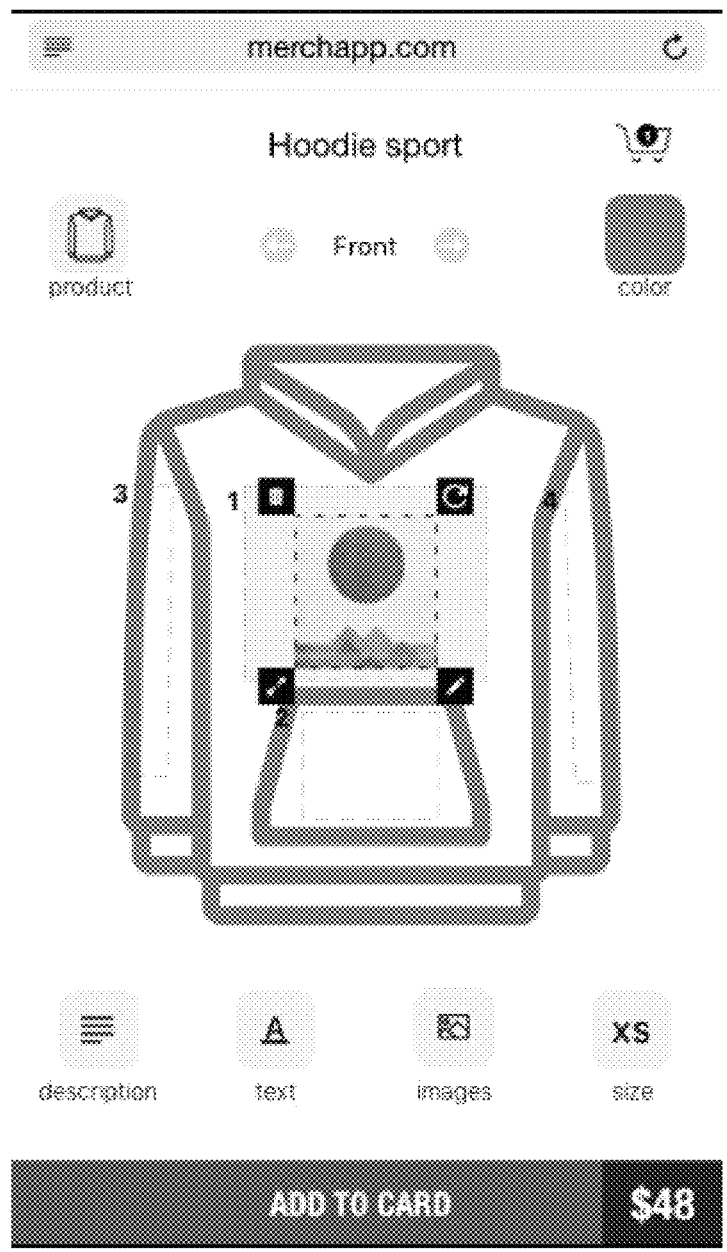

FIG. 3F illustrate an example user interface with an image added to the selected design area in response to the user selecting the corresponding image from the gallery illustrated in FIG. 3E. Controls are provided via which the user can instruct the user interface to rotate the image, change the size of the image (e.g., by dragging a corner or side of an image), edit the image (e.g., change the color of the image), straighten image, center image in the design area, center the image in a feature of the item (e.g., in the center of a pocket), or delete the image. In addition a color control is provided via which the user can instruct the user interface to change the color image. A toggle control may optionally be provided which when activated by the user causes the design area indicators, editing controls displayed over the item image, and/or any added images/text to turn on or off (where when a toggle off command is issued, the design area indicators, editing controls displayed over the item image, and/or any added images/text are not displayed).

Figure 3G:
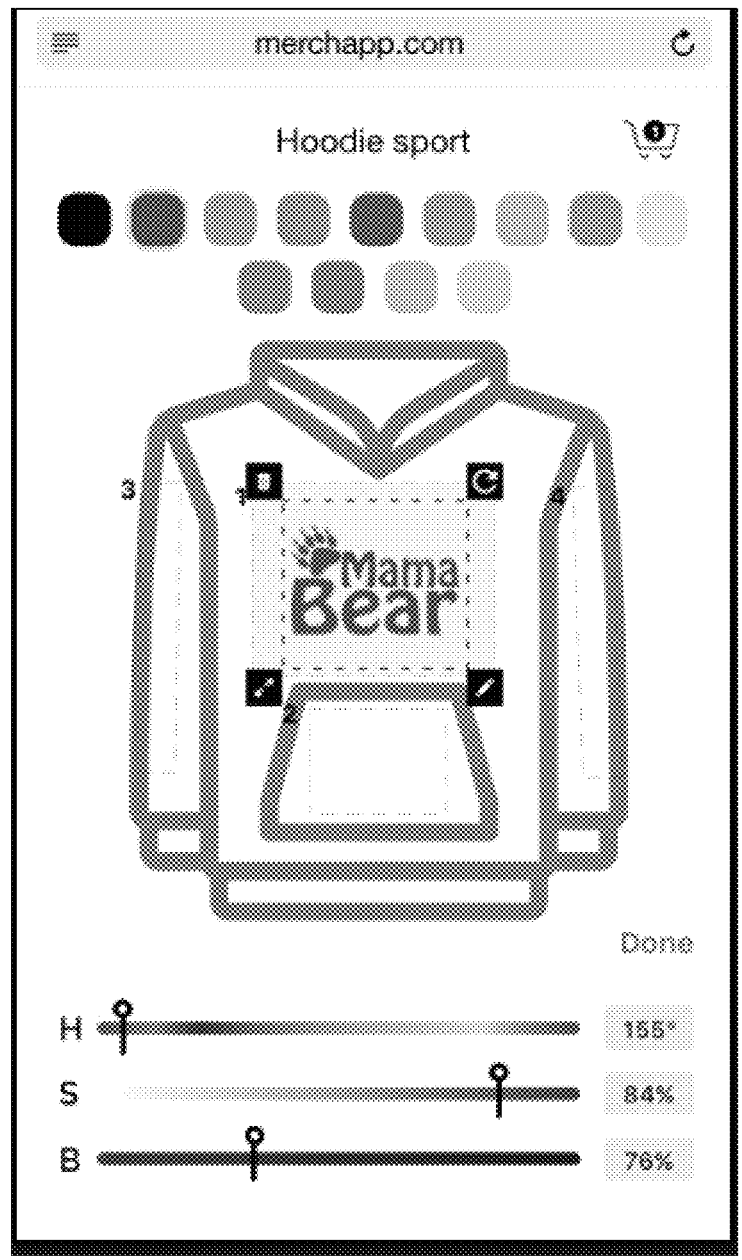

If the user selects the color control, the example user interface illustrated in FIG. 3G may be displayed. The example user interface displays a palette of colors from which the user can select a desired color. The palette may have been specified by the item provider. The color of the image is changed in real time to the color selected by user. Controls (e.g., slide controls) are provided via which the user can specify hue, saturation, and brightness for the selected color. The hue slide control depicts a continuum of hues for the selected color. The hue number corresponding to the hue slider position is determined and displayed. The saturation slide control depicts a continuum of saturations for the selected color. The saturation percentage corresponding to the saturation slider position is determined and displayed. The brightness slide control depicts a continuum of brightness for the selected color. The brightness percentage corresponding to the brightness slider position is determined and displayed. Changes in hue, saturation, and brightness specified by the user via respective controls are displayed in real time in the image depicted in the design area (e.g., the image on the hoodie jacket image). When the user selects a done control, the user settings are saved in memory.

Optionally, a control may be provided via which a person can isolate a portion of the image and remove a specified color from the portion. For example, if an image has a black background, the control may be used to remove the black background or change the color of the black background (without affecting other black colored portions of the image).

Figure 3H:
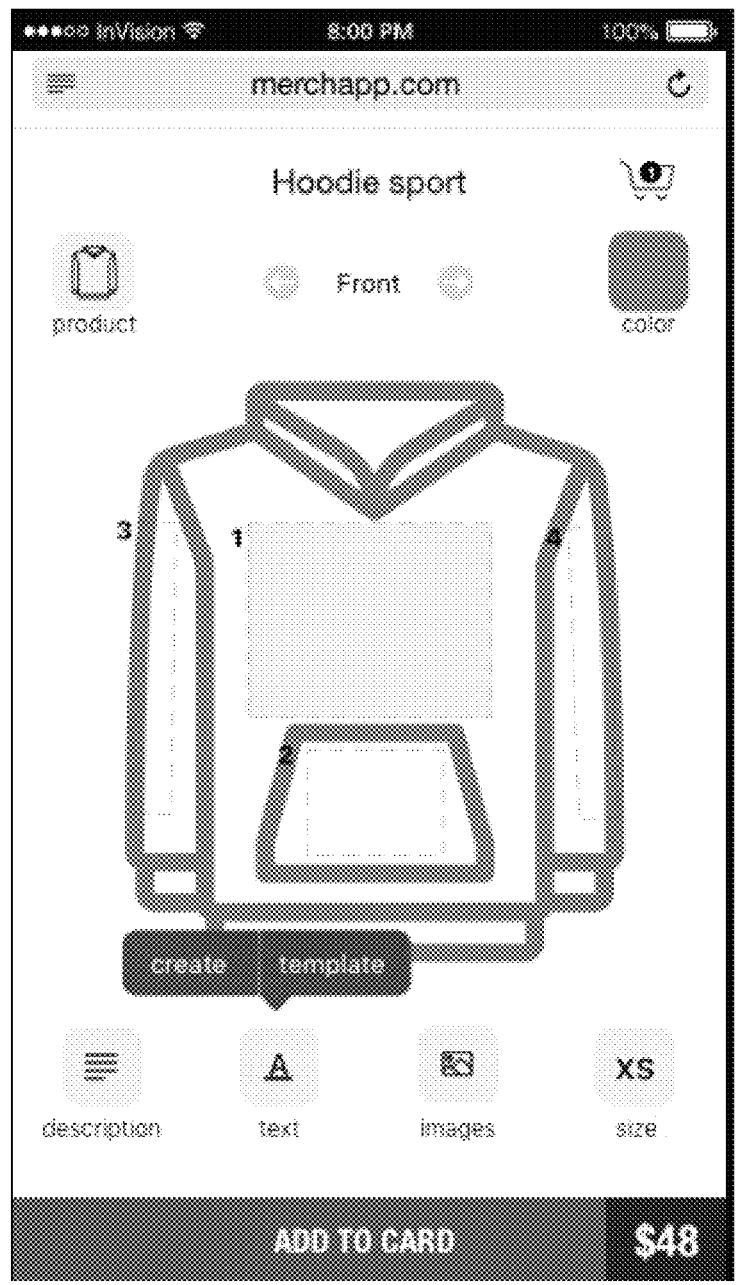
Figure 31:
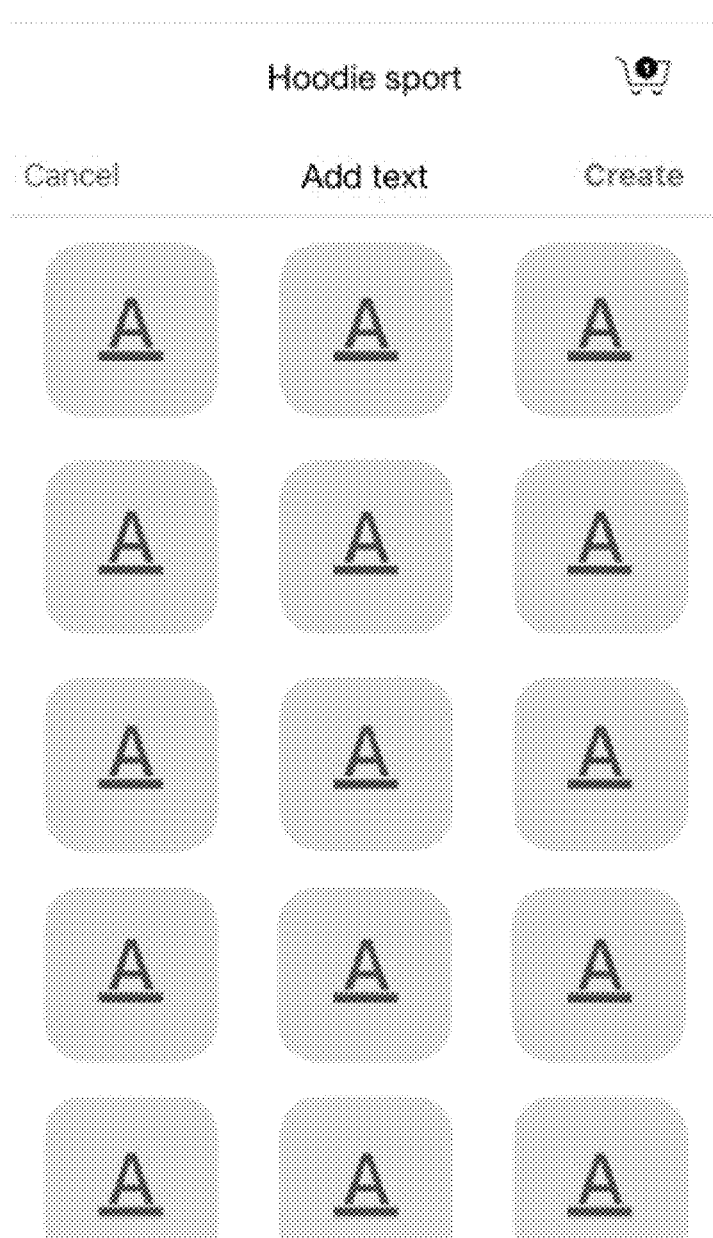

In response to the user selecting the text control illustrated in FIG. 3D, the example user interface illustrated in FIG. 3H may be presented. A "create" control and "template" control are displayed. When the user selects the "create" control a user interface may be displayed via which the user can enter the user's own text.

If the user selects the "template" control a gallery of templates, as illustrated in FIG. 3I, previously entered by the item provider (e.g., an online shop owner) via which the user can select and add a template (e.g., text/phrases), created by item provider for users to add to the item provider's products. When the user selects a done control, the user settings are saved in memory. The user can select the cancel control to cancel the template add operation. The user can select the create control to enter the user's own text. Optionally, a given template may include a visual watermark (e.g., of the item provider, the owner/licensor of a template (or character or phrased in the template) to prevent or hinder an unauthorized use of the template. However, when the template is printed on a product, the watermark is not visibly present.

Figure 3J:
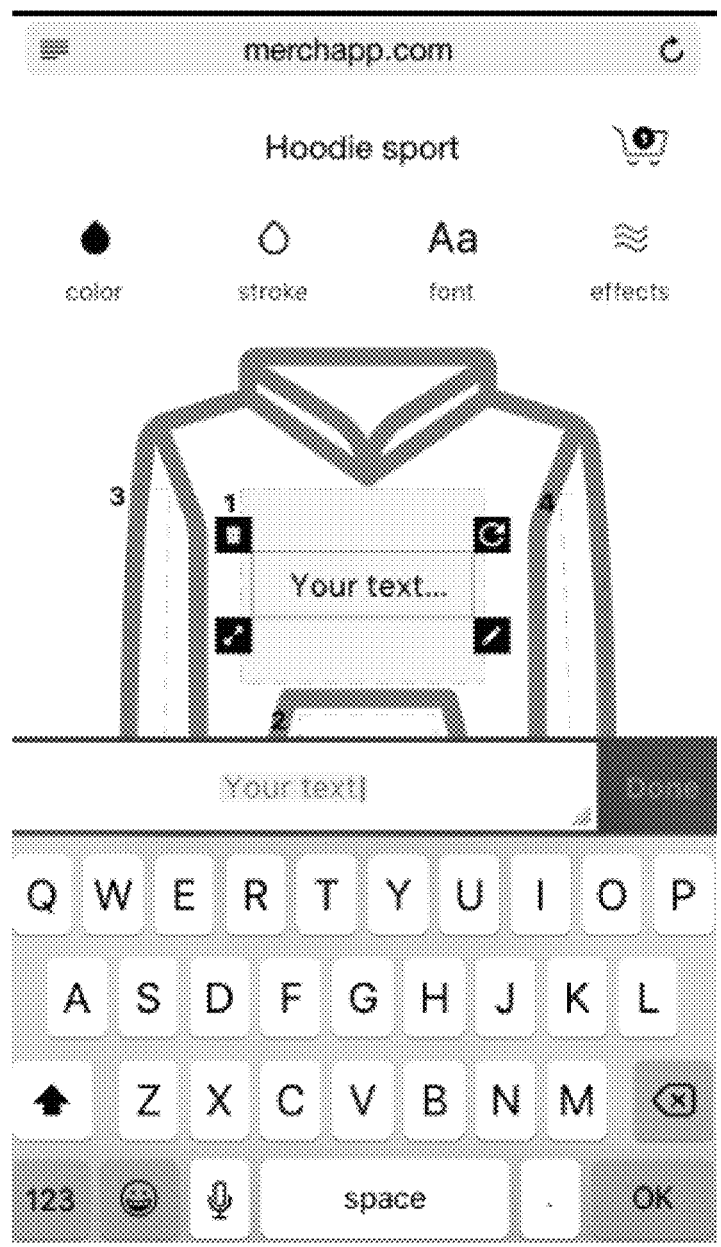
Figure 3K:
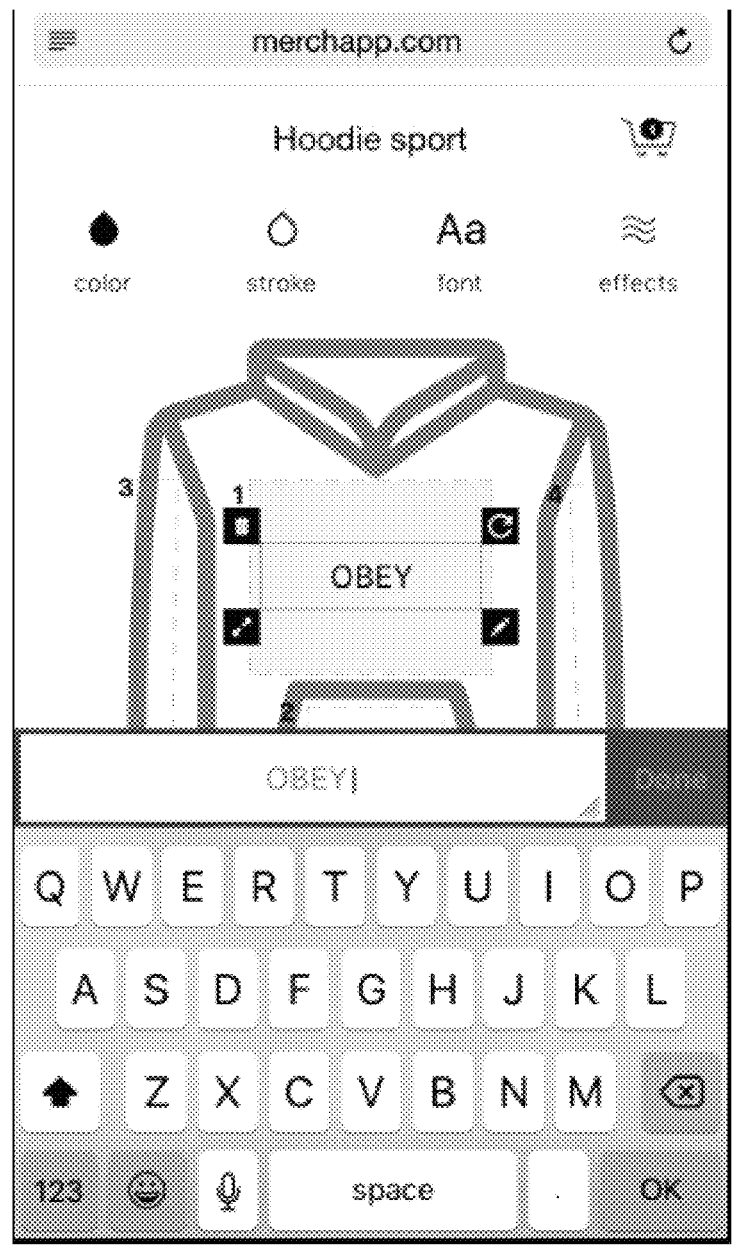

FIG. 3J illustrates an example text entry user interface including a keyboard and a text field. As the user types (via the keyboard) or otherwise enters text, the user interface displays the text in real time in the text entry field and in the selected design area, optionally with the color, hue, saturation, font, alignment, line spacing, character spacing rotation, and/or effects previously specified by the user. In response to the activating the "done" control, the user interface may be modified so that the keyboard slides away and enables the item to occupy a larger percentage of the user deice display. Controls are provided via which the user can instruct the user interface to rotate the text, change the size of the text (e.g., by dragging a corner or side of the design are or specifying a font size), edit the text (e.g., change the color of the text), or delete the text. A control is provided via which the user can change and select the color of a text border. FIG. 3K illustrates the user interface of FIG. 3J with user entered text displayed in the text entry field and the design area. When the user selects a done control, the user settings are saved in memory.

Figure 3L:
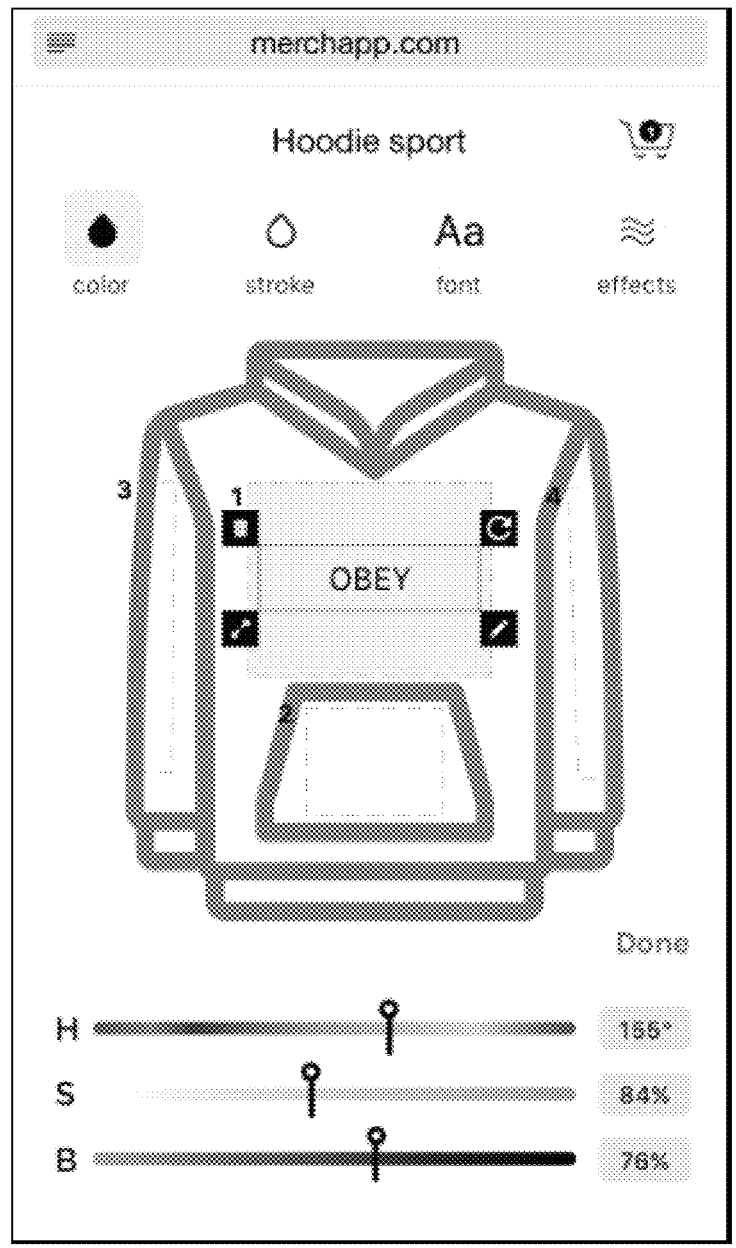

FIG. 3L illustrates the example user interface of FIG. 3K, where the user has selected the color control. The example user interface displays a palette of colors from which the user can select a color for the text in the selected design area. The text color is changed is real time to the color selected by user. Controls (e.g., slide controls) are provided via which the user can specify hue, saturation, and brightness for the selected color, as similarly discussed above. The hue slide control depicts a continuum of hues for the selected color. The hue number corresponding to the hue slider position is determined and displayed. The saturation slide control depicts a continuum of saturations for the selected color. The saturation percentage corresponding to the saturation slider position is determined and displayed. The brightness slide control depicts a continuum of brightness for the selected color. The brightness percentage corresponding to the brightness slider position is determined and displayed.

Changes in hue, saturation, and brightness specified by the user via respective controls are displayed in real time with respect to the text displayed in the selected design area (e.g., the text on the hoodie jacket image). When the user selects a done control, the user settings are saved in memory.

Figure 3M:
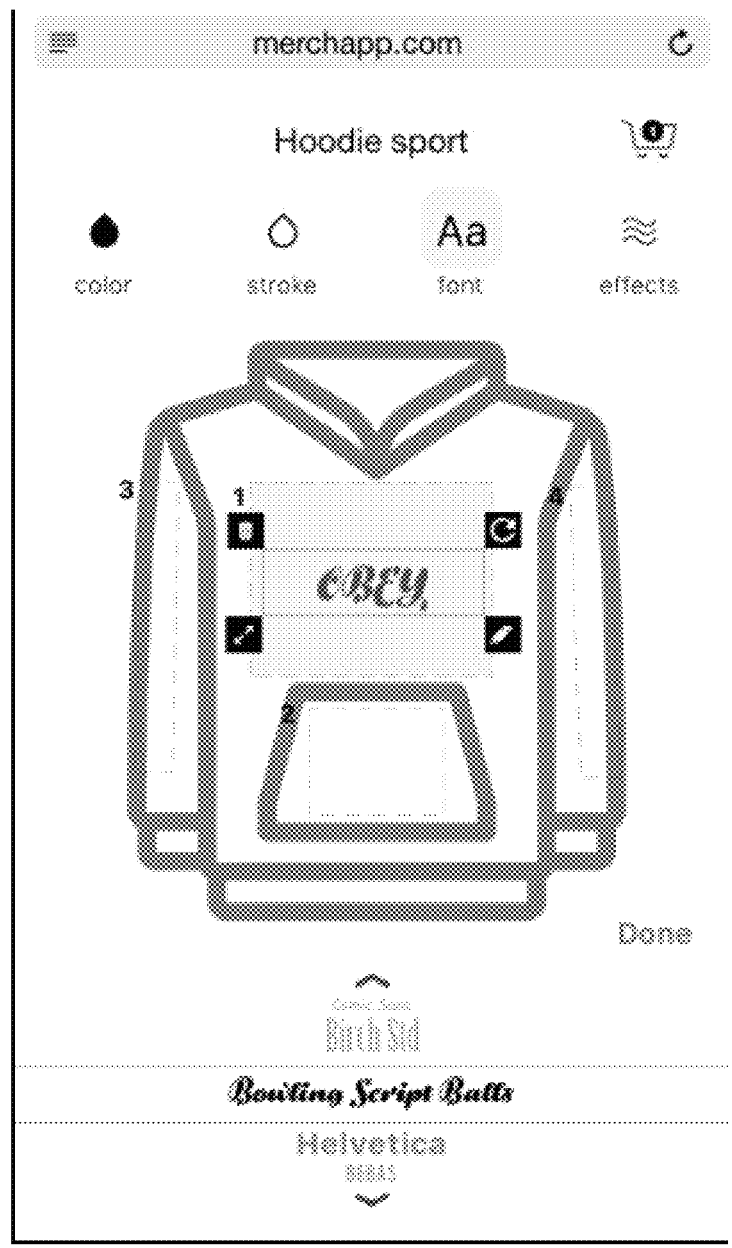

In response to the user selecting the font control illustrated in FIG. 3L, the example user interface of FIG. 3M may be displayed. A rotatable menu of fonts is provided via which the user can select a desired font (although other menu formats may be used) for template text and/or user created text. The font menu may be restricted to the fonts previously specified by the item provider. The font of the text in the design area will change in real time to the user selected font. When the user selects a done control, the user settings are saved in memory. Other font formatting controls may be provided (e.g., regular, bold, underline, strike through, subscript, superscript). Optionally, controls (e.g., via a menu) may be provided that enables a user to add a border, specify border thickness, specify text alignment (e.g., centered, left justified, right justified, etc.), specify character spacing, and/or specify line spacing.

Figure 3N:
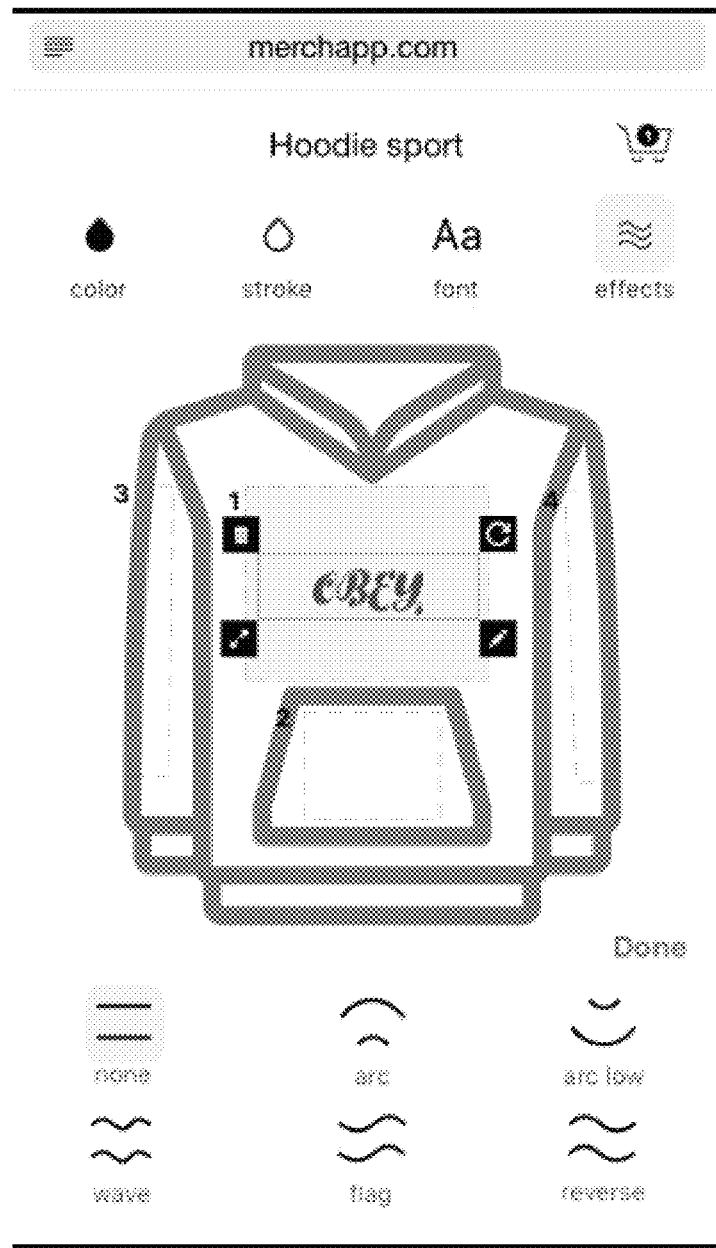

In response to the user selecting the effect control illustrated in FIG. 3M, the example user interface of FIG. 3N may be displayed. A menu of effects (e.g., text curvatures) is provided via which the user can select a desired effect. The effect menu may be restricted to effects previously specified by the item provider. The text in the design area will change in real time to the user selected effect (e.g., the user selected curvature). When the user selects a done control, the user settings are saved in memory.

Figure 3O:
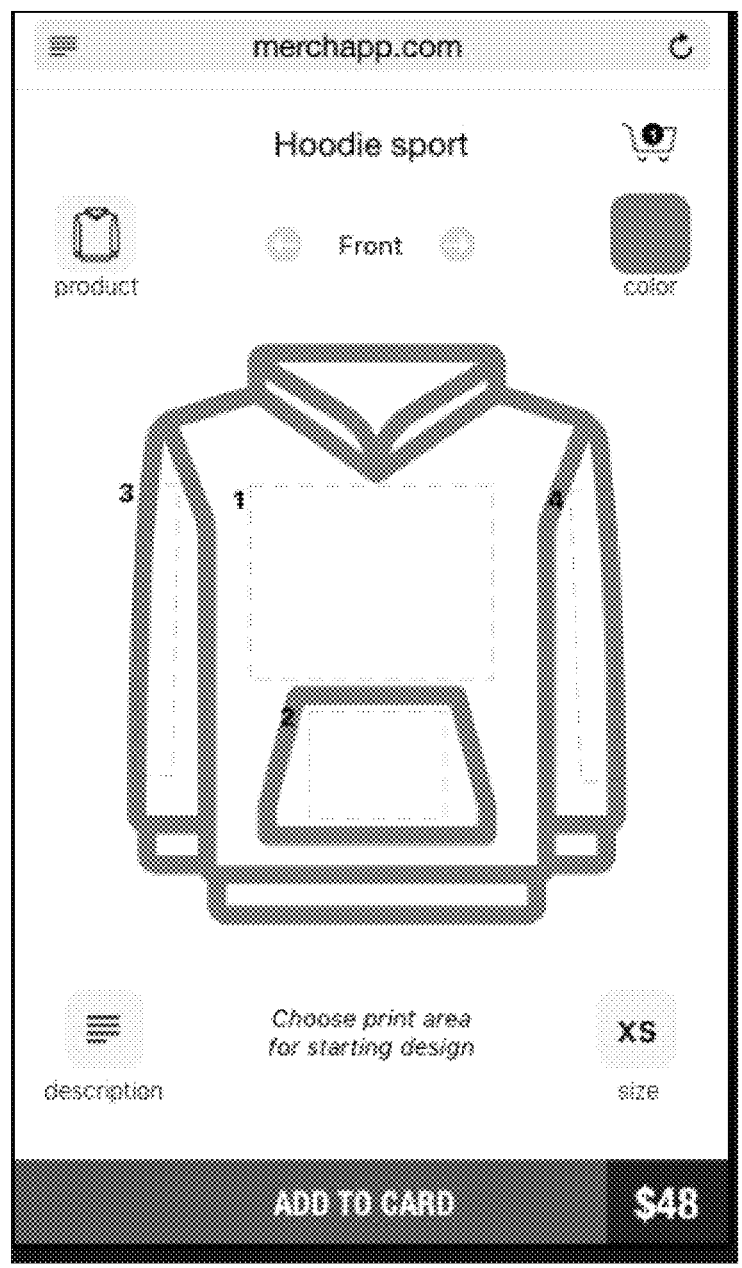
Figure 3P:

Referring to FIG. 3O, the example customization user interface of FIG. 3B is reproduced for convenience. In response to the user selecting the item color control, the example color selection user interface of FIG. 3P may be displayed. A palette of colors is displayed from which the user may select. In response to the user selecting a color from the color palette, the user interface changes the color of the item (e.g., all of the item or a representative portion of the item, such as the edges or outline of the item). When the user selects a done control, the user settings are saved in memory. Optionally, a user interface is provided via which the user can specify the color of individual elements of the item (for each sleeve, the product body, hood, muff, zipper, cord, etc.) as permitted by the item provider.

Figure 3Q:
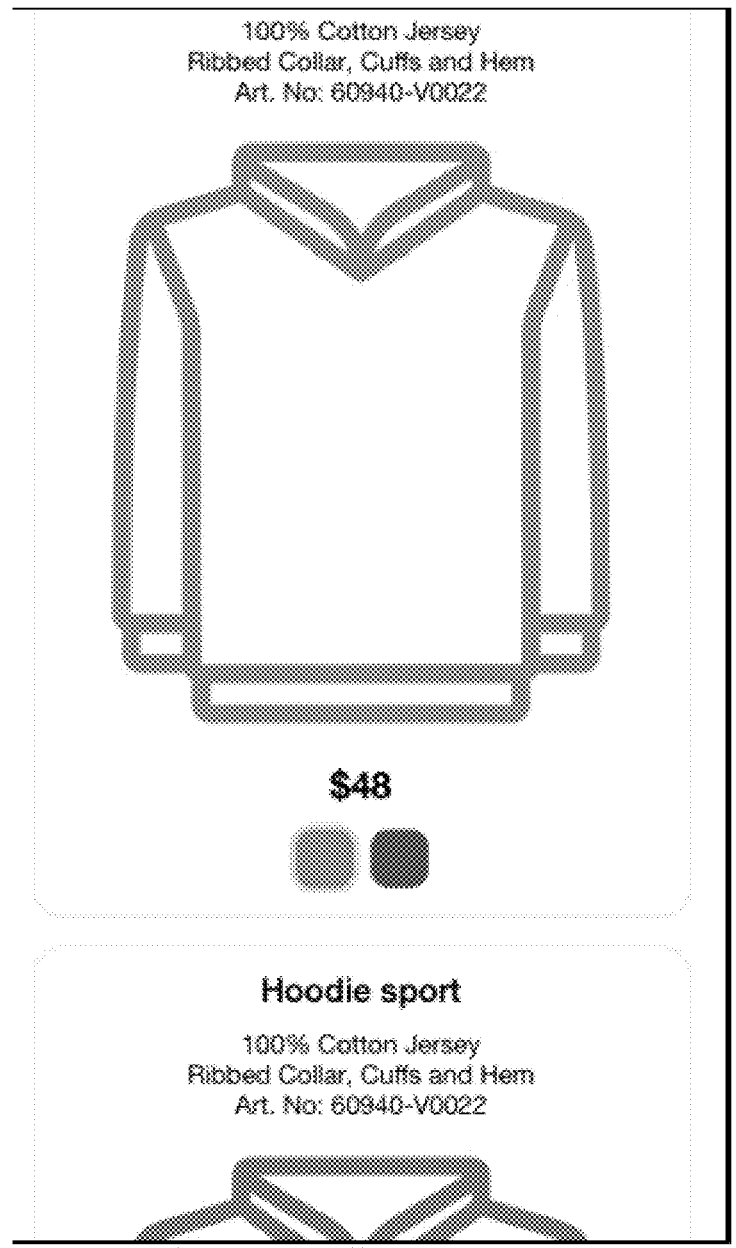

In response to the user selecting the product control illustrated in FIG. 3B, the example product menu illustrated in FIG. 3Q is displayed. A rotatable menu of products is provided via which the user can select a desired product (although other menu formats may be used). The product menu may be restricted to the products previously specified by the currently selected item provider. The user selected product will then be displayed via the example product customization user interface of FIG. 3B.

Figure 3R:
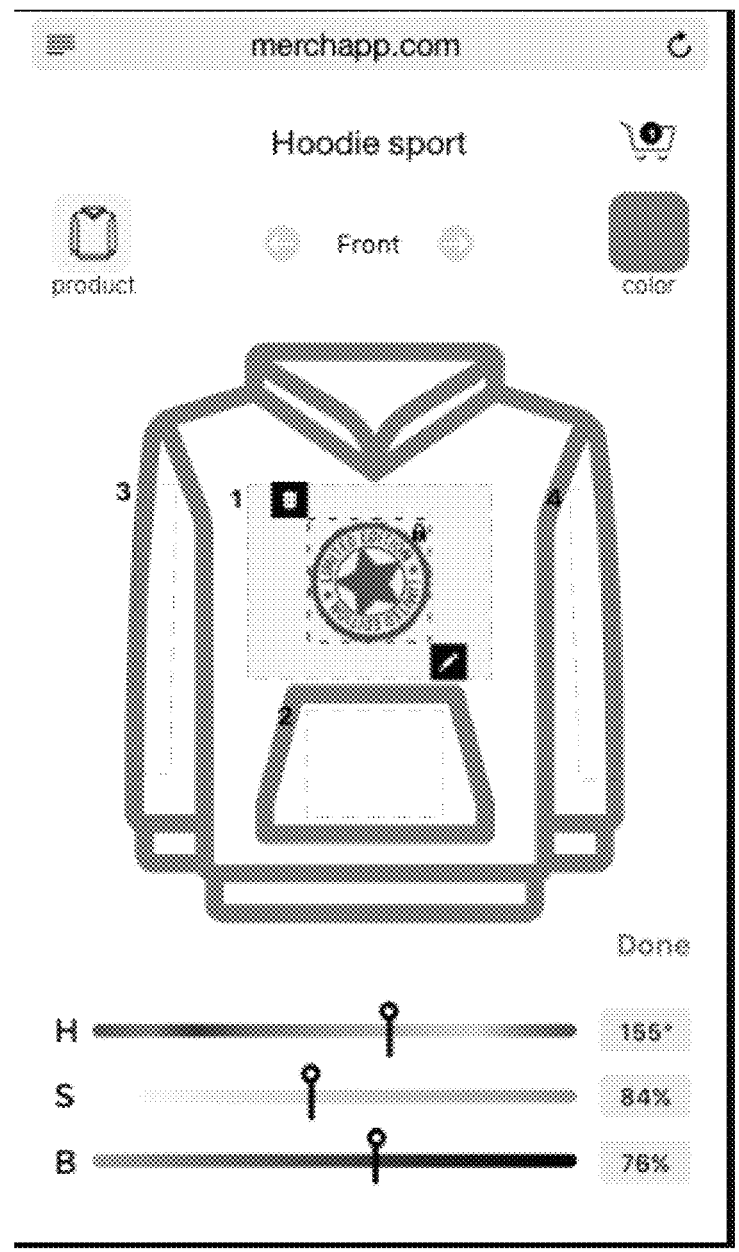

FIG. 3R illustrates an example user interface where the user has added an image to a design area. However, in this example, the item provider has specified that the position, size, and orientation are not to be altered. In response to the item provider specification, the image is accordingly locked, and the resize, drag, and rotate controls are disabled and optionally not displayed, or are displayed "greyed out" (or otherwise) to indicate that the controls are not accessible.

Optionally, a user interface may be provided via which the user can specify the print type or ink to be used to customize an item from a selection of permitted print types or ink. For example, the user interface may enable the user to specify whether standard ink, glow-in-the dark ink, and/or embroidery are to be used to customize a given item.

Optionally, controls are provided that enable a user to share an image of a user customized item (e.g., a 2D or interactive 3D image) via email, short messaging service (e.g., SMS/MMS) message, a social media posting, or otherwise. Optionally, the image may have a watermark added thereto (e.g., of the item provider, the owner/licensor of a template (or character or phrased in the template) used to customize the item, and/or of the operator of the item customization system) so that a person viewing the shared image will see the watermark. Optionally, a control may be provided via which the user may include an invitation (optionally in association with the image of the customized item) to collaborate on the customization. For example, the invitation may include a link to an interface for customizing the item or a code to access the item customization user interface.

The system may determine the size of a design element (e.g., an image and/or text) added or modified by the user. For example, the size may be determined based on a design element area (e.g., square inches, square centimeters, or other units of measure). The system may calculate a price for the item based at least in part on the current design element size and/or the design element ratio (e.g., width/height or height/width). Optionally, the price may be reflective of, or based at least in part on the expense of the ink or other materials needed to print the design element.

For example, an item price may comprise a base price for an item (e.g., a jacket), an additional minimum price for adding a design element to the item, and a variable additional price based on the size of the design element. Optionally, different design elements may be associated with different prices specified by an item provider. For example, a licensed design element of a cartoon character may be more expensive than a design element that uses a public domain graphic or photograph.

A user interface may be presented to an item provider via which the item provider can insert a pricing formula or arguments for such a formula. For example, a formula may take the form of:

$$P=(K_1(\text{height*width of design element}_1)+BDE_1)+(K_2(\text{height*width of design element}_2)+BDE_2)+ \ldots +(K_n(\text{height*width of design element}_n)+BDE_1)+BSP$$

Figures 1, 3S:
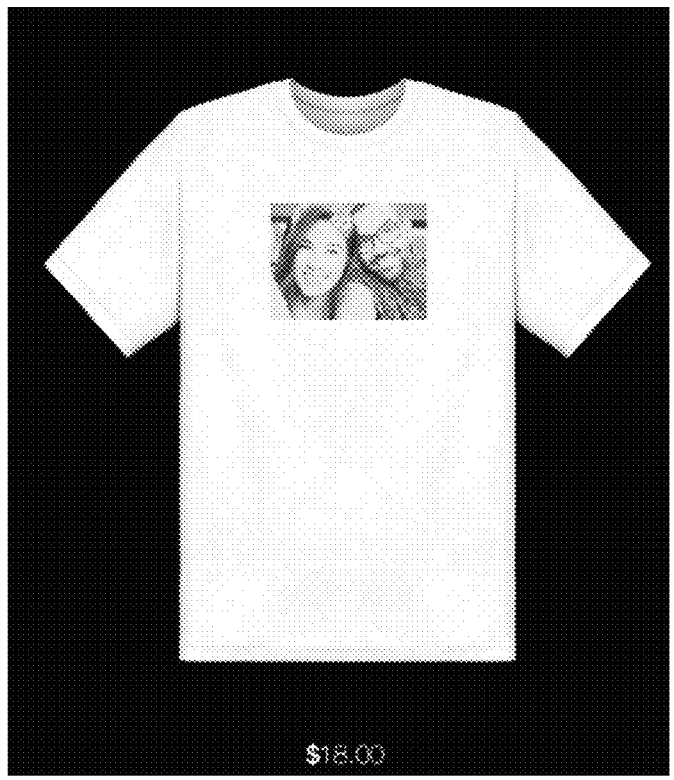
Figures 2, 3S:

Where:
P=the product price
K is a constant for a given design element (where certain design elements (e.g., of licensed celebrity images) or design element printing technologies (e.g., embroidery) may have a higher constant than others, reflecting a higher value design element);
BDE is a base price for the given design element; and
BSP is the base price for the product Optionally, with reference to FIGS. 3S-1, 3S-2, the price may be calculated in real time as the user changes the size of the design element and the price may be updated and displayed to the user in real time for the current design element size. Thus, for example, if the user is dragging a corner of a design element to increase or decrease the design element size, an item price may be continuously calculated and displayed to reflect the change in size. As illustrated in FIG. 3S-1, a first price is calculated and presented for a t-shirt having an applied photograph of a relatively small size. As illustrated in FIG. 3S-2, a second price (higher than the first price) is calculated and presented for the t-shirt having the same photograph, but of a larger size, applied. Other user modifications (e.g., change in product, change in size of product, number of customizations) that may affect the product price may also be calculated and presented in real-time to the user A shopping cart user interface may be displayed in response to a user selected a shopping cart link (e.g., which may be associated with a shopping cart icon), in response to the user activating a checkout control, or otherwise. The shopping cart user interface may include details on items that the user had added to the shopping cart. For example, the shopping cart user interface may provide an image of a given item (e.g., a predefined default image, such a front side of an item), the size(s) being ordered, the item color(s), the quantity, the item unit cost, the total cost for the number of items being ordered. Optionally, the item image may display user customization (e.g., design elements specified by the user). Optionally, an image of each side (or of a subset of sides) of the item may be displayed with respective user customizations. Optionally, user information is displayed. The user information may be accessed from a user database that stores information previously provided by the user. The user information may include a user name and/or other identifier, user contact information (e.g., email address, short message service address, phone number, etc.), and a shipping address.

If a given item customized with an image and/or text template associated with a template expiration date/time is in the shopping cart, optionally, a countdown timer may be provided for display that indicates how long the user has to order the customized item before it may no longer be ordered. Optionally, a communication (e.g., an email, text message, or other message type) may be transmitted by the system to a corresponding user destination informing the user of an upcoming expiration or non-usage date/time (e.g., a specified time period before the upcoming expiration date/time).

The shopping cart user interface may also include a menu of item providers (e.g., a menu of shops) the user can select from. In response to a user selection, a corresponding item provider electronic store front may be accessed and provided for display to the user.

Figures 1, 3T:
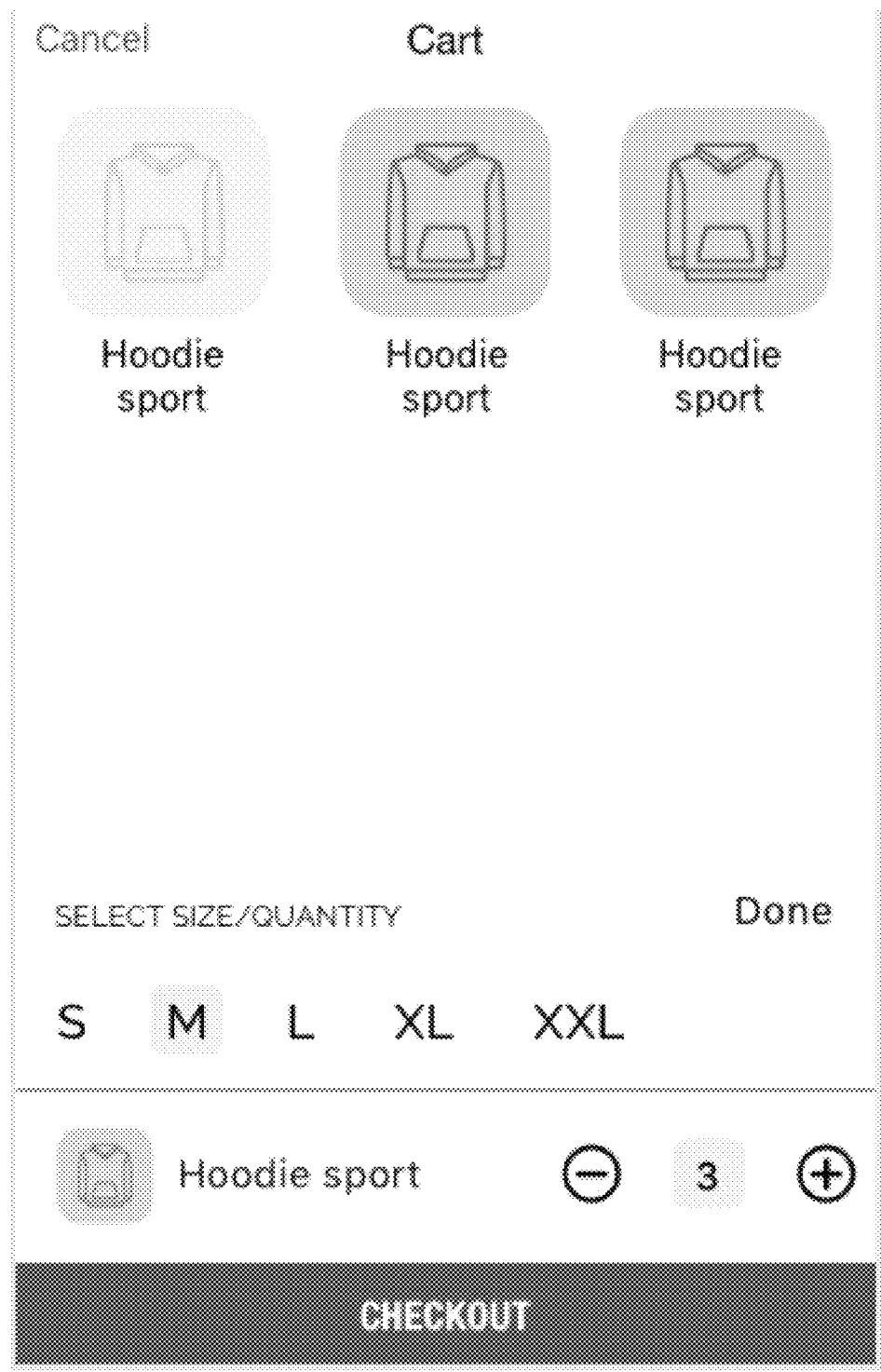
Figures 2, 3T:
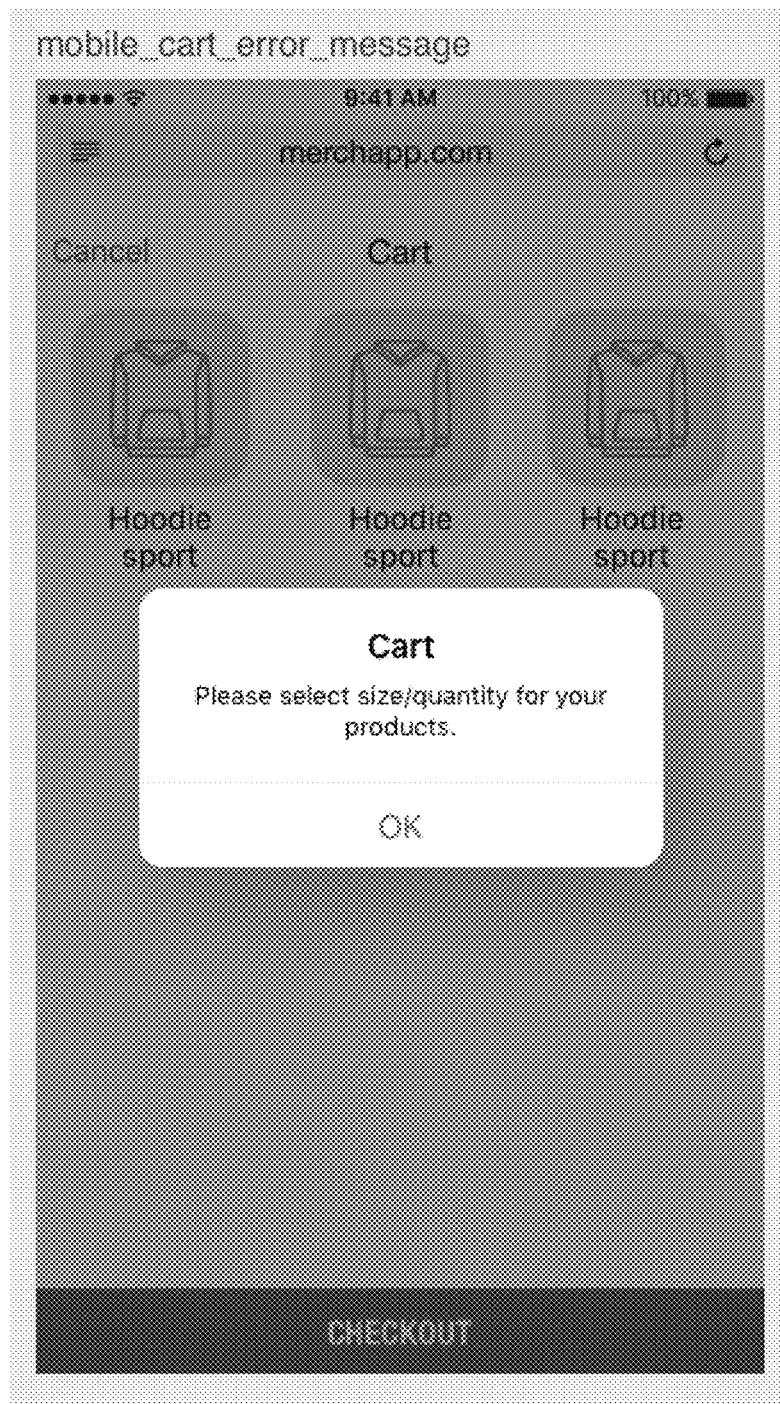
Figures 1, 3U:
Figures 2, 3U:

FIG. 3T-1 illustrates an example shopping cart user interface. In the illustrated example, the shopping cart user interface shows the contents of the shopping cart (including images of the items in the shopping cart), and optionally enables the user to select one or more items at a time in the shopping cart and change the size and/or quantity of the selected item(s). If it is detected that the user has not selected a quantity or a size of a given item in the user cart, the example error message illustrated in FIG. 3T-2 may optionally be presented.

Figure 3V:
Figure 3W:
Figure 3X:
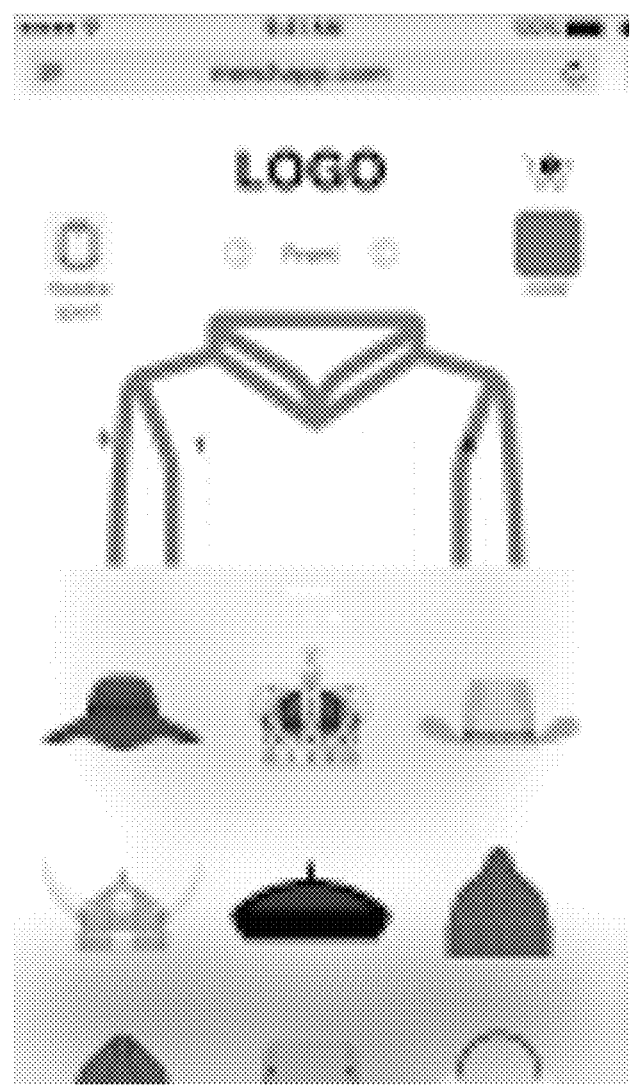

FIGS. 3V-3X illustrates additional example user interfaces that may be used to customize an item. Referring to FIG. 3V, in this example, the user has selected a hoodie sport jacket. In this example, an image corresponding to the front side of the jacket is accessed from memory and displayed as a default side, optionally in an item provider specified default color or a color specified by the user. The image may be a two dimensional or three-dimensional model (where the surface of a depicted item is rendered in three dimensions).

The front side may be the pre-specified default side that is displayed. In addition, a side selection control is provided in the form of back and forward arrows. The user may activate the side selection control to scroll through available side images in a backwards or forwards direction. The corresponding image of the selected side is displayed by the user interface, with any design areas indicated (e.g., with a border and/or a design area identifier). In the illustrated example, the user interface indicates, via respective borders and identifiers, that the jacket has four design areas that had been specified by the item provider (design area 1—chest, design area 2—muff, design area 3—right sleeve, design area 4—left sleeve). A control may be provided via which the user can add the item to the user's shopping cart.

Referring again to FIG. 3V, template, text, and image controls are provided via which the user can initiate the adding of a predefined template, text, or an image to a selected design area. If the user selects the template control, a gallery of templates may be displayed. The user may select a template from the template gallery, which will then be automatically displayed on the previously selected design area. If the user selects the image control, a gallery of images, such as that illustrated in FIG. 3W may be displayed. The user may select an image from the image gallery, which will then be automatically displayed on the previously selected design area.

Optionally, when the user selects the add template, text, or image controls, a corresponding gallery may slide up to cover only a portion of the user interface (e.g., 25% or 50% of the user interface) to enable the user to see both the image of the product being customized and the corresponding gallery. Optionally, a control may be provided that enables the user to cause the gallery to expand to a full screen mode. FIG. 3X illustrates an example user interface, were an image gallery covers about half of the user interface. When the user selects a gallery item, it may be automatically displayed on the selected design area on the image of the product, and the gallery may slide down or otherwise be removed so that the product with the gallery item added to the selected design area may be fully viewed.

Figure 3Y:
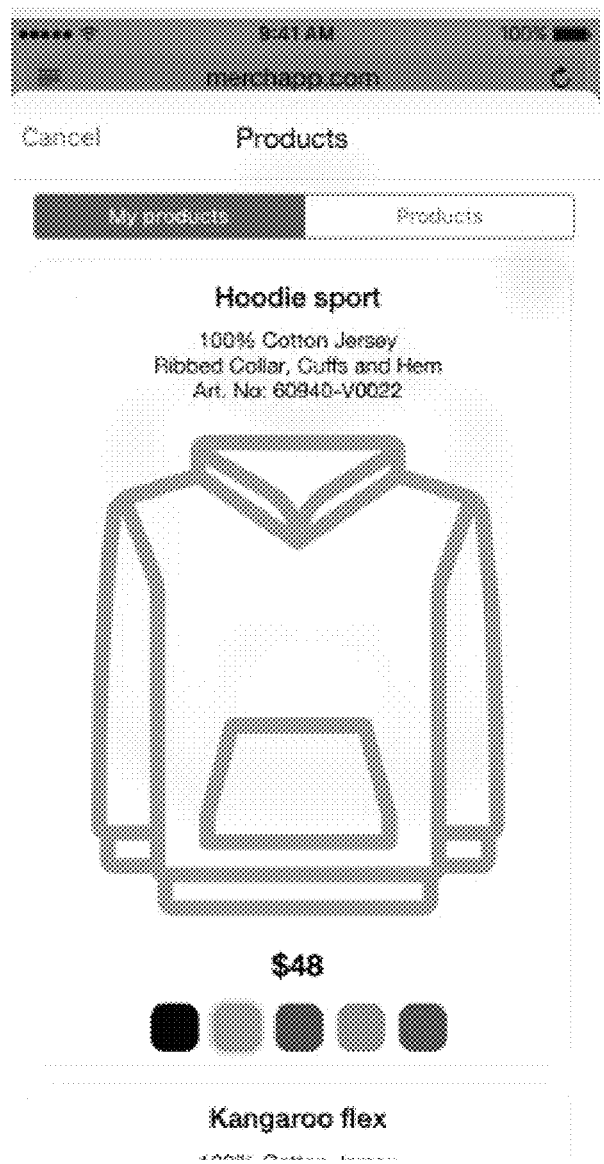

FIG. 3Y illustrates a "My products" user interface which displays one or more of the user customized designs. If the user selects the "Products" control than all available products (or a subset thereof) may be displayed via the user interface.

Certain example item provider online shop setup user interfaces will now be described. A user interface, such as that illustrated in FIG. 4A, may be provided via which a user (e.g., a shop owner) may enter information for setting up an account (e.g., first name, least name, email, address, password, phone number, other contact information, etc.).

Figure 4A:
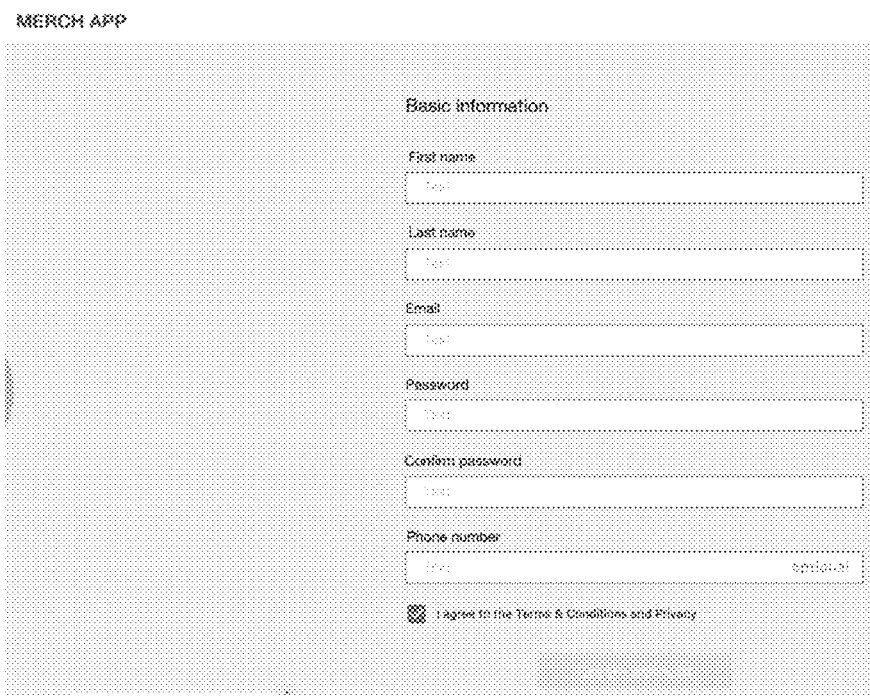
Figure 4B:
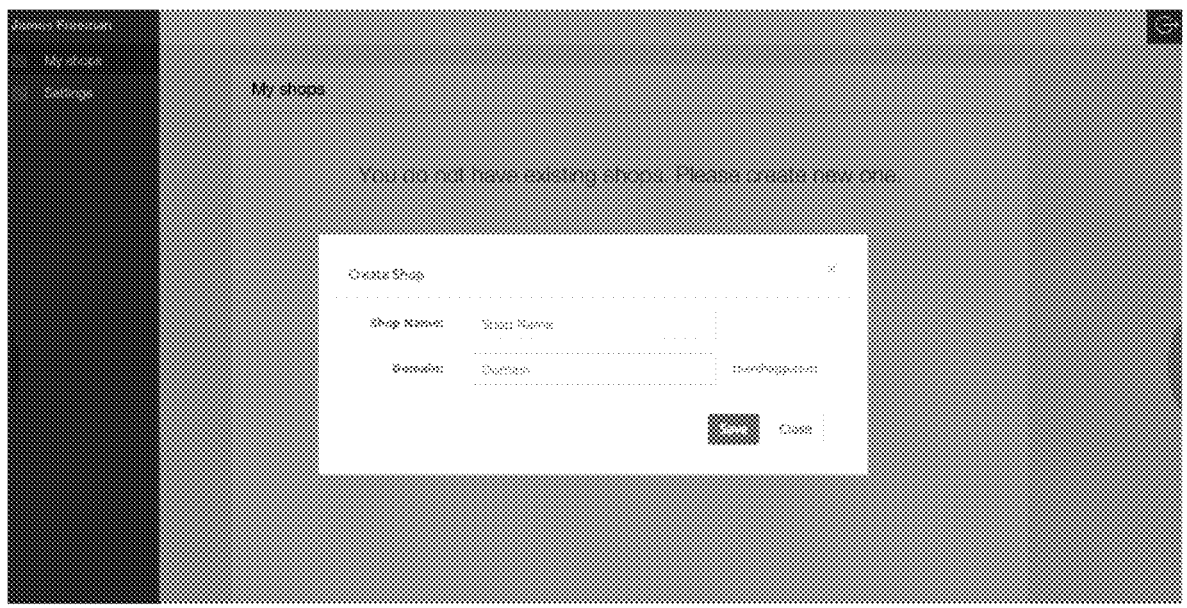

Referring to FIG. 4B, a create shop user interface is provided that includes a field configured to receive a shop name and a domain for the shop. Optionally, in response to the user activating a save control, the system will check to see if either the shop name or domain has already been assigned to another user, and it the shop name or domain has already been assign, a corresponding notification is generated and the user is notified to select an alternative name and/or domain.

Figure 4C:
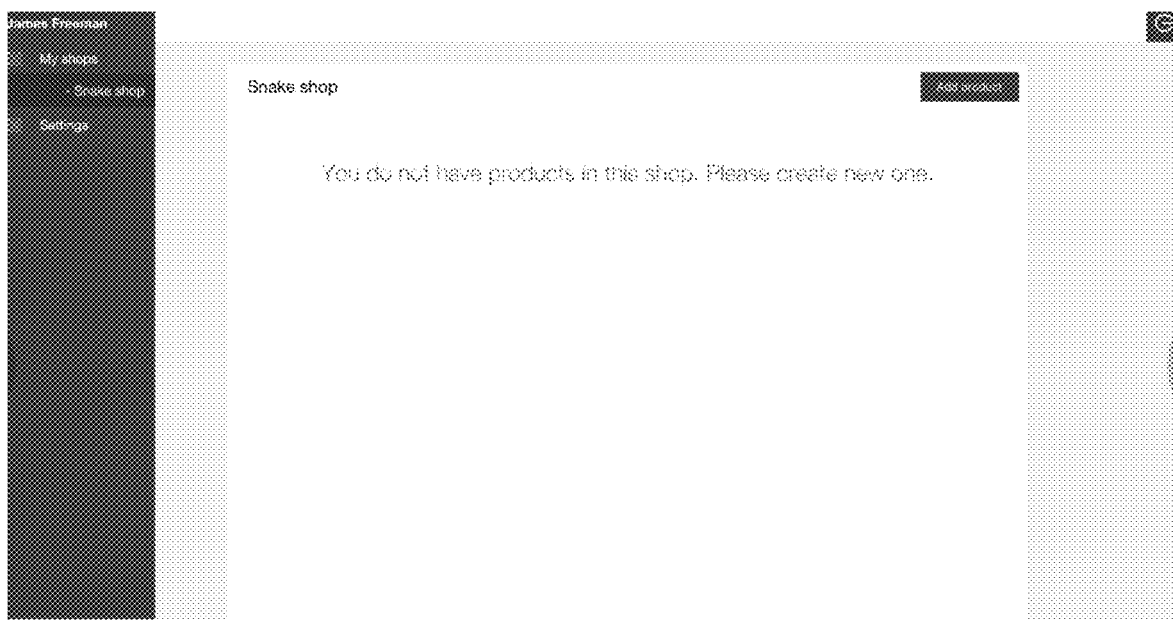

In response to the user successfully entering a shop name and domain, the example user interface illustrated in FIG. 4C is presented prompting the user to add items to the user's shop. An item/product may be specified using the other interfaces described herein.

Figure 4D:
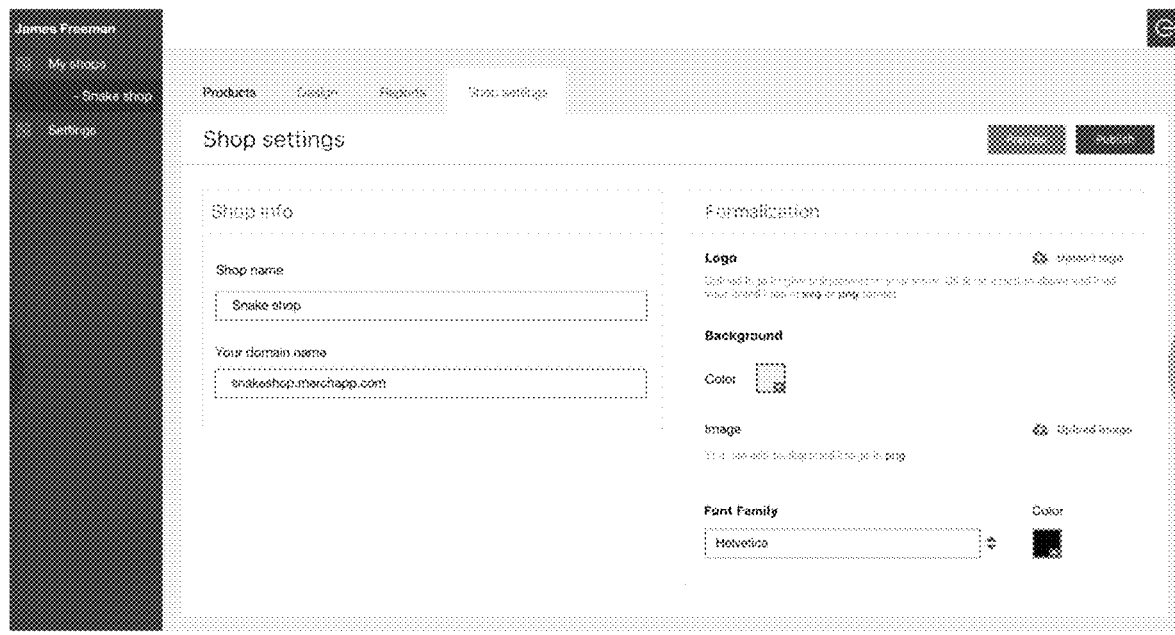

Referring to FIG. 4D, a shop settings user interface may be provided that may include some or all of the following fields: shop name, shop domain name (where the top level domain may be optionally associated with the system operator), shop logo (wherein a user may upload a logo or provide a link to the logo, and background image (in the form of a PNG, SVG, GIF, or other image file, which may be uploaded or linked to by the user). Different background colors or images may be assigned for different products or for different colored products. For example, a black background color may be assigned to white colored products to enhance contrast and to thereby enhance visibility of the product image. In addition, a control may optionally be provided via which a user can specify a background color to be used for the shop user interface(s). Controls may be provided via which the user can instruct the system to replace or remove a previously selected log, color, or background image. A font menu may be provided via which a user can specify which font is to be used for the shop, and a color control may be provided via which the user can specify a font color. A review control is provided which when activated, causes the system to generate a preview of the shop user interface in accordance with the user setup instructions. When a user is satisfied with the preview, the user may activate a publish control, which will cause the shop to be made accessible (e.g., over the Internet via a browser and/or via a dedicated item customization application) and will cause the setup instructions to be stored in association with a shop account.

One or more of the systems described herein may be configured to generate order reports for a plurality of item providers (e.g., online shops). For example, with reference to FIG. 4E, an ordering system may access order information from an order database and generate the illustrated report. The report may be limited, via one or more filters, to a specified time period, to one or more shops, to one or more users/customers, to one or more user/customer contacts or shipping addresses, to one or more products (e.g., the n most popular products), to one or more product-types (e.g., the n most popular product-types), to one or more templates (e.g., the n most popular templates), to one or more colors (e.g., the n most popular colors), to one or more fonts (e.g., the n most popular fonts), to one or more edit-types (e.g., the n most popular edit-types), and/or to sales above or below a specified threshold amount. In the illustrated electronic report, the system accesses shop owner data, purchase date/time data, customer name, customer email, and purchase amount and populates respective report columns in a report table, where each row may correspond to a different item provider (e.g., a different online shop). Sorting controls may be provided for one or more columns which enable a user to specify whether the report rows are to be sorted in an ascending or descending order based on the data in the column associated with the selected sort control. For example, a sorting menu may be provided via which the user can cause the report to be sorted according to relative popularity of templates (e.g., image and/or text templates), relative popularity of fonts, relative popularity of color, relative popularity of edits, relative popularity of product, relative popularity of product-type, etc.

As similarly discussed elsewhere herein, optionally, one or more of the systems and processes described herein may be configured to enable a user (e.g., a product provider, an intellectual property licensor, someone acting on behalf of the product provider or licensor, etc.) to specify a palette of colors (e.g., solid colors, or patterns, such a plaid, stripped, rainbow, etc.), assets, content (e.g., text or graphic content), fonts, and/or special effects, that may be utilized by other users (e.g., end users, licensees, etc.) in customizing a product or in customizing a design element. Certain related example user interfaces will now be described.

The example user interfaces described herein may optionally be optimized and structured for use on a relatively small touch display (e.g., on a phone or tablet with a display of less than 7 inches diagonal), although they may be utilized on larger, non-touch displays as well (e.g., that of a laptop or desktop computer). Thus, for example, various example user interfaces may be selected or manipulated via touch. Because certain example improved user interfaces and their structures are optimized for computing devices with touchscreens, it makes it easier for a user to more accurately provide instructions and content via touch input as compared to conventional user interfaces, thereby reducing user input errors. By contrast, many conventional user interfaces tend to provide too much data and/or controls at the same time, making it difficult for the user to locate and selectively touch a desired item of data or control, particularly when displayed on a relatively small display, such as a phone display.

Further, certain example user interfaces are structured to clearly display more important data utilizing a compact structure of icons, graphics, and text. In addition, the example optional user interface flows makes it easier for a user to provide the desired instructions and content utilizing a small display, and reduces the amount of navigation needed between user interfaces and well as reducing the chance of an erroneous input.

Thus, conventional user interfaces have many deficits relating to the efficient functioning of user devices, requiring a user to navigate and switch through many user interfaces and views to find the desired data and functionality. Further, because of the relatively small displays of certain devices, such as phones, conventionally data and functionality are divided into many layers or views, and conventional interfaces require users to navigate through many layers of interfaces on such a small display to access the desired data or functionality.

By contrast, certain of the disclosed improved interfaces enable a user to more quickly access desired data stored in, and functions of the disclosed applications with fewer navigation steps and switching of user interfaces, and enable a user to provide user inputs with reduced errors. The following example user interfaces may optionally receive user inputs via touch, voice, mouse or touchpad clicks, and/or physical keyboard entry.

Figure 4F:
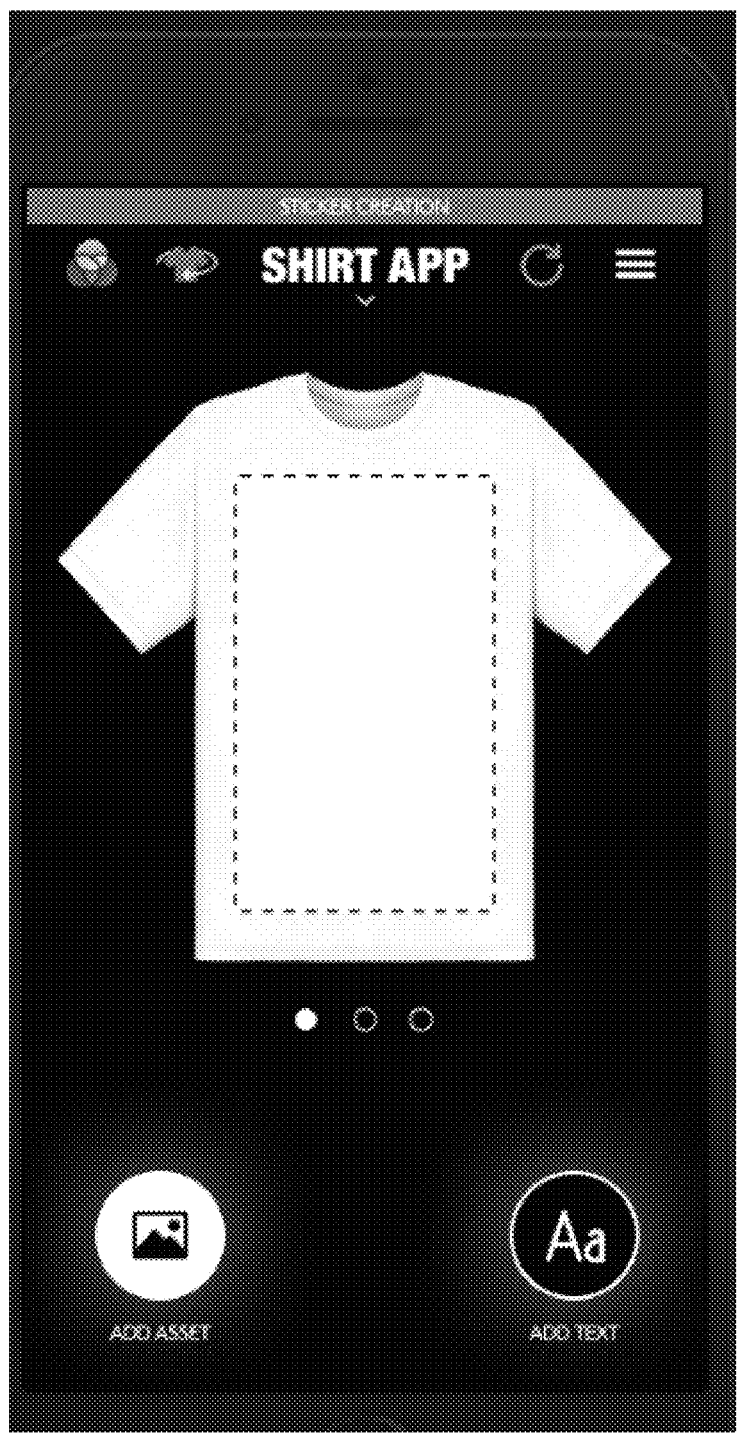

In this example, if the user selects a sticker creation control (e.g., via a menu), the example user interface illustrated in FIG. 4F may be displayed. FIG. 4F illustrates an example sticker creation user interface that enables a user (e.g., a product provider or intellectual property licensor) to define a sticker (e.g., a single design element, such as a single graphic/image (e.g., of one or more characters), a logo, a brand name, etc.). The example user interface includes an indication that the user is engaged in a sticker creation process (e.g., via the label "Sticker Creation"). An image of a product for which the sticker is being created is provided (a t-shirt in this example). The image may have been uploaded by the user or selected by the user from a library of product images. The image may be a default image specified by the app. A design area, onto which a sticker may be added, is emphasized on the product image (outlined using dashed lines in the illustrated example). At the top of the user interface, controls in the form of icons are provided, including a color icon, a product rotation icon (that enables a user to rotate the view of the product), a refresh icon (which clears previous user edits), and a menu icon.

An add asset control and an add text control are provided. The add asset control enables the user to add an image content asset (e.g., a graphic, photograph, etc.) to the image of the product. The add text control enables the user to add text to the image of the product.

Figure 4G:
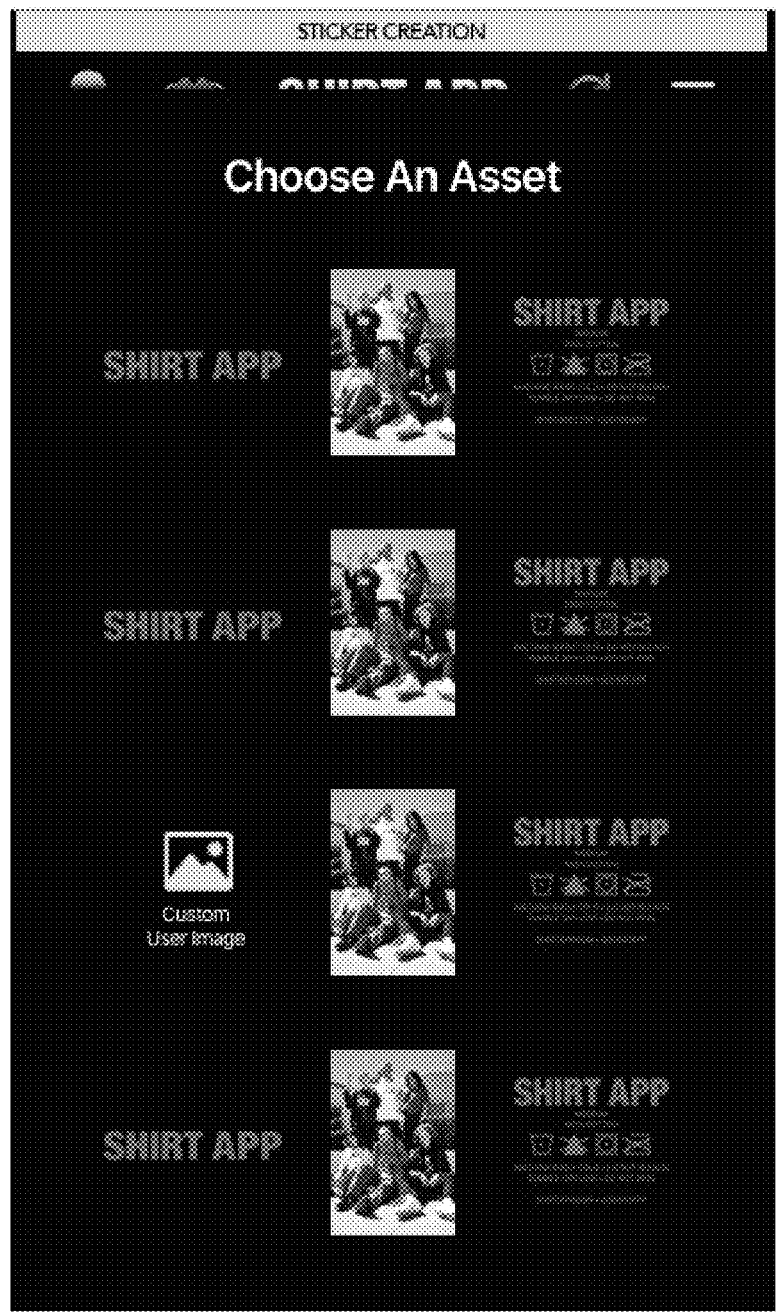

FIG. 4G illustrates an example user interface listing a library of assets (e.g., images, graphics, text, etc.) from which the user may select to add the selected asset to an asset palette. The assets may include those previously provided by the user or related entity, and/or may include a generic set of assets made available to users generally. In addition, the user made enable an end user to provide the end user's own asset, to be used in customizing the product, where the user selects and adds the "custom user image" icon to the asset palette field.

Figure 4H:

In response to the user selecting an asset, the example user interface illustrated in FIG. 4H is presented. The user interface displays the selected asset in the design area (identified via a design area border) on the image of the product, optionally surrounded by an asset border. A "–" delete control is provided (e.g., on the asset border, proximate to or on a border corner) via which the user can delete the asset from the image by focusing on the delete control (e.g., touching or clicking on the delete control or providing a delete voice command). The user interface enables the user to change the size and/or height/width ratio of the asset, rotate the asset, and/or move the asset by dragging (e.g., using a finger or other pointer) a side or corner of the asset and/or asset border. Lock controls are provided via which the user can lock (or unlock) various properties of the asset as displayed on the product image, such as resizing of the asset, rotating the asset, and adding layers (e.g., other graphics, text, etc.) over the asset. A save control is provided which the user can select to save the sticker as positioned and edited by the user. A paint can color "palette" icon is presented via which the user can control sticker colors, as discussed below.

Figure 4I:

If the user selects the paint can color palette icon, the example user interface illustrated in FIG. 4I is displayed. The user can activate a "default color" control, select a default color for the sticker from a scrollable menu of colors (displayed as a row in this example), and activate a default control to set the selected color as the default color. A "color" rectangle (positioned to the side of "set as a default control" in this example) is provided colored with the original color of the selected asset (a color that had been uploaded with the asset). For example, the asset may be uploaded (e.g., as a png file) as a transparent graphic with an associated color(s) (e.g., solid colors, or patterns, such a plaid, stripped, rainbow, etc.). The color rectangle may be displayed with a backslash and the notation "original" color to indicate that the asset is being displayed in the original color.

Figure 4J:

If the user selects a color from the color menu, as illustrated in FIG. 4J, the color of the asset is changed to the selected color, the "color" rectangle (previously displayed with a backslash and the notation "original" color) is colored to correspond to the selected color, and the corresponding color code (e.g., FFDC03) is determined and displayed. If the user selects the "set as default" control, the example user interface illustrated in FIG. 4K is displayed, with the default color added to a color palette field towards the top of the user interface, with a corresponding notation (e.g., "main color (this is the default color for this sticker)").

Figure 4K:

Referring to FIG. 4K, a lock icon is provided via which the user can lock (e.g., by touching or clicking on an open lock symbol) the default color so that an end user (e.g., looking to customize the product or sticker) can only change the asset color using the color(s) specified in the color palette field (the default color in this example), rather than from the color menu as a whole. The user can unlock (e.g., by touching or clicking on a closed lock symbol) the default color so that an end user can change the asset color.

Figure 4L:
Figure 4M:

With reference to FIG. 4L, if the user selects the color palette control and the circle-backslash symbol, the color/pattern that had been uploaded with the asset will be selected, and the color rectangle will be displayed with a corresponding indication (e.g., a backslash symbol and the corresponding color code). If the user activates the "add to palette" control, the uploaded color will be added to the color palette from which end users may select, as illustrated in FIG. 4M (adjacent to the notation "user can only use these colors for the sticker").

Figure 4N:
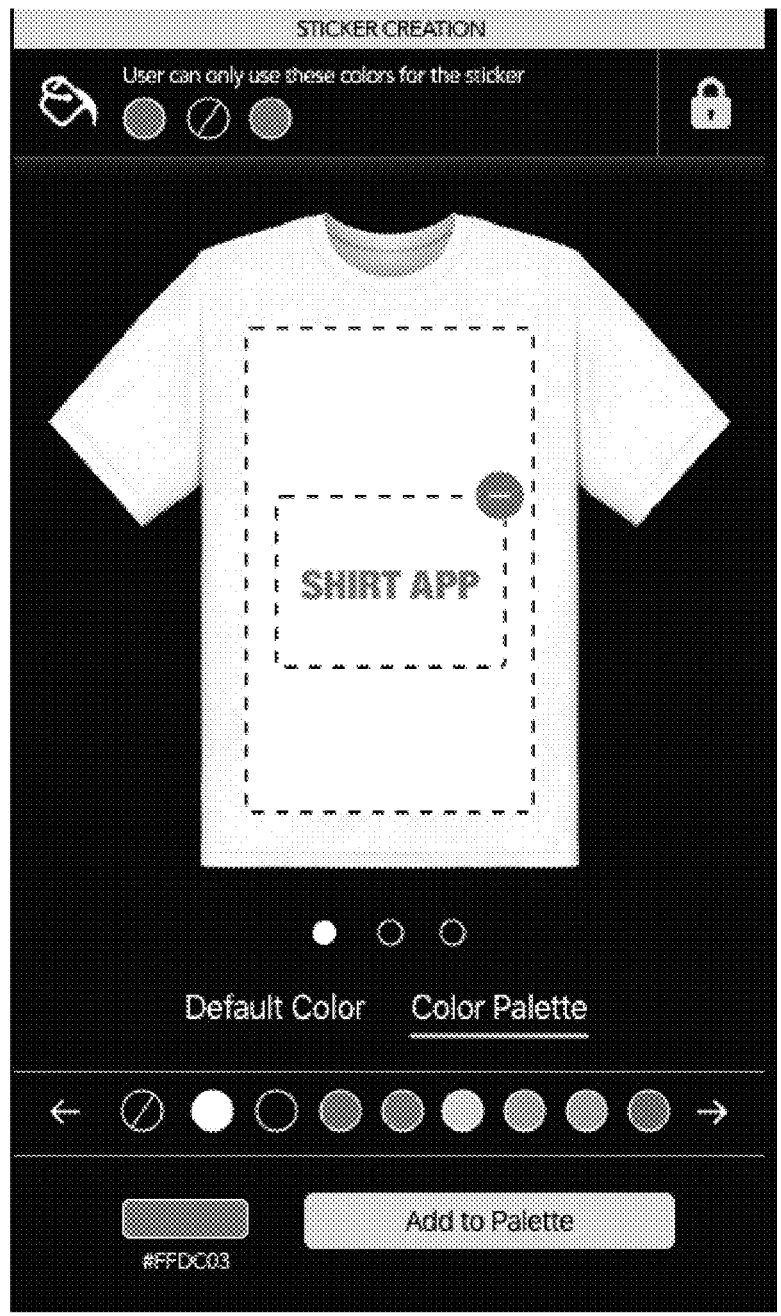

The user can select still other colors and add them to the color palette by activating the add to palette command, as illustrated in FIG. 4N. The selected colors will be displayed in the color palette field. Optionally, the default color will emphasized relative to the other colors in the color palette field. For example, the default color may be displayed first in the color palette field to indicate that it is the default color. When the user selects a color to add to the color palette, the color of the asset (as displayed in the "add to palette" user interface) is changed to the selected color.

Figure 4O:

If the user unlocks the palette (e.g., by selecting the lock icon) as illustrated in FIG. 4O, then optionally the selected palette may be presented to end users as recommended colors and/or the colors in the palette may be presented in a prominent position (e.g., first), but the user can select other colors (including other patterns) to utilize in customizing the asset. Optionally instead, a color menu is provided from which the end user may select (which may optionally include the same colors as the color menu viewed by the user when defining the color palette), and colors included in an unlocked palette are not provided in a more prominent position (but are included in the color menu at their typical position).

Figure 4P:
Figure 4Q:

If the user clicks outside of the asset border in the user interface (or other designated location) illustrated in FIG. 4O, the example user interface illustrated in FIG. 4P is presented. The illustrated user interface provides separate lock controls for resizing, rotating, and layers. Thus, for example, a user can selectively lock or unlock resizing, rotating, and/or adding layers to the asset. On or adjacent to the paint can symbol, a number indicating the number of colors (e.g., solid colors, patterns, etc.) in the palette is presented. The user can activate a save sticker command to save the sticker, modifications thereto, the defined palettes, and the various specified permissions. Once the user activates the save sticker control, the example user interface illustrated in FIG. 4Q is presented, indicating what modifications an end user may or may not make. The user can activate the done control to save the various lock and unlock instructions.

Figure 4R:
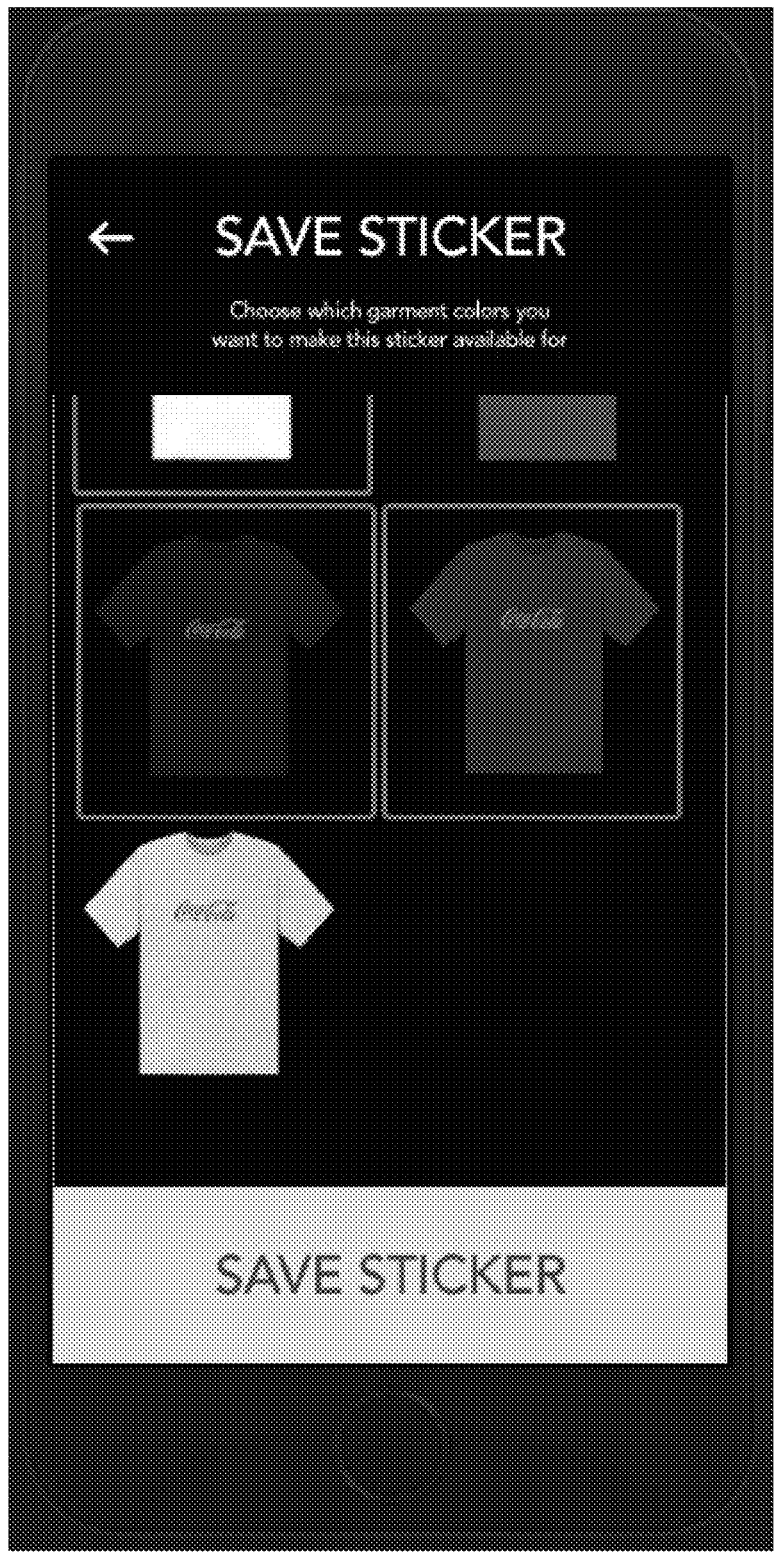

With reference to FIG. 4R, the product and the sticker (optionally in the default color) are displayed on multiple images of the product, where the product is in a different color in each image. The user can select one or more the different colored versions of the product to indicate on what product colors the sticker is to be made available for to end users. Optionally, the user interface may include images of different products (e.g., t-shirt, hoodie, backpack), with each product displayed in multiple colors. The user interface thus enables the user to specify, by selecting images, both what products and what product colors the sticker to be made available for. The user can select the "save sticker" control to save the selections. A saved confirmation indication may be provided in response to the user selecting the save sticker control.

Figure 4S:
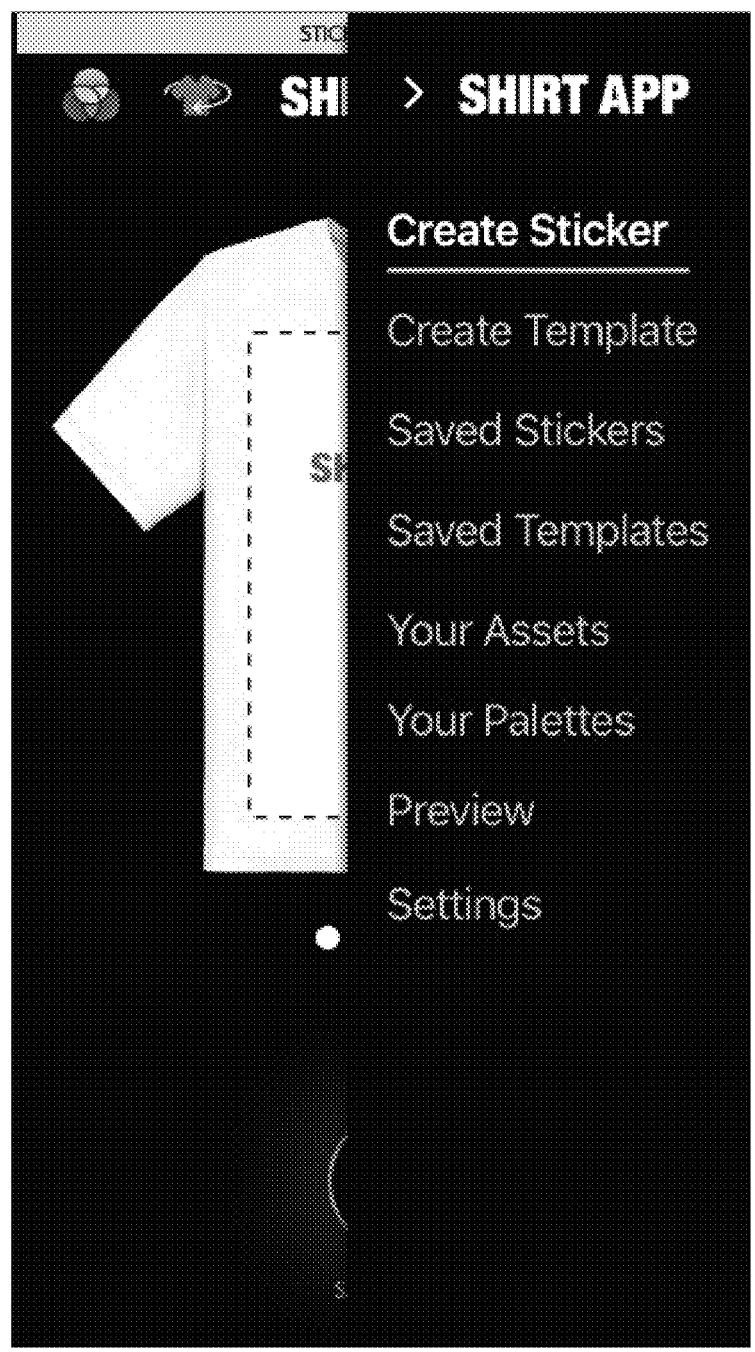

FIG. 4S illustrates the user interface presented in response to a user selection of the menu icon. The menu includes controls for initiating the creation of a sticker, initiating the creation of a template (which may include multiple assets), accessing saved stickers, accessing saved templates, accessing assets uploaded or otherwise provided by the user, accessing palettes (e.g., color, content, assets, fonts, effects, etc.) defined by the user, previewing a product (including a saved sticker or template), and accessing settings.

Certain example template user interfaces will not be described, where a template may include several separate design elements (e.g., an image, text, a background, etc.). It is understood that certain user interfaces provided for defining templates may be similarly utilized for defining stickers (e.g., those related to text fonts and effects, colors, etc.).

Figure 4T:
Figure 4U:
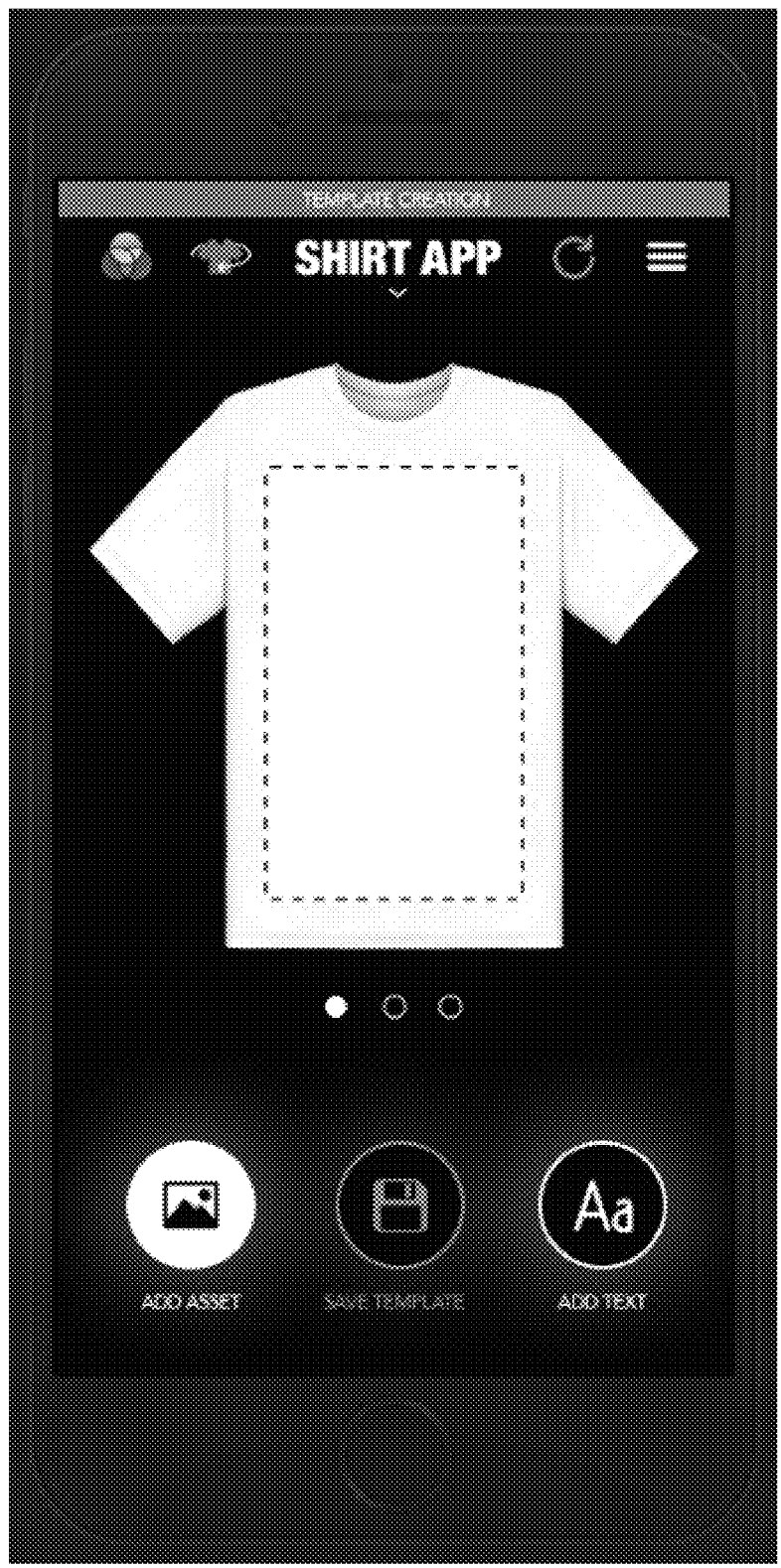

If the user selects a create template control (e.g., via the menu described above), the example user interface illustrated in FIG. 4T is presented, displaying the product image and a "create template" indicator so that the user is formed of the process the user is engaged in. If the user clicks within the design area border (or other designated location), then the example user interface illustrated in FIG. 4U is displayed. A label (e.g., "template creation") is provided indicating the user is engaging in a template creation process (as opposed to a sticker creation process). Controls are provided via which the user can add an asset, add text, or save a user edited or created template. The save template control may be rendered as inactive (e.g., using a greyed out/faded coloring) to indicate that there is no template to save yet. In addition, as similarly discussed above with respect to the sticker creation user interfaces, color, product rotation, refresh, and menu icons are presented, which when selected cause corresponding acts to take place. As will be discussed in greater detail, the add asset control enables the user to add a content asset (e.g., a graphic, photograph, animation, etc.) to the template. The add text control enables the user to add text to the template. A design area border is optionally provided as similarly discussed above.

Figure 4V:
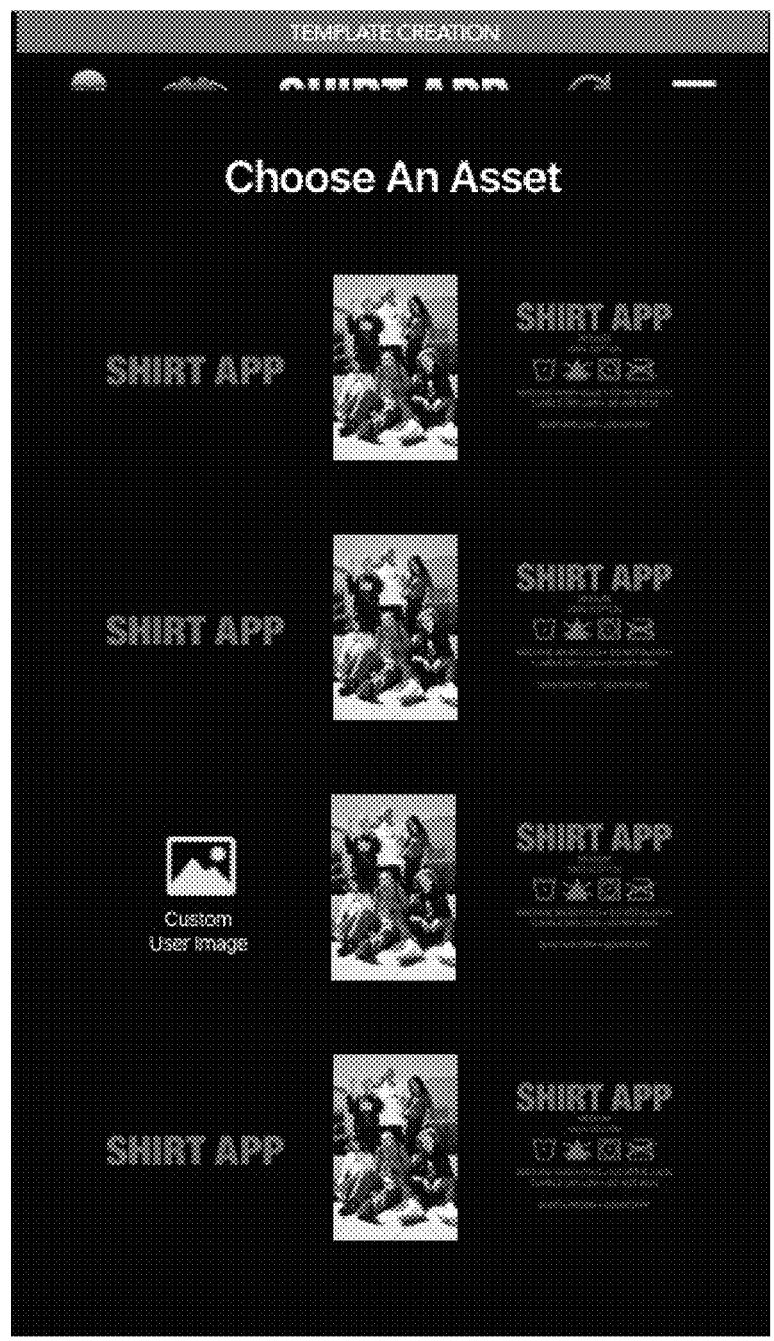

If the user selects the add asset control, then the example user interface illustrated in FIG. 4V is presented, displaying a library of assets (e.g., uploaded or otherwise provided by the user, or from a library of assets available to all users generally). In addition, the user may enable an end user to provide the end user's own asset (e.g., an image or graphic), to be used in customizing the template (and product) where the user selects and adds the "custom user image" icon to the asset palette field.

Figure 4W:

If the user selects an asset, the example user interface illustrated in FIG. 4W may be presented. The selected asset is displayed on an image of the product with a surrounding border, within a design area border. The selected asset may be displayed in the color it was displayed in via the asset library interface. If the user focuses on the asset displayed on the image of the product (e.g., touches the asset, clicks on the asset, points at the asset etc.), the associated palettes for that asset may be displayed (e.g., the palette icons with the corresponding number indicating the number of items in the corresponding palette). Lock controls are provided via which the user can lock (or unlock) resizing of the asset, rotating the asset, adding layers to the asset, or moving the asset, to thereby control how much freedom an end user has with respect to customizing/modifying the asset. The user may move, resize, or change the orientation of the asset by clicking on the asset and/or asset border or corner, and dragging it as desired.

Figure 4X:
Figure 4Y:
Figure 4Z:
Figure 4A:
Figure 4B:
Figure 4C:
Figure 4D:

If the user selects the paint can color palette user icon, the example user interface illustrated in FIG. 4X is displayed. The user interface is similar to that discussed above with respect to sticker definition. The user interface includes a horizontal, scrollable menu of colors from which to choose. The user can activate a "default color" control, select a default color for the sticker from a scrollable menu of colors (displayed as a row in this example), and activate a default control to set the selected color as the default color. A "color" rectangle is provided colored with the original color of the selected asset (a color that had been uploaded with the asset). The color rectangle may be displayed with a backslash and the notation "original" color to indicate that the asset is being displayed in the original color. If the user selects a color from the color menu, as illustrated in FIG. 4Y, the color of the asset is changed to the selected color, the "color" rectangle (previously displayed with a backslash and the notation "original" color) is colored to correspond to the selected color, and the corresponding color code (e.g., FFDC03) is determined and displayed. If the user selects the "set as default" control, the example user interface illustrated in FIG. 4Z is displayed, with the default color added to a color palette field towards the top of the user interface, with the notation of "main color (this is the default color for this sticker)".

A lock icon is provided via which the user can lock (e.g., by touching or clicking on an open lock symbol) the default color so that an end user (e.g., looking to customize the product) can only change the asset color of the template using the color(s) specified in the color palette field (the default color in this example), rather than from the color menu as a whole. The user can unlock (e.g., by touching or clicking on a closed lock symbol) the default color so that an end user can change the asset color.

With reference to FIG. 4AA, if the user selects the color palette control and the circle-backslash symbol, the color/pattern that had been uploaded with the asset will be selected, and the color rectangle will be displayed with a corresponding indication (e.g., a backslash symbol and the corresponding color code). If the user activates the "add to palette" control, the uploaded color will be added to the color palette from which end users may select, as illustrated in FIG. 4BB (adjacent to the notation "user can only use these colors for the sticker").

The user can select still other colors and add them to the color palette by activating the add to palette command, as illustrated in FIG. 4CC. The selected colors will be displayed in the template color palette field. Optionally, the default color will emphasized relative to the other colors in the color palette field. For example, the default color may be displayed first in the color palette field to indicate that it is the default color. When the user selects a color to add to the palette, the color of the asset (as displayed in the "add to palette" user interface) is changed to the selected color.

If the user unlocks the palette (e.g., by selecting the lock icon), then optionally the selected palette may be presented to end users as recommended colors for customizing and/or the colors in the palette may be presented in a prominent position (e.g., first), but the user can select other colors (including other patterns) to utilize in customizing the asset. Optionally instead, a color menu is provided from which the end user may select (which may optionally include the same colors as the color menu viewed by the user when defining the color palette) for customizing the template, and colors included in an unlocked palette are not provided in a more prominent position (but are included in the color menu at their typical position).

If the user clicks outside of the asset border in the user interface illustrated in FIG. 4CC (or at other designated location), the example user interface illustrated in FIG. 4DD is presented. The user interface provides separate lock controls for resizing, rotating, and layers. Thus, for example, a user can selectively lock or unlock resizing, rotating, and/or adding layers to the asset. On or adjacent to the paint can symbol, a number indicating the number of colors (e.g., solid colors, patterns, etc.) in the palette is presented.

In this example, a photo/image icon is displayed towards the top of the user interface. In response to the user activating the photo/image icon, the example user interface illustrated in FIG. 4EE may be displayed, including the previously added asset. If a default asset (e.g., a photograph, image, graphic, etc.) had previously been specified, the corresponding asset may be displayed on the product image and below the product image.

Figure 4E:
Figure 4E:
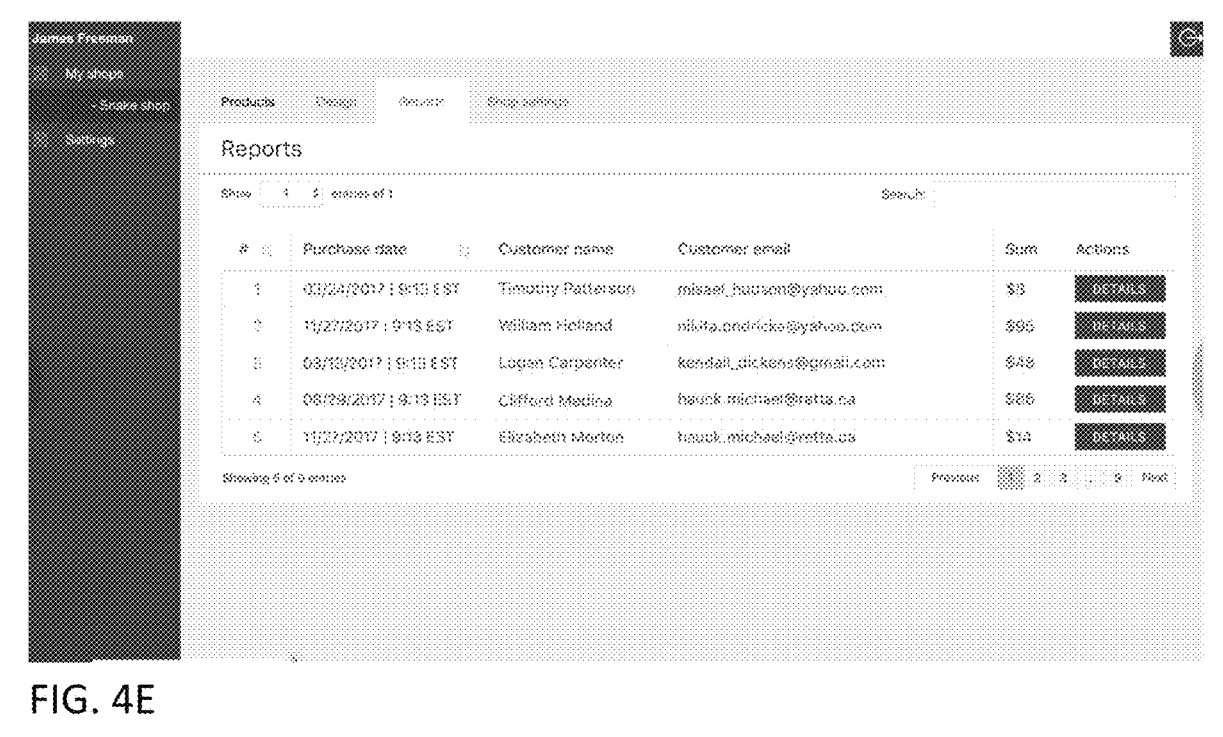
Figure 4F:
Figure 4G:
Figure 4H:
Figure 4I:
Figure 4J:
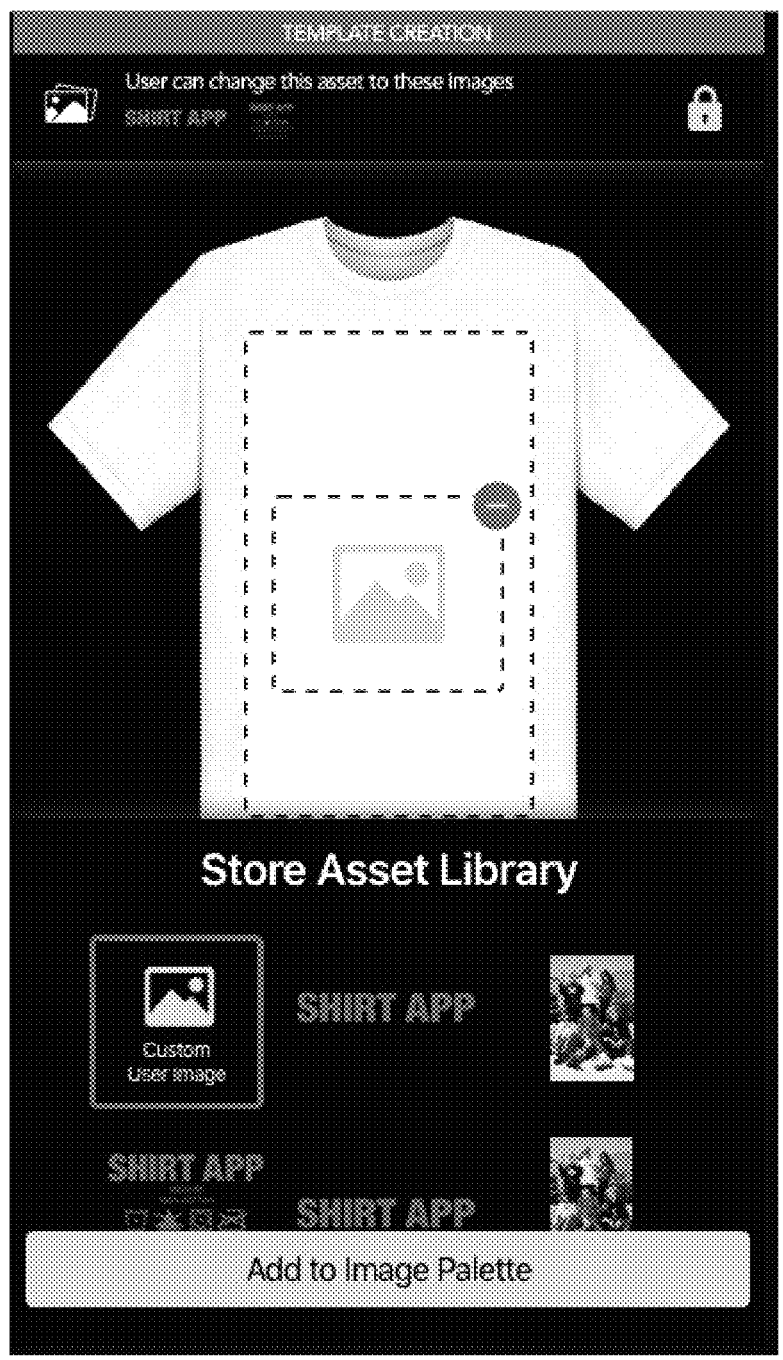
Figure 4K:
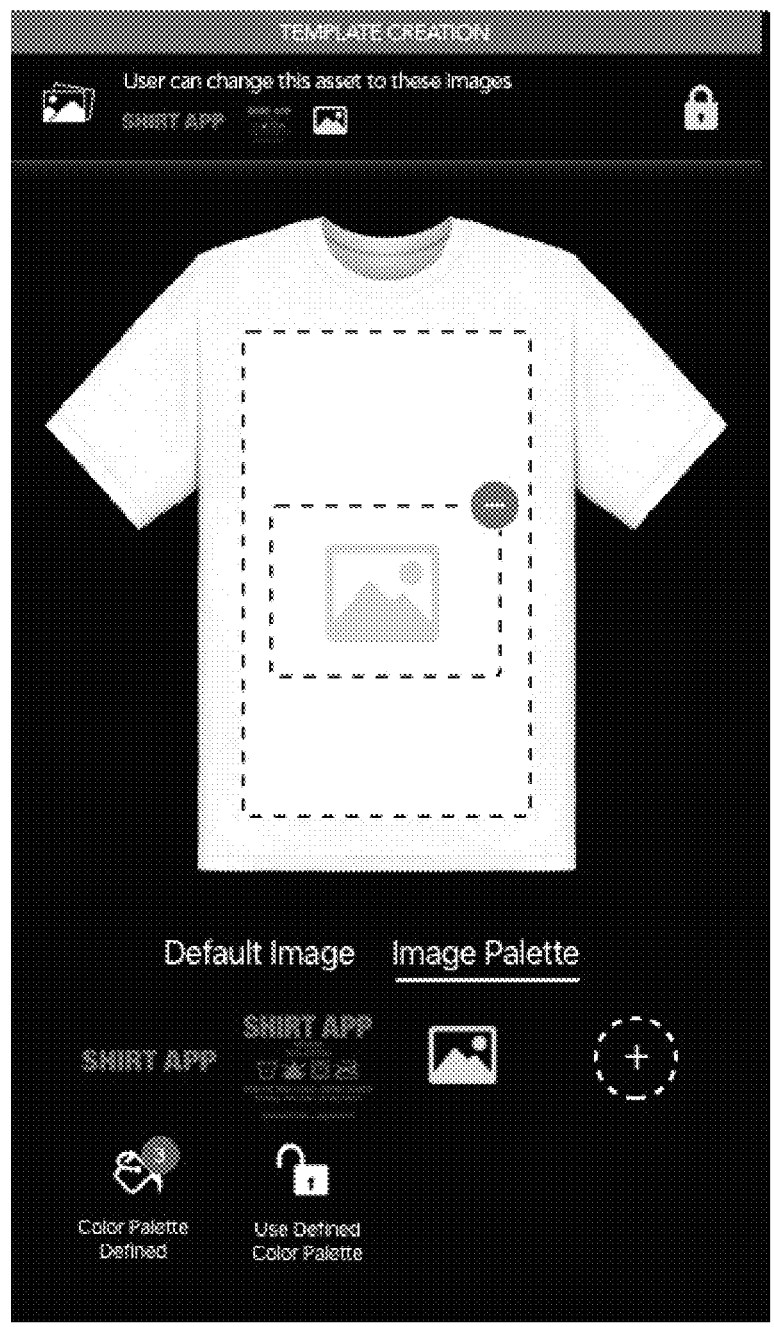
Figure 4L:
Figure 4M:
Figure 4N:
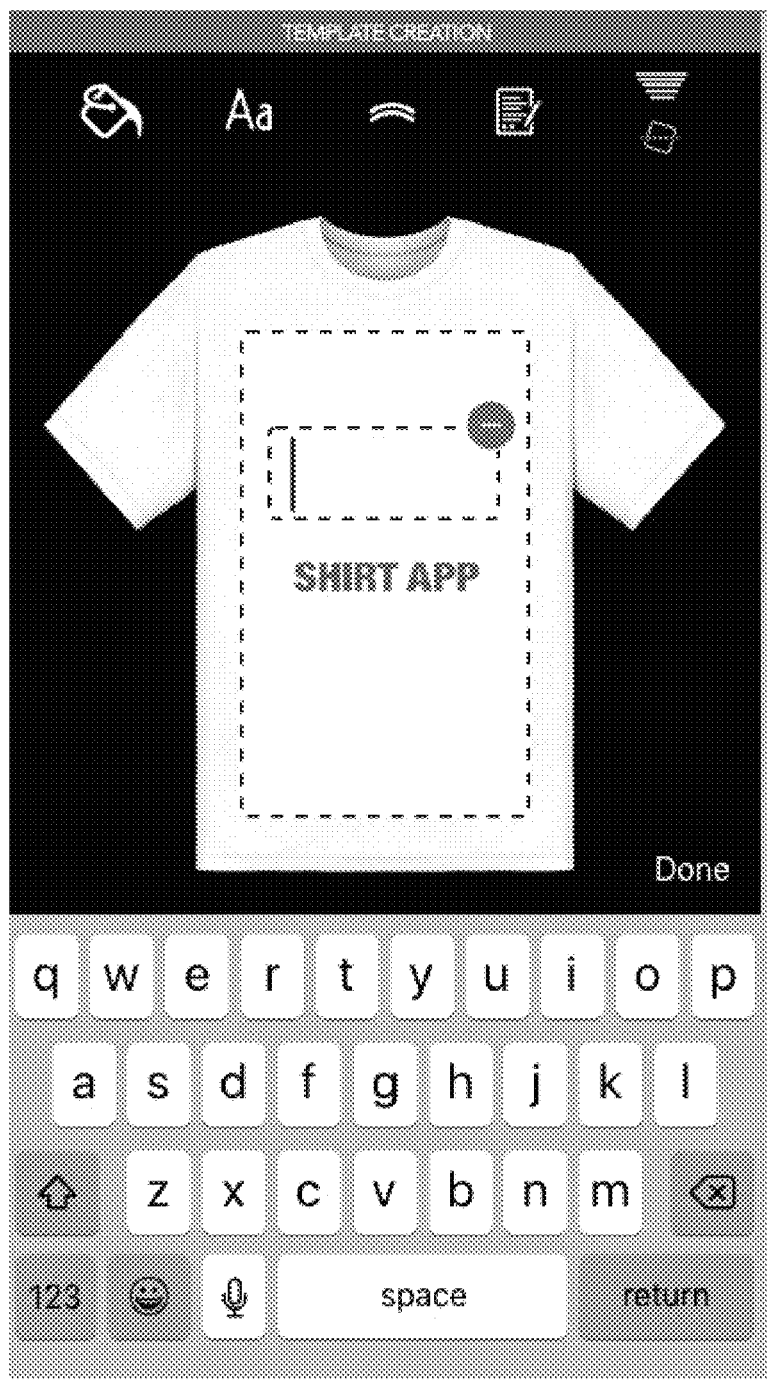
Figure 400:
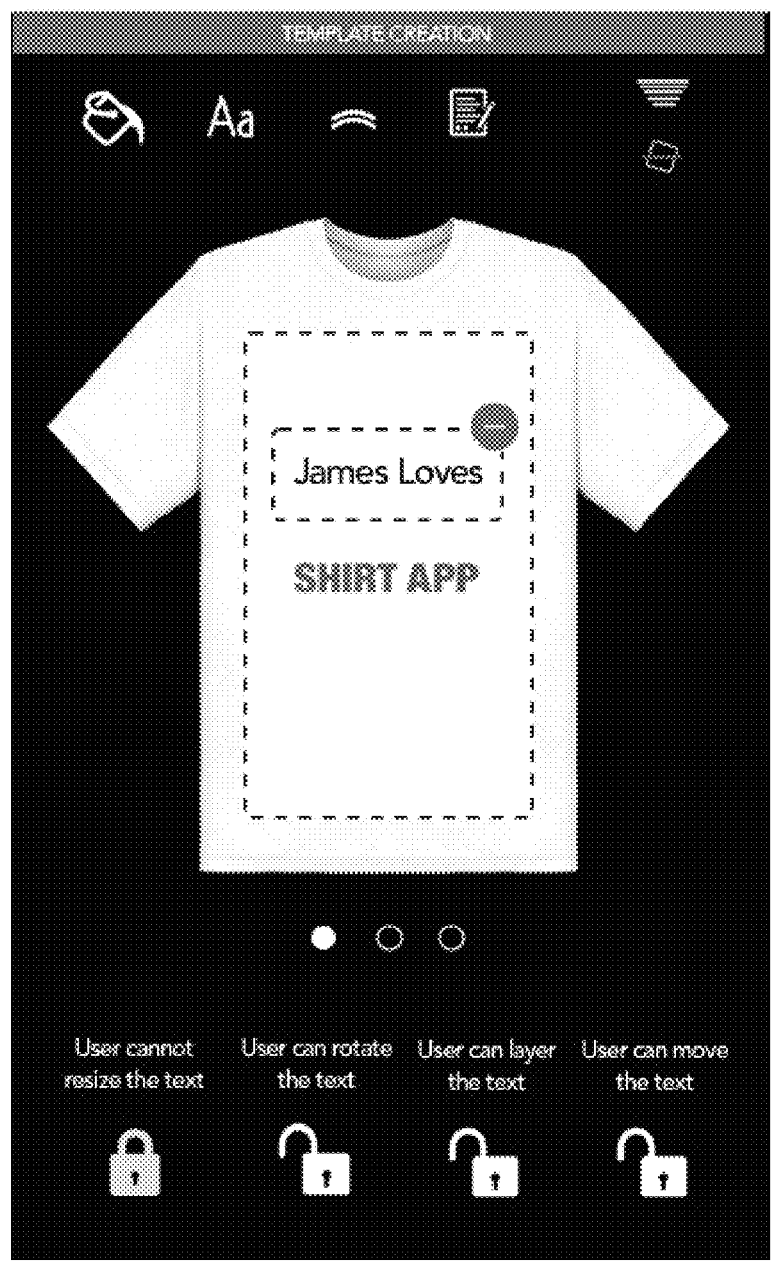
Figure 4P:
Figure 4Q:
Figure 4R:
Figure 4S:
Figure 4T:
Figure 4U:
Figure 4V:
Figure 4W:
Figure 4X:
Figure 4Y:
Figure 4Z:

In response to the user activating the image palette control illustrated in FIG. 4EE, the example user interface illustrated in FIG. 4FF may be displayed. The user interface indicates which palettes have currently been defined, with a numerical indication as to how many items are associated with a given palette. In response to the user activating the "+" control (for accessing an image asset library, which may include images selected or provided by the product provider, intellectual property licensor, or someone acting on their behalf), the user interface illustrated in FIG. 4GG may be displayed. The user interface depicts the product, the previously added asset, and a scrollable library of images. Using the illustrated user interface, the user can select an image, and the image will be displayed on the product image (optionally at the same time as the previously added asset(s)), optionally within a border, as illustrated in FIG. 4HH. In addition, the user may enable an end user to customize the product using an end user-provided image, where the user selects and adds the "custom user image" icon to the image asset palette field.

The user can add additional (non-default) image assets to the image asset palette field (e.g., one asset at a time to reduce the possibility of an inadvertent asset selection, or multiple assets at the same time to speed by the asset selection) by selecting (e.g., via touch) one or more assets and activating an "add to image palette" control. In response to the user activating the "add to image palette" control, the example user interface illustrated in FIG. 4II may be displayed.

With reference to FIG. 4II, the additional image assets are displayed in the asset palette field and optionally below the product image. Optionally, palettes (e.g., color, font, effect, etc.) associated with one image asset (e.g., a default image asset) may be automatically associated with other image assets added to the image asset palette (although optionally, the user can modify such palettes for each asset). An icon may be displayed (e.g., a lock icon) indicating whether or not an end user may change the color of image asset. The user may change the current restriction on color change from lock to unlock, or from unlock to lock. The user can activate the add image to palette control ("+"), to add additional images from the image asset library to the image asset palette.

As illustrated in FIG. 4JJ, if the user selects the "custom user image" icon, than a corresponding image may be displayed on the product image, indicating that an end user may add their own image (although the user may still specify the color, size, and position the image may be when used to customize the product/template). In response to the user activating the "add to image palette" control, the example user interface illustrated in FIG. 4KK may be displayed. The added image (in this example, the custom user image icon) is displayed in the image asset field and underneath the product image, as well as on the product image. Optionally, a control may be provided via which the user can specify that only those image assets included user specified image asset palette may be used by end users (or licensees or someone acting on their behalf) in customizing the corresponding portion of the template when customizing the product.

Optionally, in response to the user focusing on (e.g., touching or clicking on) an area outside of the product image or other designated location, a content lock user interface, such as that illustrated in FIG. 4LL, may be presented via which the user can lock (or unlock) resizing of the asset, rotating the asset, adding layers to the asset, or moving the asset, to thereby specify how much freedom an end user has with respect to customizing the asset.

FIG. 4MM illustrates an example user interface providing controls via which the user can add an asset, add text, or save a user edited or created template. The save template control may be rendered as inactive (e.g., using a greyed out/faded coloring) to indicate that there is no template to save yet.

In response to the user activating the add text control, the example user interface illustrated in FIG. 4NN may be displayed. A text area (outlined with a text area border) is displayed on the product image at the same time the previously added asset is displayed, and an onscreen keyboard is displayed via which the user can enter text. When the user has finished entering the desired text, the user can select a done control, and the example user interface illustrated in FIG. 4OO may be displayed.

With reference to FIG. 4OO, lock controls are provided via which the user can lock (or unlock) resizing of the text, rotating the text, adding layers to the text, or moving the text, to thereby specify how much freedom an end user has with respect to customizing the text. The user may move, resize, or change the orientation of the text by clicking on the text and/or text border or corner, and dragging it as desired. As similarly discussed above, a delete control may be provided (e.g., on the text area border) which when selected causes the system to delete the text and text area. In addition, a paint can color palette icon, a font icon, a text effect icon, and a content icon are displayed. Optionally, a number may be displayed in association with a given icon indicating how many items (e.g., colors, fonts, texts, effects, content, etc.) have been designated for the corresponding palette.

If the user selects the font icon ("Aa" in the illustrated example), the example user interface in FIG. 4PP may be displayed. The user can specify a main or default font by scrolling through fonts via forward and reverse controls. A given font may be displayed in a font field (e.g., using the font name in the corresponding font (e.g., Radical Life)). The text displayed on the product changes to the displayed font. The user can select a "set as main/default font" control to set the displayed font as the main/default font for the displayed user entered text. For example, if the user selects the forward arrow, the font displayed in the font field may change to a different font name and the text may change to the different font, as illustrated in FIG. 4QQ. If the user selects the "set as main/default font" control, then the displayed font will be set as the main/default font, and a corresponding font indicator will be displayed in a font palette area at the time of the user interface (e.g., by font name or by using letters in the selected font, e.g., AA) as illustrated in FIG. 4RR. A label may be provided that indicates that the font indicator in the font palette area has been set as the default font (e.g., "main font (this is the default font of the asset)").

If the user selects the font palette control, an "add to font palette" control is provided, as illustrated in FIG. 4SS. The user can scroll through the different fonts (and the text displayed on the product will change accordingly). When the user activates the "add to font palette" control, the font will be displayed in the font palette field alongside the default font, as illustrated in FIG. 4TT. Optionally, the default font will emphasized relative to the other fonts. For example, the default font may be displayed first in the font palette field to indicate it is the default font. If the user selects an area outside of the product image or other designated area, the example lock user interface (as similarly discussed above) illustrated in FIG. 4UU is displayed. The font icon is displayed in association with a number that indicates how many fonts are in the font palette.

If the user selects the paint can color palette user icon, the example user interface illustrated in FIG. 4VV may be displayed. The user interface includes horizontal, scrollable menus of colors from which to choose. A first row of colors may be utilized to set the fill color of the text, while the second row of colors may be utilized to set the outline/border color of the text. The user can select a color (from the fill color menu) and set it as the default color for the text fill, and select a color (from the outline/border color menu) and set it as the default color for the text outline, by selecting a "set as default" control. The "color" rectangle is initially blank with an "original" indication. If the user selects a color, the "color" rectangle changes to the selected color. There may be two "color" rectangles, one for the fill color and one for the outline/border color. If the user selects the "set as default" control for the fill or outline color, the selected color is displayed in the color palette field at the top of the user interface, as illustrated in FIG. 4WW. The user can change the fill or outline default color by selecting another color as activating the set as default control.

If the user selects the color palette control, the user can add additional colors to the color palette by selecting additional colors, as illustrated in FIG. 4XX The user can also reset the default text color (for the text fill or text border/outline) to the original color by selecting a reset color symbol from the row of colors. The colors selected for the text fill are displayed in the color palette as solid colored discs. The colors selected for the text outline/border may be presented in the color palette field as a black disc with an outline/border in the second color. Optionally, the default color will be displayed first in the color palette field to indicate it is the default text color.

FIG. 4YY illustrates an example text lock user interface that enables the user to lock various text properties. In this example, lock controls are provided via which the user can lock (or unlock) resizing of the user entered text, rotating the text, adding layers to the text, or moving the text, to thereby specify how much freedom an end user has with respect to customizing the user entered text. As similarly discussed above, a number is displayed in association with respective palette icons (e.g., the paint can color palette icon, the font palette icon, the effects palette icon (e.g., arced lined), etc.) indicating the number of user-selected items in the corresponding palette.

If the user selects the effects icon, the user interface illustrated in FIG. 4ZZ may be displayed. The user may set a default effect for the user entered text by selecting an effect from a listed menu of effects (e.g., none, arc 1, arc 2, wave 1, wave 2, wave 3). The text on the product image will be modified in accordance with the selected effect. In this example, the user selected "none" and selected the "set as main effect" control, and in response, the "none" icon is displayed in the effects palette field as the default effect, as illustrated in FIG. 4AAA.

Referring to FIG. 4BBB, in the illustrated example user interface, the user has selected the "effect palette" control (to add more effects to the effects palette) and has selected the arc 2 effect. In response, the text on the product image is modified utilizing the arc 2 effect. If the user selects the "add to effects palette" control, then the selected effect is added to the effects palette. If the user clicks the user interface outside of the product image, the example lock user interface illustrated in FIG. 4CCC may be displayed. As similarly discussed above, the user can selectively lock resizing of the text, rotating of the text, layering the text, and moving the text.

If the user selects the content palette icon (a paper and pencil icon in this example), the user interface illustrated in FIG. 4DDD may be displayed. The user interface enables the user to specify one or more items of content (e.g., text, graphics, images, etc.) from which an end user can select. Optionally, a content provider (or agent thereof) may create an image content palette and enables permissions to be set on images so the images can be replaced by end users with other images uploaded by the product provider (or, optionally, the product provider may enable the end user to replace an image provided by the product provider with an image of the end user). The user can select a "default content" control to specify the default content to be displayed in a given area. In this example, the user has added the content "James Loves". The user may move, resize, or change the orientation of the content by clicking on the content and/or content border or corner, and dragging it as desired. The default content (or a portion thereof) may be displayed in the content palette field, optionally with a label (e.g., "main content (this is the default content for this asset)").

If the user selects the "default content" control, the example user interface illustrated in FIG. 4EEE may be displayed. A keyboard is provided via which the user can enter new text (or emoji) content. Optionally, the user interface may be enabled to enter new next or other content via handwriting (e.g., using a finger, stylus, or mouse). As the user enters in text (where the phrase "text" includes emojis unless the context indicates otherwise), the text is optionally incrementally displayed on the product image, character-by-character. If the user activates the "set as default content" control, the user entered content will be set as the default content, and will be displayed in the content palette field as the default content.

If the user selects the "content palette" control, the example user interface illustrated in FIG. 4FFF will be displayed. If the user activates the "add content" control, a keyboard (or drawing area) will be displayed, and the user can enter new text (e.g., "Mike Loves"), as illustrated in FIG. 4GGG. If the user enters text and selects the "add to content palette" control, the user entered text will be added to the content palette field, as illustrated in FIG. 4HHH. Optionally, the default content will be displayed first in the content palette field to indicate it is the default content. The user may lock the content palette (e.g., by selecting a lock control) to prevent an end user from modifying or replacing the content in the template and on the product.

FIG. 4III illustrates an example content lock user interface via which the user can lock (or unlock) resizing of the content, rotating the content, adding layers to the content, or moving the content, to thereby specify how much freedom an end user has with respect to customizing the content. The user can optionally first move, resize, and/or rotate each design element (e.g., images, text, etc.) displayed on the product image, and then lock resizing, rotation, layering, and/or movement of the text.

With reference to FIG. 4M, the product and the content are displayed on multiple images of the product, where the product is in a different color in each image. The user can select one or more the different colored versions of the product to indicate on what product colors the content is to be made available for to end users. Optionally, the user interface may include images of different products (e.g., t-shirt, hoodie, backpack), with each product displayed in multiple colors. The user interface thus enables the user to specify, by selecting images, both what products and what product colors the template to be made available for. The user can select the "save template" control to save the selections. A saved confirmation indication may be provided in response to the user selecting the save template control.

Certain additional example user interfaces will now be described via which an end user (e.g., a product purchaser) may customize a product in accordance with palettes (e.g., image, asset, color, font, and/or effect palettes) and restrictions specified by a product provider or intellectual property licensor (or someone acting on their behalf) utilizing, by way of example, user interfaces and processes described herein. The user interfaces may be presented via an application installed on the end user device or via a website, by way of example. As will be described, advantageously if certain design elements have certain characteristics that have been locked (e.g., color, font, content, etc.), then optionally the corresponding controls are not displayed or accessible, thereby efficiently utilizing display space and avoiding confusing the end user (and reducing end user input errors).

FIG. 4KKK illustrates an example user interface depicting an image of a product selected by an end user (e.g., via an interactive catalog, such as described elsewhere herein). In addition, controls are provided via which the end user can "like" a product (e.g., add it to a wish list), add a product (e.g., with end user customization) to an electronic shopping cart, and access templates (e.g., via a template icon) and/or stickers. In response to the end user selecting the template control, the example user interface illustrated in FIG. 4LLL may be presented. The user interface presents a palette of templates (e.g., defined using interfaces and processes described herein) that the end user may select from to customize the product selected by the end user. As discussed elsewhere herein, different palettes may be defined for different products and/or product types.

In response to the end user selecting a template from the template palette, the selected template may be displayed in real time on the product image at a template designated location, as in the example user interface illustrated in FIG. 4MMM. The selected template may include multiple design elements, such as graphics, photographs, text, etc. By way of illustration, a template may include graphics of multiple cartoon or comic book characters, a background, and text. Optionally, a given template design element may be associated with a respective set of restrictions (e.g., with respect to content that may be replaced, template orientation, layering, change in size, etc.).

By way of illustration, if the selected template includes a cartoon character, the end user may select the cartoon character (e.g., by touching, pointing at, or clicking on the cartoon character). In response, a palette of content items (e.g., other cartoon characters) previously defined (e.g., by a product provider) may be presented. In response to the end user selecting a template content item (e.g., a cartoon character), the selected content item may replace the previously selected content item on the product image.

In this example, the end user has selected a photograph on the product image. In response, the example user interface illustrated in FIG. 4NNN may be presented. In this example, a palette of content items (e.g., other photographs, graphics, text, etc.) previously defined (e.g., by a product provider) may be presented. In response to the end user selecting a content item, the selected content item may replace the previously selected content item on the product image. In this example, the end user has selected a template that includes text ("I love") and that enables the end user to supply the user's own photograph for the template (by selecting a graphic of a schematic of a photograph, including a mountain and moon, in this example, that indicates the user may use a custom image). In response to the end user selecting the custom image graphic, the user interface illustrated in FIG. 4OOO may be presented.

The example user interface illustrated in FIG. 4OOO includes a control (a camera icon) that enables the end user to take a photograph using a camera on the end user's device (e.g., a camera-equipped phone) and a control to access photographs from a photograph data store associated with the end user (e.g., on the end user's device, from a cloud data store, or otherwise). In this example, the end user selects a photograph from the data store, and in response, the selected photograph is displayed on the product image in the location identified by the template, as illustrated in FIG. 4QQQ. In response to the end user selecting the template text ("I love"), a previously defined a palette of phrases/text (e.g., defined by a product provider) may be presented, as illustrated in FIG. 4RRR, from which the end user may select to utilize as template text. In this example, the product provider has permitted the end user to provide custom text, and so a "custom" text control is provided. In the product provider did not enable the end user to add custom text to the template, then optionally the "custom" text control is not displayed. In response to the end user activating the "custom" text control, the example user interface illustrated in FIG. 4SSS may be presented.

As illustrated in FIG. 4SSS, a keyboard is presented via which the user can type in text (or handwriting area may be presented via which text may be entered via a finger, stylus, or other pointing device)), which replaces the original text from the previously selected template ("I do it" replaces "I love"). The typed in text may incrementally be displayed in the text area of the template in real time. If the font and color were locked (e.g., by the product provider), then the end user is inhibited from modifying the font and color of the end user-entered text. When the end user has completed entering the text, the end user can activate a done control, and the example user interface illustrated in FIG. 4TTT may be presented. The user interface illustrated in FIG. 4TTT depicts the front of the product with the end user selected photograph and the end user entered text, utilizing the positioning, font, and default colors specified by the product provider for the corresponding template.

In response to the end user activating the rotation control (e.g., an icon of a circle composed of two arrowed lines) the image of the product is rotated or replaced to show the backside of the product, as illustrated in FIG. 4UUU. In this example, the image displays a template comprising text defined by the product provider ("Your Last Name"). In response to the end user selecting (e.g., touching or pointing at) the text on the product image, the example user interface illustrated in FIG. 4VVV may be presented. The end user may select a phrases control, and a palette of phrases/text previously defined (e.g., by a product provider) may be presented from which the end user may select to utilize as template text. In this example, the product provider has permitted the end user to provide custom text, and so a "custom" text control is provided (otherwise, the "custom" text control may optionally be inhibited from being displayed). In response to the end user activating the "custom"

text control, the keyboard (or a drawing area) is displayed. As the end user enters text via the touch keyboard (or by drawing in the drawing area), the text replaces the original text ("Michaels" replaces "Your last name"). The typed-in text may optionally be incrementally displayed in the text area in real time as the end user types in characters. In response to the end user selecting a "done" control, the example user interface illustrated in FIG. 4WWW may be presented. In this example, the product provider has permitted the end user to change the text color, and so a menu of colors is presented (otherwise, the color menu may optionally be inhibited from being displayed). The end user may select a color (e.g., by touching or pointing at a desired color), and the text will change to the selected color in real time.

In response to the end user completing the color selection (e.g., by clicking outside the product image or at other appropriate location), the example user interface illustrated in FIG. 4XXX may be presented, displaying the image of the backside of the product with the end user entered text in the end user selected color. In response to the end user selecting the rotation command, the example user interface illustrated in FIG. 4YYY may be displayed. The end user may add the customized product to the shopping cart (and purchase the customized product), or continue modifying the templates.

In the foregoing discussion of example end user customization user interfaces, it is understood that if the product provider (or intellectual property licensor or someone acting on their behalf) defined palettes for fonts and/or text effects, user interfaces may be presented enabling the end user to customize the text using such font and/or effect palettes. Further, if the product provider granted permission to resize, move, rotate and/or layer specified templates or content items (e.g., graphics, images, text), then corresponding control may be provided enabling the end user to accordingly resize, move, rotate and/or layer such templates or content items.

Optionally, tutorial or other help user interfaces may be presented for a product provider and/or for an end user to assist in the use of user interfaces and processes described herein. For example, a system may determine what user interface the user is viewing and/or what feature of a user interface a user is accessing (e.g., by detecting what control or design element the user is touching, pointing at, or otherwise focusing on), and based at least in part on such determination, infer what operation the user is attempting to perform. The system may then adaptively provide help (visually and/or audibly) to guide the user in performing the operation. For example, if the system detects that a user is touching a color in a color menu, the system may cause a "set as default" control and an "add to palette" control to be highlighted (e.g., by changing the control color, by drawing a boarder around the control, by flashing the control, by causing an arrow to point at the control, or otherwise) to indicate that the user may want to set the selected color as a default color or add the selected color to the color palette as a non-default color. Optionally, a video and/or audio presentation may be identified, accessed, and played that illustrates or provides a description of how one or more features may be utilized. Optionally, a tutorial may be provided that guides the user regarding one or more operations described herein. Optionally, the system operator, a product provider, and/or an end user may enable or disable the provision of such tutorial to the end user.

Certain example operations will now be described with reference to the figures. Fewer or additional operations may be performed, and the operations may be performed in a different order. For example, if a user elects not to add text to a design area, then certain related operations related to rending text editing interfaces may not be performed. By way of further example, if a design does not violate a design rule, than corresponding error handling operations may not be performed. In addition, certain operations that are depicted as being serially performed may be performed in parallel (e.g., at the same time). Certain operations may be performed by a user device and/or a CAD system.

Figure 5A:
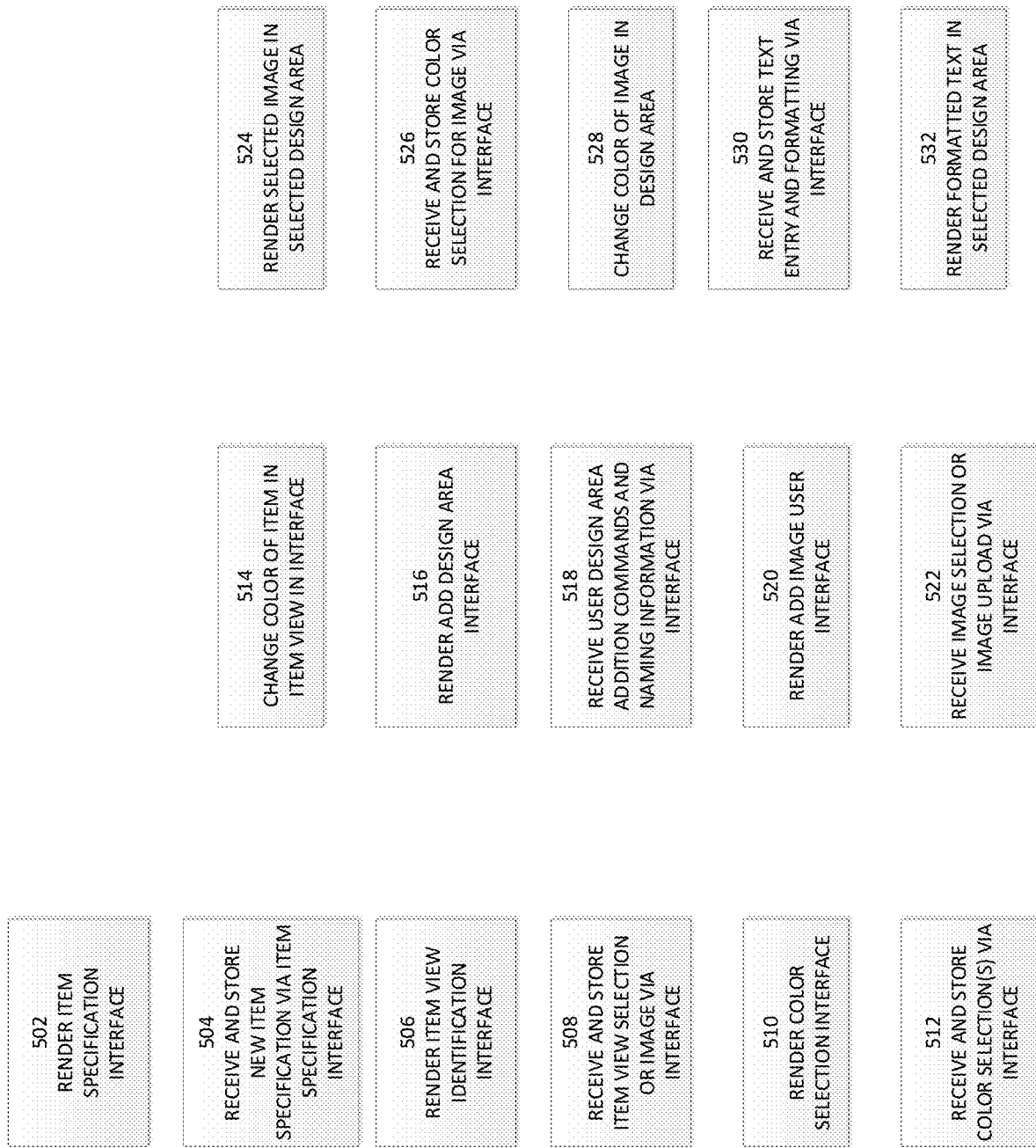
Figure 5B:
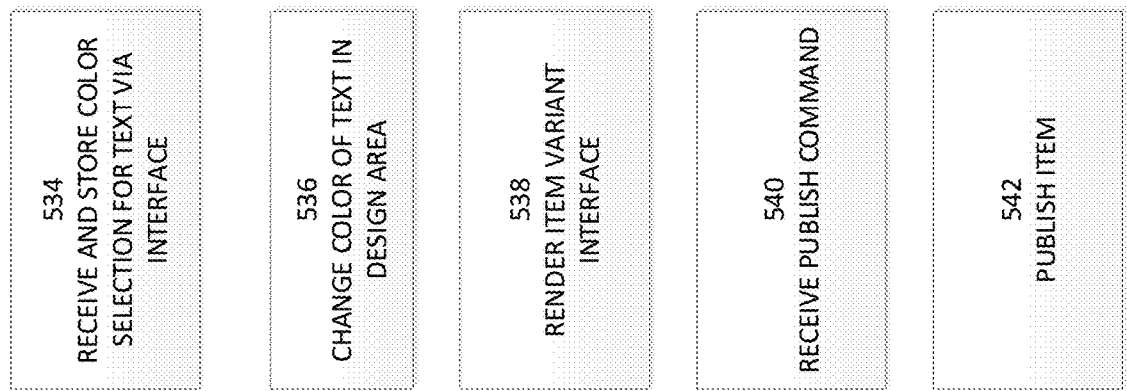

FIGS. 5A-5B illustrate example operations that may be performed with respect to an item provider that is specifying an item and that is specifying end user customization permissions/restrictions. At block 502, an item specification interface is rendered on a user device (e.g., an item provider device), optionally in response to a user input. At block 504, a new item specification is received and stored. For example, the item specification may include item name, item category, description, sizes, item color, and the like. At block 506, an item view identification user interface is rendered. At block 508, an item view is selected by the user from a gallery of generic items view or the user may upload an image of a side of the actual item. The item view selection or upload is received. At block 510, a color selection user interface is rendered, optionally in response to a user input. At block 512, a color selection is received and stored. For example, a palette of colors may be provided, and in response to the user selecting a color from the palette, a corresponding color map may be provided with a range/shades of the selected color. The user may select a particular color shade from the map (e.g., using a pointing device, such as a mouse, stylus, or finger). Optionally, the user can enter the desired color via a color value field. At block 514, the item in the interface is colored using the selected color in real time.

At block 516, an add design area interface is rendered which may provide a design area specification tool that enables a user to draw or otherwise specify a design area perimeter and to assign a name to the specified design area. At block 518, the design area specification and design area name are received (e.g., where the design area is drawn by the user on a given portion of the item, or the user provides numerical coordinates for the design area).

At block 520, an add image interface is rendered, optionally in response to a user input. The add image interface may include a gallery of previously stored images and/or may provide a control via which a user can upload or link to an image. At block 522, an image selection from the gallery is received and/or an image upload or link is received. At block 524, the selected/uploaded image is rendered in the design area. At block 526, an image color selection is received. For example, the user may select a color from a displayed palette of colors and in response, the interface may access and present a color map corresponding to the color selected by the user. The user may select a desired shade from the color map. At block 528, the image color may be changed in real time to the selected shade. A lock control may also be provided. If the lock control is activated by the user, the image color may be locked to prevent the color from being changed (e.g., by an end user) unless the lock is unlocked.

At blocks 530 and 532, in response to the user selecting an add text control, an add text interface may be presented. The interface may indicate one or more previously specified design areas, and may highlight a user-selected design area. A text field may be provided. As the user enters text (e.g., using a provided keyboard, via voice input, or otherwise) the text is displayed in real time in the selected design area. Formatting controls may be provided via which the user can select/specify a font, text alignment (e.g., left, right, center), text effects, character spacing, and/or line spacing. In addition, controls may be provided via which the user can rotate the text, change the size of the text, and/or lock the text (so that the text cannot be changed by an end user). A design area deletion control may also be provided. Text entry and text formatting specified by the user may be reflected in the selected design area on the item image in real-time.

At block 534, a text color selection is received and stored. For example, the user may select a color from a displayed palette of colors and in response, the interface may access and present a color map corresponding to the color selected by the user. The user may select a desired shade from the color map. At block 536, the text color in the design area may be changed in real time to the selected shade.

At block 538, an item variant interface may be rendered via which a user can assign a base price and prices for each specified item variant (e.g., for each combination of available color, available size, and number of design areas customizable by an end user). The item variant interface may also enable the user to specify what type of print options may be used or made available for a given item or item-type. For example, the interface may enable an item provider to specify whether standard ink, glow-in-the dark ink, and/or embroidery are to be made available to end users to customize a given item. The user inputs may be received and stored.

At block 540, a publish command may be received (e.g., in response to the user activating a publish control). At block 550, the specified item may then be saved and published (e.g., to a store associated with the user).

Figure 6A:
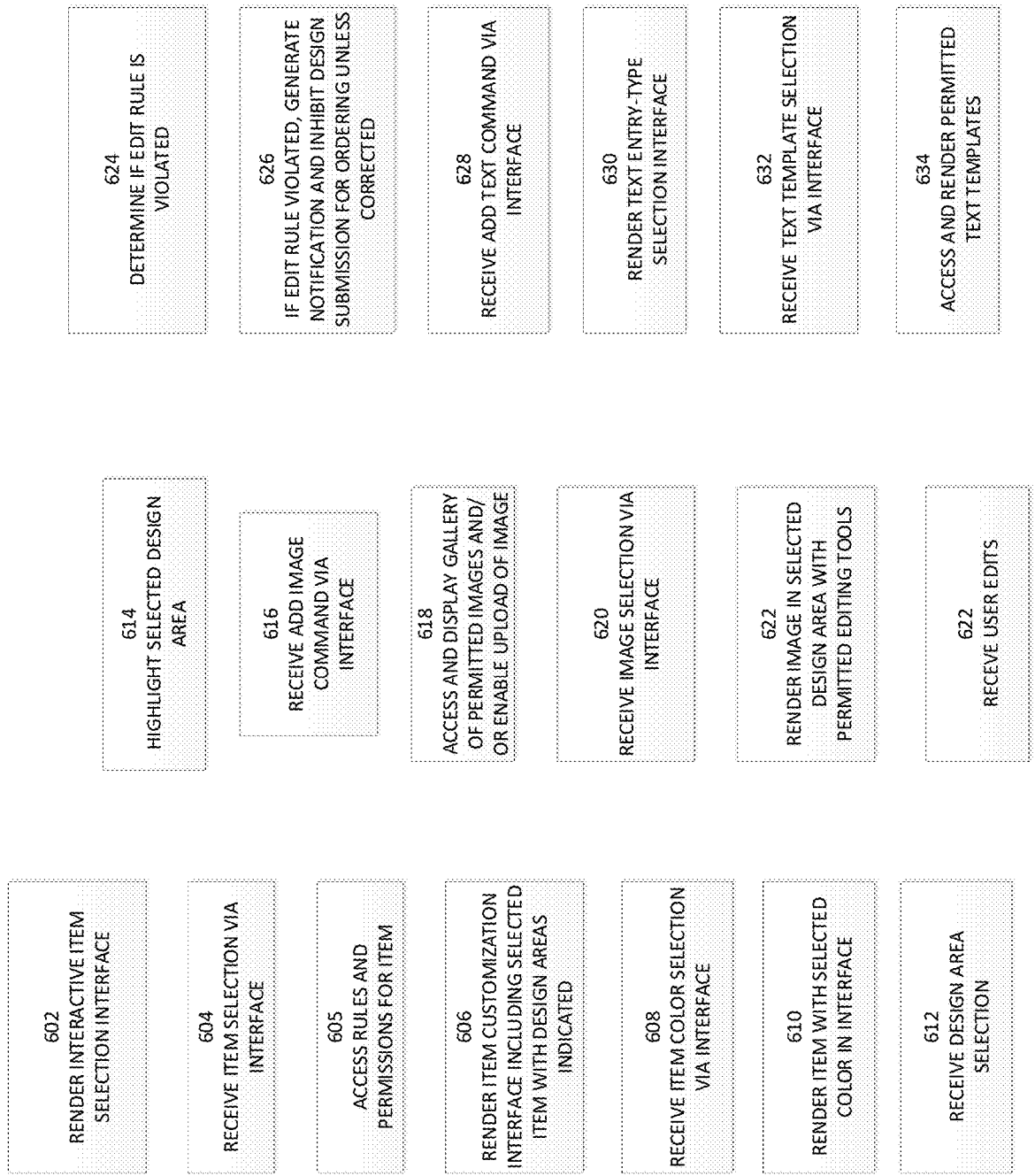
Figure 6B:
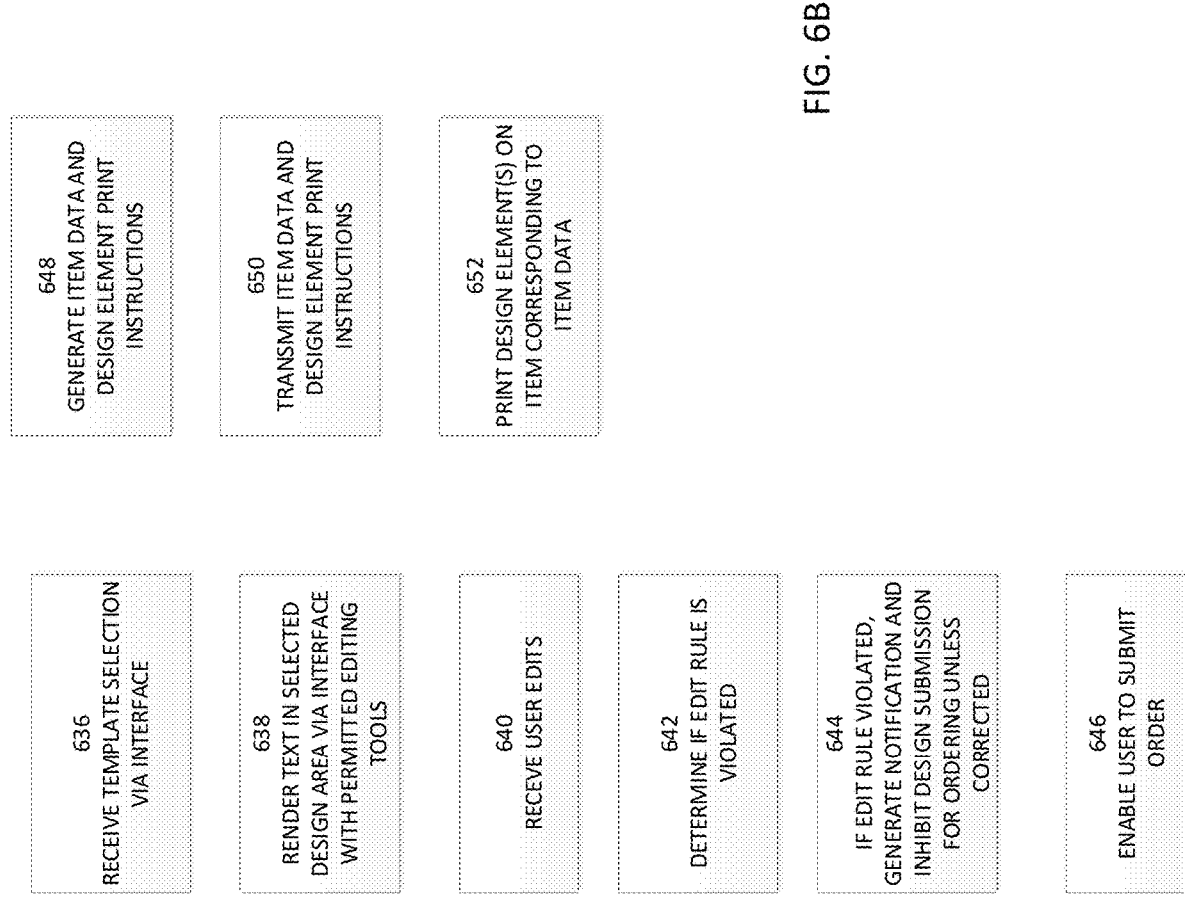

FIGS. 6A-6B illustrate example operations that may be performed with respect to an end user in customizing an item. At block 602, an interactive item selection interface may be rendered on a user device (e.g., via a browser or dedicated application). The interactive item selection interface may display or provide access to a catalog of items of one or more stores. At block 604, a user item selection is received. At block 605, customization rules and permissions are accessed from memory. For example, the customization rules and permissions may indicate what colors may be used for the item, for each design area, for each image in a design area, and/or for each item of text in a design area. By way of further example, the customization rules and permissions may indicate what text formatting (e.g., which fonts, alignment, spacing, size, and/or effects) may be used for an item or for a given design area on the item. By way of yet example, the customization rules and permissions may indicate whether a design element (e.g., text or an image) may be rotated, may specify rotation increments, and/or may specify a maximum rotation amount. By way of yet example, the customization rules and permissions may indicate which design elements (e.g., text or image) that had been applied by the item provider to an item may be deleted or edited.

At block 606, customization interface may be rendered. The customization interface may display an image corresponding to a default side of the user selected item, optionally in an item provider specified default color. A side selection control may be provided via which the user can view and select an image of a different side. The design areas specified by the item provider may be highlighted on the item image. The user may select (e.g., by clicking on) a design area to add to or modify the design area. An item color selection interface may be provided (e.g., including a palette of colors) via which the user can select an item color. At block 608, a user color selection for the item is received. At block 610, the item is rendered with the selected color in real time. At block 612, a design area selection is received. At block 614, the selected design area is highlighted.

At block 616, a user selection of an add image control is received. At block 618, an interface is presented that includes a gallery of images that item the provider indicated may be used to customize the item and/or selected design area. The interface may include controls via which the user can select and upload/link to an image to be added to the selected design area. At block 620, a user image selection or upload is received. At block 622, the image is rendered in real time in the selected design area. In addition, the permitted editing tools are determined and displayed. For example, depending on the restrictions/permissions specified by the item provider for the item or the design area, one or more of the following tools may be presented and enabled: resize, drag, rotate, change font, change color, delete, or the like. Controls that are not permitted may be disabled and optionally not displayed, or may be displayed "greyed out" (or otherwise) to indicate that the controls are not accessible.

At block 623, user edits are received.

At block 624, a determination is made as to whether the user edits have violated any edit rules. For example, a determination may be made that the user has expanded the size of the image past the border of the design area as specified by the item provider. At block 626, if a determination is made that an edit rule is violated, an error notification may be generated and provided to the user. For example, the notification may include one or more of a text notification, an icon notification, a sound notification, an operational notification (e.g., snapping the size of the image back to the previous size in response to detecting that the user is attempting to increase the size of the image in at least one direction or dimension past a threshold size or dimension), or the like. Detection and handling of other rule violations, such as violations of rules discussed elsewhere herein, may be similarly handled. In addition, the user edit that violated the edit rule may be inhibited from being included in a design or manufacturing file for the item, and the user may be prevented from ordering the item until the violation is corrected.

At block 628, a user selection of an add text control is received. In response to receiving the user selection of the text control, at block 630 a text entry-type selection interface is rendered. The text entry-type selection interface may include a "create" control and "template" control. At block 632, a template control selection may be received via the text entry-type selection interface.

If the user selects the "template" control, at block 634, a gallery of user-selectable text templates (e.g., previously entered by the item provider) that are permitted for the item/design area is generated and rendered. For example, a given template may include alphanumeric text (e.g., one or more phrases) with an item provider-specified font. At block 636, a user selection of a template is received.

If the user selects the "create" control, a user interface is rendered via which the user can enter the user's own text. For example, the create user interface may include a keyboard and a text field.

At block 638, the text (either corresponding to the template text or the user created text) is rendered in the selected design area with permitted editing tools. For example, depending on the restrictions/permissions specified by the item provider for the item or the design area, one or more of the following tools may be presented and enabled: resize, drag, rotate, font, color, or the like. Controls that are not permitted may be disabled and optionally not displayed, or may be displayed "greyed out" (or otherwise) to indicate that the controls are not accessible. The an editing toolbox may be dynamically determined based on the item the user is customizing, the design area of the item the user is customizing, and/or the type of customization the user is performing (e.g., adding text or adding an image).

At block 640, user edits are received via the permitted editing tools. For example, the edits may include text rotation, size change, font change, color change, or the like.

At block 642, a determination is made as to whether the user edits to the text have violated any edit rules. For example, a determination may be made that the user has reduced the size of the below a certain size specified by the item provider. At block 644, if a determination is made that an edit rule is violated, an error indication/notification may be generated and provided to the user. For example, the notification may include one or more of a text notification, an icon notification, a sound notification, an operational notification (e.g., snapping the size of the text back to the previous size in response to detecting that the user is attempting to increase the size of the text in at least one direction or dimension past a threshold size or dimension), or the like. Detection and handling of other rule violations, such as violations of rules discussed elsewhere herein, may be similarly handled. In addition, the user edit that violated the edit rule may be inhibited from being included in a design or manufacturing file for the item, and the user may be prevented from ordering the item until the violation is corrected.

At block 646, at least partly in response to determining that edit rules have not been violated, the user is enabled to submit an order for the user-customized item (e.g., via an order control).

At block 648, item and customization data may be generated corresponding to the customized item. For example, the item data may include an identification of the item, the item size (where the size may include an indication as to gender and age (e.g., unisex, men, women, juniors, youth, toddler, infant)), and the item color. The customization data may include print data. For example, data may include data in ppi (pixels per inch) or vector format. Images may be in the form of JPEG, PNG, SVG, or other format. Text may optionally be converted to an outline format. Colors may be provided using pantone color codes. An image (or images) of templates and/or user provided images and/or text used in the customization may be generated as part of the customization data (see, e.g., FIG. 3U-1). An image (or images) of side(s) of the item that have been customized may be generated as part of the customization data (see, e.g., FIG. 3U-2). The item data and customization data may be provided in separate files or a single file. At block 650, the item and customization data for each design element may be transmitted to a printing and/or embroidering system. For example, one or more files including the item data and/or the customization data may be transmitted over a network to printing machine for printing. At block 652, the customized design elements may be printed or embroidered on the item. For example, the printer may use heat transfer vinyl, screen printing, direct to garment printing, sublimation printing, and/or transfer printing.

FIG. 7 illustrates an example process for changing the color of an image, which may be used by one or more of the color change operations discussed herein. At block 702, an image whose color is to be changed (e.g., in response to a user color-change instruction) is accessed. For example, the image may be in scalable vector graphics (SVG) format which is defined in an XML text file. At block 704, the color data is identified. For example, a color entry in the text file may be identified. At block 706, the color data is edited to correspond to the color specified by the user. The color may be in the form of a standard color name (e.g., "green," "red," "blue"), or via a numerical code (e.g., as a hexadecimal value, as rgb decimal values (e.g., rgb (126, 255, 216), as rgb percentages (e.g., rgb (75%, 50%, 25%), or otherwise). At block 708, the image is rendered using the edited color data.

FIG. 8 illustrates example operations that may be performed in detecting design rule violations with respect to specifying design areas (e.g., printable areas). The operations may be used in conjunction with one or more of the design area specification operations discussed herein. At block 802, a design area specification for an item (e.g., a clothing product) is received. By way of example, a design area specification tool may be provided that enables a user to draw or otherwise specify a design area perimeter. By way of illustration, a user may select the tool, specify a first corner via a pointer (e.g., mouse, stylus, finger), drag the pointer to indicate a diagonally opposite corner, and a corresponding perimeter will be drawn (e.g., using dashed lines or other indicator), which may be in the form of a rectangle or square (although other shapes may be used). At block 804, the design area outline (e.g., a border) is drawn on the item. At block 806, a determination is made as to whether the design area outline violates any design rules (e.g., specified by a printing entity or system operator). For example, depending on the printing technology to be used, it may not be possible to print within a certain distance of an edge of an item, such as within a certain distance of a hem of a jacket. Thus, margins may be specified with respect to certain edits/portions of the item.

If a user (e.g., an item provider) attempts to specify a design area that will violate such margins, at block 810 an error indication/notification may be generated. For example, the notification may include one or more of a text notification, an icon notification, a sound notification, an operational notification (e.g., snapping the size of the design area border back to the previous size in response to detecting that the user is attempting to increase the size of the design area past a margin), or the like. In addition, the user may be prevented from publishing the item on the user's store until the violation is corrected. If there is no violation or the violation has been corrected, then at block 808, the design area dimensions and/or coordinates may be stored for later publication. Optionally, instead of generating an error notification, the process may crop the design area so that the design area will automatically be sized to fit within the specified margins.

FIG. 9 illustrates example operations that may be performed in detecting design rule violations with respect to editing an image by a user (e.g., an end user) which may be used by one or more of the image editing operations discussed herein. At block 902, an image edit instruction is received. For example, the editing instructions may relate to change the size, rotation, and/or position of an image depicted in a design area of an item (e.g., on a chest design area of a jacket). At block 904, the edited image is rendered in real time on the item. At block 906, a determination is made as to whether the edited image extends past the design area boarder or a margin thereof, as defined by an item provider. At block 910, an error indication/notification is generated. For example, the notification may include one or more of a text notification, an icon notification, a sound notification, an operational notification (e.g., snapping the size or rotation of the image back to the previous size or rotation in response to detecting that the user is attempting to increase the size of the image or change the rotation of the image so that it will be past a design area border or margin), or the like. In addition, the user may be prevented from ordering the item until the violation is corrected. If there is no violation or the violation has been corrected at block 912, then at block 908, the image dimensions and/or coordinates may be stored for later ordering or printing. Optionally instead, the portion of the image or other template that violates design area boarder or a margin thereof is cropped, and the cropped image is displayed in real time in the design area. The user may be permitted to order the order the item with the cropped image or other template.

FIG. 10 illustrates example operations that may be performed in detecting design rule violations with respect to editing text by a user (e.g., an end user). The example operations may be used in conjunction with one or more of the text editing operations discussed herein. At block 1002, an text edit instruction is received. For example, the editing instructions may relate to change the size, rotation, and/or position of text depicted in a design area of an item (e.g., on a chest design area of a jacket). At block 1004, the edited text is rendered in real time on the item. At block 1006, a determination is made as to whether the edited text extends past the design area boarder or a margin thereof, as defined by an item provider. At block 1010, an error indication/notification is generated. For example, the notification may include one or more of a text notification, an icon notification, a sound notification, an operational notification (e.g., snapping the size or rotation of the text back to the previous size or rotation in response to detecting that the user is attempting to increase the size of the text or rotate the text past a design area border or margin), or the like. In addition, the user may be prevented from ordering the item until the violation is corrected. If there is no violation or the violation has been corrected at block 1012, then at block 1008, the text dimensions and/or coordinates may be stored for later ordering or printing.

Optionally instead, the portion of the text or other template that violates design area boarder or a margin thereof is cropped, and the cropped text or other template is displayed in real time in the design area. The user may be permitted to order the order the item with the cropped text or other template.

Figure 11:
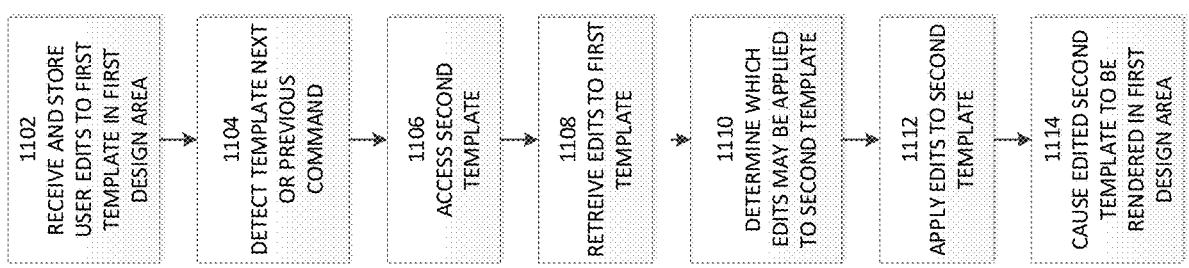

FIG. 11 illustrates an example process that enables a user to quickly view different templates as applied to an item design area. At block 1102, user edits to a first design element (e.g., a first template) in a first design area of an item are received. For example, the edits (e.g., a change in orientation, color, size, height/width ratio, text content, deletion of a portion of a design element, etc.) may been received using interfaces described above. The first design element may be one of a plurality of design elements that may be used in the design area. The user interface may display the edited first design element on a model of an item.

At block 1104, a next or previous design element command may be received and detected. For example, if the user interface is displayed via a touch screen, the next or previous design element command may be received via a left or a right swipe gesture using one or more fingers or a stylus. Optionally, visible next and previous controls may be provided that may be clicked on or otherwise selected. Optionally, a suggestion control may be provided which may be used to instruct the process to suggest a template (rather than provide the last or next template).

At block 1106, a second design element is accessed in response to the next or previous command. For example, if a previous command is received, the process may select the immediately preceding design element in a gallery of design elements. If an a next command is received, the process may select the immediately next design element in a gallery of design elements. If a suggestion control is selected, the process may select a second template based on a user's template purchase history, user preferences (e.g., the user may have indicated a preference for certain sports teams or players, performers, celebrities, politicians, cartoon characters), and/or template popularity.

At block 1108, the edits to the first design element are retrieved from memory.

At block 1110, a determination is made as to which edits to the first design element may be applied the second design element. For example, the process may determine whether an item provider has set different edit restrictions for the first design element than the second design element, and whether edits permitted for the first design element are permitted for the second design element. The process may not apply (or apply with a rule violation notice) the edits from the first design element to the second design element where such edits would violate edit restrictions for the second design element.

By way of illustration, the first design element may be of a basketball, and a first edit may have changed the basketball color to green. The second design element may be a logo of a basketball team and may be associated with a restriction preventing a color change to the logo. In such case, the process would not apply the color change to the logo. By way of further example, the edit permissions for both the first and second design elements may indicate that both design elements may be rotated to any desired angle. In such case, the process may apply a rotation edit for the first design element to the second design element. By way of further example, an edit to the first design element may have been deletion of a word. If the second design element does not include the deleted word, than the deletion edit will not be performed.

At block 1112, the edits that are determined to be applyable to the second design element are applied. At block 1114, the second template is rendered on the first design area of the model of the item. Optionally, an undo control may be provided which when activated will cause the edits to the second template to be removed. The foregoing process may be performed in real time, enabling a user to swiftly view different customizations, optionally without having to reapply edits for each design element.

Optionally, in addition to enabling gestures to be used to cycle through templates, the process may enable gestures to be used to swipe through different items to which a template will be applied. For example, in response to detecting a gesture (e.g., an up/down or left/right swipe) on a user device display, the process may replace the item on which the template is displayed with a different item. For example, if a template is displayed on an image of a t-shirt with a pocket, in response to a gesture process may cause the same template (optionally with any user edits) to be displayed in real time on another item (e.g., a t-shirt without a pocket) in place of the image of the t-shirt with a pocket.

Figure 12:
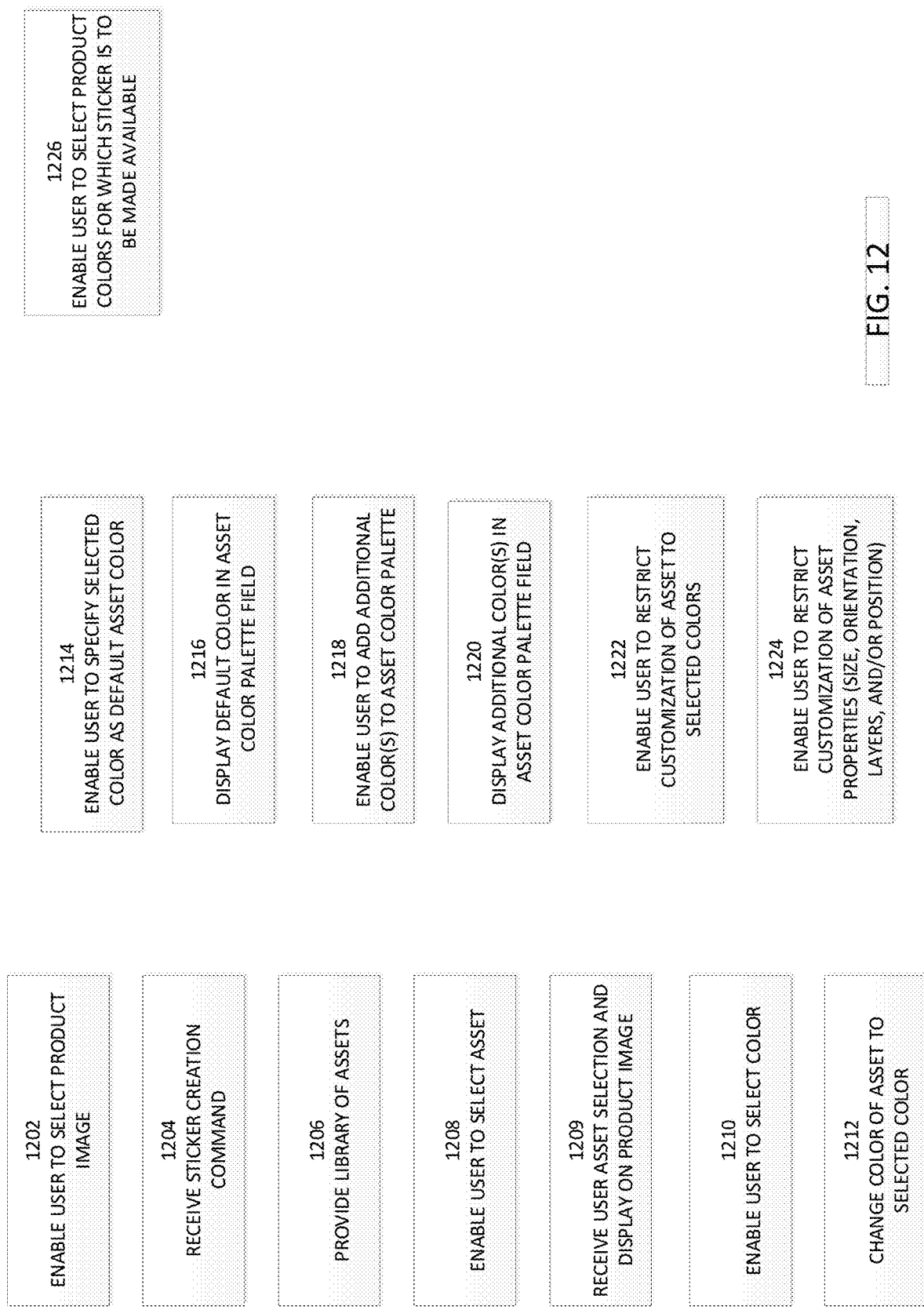

FIG. 12 illustrates an example process that enables a user to accurately and quickly generate a sticker and customization palettes for a sticker. It is understood, that given the flexibility of the user interfaces, optionally the various user interfaces may be accessed in different order. At block 1202, a user interface is provided via which the user can select a product to which a "sticker" (e.g., an image of a licensed character, logo, trademark, etc.) may be applied. For example, if the user interface is enhanced for touch input as described elsewhere herein, the process may enable gestures to be used to swipe through images of different items to which a sticker may be applied. For example, in response to detecting a gesture (e.g., an up/down or left/right swipe) on a user device touch display, the process may replace an image of a first product (e.g., a t-shirt) with an image of a second product (e.g., a hoodie jacket). The user may touch or otherwise select a product image (e.g., by pointing a cursor over a product image and clicking, or otherwise).

At block 1204, a sticker creation command is received from a user (e.g., via menu selection, link activation, or otherwise). At block 1206, a library of assets is accessed, and at least a portion of the library is displayed. For example, an asset may be a character, logo, or trademark. At block 1208, the user is enabled to select an asset (e.g., by touching the asset displayed on the user device display, by pointing a cursor over the asset and clicking, or otherwise). At block 1209, a user asset selection is received and displayed on an image of the selected product. At block 1210, a user interface is provided via which a user may select a color. For example, a plurality of colors may be displayed (e.g., in a scrollable list of colors). A user can touch the desired color to select it. At block 1212, in response to detecting a user color selection, the color of the asset, displayed on the product image, is changed to that of the selected color.

At block 1214, a user is enabled to designate the selected color as a default color (e.g., the color the sticker will be initially displayed in when displayed to an end user in an electronic catalog of products and/or of stickers). For example, a "set as default control" (e.g., which may be labelled as "set as main" or otherwise) may be provided. At block 1216, in response to the user activation of the default control, the corresponding selected color is displayed in an asset color palette field. The asset color palette field is configured to display colors designated by the user as to be made available to end users (or licensees) in customizing the sticker. The color designated as the default color may be highlighted (via position as the first color in the palette, via an icon, via a text notation, and/or via other technique) to distinguish the default color from other colors in the asset color palette field. At block 1218, a user interface is provided via which the user can add additional colors to the asset color palette field (e.g., one color at a time to reduce the possibility of an inadvertent color selection, or multiple colors at the same time to speed the color selection). At block 1220, the additional colors are displayed in the asset color palette field.

At block 1222, a user interface may be provided via which the user can specify that only those colors included user specified asset color palette may be used by end users (or licensees) in customizing the color of the asset. The user may also specify that end users may utilize the colors in the included user specified asset color palette but may also use other colors. Optionally, if end users are permitted to use other colors, the colors included user specified asset color palette may be recommended or emphasized (e.g., listed first or with a notation) relative to colors not included in the user specified asset color palette.

At block 1224, a user interface may be provided via which the user can specify that certain asset properties may or may not be modified by an end user. For example, the user may specify that the asset size, asset orientation, asset position (on the product), or asset layering may or may not be modified.

At block 1226, a user interface may be provided via which the user can specify on what colors of the product the sticker (including the associated colors and permissions) is to be made available for to end users.

Figure 13A:
Figure 13B:

FIG. 13A-13C illustrates an example process that enables a user to accurately and quickly generate a template and customization palettes for a template. It is understood that certain processes described herein (e.g., with respect to selecting or entering text, selecting fonts, selecting text effects, etc.) may be utilized with respect to stickers as well.

At block 1302, a user interface is provided via which the user can select a product to which a "template" (e.g., which optionally includes multiple elements, such as text, and an image, logo, trademark, etc.) may be applied. For example, if the user interface is enhanced for touch input as described herein, the process may enable gestures to be used to swipe through images of different items to which a template may be applied. For example, in response to detecting a gesture (e.g., an up/down or left/right swipe) on a user device touch display, the process may replace an image of a first product (e.g., a t-shirt) with an image of a second product (e.g., a hoodie jacket). The user may touch or otherwise select a product image (e.g., by pointing a cursor over a product image and clicking, or otherwise).

At block 1304, a template creation command is received from a user (e.g., via menu selection, link activation, or otherwise). At block 1306, a library of assets is accessed, and at least a portion of the library is displayed. For example, an asset may be a character, logo, or trademark. At block 1308, the user is enabled to select an asset (e.g., by touching the asset displayed on the user device display, by pointing a cursor over the asset and clicking, or otherwise). At block 1310, a user asset selection is received and displayed on an image of the selected product.

At block 1312, a user interface may be provided via which the user can specify that certain asset properties may or may not be modified by an end user. For example, the user may specify that the asset size, asset orientation, asset position (on the product), or asset layering may or may not be modified.

At block 1314, a user interface is provided via which a user may select a color. For example, a plurality of colors may be displayed (e.g., in a scrollable list of colors). A user can touch the desired color to select it. At block 1316, in response to detecting a user color selection, the color of the asset, displayed on the product image, is changed to that of the selected color.

At block 1318, a user is enabled to designate the selected color as a default color (e.g., the color the asset will be initially displayed in when displayed to an end user in an electronic catalog of products and/or of templates). For example, a "set as default control" (e.g., which may be labelled as "set as main" or otherwise) may be provided. At block 1320, in response to the user activation of the default control, the corresponding selected color is displayed in an asset color palette field. The asset color palette field is configured to display colors designated by the user as to be made available to end users (or licensees) in customizing the template. The color designated as the default color may be highlighted (via position as the first color in the palette, via an icon, via a text notation, and/or via other technique) to distinguish the default color from other colors in the asset color palette field.

At block 1322, a user interface is provided via which the user can add additional colors to the asset color palette field (e.g., one color at a time to reduce the possibility of an inadvertent color selection, or multiple colors at the same time to speed by the color selection). At block 1324, the additional colors are displayed in the asset color palette field.

At block 1326, a user interface may be provided via which the user can specify that only those colors included user specified asset color palette may be used by end users (or licensees) in customizing the color of the asset. The user may also specify that end users may utilize the colors in the included user specified asset color palette but may also use other colors. Optionally, if end users are permitted to use other colors, the colors included user specified asset color palette may be recommended or emphasized (e.g., listed first or with a notation) relative to colors not included in the user specified asset color palette.

At block 1324, a user interface may be provided via which the user can specify that certain asset properties may or may not be modified by an end user. For example, the user may specify that the asset size, asset orientation, asset position (on the product), or asset layering may or may not be modified.

At block 1326, a user interface may be provided via which the user can specify on what colors of the product the template (including the associated colors and permissions) is to be made available for to end users.

At block 1328, a user interface (e.g., a keyboard) may be provided on the touch display via which the user can enter text. At block 1330, the text is displayed on the product image. Optionally, the text is incrementally displayed as the user types it. Optionally instead, the text is not displayed until the user indicates (e.g., via a "done" control) that the user has completed entering the text.

At block 1334, a user interface is provided via which a user may select a font. For example, one or more fonts may be displayed (e.g., in a scrollable list of fonts). The displayed fonts may include the name of the font using letters in the font. A user can touch or point at the desired font to select it. At block 1336, the font of the text, displayed on the product image, is changed to that of the selected font. Optionally, the font of the text, displayed on the product image, is changed to that of the selected font in response to the user scrolling to the corresponding font in the scrollable list of fonts, even if the user has not selected the font.

At block 1338, a user is enabled to designate the selected font as a default font (e.g., the font the text will be initially displayed in when displayed to an end user in an electronic catalog of products and/or of templates). For example, a "set as default control" (e.g., which may be labelled as "set as main font" or otherwise) may be provided. At block 1340, in response to the user activation of the default control, the corresponding selected font is displayed in a text font palette field. The text font palette field is configured to display fonts designated by the user as to be made available to end users (or licensees) in customizing the template. The font designated as the default font may be highlighted (via position as the first font in the palette, via an icon, via a text notation, and/or via other technique) to distinguish the default font from other fonts in the text font palette field.

At block 1342, a user interface is provided via which the user can add additional (non-default) fonts to the text font palette field (e.g., one font at a time to reduce the possibility of an inadvertent font selection, or multiple fonts at the same time to speed by the font selection). At block 1344, the additional fonts are displayed in the text font palette field. A user interface may be provided via which the user can specify that only those fonts included user specified text font palette may be used by end users (or licensees) in customizing the font of the text. The user may also specify (e.g., via a lock control) that end users may utilize the fonts in the included user specified text font palette but may (or may not) also use other fonts. Optionally, if end users are permitted to use other fonts, the fonts included user specified text font palette may be recommended or emphasized (e.g., listed first or with a notation) relative to fonts not included in the user specified text font palette.

At block 1346, a user interface may be provided via which the user can specify that certain text properties may or may not be modified by an end user. For example, the user may specify that the text size, text orientation, text position (on the product), or text layering may or may not be modified.

At block 1348, a user interface is provided via which a user may select text fill and text outline colors. For example, a plurality of colors may be displayed (e.g., in a scrollable list (e.g., row) of colors). Optionally, two sets of colors may be presented, a first set for the text fill colors, and a second set for the text outline colors. A user can touch or point at a desired color in the first set of colors to select the color as the text fill color. A user can touch or point at a desired color in the second set of colors to select the color as the text outline color. At block 1350, in response to detecting a user color selection from the first set of colors, the fill color of the text, displayed on the product image, is changed to that of the selected color. In response to detecting a user color selection from the second set of colors, the outline color of the text, displayed on the product image, is changed to that of the selected color.

At block 1352, a user is enabled to designate the selected fill color as a default fill color (e.g., the text fill color the text will be initially displayed in when displayed to an end user in an electronic catalog of products and/or of templates). For example, a "set as default control" (e.g., which may be labelled as "set as main" or otherwise) may be provided. Similarly, a user is enabled to designate the selected outline color as a default text outline color (e.g., the text outline color the text will be initially displayed in when displayed to an end user in an electronic catalog of products and/or of templates). At block 1354, in response to the user activation of the color fill default control, the corresponding selected fill color is displayed in a text color palette field. Similarly, in response to the user activation of the color outline default control, the corresponding selected outline color is displayed in the text color palette field. The text color palette field is configured to display fill and outline colors designated by the user as to be made available to end users (or licensees) in customizing the template. The color designated as the default color may be highlighted (via position as the first color in the palette, via an icon, via a text notation, and/or via other technique) to distinguish the default color from other colors in the text color palette field.

At block 1356, a user interface is provided via which the user can add additional fill and/or outline colors to the text color palette field (e.g., one color at a time to reduce the possibility of an inadvertent color selection, or multiple colors at the same time to speed by the color selection). At block 1358, the additional colors are displayed in the text color palette field.

At block 1360, a user interface may be provided via which the user can specify that only those colors included user specified text color palette may be used by end users (or licensees) in customizing the fill and/or outline colors of the text. The user may also specify (e.g., via a lock control) that end users may utilize the fill and/or outline colors in the included user specified text color palette but may also use other colors. Optionally, if end users are permitted to use other colors, the colors included user specified text color palette may be recommended or emphasized (e.g., listed first or with a notation) relative to colors not included in the user specified text color palette.

At block 1362, a user interface is provided via which a user may select an effect. For example, one or more effects may be displayed (e.g., in a menu or scrollable list of effects). The displayed effects may include the name of the effect. A user can touch or point at the desired effect to select it. At block 1364, the text, displayed on the product image, is changed in accordance with the selected effect. Optionally, the effect applied to the text, displayed on the product image, is changed to that of an effect pointed at by the user, even if the user has not selected the effect.

At block 1366, a user is enabled to designate the selected effect as a default effect (e.g., the effect the text will be initially displayed in when displayed to an end user in an electronic catalog of products and/or of templates). For example, a "set as default control" (e.g., which may be labelled as "set as main effect" or otherwise) may be provided. At block 1368, in response to the user activation of the default control, the corresponding selected effect is displayed in a text effect palette field. The text effect palette field is configured to display effects designated by the user as to be made available to end users (or licensees) in customizing the template. The effect designated as the default effect may be highlighted (via position as the first effect in the palette, via an icon, via a text notation, and/or via other technique) to distinguish the default effect from other effects in the text effect palette field.

At block 1370, a user interface is provided via which the user can add additional effects to the text effect palette field (e.g., one effect at a time to reduce the possibility of an inadvertent effect selection, or multiple effects at the same time to speed by the effect selection). At block 1372, the additional effects are displayed in the text effect palette field. At block 1374, a user interface may be provided via which the user can specify that only those effects included user specified text effect palette may be used by end users (or licensees) in customizing the effect of the text. The user may also specify (e.g., via a lock control) that end users may utilize the effects in the included user specified text effect palette but may (or may not) also use other effects. Optionally, if end users are permitted to use other effects, the effects included user specified text effect palette may be recommended or emphasized (e.g., listed first or with a notation) relative to effects not included in the user specified text effect palette.

At block 1376, a user interface (e.g., a keyboard) may be provided on the touch display via which the user may select (e.g., from a content library), submit or enter content (e.g., via a keyboard, by drawing on the display, via an upload). At block 1378, the content is displayed on the product image. Optionally, the content is incrementally displayed as the user types or draws the content.

At block 1380, a user is enabled to designate the selected content as a default content (e.g., the content the asset will be initially displayed in when displayed to an end user in an electronic catalog of products and/or of templates). For example, a "set as default control" (e.g., which may be labelled as "set as main" or otherwise) may be provided. At block 1382, in response to the user activation of the default control, the corresponding selected content is displayed in a content palette field. The content palette field is configured to display content designated by the user as to be made available to end users (or licensees) in customizing the template. The content designated as the default content may be highlighted (via position as the first content in the palette, via an icon, via a text notation, and/or via other technique) to distinguish the default content from other content in the content palette field.

At block 1384, a user interface is provided via which the user can add additional content to the content palette field (e.g., one content at a time to reduce the possibility of an inadvertent content selection, or multiple content at the same time to speed by the content selection). At block 1386, the additional content are displayed in the content palette field.

At block 1388, a user interface may be provided via which the user can specify that only that content included user specified asset content palette may be used by end users (or licensees) in customizing the content of the asset. The user may also specify that end users may utilize the content in the included user specified asset content palette but may also use other content. Optionally, if end users are permitted to use other content, the content included user specified asset content palette may be recommended or emphasized (e.g., listed first or with a notation) relative to content not included in the user specified asset content palette.

At block 1390, a user interface may be provided via which the user can specify that certain content properties may or may not be modified by an end user. For example, the user may specify that the content size, content orientation, content position (on the product), or content layering may or may not be modified.

At block 1392, a user interface may be provided via which the user can specify on what colors of the product the content (including associated permissions) is to be made available for to end users.

Ensuring that design elements are resistant to unauthorized uses is challenging. If end users are prohibited from any alteration of a design element and are only permitted to use the design element with respect to specified websites, applications, or products, then end users may be discouraged from using the source's design elements all together.

Thus, certain aspects of the foregoing disclosure relate to customization of physical items, such as clothing, and electronic, digital items (e.g., digital photographs, animations, gifs, videos, blogs, social network content, other design elements, and the like), using a computer aided design system and related to providing fine-grained control on the use and modification of design elements (e.g., logos, photographs, brand names, gifs, videos, etc.) with respect to customization.

For example, as similarly discussed elsewhere herein, systems and methods described herein may be utilized to enable users to utilize intellectual property (e.g., a design element, a brand name, and the like) of an owner/source in accordance with source-specified controls, while preventing or inhibiting the use of such intellectual property in a manner not acceptable to the source. For example, an intellectual property source may want to selectively prevent the use of its intellectual property in conjunction with certain content or types of content, such as profanity, derogatory text or images (e.g., photographs, videos, etc.), obscene or offensive imagery (e.g., photographs, videos, etc.), any text, any images, the brands or logos of third parties, certain colors, certain fonts, certain text effects, etc.

Thus, user interfaces and processes are provided via which a source (or someone acting on the source's behalf, which will also be referred to as the "source" unless the context indicates otherwise) can specify with respect to one or more design elements (logos, photographs, brand names, tag lines, characters, stickers, gifs, videos, and/or other items of intellectual property): size change restrictions (e.g., a maximum and/or a minimum height or width), color restrictions (e.g., restrict adding one or more specified colors to a design element), design element orientation restrictions (e.g., maximum and/or minimum rotation angle), restrictions with respect to changes to text content (e.g., prevent changes to one or more words in a text design element), design template height/width ratio restrictions, font usage restrictions, effect use restrictions (e.g., text curvature effects, 3D effects, etc.), restrictions with respect to changes to the subject matter of text content and/or the like.

By way of further example, a user interface may optionally be provided via which a user may specify that certain text and/or image notifications (e.g., copyright notices, trademark notices) or logos may not be removed and/or altered. By way of yet further example, user interfaces may optionally be provided that restricts changes to image resolutions, video resolutions, text resolutions, etc., where the resolution may be specified in pixels.

In addition, user interfaces may optionally be provided that enable a source to control the truncation or cropping of a design element. For example, a source may specify that a digital photograph (e.g., of a celebrity) may not be cropped. By way of yet further example, a source may specify that a video cannot be shortened or have a playback speed altered. Optionally, user interfaces may be provided that inhibit the combination of certain design elements with other design elements. For example, a user interface may optionally be provided that enables a source to specify that a design element cannot be modified to include an advertisement (e.g., where the design element is a video, the source may specify that the video is not be combined with a pre-roll, post-roll, interstitial, and/or overlay advertisement or other content).

By way of further example, user interfaces may optionally be provided that restrict or prevent the use of a source's design element in association with any or certain types of user provided or selected text content (e.g., obscene text, offensive text, derogatory text, mocking text, brand names of third parties, tag lines of third parties, political text, advertising text, etc.) and/or image content (e.g., obscene photograph and/or video images, offensive photograph and/or video images, derogatory photograph and/or video images, mocking photograph and/or video images, logos of third parties, photographic and/or video images of competitor products, political images, advertising images etc.). Thus, for example, the user interfaces may enable a source to control the type of content displayed as an overlay, as a frame, displayed adjacent to, displayed as an interstitial, or otherwise with respect to the source's design element. By way of further example, user interfaces may optionally be provided that restrict or prevent the user of a source's design element as decoration with respect to an item of content provided by or selected by the user.

User interfaces may optionally be provided that enable the source to limit the user of a design element to combining the design element with only certain specified text and images (e.g., those selected from a library of text and/or images, as similarly discussed elsewhere herein). User interfaces may optionally be provided that enable the source to limit the use of a source's design element with only text and images that relate to a specified subject matter (e.g., if the source's design element is a cat character from a cartoon, the source may specify that user's may only combine the cat design elements with images of cats). Thus, a source may generate whitelists of permitted text, images, text subject matter, and/or image subject matter for a given design element or set of design elements, where the design element or design elements in the set may only be combined with content or content types specified on the whitelists. Similarly, user interfaces may optionally be provided that enable a source to generate blacklists of prohibited text, images, text subject matter, and/or image subject matter for a given design element or set of design elements, where the design element or design elements in the set may not be combined with content or content types specified on the blacklists.

Further, user interfaces may optionally be provided that enable the source to specify via what channels (e.g., emails, SMS/MMS messages, etc.) and platforms (e.g., photo platforms, gif sharing platforms, microblog platforms, social networking platforms, and/or the like) may or may not be used to share a design element, a modified design element, and/or a design element combined with user-supplied or selected content. By way of illustration, the source may specify certain social network platforms or microblogs via which a design element may be shared, wherein the user is inhibited from sharing the design element via other social network platforms or microblogs.

Optionally, the source, via the user interfaces, may specify different restrictions (e.g., using restrictions described herein) and/or permissions (e.g., using permissions described herein) for different sharing channels and platforms. For example, the source may permit a design element with user-supplied text and images to be shared via a text message but not via a GIF sharing platform, but may permit the modified design element to be shared via the GIF sharing platform if the only modification is to the design element color and the design element is not combined with user supplied text or images.

Once the user has modified a design element or combined the design element with other content (e.g., using the interfaces described herein), the system may electronically inspect the result prior to enabling the user to share or utilize the design element as modified or combined to ensure compliance with any restrictions or limits.

For example, the system may access source-specified permissions, restrictions, and/or limits (which may be referred to as rules) and may utilize an internal image analysis engine or access a third party image analysis engine (e.g., GOOGLE SAFESEARCH detection system) via an API, to request that the design element (e.g., as modified or combined with other content) be analyzed. The result of the analysis may be compared to the rules, and if the comparison indicates that the rules are satisfied, the user may be enabled to share, download, and/or otherwise utilize the analyzed modified design element or combination.

By way of illustration, the system may generate an analysis query based on the accessed rules. For example, the request may ask for different feature detection types (e.g., spoof, medical, adult, violence, etc.) based on the rules. By way of illustration, if the rules prohibit combination of a design element with adult content but not other content, the query may ask of the presence of adult content to be analyzed, and not the presence of other content.

For each feature type specified in the query (e.g., spoof, medical, adult, violence, etc.), a likelihood value may be returned (e.g., "PRESENT", "NOT PRESENT"; "VERY UNLIKELY", "UNLIKELY", "POSSIBLE", "LIKELY", or "VERY LIKELY"; a numeric number from a number range (e.g., 1-5, 1-2, or other range), where the higher the number the more likely that the feature is present; a letter from a letter range (e.g., A-E) where "A" indicates very likely, "B" indicates likely, "C" indicates possible, "D" indicates unlikely, "E" indicates very unlikely; and/or using other values) by the analysis engine. The source may specify what action is to be taken for different likelihood values and/or action defaults may be specified by the system operation.

For example, optionally, if a value of "LIKELY", or "VERY LIKELY" is returned, the source may specify that the user is to be automatically inhibited from utilizing/ sharing the design element as modified or combined by the user. Optionally, if a value of "POSSIBLE is returned, an alert may be generated and transmitted to a designated person/destination so that a human can review the design element combination+/modification and determine if further action needs to be taken (e.g., interact with the user to discuss the modification/combination, or prohibit the user or sharing thereof). Optionally, if a value of "VERY UNLIKELY" or "UNLIKELY", is returned, the user is automatically (without needing human approval) permitted to use/share the design element as modified or combined in accordance with any sharing instructions.

Optionally, a user interface is provided via which the source can specify what action is to be taken for different types of content for different classifications. For example, a source may specify that images (being combined with a design element) identified as spoof, adult, or violent may not be used in combination with a design element, but that images classified as medical are acceptable. By way of further example, a user interface may optionally be provided via which the source can further specify that images that have been classified as likely or very likely to contain violence may not be used in combination with the design element, but that images that include spoofs are only to be prohibited from being combined with the design element if the images are classified as very likely to be spoofs.

Optionally, the analysis engine utilizes artificial intelligence and/or machine learning in performing the analysis. For example, optionally a deep neural network model trained to classify inappropriate content in design elements, such as images, may be used. The deep neural network may include an input layer, an output layer, and one or more levels of hidden layers between the input and output layers. The deep neural network may be configured as a feed forward network. Optionally, convolutional deep neural networks may be used to analyze images and audio content. The convolutional deep neural network may be configured with a shared-weights architecture and with translation invariance characteristics. The hidden layers may be configured as convolutional layers, pooling layers, fully connected layers and/or normalization layers. The convolutional deep neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Average pooling may utilize the average value from each of a cluster of neurons at the prior layer.

A separate text analysis engine may optionally be provided to analyze text being associated by an end user with a source's design element. For example, the text may be compared to a list of prohibited words provided or specified by the source, and if a match is detected, the user may be inhibited from utilizing the text with the design element. Optionally, neural network classifiers may be utilized to identify inappropriate or prohibited language (e.g., obscene language, racist language, sexist language, demeaning language, etc.). Optionally, sentiment analysis may be utilized to determine the attitude of the user text. By way of illustration, the sentiment analysis may determine the polarity of the user text (e.g., positive, negative, or neutral). Emotional states may also be determined, such as happy, sad, angry, frustrated, etc.

A user interface may optionally be provided that enables a source to specify the pixel dimensions of a given design element that may be accessed or downloaded by an end user. For example, the pixel dimensions may be specified to be small enough (e.g., between 1K and 500 pixels) to make the design element difficult to edit in certain ways without creating visual degradation and pixilation, but large enough to still be attractive enough and of high enough resolution to use. This technique may inhibit a user from downloading or copying a design element, and then modifying the design element using the user's own CAD system in an attempt to avoid the use and modification controls specified by the source.

Optionally, a control may be provided which, when activated by the source, inhibits including a color profile with certain design elements (e.g., a photograph), making it more difficult for an end user to download or copy the photograph for editing using the user's own CAD system, as unwanted shifts in colors and contrast may appear.

Optionally, a control may be provided which enables the source to override end user controls for copying a design element (e.g., where an end user may attempt to copy a design element by right clicking while pointing a cursor at the design element), making it more difficult for an end user to copy the design for editing using the user's own CAD system in an attempt to avoid the use and modification controls specified by the source. For example, a JavaScript may be associated with a design element that disables copying by inhibiting right clicking. The JavaScript may be downloaded and executed by a browser when the design element is accessed and displayed by the browser on the end user terminal.

Optionally, a control may be provided which, when activated, causes a no index tag to be associated with a design element so that search engines will be inhibited from indexing the design element. The use of such a tag makes it more difficult for users to locate the design element without accessing the CAD system, and may hence inhibit users from improperly accessing utilizing the design element.

Optionally, the system may provide a user interface via which the source can cause a watermark and/or copyright metadata to be embedded on the design element to facilitate tracking of the use of the design element on other sites by crawling websites and detecting the presence of the watermark. The watermark may be visible to the naked eye or non-visible to the naked eye, but detectable via computer analysis. Steganography may be used to embed the watermark in a hidden manner embedding watermark data covertly in noisy signals using robust spread-spectrum techniques (where the watermark is spread over many frequency bins so that the energy in one bin is very small and thus difficult to detect using human senses), quantization techniques, and/or amplitude modulation in the spatial domain. For example, an "invisible" watermark may be added by slightly changing pixel brightness and/or chrominance in a specified pattern, or by adding empty pixels at the edge of the design element image or distributed at predetermined locations on the design element. If the design element comprises audio data (e.g., a video with an audio track, or a standalone audio track), a "sound" watermark may be added that includes an identifier inaudible, or audibly indistinguishable from the base sound. For example, the audio identifier may be added within an audible frequency domain via a spread-spectrum process.

The system may then crawl websites to detect use of the design element, and automatically analyze, using the analysis engine(s) disclosed herein, the design element to detect if it has been modified with or associated with content that violates the source's rules.

For example, as similarly discussed above, an analysis query may be generated based on the source's rules. The request may ask for different feature detection types (e.g., spoof, medical, adult, violence, etc.) based on the rules. For each feature type, a likelihood value may be returned (e.g., "VERY UNLIKELY", "UNLIKELY", "POSSIBLE", "LIKELY", or "VERY LIKELY"). The analysis engine may then return one or more flags (e.g., classification values) indicating how likely the modification or combination with other content violates the rules. Based on the classification values, one or more actions may be taken (e.g., generation of notifications, remediation actions, etc.). As discussed elsewhere herein, the actions to be taken may have been specified by the source via a user interface.

By way of illustration, if a value of "LIKELY", or "VERY LIKELY" is returned with respect to a type of prohibited content, a first type of alert may be generated and transmitted to a designated person/destination so that action can be taken to have the design element and/or associated content removed from the offending website. Optionally, if a value of "POSSIBLE is returned, a second type of alert may be generated and transmitted to a designated person/destination so that a human can review the design element usage/modification and determine if further action needs to be taken. Optionally, if a value of "VERY UNLIKELY" or "UNLIKELY", is returned, no further action is taken.

Optionally, a user interface is provided via which the source can specify what action is to be taken with respect to design elements located on different sites. The user can specify different types of actions for different types of content (e.g., images, text, audio) used in conjunction with a design element and for different classifications. For example, a source may specify that images identified as spoofs, adult, or violent are not acceptable, but the images classified as medical are acceptable. The source can further specify that remediation action is to be taken for images that have been classified a likely or very likely to contain violence, but that remediation action only needs to be taken for spoofs if the images are classified as very likely to be spoofs.

Figure 22:
FIG. 22 illustrates an example analytics dashboard.

Optionally, the data collected by crawling sites and platforms and identifying the presence of design elements may be utilized in generating and reporting analytics that indicate where the design elements are used, how they are used, how they are interacted with, how they are modified, with what content they are combined with, and the like. For example, FIG. 22 illustrates an example analytics dashboard including textual and graph-based analytics that may be generated using gathered data related to user interactions with design elements and the customization of items, such as discussed herein.

The example analytics dashboard may include a "top sellers" control, that when activated, causes the dashboard to be rendered and populated so as to identify those design elements that are determined to be the top sellers (e.g., top 3, 5, 8, or 10 most sold). Optionally, a control may be provided that enables a user to navigate to sales information for each design element rather than just the top sellers. The identification of the most sold design elements may include a display of the corresponding design elements and the number of times the design element was purchased within a specified period of time (e.g., the current day, the past week, the past month, or from the inception of recording such purchases). Similarly, the example analytics dashboard may include a "top selected" control, that when activated, causes the dashboard to be populated so as to identify those design elements that are determined to be most selected by users (e.g., top 3, 5, 8, or 10 most selected for use as described elsewhere herein). The identification of the most selected design elements may include a display of the corresponding design elements and the number of times the design element was selected within a specified period of time (e.g., the current day, the past week, the past month, or from the inception of recording such selection).

The example analytics dashboard may include a "popular combinations" interface that indicates, for a given design element, the design elements the given design element was most often paired/combined with. The popular combinations interface may display a first design element in a first area, and display in a second area design elements most commonly combined with the first design element (e.g., the top 3, 5, 8, 10, or other number). The second area may include the combined design elements, the name of the combined design elements, the number of times the combined design element was paired with the first design element (optionally within a specified period of time, such as the current day, the past week, month, year, or otherwise), and the percentage of times the combined design element was paired with the first design element. As a default, the top selling or most selected design element in a specified period of time may be selected as the first design element. The interface may enable the user to swap with first design element with a second design element (e.g., by scrolling through design elements using a swipe motion, by dragging a design element to the first area from a menu of design elements, or otherwise). If the user replaces the first design element with a second design element, the second area may be dynamically updated in real time to display the design elements the second design element was most often combined with.

The example analytics dashboard may include a "common combinations" interface that indicates the most common combinations of design elements (optionally within a specified period of time, such as the current day, the past week, month, year, or otherwise). The interface may report the number of times the combination was made and/or used and the percentage of times the paired/combined design elements were made and/or used.

The frequency of placement of a design element for different locations may be reported for a given item or item type (e.g., t-shirt, backpack, hoodie, etc.). The report may be limited to a specific time frame. A control may be provided that enables the user to select the item type. Optionally, a heat map may be generated and rendered that indicates, using colors and shapes, the frequency a given area on the item has a design element located thereon, thereby providing a visualization of the comparative popularity of locations. For example, the color red may be used to indicate a location that is very frequently has design elements positioned thereon (e.g., greater than a first threshold number of times), the color yellow may be used to indicate a location that somewhat frequently has design elements positioned thereon (e.g., between a second threshold number of times and the first threshold number of times), the color green may be used to indicate a location that occasionally has design elements positioned thereon, the color green may be used to indicate a location that infrequently has design elements positioned thereon, and the color white may be used to indicate locations that no design elements have been positioned thereon. A garment filter drop down menu may be provided. The garment filter may be used to determine which area of a garment is most used in the design process.

A conversion funnel graph may be generated and rendered that indicates the percentage of users that enter a corresponding online store, the percentage of users that change templates, the percentage of users that swap out images in templates, the percentages of users that save their template modifications, the percentages of users that enter a checkout process, and the percentages of users that purchase items after entering the checkout process. The graph may visualize and reveal bottlenecks in the process of customizing and purchasing items.

A graph may be generated and rendered that indicates the popularity of colors for a given item or item type. For example, the graph may include arcs of a circle, wherein a given arc may be rendered using a corresponding item color. The width and/or length of the arc may indicate the relative popularity by sales or the absolute number of sales of the item in the corresponding color. In addition, a text report may be provided stating the color name, the percentage of sales in the corresponding color and/or the actual number of sales in the corresponding color (optionally provided in association with an icon in the corresponding color).

A time of day interface (titled "Day vs Night") may be generated and rendered that indicates the number of sales of a given item or item type by time of day. The interface may include a graph that has the hours of the day on one axis (e.g., the x axis), and the number of sales on another axis (e.g., the y axis), thereby providing a visualization of the comparative sales at different times of day. In addition, a textual report may be provided indicating revenue for given time periods (e.g., an average of revenue during daylight hours, an average of revenue during nighttime hours), and percentage changes in revenue.

User interfaces disclosed herein may report tracked, collected, and/or analyzed data in a meaningful, efficient, clear manner. Color may be utilized to help identify associated data. Certain user interfaces enable a user to select a given template/content asset and have relevant data presented. For example, certain user interfaces enables a user to choose an asset and compare the utilization and sales data for the asset to specified other assets or to all assets in a given online catalog. Interfaces may be provided that enable a user to filtered the displayed data by day, month, year, or by a specified start/end data. Determined and displayed data may include, by way of example, gross sales (of items using respective content assets), total item sales (of items using respective content assets), average order amounts (of items using respective content assets), incoming royalties for a given content asset licensed out, and cross-licenses for content assets of third parties.

The foregoing data may enable a user to determine which assets pair best or worst with which other assets, detect trends and asset popularity, determine what characters or other assets people like to see paired, and/or the like. Such information may be used, by way of illustrative example, to determine what actors should be used in a given movie or television show, what content assets should be used in advertisements, toys, or otherwise.

Figure 23A:
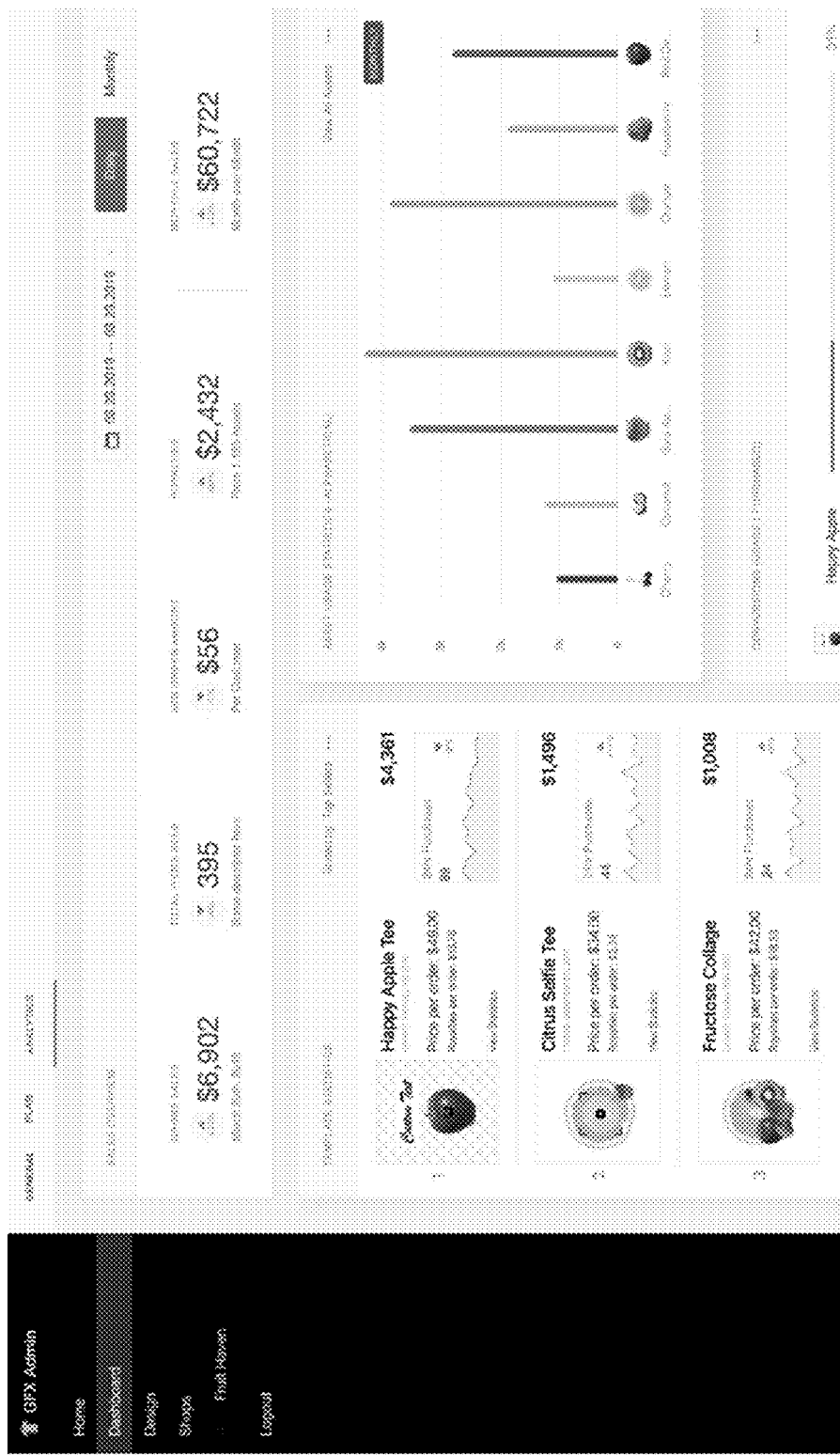
FIGS. 23A-23C illustrate additional example analytics interfaces.

FIG. 23A illustrates another example analytics dashboard which efficiently renders and represents data monitored and processed as discussed herein. In this example, there is a transaction overview pane/area, a template statistics pane/area, an asset usage pane/area, and a conversion usage pane/area. The data presented therein may optionally be updated in real time as new data is received from one or more networked data sources. For example, the data may be based on data accessed from online or offline point of sale terminals, transaction databases, third party transaction database for sales made via third party websites and applications, and/or otherwise.

In this example, the transaction overview pane/area reports gross sales of products/items (sometimes referred to as simply products or items) with content assets (e.g., templates that include images and/or text as discussed herein), total items sold, average order amount (e.g., per customer), royalties received for licensed assets (being used by a third party on products or services), royalties paid, and monthly sales. Optionally, the user may be able to specify the time frame for a given set of data. For example, the user may be able to specify that the data should be reported for a particular day, a particular month, a particular year, particular start and end dates, or otherwise. In the illustrated example, a "daily" control is provided, which when activated causes the data to be reported for the current day. A "monthly" control is provided, which when activated causes the data to be reported for the current month. A calendar interface is provided that enables the user to specify a start month/day and end month/day which causes the data to be reported for the specified start month/day and end month/day.

The transaction overview pane/area may be configured to report a change (e.g., percentage change and/or absolute change in number) in gross sales, total items sold, average order amount, royalties, monthly sales, and/or daily sales. from one period to another period (e.g., day over day, month over month, year over year, from a corresponding time period in the previous year, and/or the like). Optionally, a user interface may be provided enabling a user to specify what "change over period" is to be calculated and/or reported.

The template statistics pane/area may report statistics for a set of content assets. For example, the set of content assets may include the top and/or bottom three content assets (or other number of content assets) as measured by items sold with a given content asset, the top and/or bottom three content assets (or other number of content assets) as measured by the number of times the content asset was used on a representation of an item during a consumer item customization/specification process (whether or not the item was purchased), the top and/or bottom three content assets (or other number of content assets) as measured by the increase/decrease in the number and/or percentage of items with the content asset sold as compared to a specified earlier time period, the top and/or bottom three content assets (or other number of content assets) as measured by the increase/decrease in the number and/or percentage of number of applications of the content asset on a representation of an item during a consumer item specification process (whether or not the item was purchased), and/or the like.

In addition, for each listed content asset, some or all of the following may be generated and rendered for display: a sales ranking of the content asset (e.g., as measured by the dollar value of items sold that have the content asset printed/embroidered thereon), a representation of the content asset (e.g., a thumbnail of the asset or a frame or other portion of a content asset, in a default color specified for the content asset), a name of the content asset, a total price per order of items that use the content asset, the portion of the total price that corresponds to a royalty for the use of the content asset for a given order, the total currency (e.g., dollar value) of orders of items with the content asset for a specified time period, the number of purchases of items using the content asset for a specified time period or other time period (e.g., the last 24 hours), a graph graphically showing sales of items with the content asset over a specified time period (e.g., the last 24 hours), and/or the percentage change in sales of the items using the content asset over a specified period of time.

The example asset usage pane/area may graphically depict (e.g., via a bar chart, a pie chart, or other graph-type) usage numbers for one or more content assets over a specified time period (e.g., the last 24 hours, the current month, the last month, etc.). In the illustrated example, each graph bar is rendered in association with a rendering of the associated content asset, in the default color of the content asset. This advantageously makes it easy for a user to understand the data being presented, and ensures that a user will not erroneously associate a graph bar with the wrong content asset. The graph may be rendered for a selected set of content assets, such as one or more of the sets described above, for all currently available content assets, or for currently available and historically available (but no longer available) content assets.

The conversion usage pane/area depicts, via a bar graph and via text, the percentage of content assets that were used during a consumer design process (where the content asset was applied on a representation of an item during a consumer item specification/customization process) where the item was then purchased with the content asset applied thereon (e.g., printed or embroidered thereon). The conversion data may be displayed in association with a depiction of the content asset. Optionally, the depiction of the content asset and the bar graph may be rendered in the default color of the content asset.

Figure 23B:
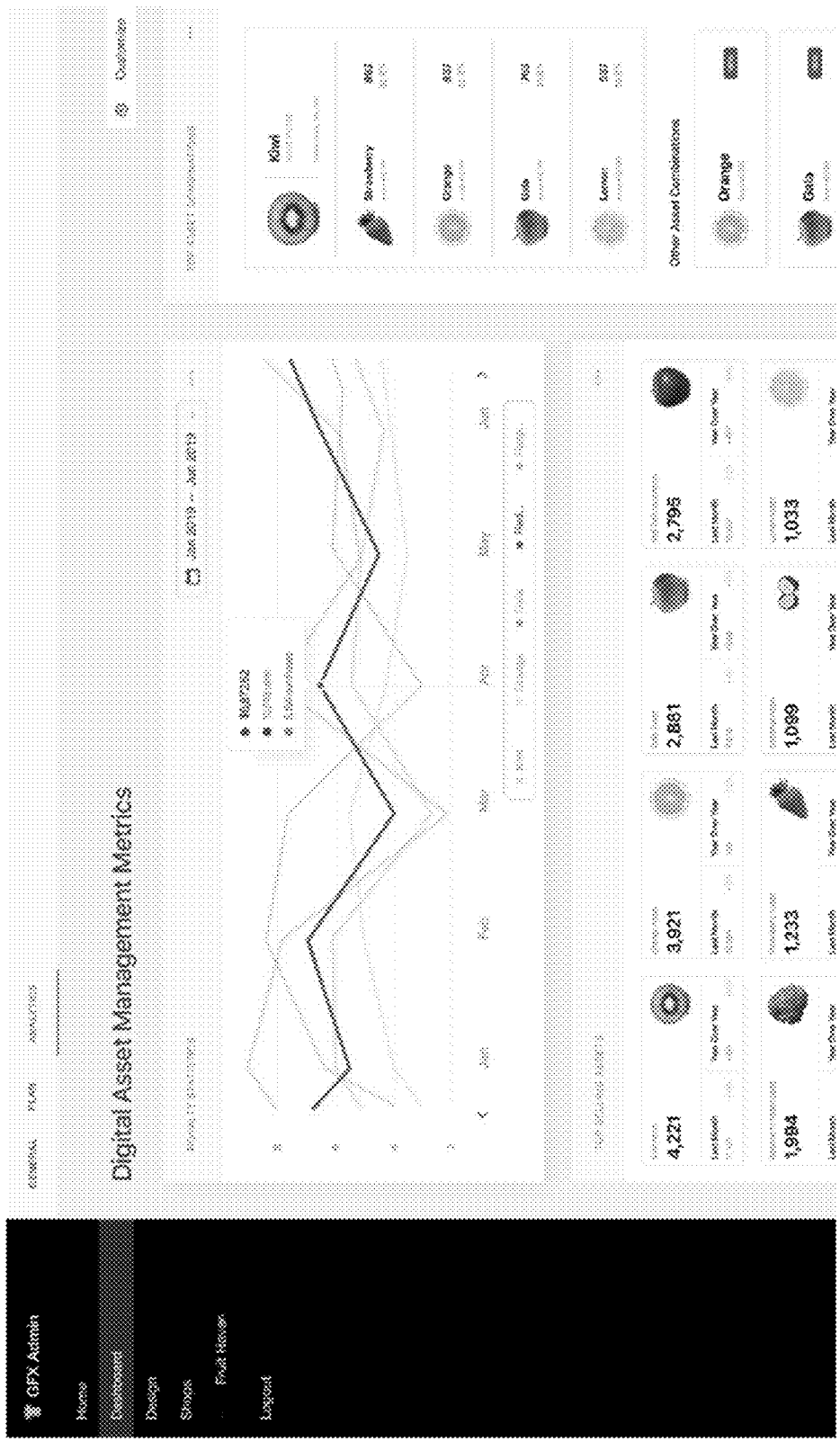

FIG. 23B illustrates an example digital assert management metrics interface via which a user can sort and view: the popularity of certain content assets (via uses and sales of the content assets and/or items that utilize the content assets), royalty statistics for content assets, the number of times content assets were used, and/or top content asset combinations.

In particular, a royalty statistics graph is generated and rendered that graphically depicts for content assets the number of uses (whether or not there was a purchase), number of purchases, and/or dollar value of purchases over a default or user specified time period. The graph line may be rendered in the same/default color as the corresponding content asset. As similarly noted above, this advantageously makes it easy for a user to understand the data being presented, and ensures that a user will not erroneously associate a graph line with the wrong content asset. Scroll controls may be provided that enables the user to scroll through different time periods, with the graph lines dynamically rendered accordingly. In addition to providing the foregoing information graphically, the information may be presented textually.

A top selling assets pane/area is generated and rendered that shows the top number of selling assets (where the term "selling" may mean the sale of a copy of the content asset itself or of an item (e.g., a t-shirt) that utilizes the content asset (e.g., has the content asset reproduced thereon)). The number of content assets depicted may be based on a threshold, such as a user-specified or default threshold (e.g., top 3, 5, 8, or 10 best-selling assets). In addition, some all of the following data may be generated and depicted in association with the corresponding content asset: the name of the content asset, the quantity of the content asset sold in a current period (e.g., the current month), the quantity of the content asset sold in an immediately previous period (e.g., the previous month), the percentage change in sales from the immediately previous period, the quantity change in sales from the immediately previous period, the percentage change in sales relative to the same period one year prior (year over year change percentage change in sales), and/or the quantity change in sales relative the one year prior (year over year change in sales).

Optionally, sort and filter controls are provided that enables the user to command the user interface and system to rank and display the content assets by top selling, most profitable, most popular, fasted increasing sales, or fasted decreasing sales. The user interface will then render the corresponding data accordingly.

A top asset combination pane/area may be generated and rendered that shows the top content assets as measured by the number of times the given content asset was combined with at least one other content asset. The number of content assets depicted may be based on a threshold, such as a user-specified or default threshold (e.g., top 1, 3, 5, 8, or 10 best-selling assets). Optionally, the top-ranked asset may be selected based in part on a time period specified by the user. For a given top-ranked asset entry, the following may be depicted: the top-ranked content asset itself, the top-ranked content asset name, the top-ranked content asset ranking (out of the number of total content assets being ranked), and the content assets combined with the top-ranked content asset. For each of the content assets combined with the top-ranked content asset, some all of the following information may be provided: a depiction of the combined content asset, the sales ranking of the content asset, the number of times the content asset was combined with the top-ranked content asset, the content asset combination percentage with respect to the top-ranked asset. Optionally, with respect to a given top-ranked asset, the display of the content assets combined with the top-ranked content asset may be generated in response to activation of a view control, and may be hidden in response to a hide control. This technique ensures that the viewer may easily access and view the most relevant data or the data of most interest.

Figure 23C:
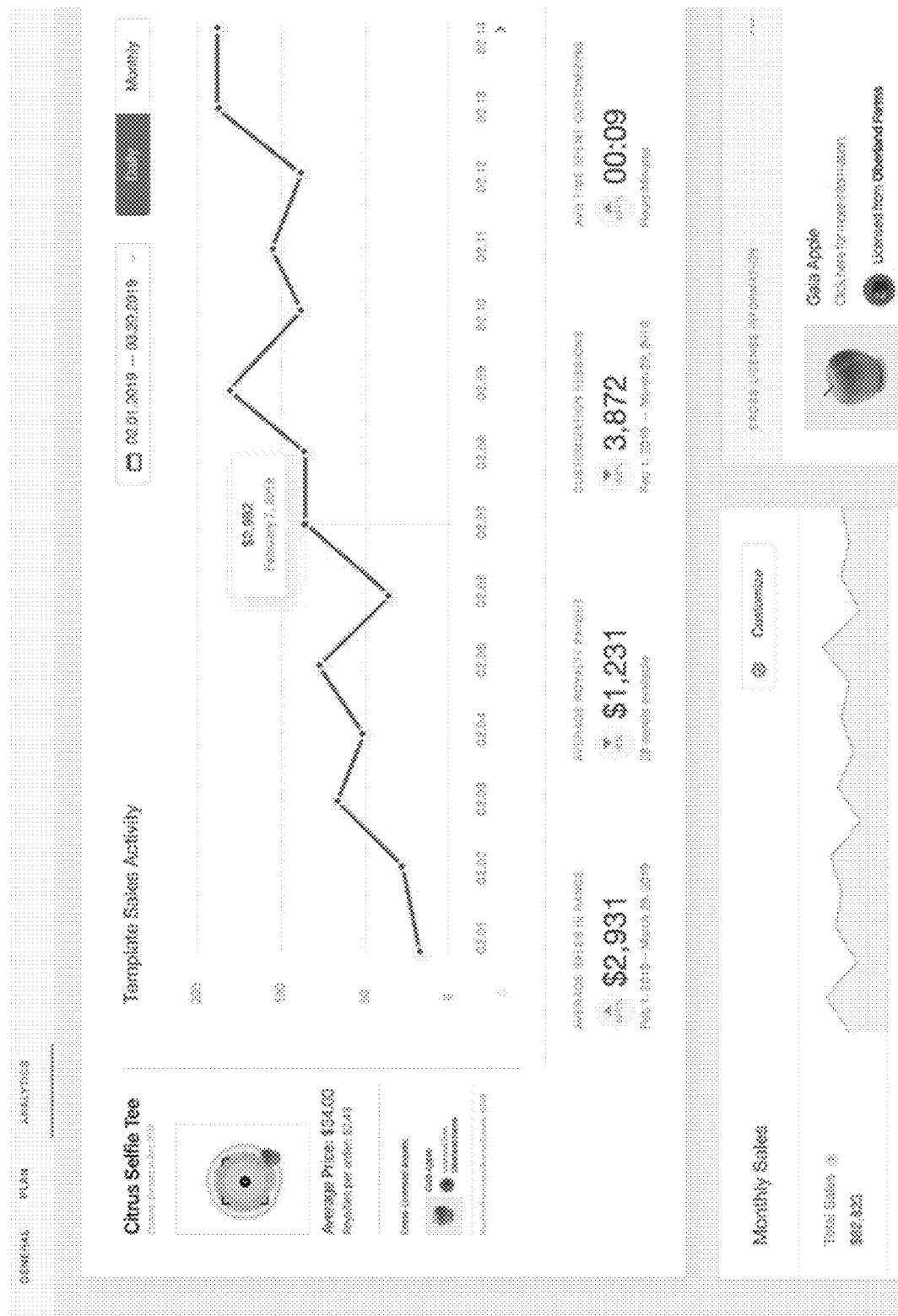

FIG. 23C illustrates an example template sales user interface that renders and depicts sales activity data for a given template/content asset. In this example, the user interface depicts the content asset, the content asset name, the average price of a sale of the content asset and/or an item having the content asset depicted/printed thereon, the amount of royalties paid for use/sale of the content asset, and/or a depiction of cross-licensed content assets (including the name of the cross-licensed content assets, and the name/identifier of the licensor of the cross-licensed content assets). A template sales activity graph is depicted that graphically depicts the template/content asset sales (e.g., in terms of dollar value and/or number of sales) over a default time period or user specified time period. In the illustrated example, a daily control is provided, which when activated causes the data to be reported for the current day. A monthly control is provided, which when activated causes the data to be reported for the current month. A calendar interface is provided that enables the user to specify a start month/day and end month/day which causes the data to be reported for the specified start month/day and end month/day.

In addition, the template sales activity user interface may present, for a specified time range, the average sales and a percentage change in sales from a corresponding previous time period for the content asset (e.g., month over month, year over year, etc.). In addition, the average royalty payout may be determined, generated and displayed for a given time period, a percentage change in royalty payout from a corresponding previous time period, and the number of content assets available. Still further, the number of user item customization sessions using the content asset, and a percentage change in user item customization sessions using the content asset from a corresponding previous time period for the content asset, may be reported for a specified time range. In addition, the average time spent by users in item customization sessions may be determined and reported, and a percentage change in the average time spent by users in item customization sessions may be determined and reported for a specified time range.

A monthly sales graph may be generated and rendered showing the monthly sales of items using the content asset. In addition, the total sales may be reported. A cross-license area may depict cross-licensed content assets (including the name of the cross-licensed content assets, and the name/identifier of the licensor of the cross-licensed content assets).

As noted above, optionally, the user interfaces and functionality described herein may be made available via a third party website/webpage using an IFrame (Inline Frame). The embedded user interfaces may be surrounded on one or more sides by other content, such as branding and/or other content of one or more third parties.

Figure 24A:
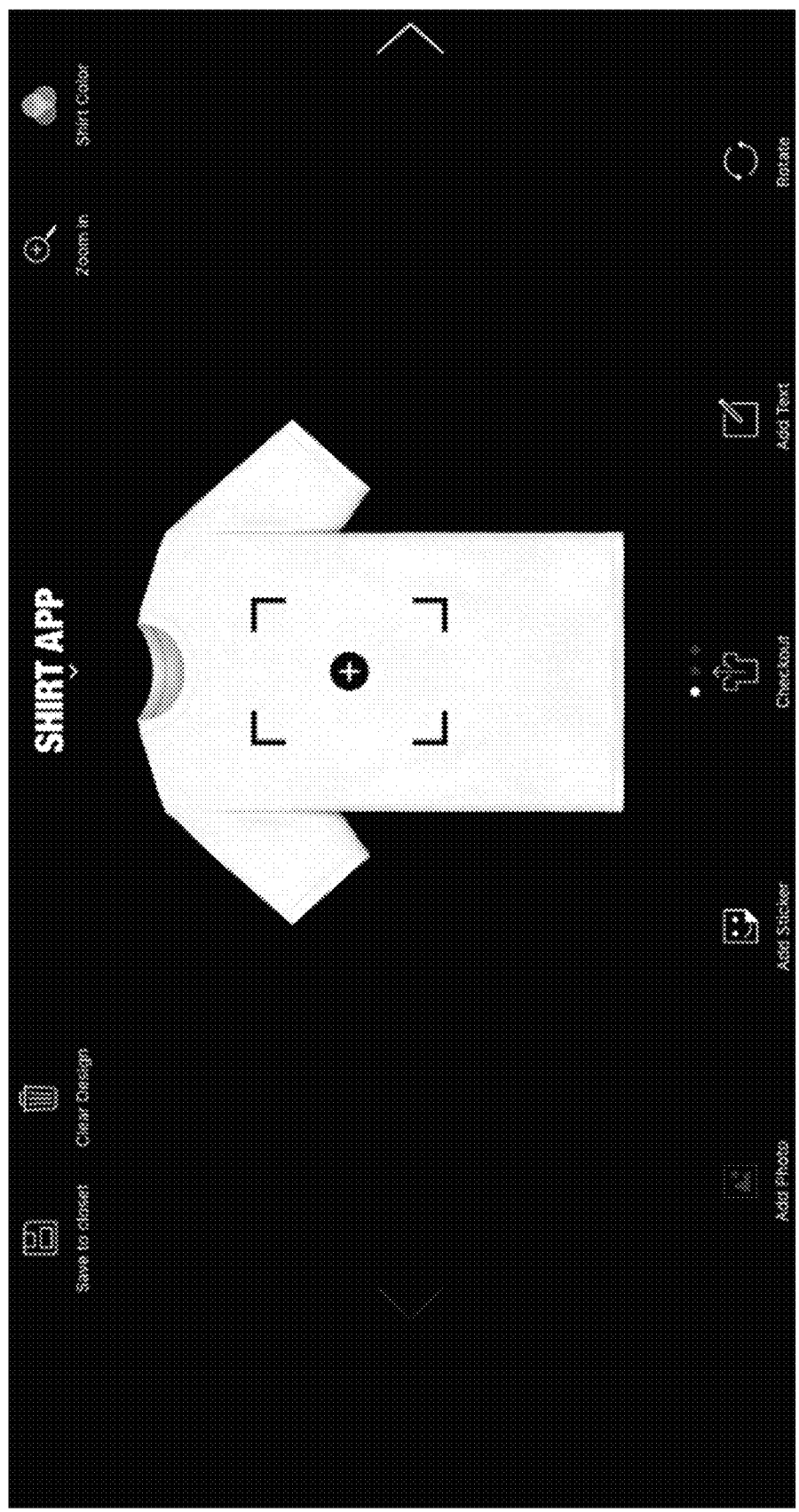

FIG. 24A illustrates another example template maker user interface that may be utilized to define slots and add a content asset (e.g., a photograph, a sticker, text, etc.) via respective controls to an item (a t-shirt in this example) slot. The slots may be configured to receive text and/or images. The slots may be configured as "customizable" or "swappable." For example, if a slot has been designated as swappable, a user may be enabled to select a content asset from a set of content assets (a palette of content assets) to be added to the swappable slot. A customizable slot may enable a user to add a user provided or generated content asset (e.g., text or image) to the slot. As discussed elsewhere herein, an interface may be provided that enables an authorized user (e.g., an administrator) to specify what type user-generated text and images may be added to a given customizable slot, and which slots are swappable and/or customizable. Controls are provided to save the template to a file or electronic closet, to clear/reset the item to remove all the user-added content assets, to zoom in or out on the item and/or added assets, and to change the item color.

Figure 24B:
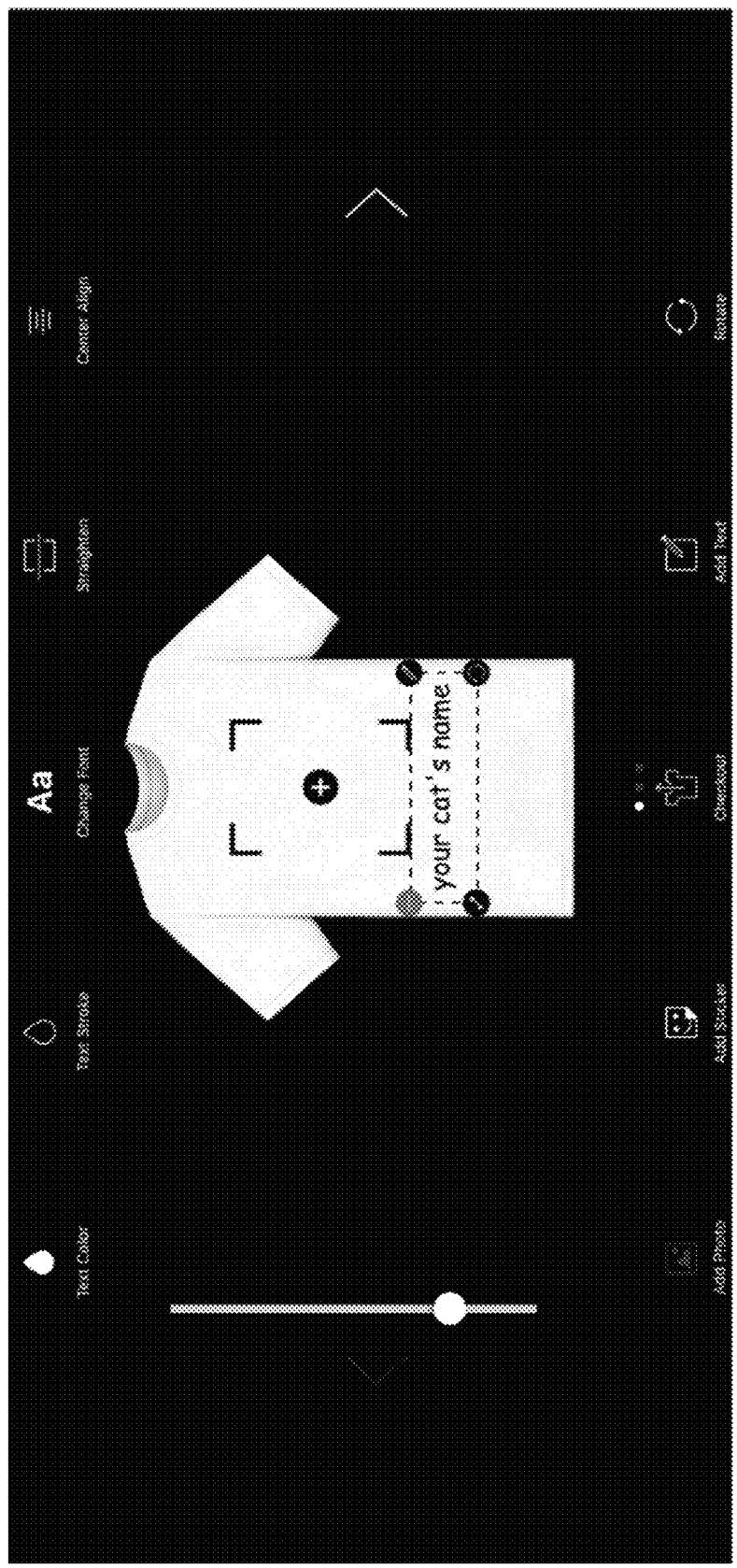

FIG. 24B illustrates the template user interface of FIG. 24A with an added content asset (the text "your cat's name"). Text editing controls are automatically rendered in response to the user activating the add text control. The text editing controls may include a slider control which may be used to increase or decrease the text font size. A text color control is provided that enables the user to select and apply a desired color from a color palette to the text. A font change control is provided that, when activated, causes a palette of fonts to be presented from which the user can select. The text will then be rendered in the selected font.

Figure 24C:
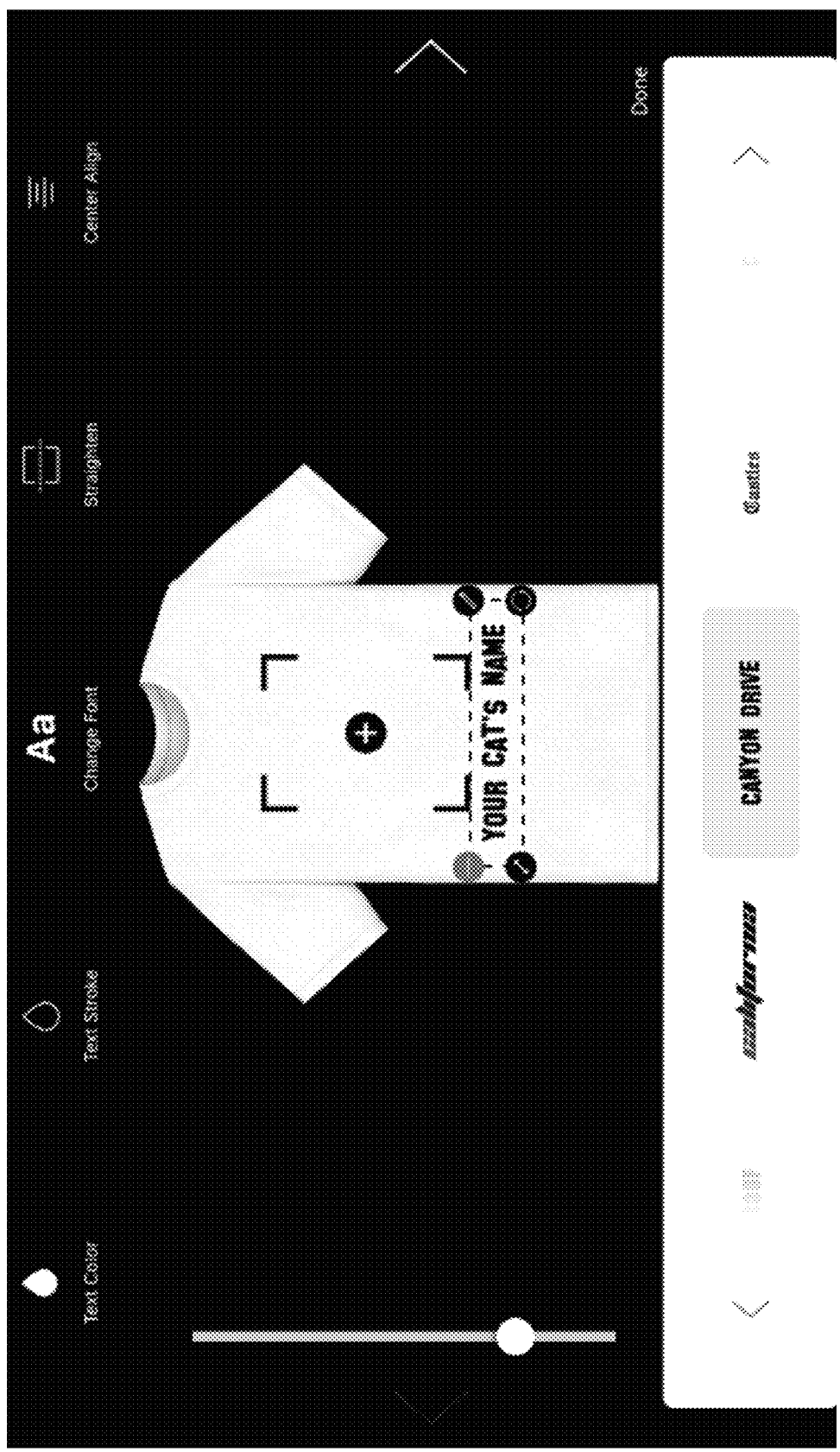

In response to the user selecting the change font control illustrated in FIG. 24B, the example scrollable font palette is presented, as illustrated in FIG. 24C. In response to the user selecting a font, the text will be re-rendered in the selected font.

Figure 24D:
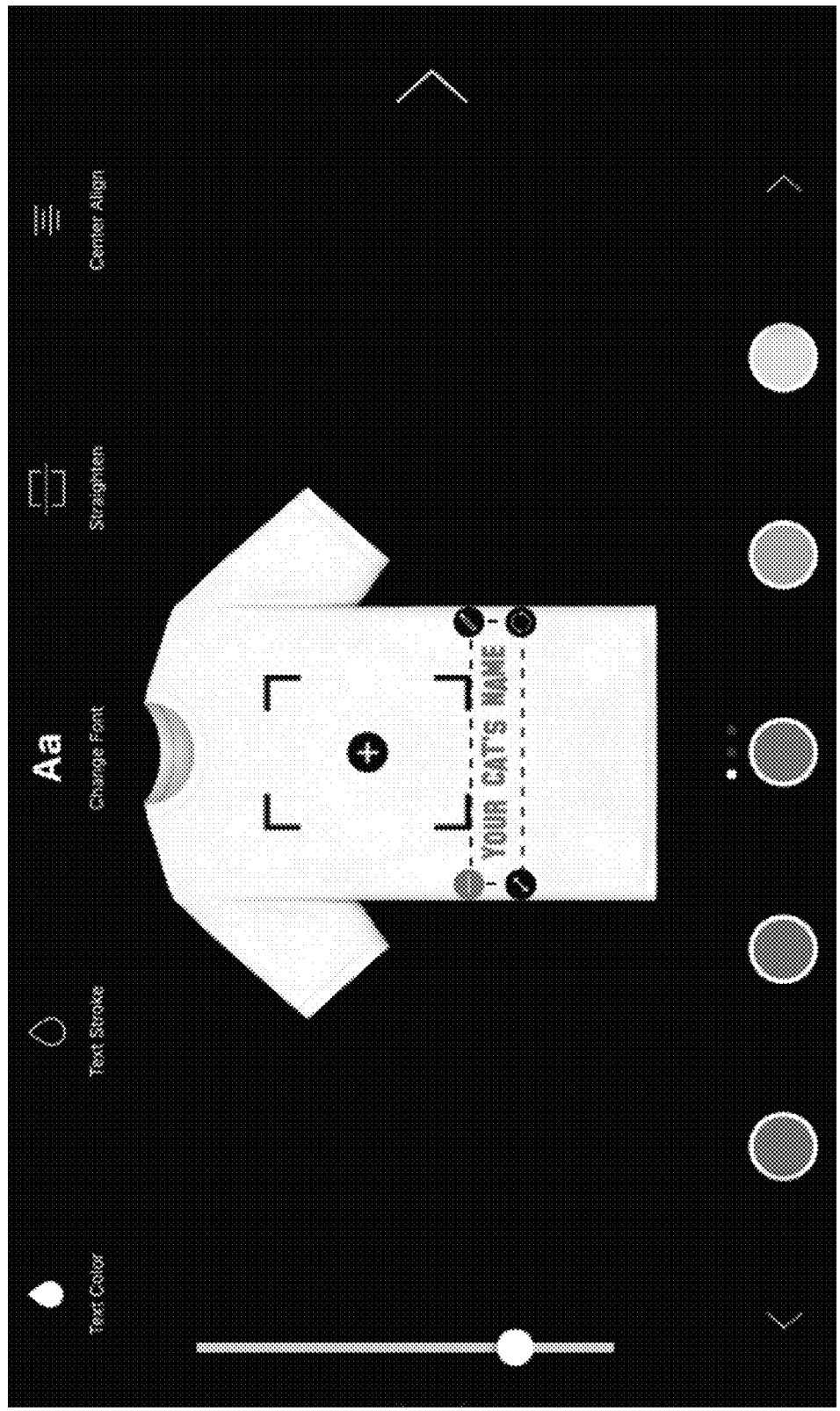

In response to the user selecting a text color fill control, the example scrollable color palette is presented, as illustrated in FIG. 24D. In response to the user selecting a color, the text fill will be re-rendered in the selected color.

Figure 24E:
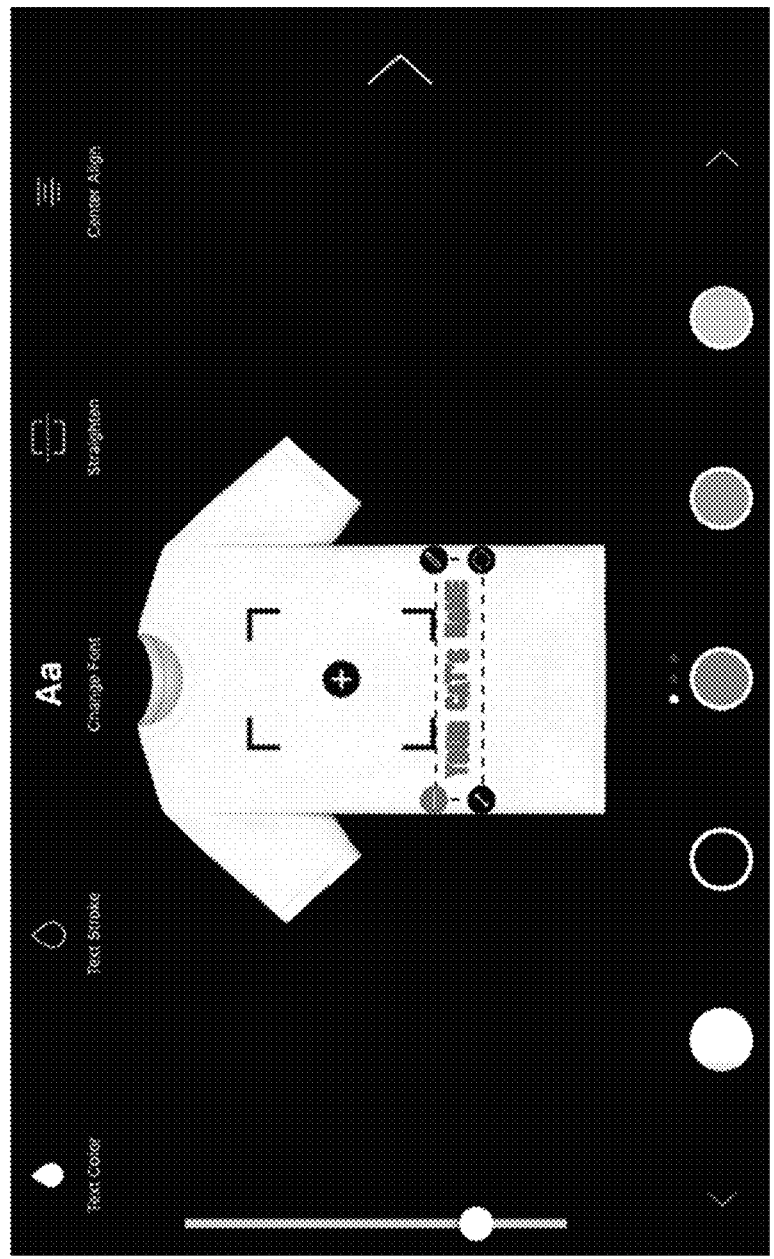

In response to the user selecting a text color stroke/outline control, an example scrollable color palette is presented, as illustrated in FIG. 24E. In response to the user selecting a color, the text stroke will be re-rendered in the selected color.

Figure 24F:
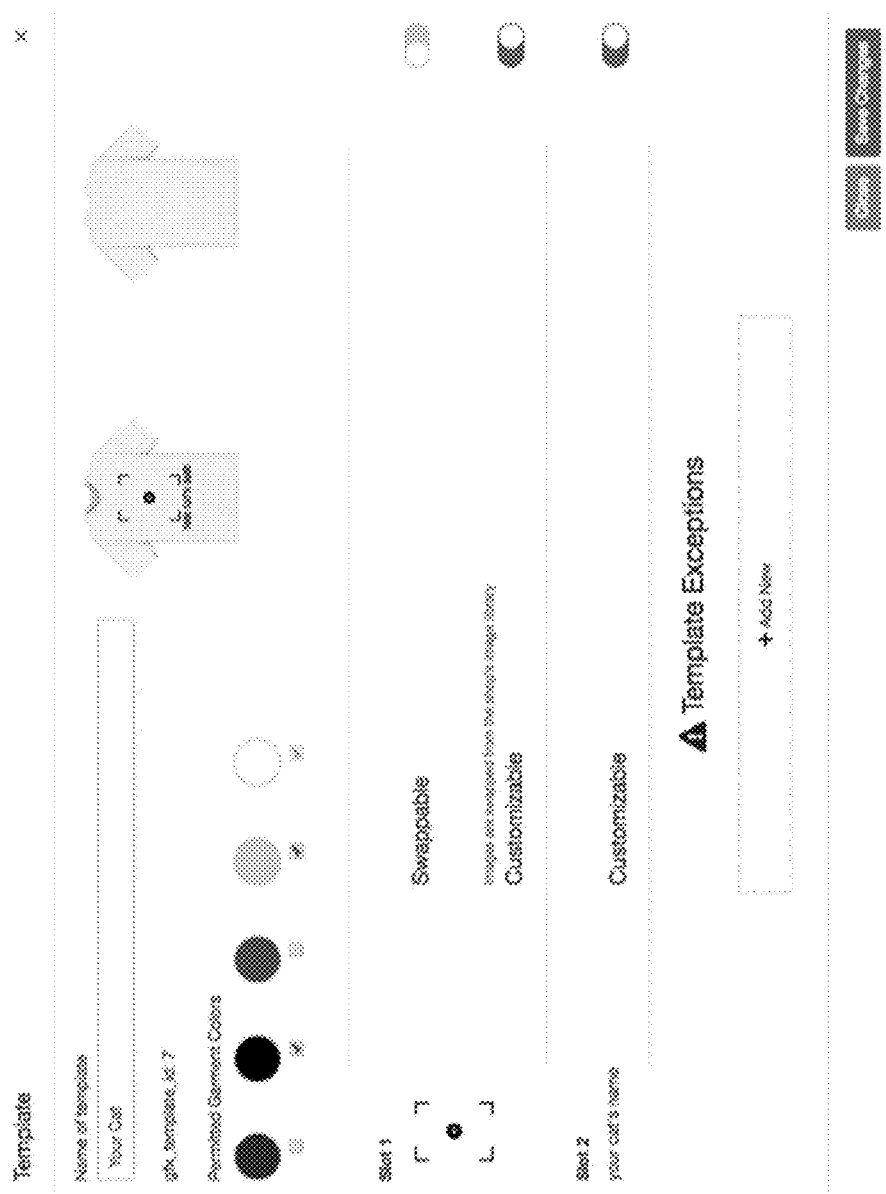

The user interface illustrated in FIG. 24F renders the template as customized using the interfaces illustrated in FIG. 24A-E, including any customizable or swappable slots as discussed elsewhere herein. The user interface includes a template name field via which the user can enter a template name. A permitted garment color menu is provided via which the user can specify in which colors the item is to be made available in. The slots added via the prior user interfaces may be rendered with the current assets assigned to the slots. In this example, there is a representation of slot 1 (with the added image) and a representation of slot 2 (with the added text). A swappable control is optionally provided which enables the image in slot 1 to be swapped with images in an image palette (e.g., a library of images associated with an online store). A swappable control is optionally provided which enables the text in slot 2 to be swapped with text in an text palette. A template exception control is provided via which the user can add template exceptions as similarly discussed elsewhere herein.

Figure 24G:
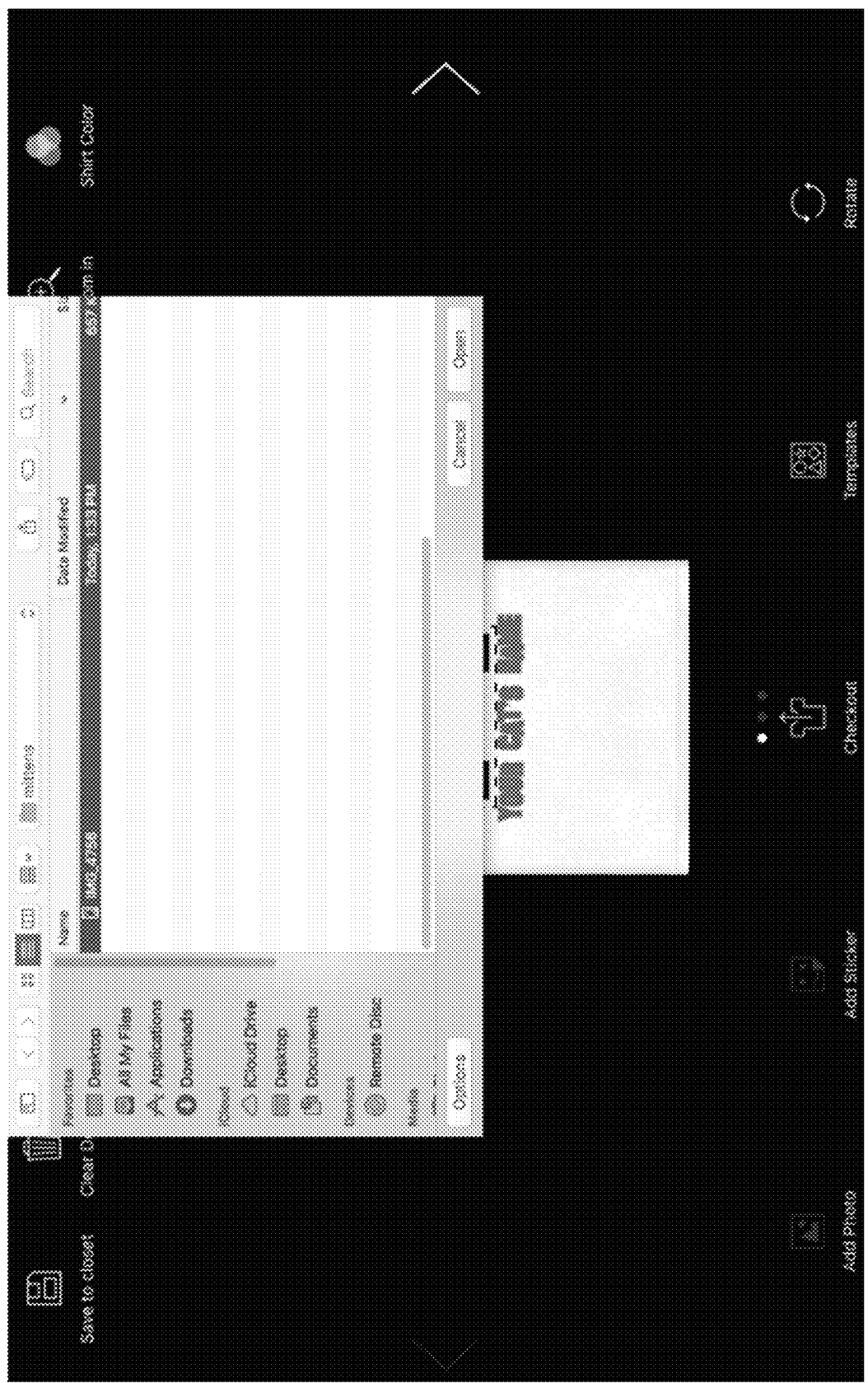
Figure 24H:
Figure 241:
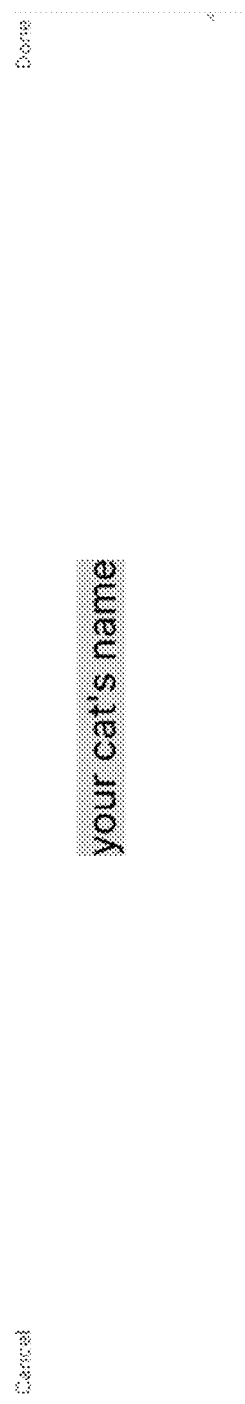

FIG. 24G illustrates an image picker user interface which may be displayed in response the user selecting/clicking on a custom image slot within the template. The picker user interface accesses and displays the names and/or thumbnails image files stored in a selected directory or memory device. The user may select an image, which will then be rendered in the corresponding slot, as illustrated in FIG. 24H.

Figure 24K:

FIG. 24I illustrates an example text edit user interface which may be displayed in response the user selecting/clicking on a custom text slot within the template. The text edit user interface accesses and displays any text already entered into the custom text slot (e.g., default text or previously entered user text). The user may, for example, delete one or more characters (including whole words and phrases) and/or add one more characters (including whole words and phrases). Optionally, the illustrated text edit user interface does not enable the user (or provide controls to the user) for the changing of the original/current font, fill color, or stroke color. In the example text edit user interface illustrated in FIG. 24J, the user has replaced the default text ("your cat's name") with new text ("mittens"). When the user has completed the text edits, the user may activate a "done" control or the like, and the edits will be accordingly be saved in memory. The example user interface illustrated in FIG. 24K may then be presented, which includes the item with any image and/or text edits (e.g., image or text replacements) made using the interfaces discussed above, appearing in the corresponding custom slots.

FIG. 14A illustrates an example content analysis process that may be used to determine whether design element modifications or combinations of the design element with other content violates one or more specified usage controls. The process may be utilized to control the electronic sharing and/or printing of the design element.

At block 1402, the process enables a user to access and select a design source. For example, a user interface presenting a library of design elements may be presented to a user via a user terminal (e.g., via a dedicated application, a webpage accessed via a browser, or otherwise), as similarly discussed elsewhere herein.

At block 1404, design element usage rules are accessed from a source rules database. Examples of rules are discussed elsewhere herein. By way of not limiting example, the design rules may specify what type of content the design element may be utilized with. By way of illustration, the rules may specify that the design element may only be combined with certain types of content and/or that the design element may not be combined with certain types of content (e.g., spoof, medical, adult, violent, political, racial, third party brand names, third party logos, images of competitor products, images of specified subjects or characters, etc.). The rules may optionally specify how a given type of content may be utilized in combination with a design element. For example, a rule may specify that text may be added one side of the design element, but not as an overlay over the design element. By way of further example, a rule may specify that a design element may not be used to frame and/or overlay other content.

The rules may also optionally specify sharing controls. For example, the rules may specify what channels and platforms may or may not be used to share a design element, a modified design element, and/or a design element combined with user-supplied or selected content. Examples of sharing channels may include email, short messaging service (e.g., SMS/MMS), instant messaging, chat systems, etc. Examples of sharing platforms may include photo sharing platforms, gif sharing platforms, microblog platforms, social networking platforms, and/or the like. Some or all of the rules may be textually and/or graphically displayed to the user so that the user may view the controls and restrictions associated with the selected design element.

At block 1406, a user interface may optionally be provided via which the user can specify one or more platforms or channels that the user wants to use in sharing the design element. The process receives the user sharing specification.

At block 1408, the system receives user design element modifications and/or associations with other content (e.g., text, image, and/or audio content). For example, the modifications and/or associations with other content may be received using example user interfaces described herein, and may, by way of example, include changing design element colors, orientation, size, fonts, effects, and the like. The associations may include positioning text or images (still image or video images) on a side of the design element, as an overlay on the design element, as a design element frame, as a morphing with the design element, and/or the like. The associations may also include associating an audio track with a design element.

At block 1410, the process generates an analysis query based on the source rules and optionally based on the user sharing specification (e.g., as different rules may apply based on the user sharing specification). As similarly discussed elsewhere herein, the analysis query may be configured to request detection of content or content subject matter whose use is prohibited by the source rules (e.g., obscene images and/or text, offensive images and/or text, derogatory images and/or text, mocking images and/or text, logos of third parties, images and/or text of competitor products, political images and/or text, etc.).

At block 1412, the generated query may be submitted to an analysis engine. The analysis engine may optionally include multiple engines (e.g., an image analysis engine, a text analysis engine, an audio analysis engine, and/or the like). At block 1413, the analysis engine performs the requested image, text, and/or audio analysis in accordance with the query and generates corresponding classifier values. For example, a classifier value may indicate the likelihood (e.g., present/not present, very likely, likely, possible, unlikely, very unlikely, etc.) that the analyzed content includes content that the query asked to be identified.

At block 1414, the classification values are received. At block 1416, the classification values are examined to determine if there is a violation of the rules. For example, a determination may be made that the content has been associated with the design element that violates the source rules. In the event that there is a specified level of uncertainty (e.g., the analysis engine indicates that it is "possible" but not highly likely that prohibited content is present), further analysis may be performed to determine with a higher degree of confidence the likelihood that prohibited content is present.

If the rules are not satisfied, at block 1422 the user is prohibited from using/sharing the design element has modified or combined by the user. For example, the user may be prohibited from having the design element (as modified or combined by the user) from being printed or embroidered on a physical object and/or from being shared on a social networking site or content sharing site. A rule violation notification may be generated and displayed to the user so that the user can correct the rule violation. If the rules are satisfied, at block 1418, a watermark/copyright data may optionally be embedded in the design element (e.g., as modified by the user and/or as combined by the user with other content) to facilitate quicker and more accurate detection of the design element as posted on other digital media platforms (e.g., websites, content sharing platforms, microblogs, etc.).

At block 1420, the user is enabled to use/share the watermarked design element (e.g., as modified by the user and/or as combined by the user with other content). For example, the user may be enabled to share the watermarked design via channels and/or platforms permitted by the source-specified rules. Optionally, if the user is using the design element for printing on a physical object and not for electronically sharing, the design element may be a version that does not include an embedded watermark.

Figure 14B:
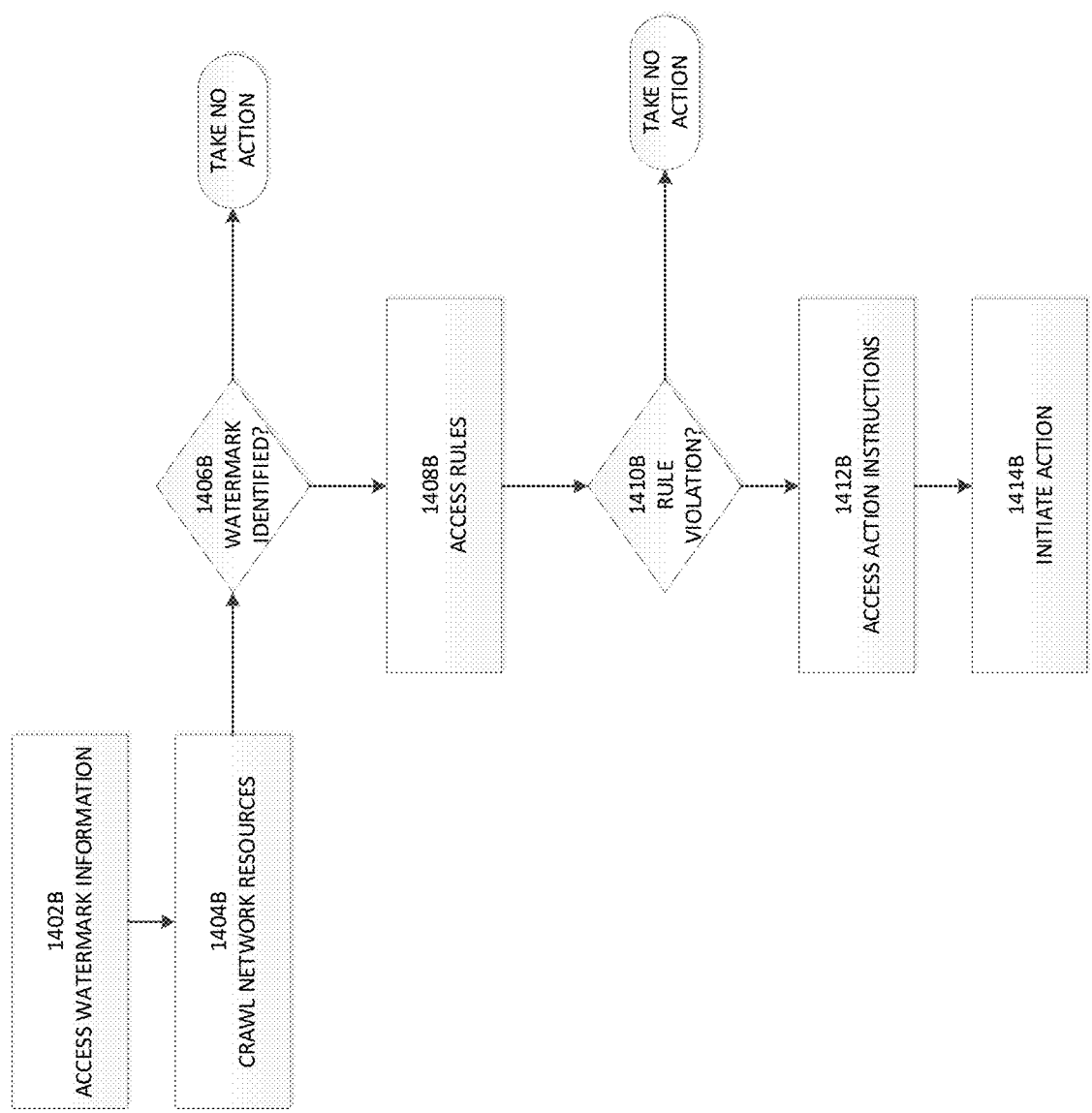

FIG. 14B illustrates an example crawling and content analysis process that may be used to determine whether a design element as shared on a networked resource (e.g., a website, a microblog, a content sharing site, etc.) violates a source rule. For example, this may have occurred as a result of the user modifying or combining the design element without utilizing the CAD system described herein. At block 1402B, watermark information for a watermark embedded in a design element is accessed. The watermark information may comprise an algorithm configured to detect the presence of a digital watermark that is not visible to human senses (e.g., cannot be perceived via human vision or hearing). The watermark information may indicate the location and content of the watermark. At block 1404B, network resources are crawled. The crawling may continue in parallel with other states of the process. At block 1406B, the process determines if the watermarked design element is present. For example, if spread spectrum techniques were used to embed the watermark, where the watermark is spread over many frequency bins so that the energy in a given bin is very small, the process may look for the locations where the watermark is located, and combine the small energy signals into an output with a relatively high signal to noise ratio.

If the watermark is present, at block 1408B, rules (such as those described herein) associated with the design element are accessed. The rules may relate to permitted/prohibited modification of the design element, and/or permitted/prohibited combinations of the design element with other content. If, at block 1410B, a determination is made that there is a rule violation, then at block 1412B, action instructions are accessed, where the action instructions may specify what remedial actions are to be taken. For example, the remedial action may include generation of a corresponding alert notification to a designated destination or cause the removed from the design element to be removed from the network resource. At block 1414B, the corresponding action is initiated.

Figure 15:
FIG. 15 illustrates an example user interface.

FIG. 15 illustrates another example user interface that enables a user (e.g., a source) to control how certain intellectual property may be used. A field is optionally provided (e.g., comprising a checkbox) which enables the user to specify whether the controls are to be applied to all of the user's intellectual property (e.g., logos, brand names, photographs, tag lines, other design elements, etc.) identified to the system. A field is optionally provided (e.g., comprising a checkbox and an intellectual property asset selection field, named "My IP" in this example) which enables the user to specify whether the controls are to be applied to selected intellectual property assets of the user, and to identify which assets the controls are to be applied to. The assets may be individual assets or assets that the user has grouped together. For example, if a company has multiple brands, the company may group a given brand's intellectual property assets together. By way of illustration, a given brand may have a brand name, a logo, and a photograph of a celebrity that is endorsing the brand. The user may group the foregoing assets together, and assign a group name (e.g., "IPGroup1"). The group name may be displayed in the "My IP" interface. The "My IP" interface may be populated by accessing data from a database of assets previously associated with the user's account. The user can select from the displayed assets. Optionally, the user interface may enable the user to defined a new group of assets by selecting assets from the "My IP" interface and assigning a group name for the selecting assets (e.g., by typing in or speaking a group name).

Various types of content may be listed by the user interface in a prohibited content area, such as obscene images, obscene text, obscene audio, violent images, violent text, violent audio, medical images, medical text, medical audio, political images, political text, political audio, racially insensitive images, racially insensitive text, racially insensitive audio, gender insensitive images, gender insensitive text, etc. The user can indicate (e.g., via a checkbox) if a given listed type of content is not to be used with the intellectual property specified by the user (e.g., using the "My IP" interface).

In addition, a user may specify with greater granularity specific types and/or items of content (e.g., text, image, audio content, etc.) that may or may not be used (e.g., combined) with the intellectual property specified by the user. For example, text, image, and/or audio blacklist interfaces may optionally be provided via which a user can specify specific text, image, and/or audio that may not be combined with the intellectual property specified by the user. Similarly, text, image, and/or audio whitelist interfaces may optionally be provided via which a user can specify specific text, image, and/or audio that may be combined with the intellectual property specified by the user. The various blacklist and whitelist entries may be entered using a variety of techniques. For example, the user may type in text for the text blacklists and whitelists, may enter (e.g., via copying or drag and dropping) a link or the content itself for the image and/or blacklists and whitelists, or the like. Optionally, the whitelist and/or blacklist will take priority over the prohibited content specification. For example, if an item of content includes obscene language, and the user has indicated that obscene language is to be prohibited, but has also added a specific obscene word to the whitelist, the combination of the whitelisted obscene word with the intellectual property will be permitted as the whitelist has priority.

It is noted that although the example illustrated user interface may reference "images" generally, the user interface may optionally be configured to include prohibited content entries, blacklist fields, and/or whitelist fields of various forms of images that the user can indicate are proscribed, blacklisted, or whitelisted content, such as video, graphic, photographic, animated, and/or other forms of images. By way of example, the prohibited content list may include obscene videos, obscene photographs, obscene graphics, and obscene animations. Similarly, there may be fields for blacklisted video content, blacklisted photograph content, blacklisted graphic content, blacklisted animation content, whitelisted video content, whitelisted photograph content, whitelisted graphic content, and whitelisted animation content. Optionally, to conserve display real estate, enhance clarity, and reduce human interaction errors, the prohibited content entries that list "image" may be in the form of a dropdown/expandable menu, so that in response to the user clicking or touch an image entry, the entry will expand to include a listing of different forms of images (e.g., video, photographic, graphic, animation, etc.). The user can select the "image" listing as a whole to be included in the prohibited content, or can select a given form of image to prohibit. Thus, a user may prohibit obscene videos and photographs, but choose not to prohibit obscene animations.

Optionally, interfaces may be provided via which the user can specify forms of content that may or may not be combined with the user selected intellectual property. For example, fields may be provided via which the user can specify that no image, text, and/or audio content of any type may be combined with the selected intellectual property. Optionally, if a user indicates that a given form of content may not be combined with the selected intellectual property, then the corresponding entries will not be displayed in the prohibited content field to conserve display real estate and to avoid user confusion. Thus, for example, if a user indicates that audio content may not be combined with the user's selected intellectual property, then the "audio" items (e.g., obscene audio, violent audio, etc.) will not be displayed in the prohibited content field. Optionally instead, the audio items will still be displayed, but they will be automatically "checked" to indicate that they are prohibited content.

A submit control may be provided which, when activated, causes the system to store the usage specifications (e.g., the prohibited content specifications, the blacklist specifications, the whitelist specification), for use as described herein.

Optionally, a user (e.g., an intellectual property owner) may specify a royalty/fee for uses of its intellectual property (e.g., logo, character, tagline, brand name, photograph, animation, video, audio, etc.) with respect to customizing items and/or sharing electronically using systems and processes disclosed herein. Optionally, the source may specify different fees for physical uses of intellectual property (e.g., printing or embroidering on physical items) and for electronic uses/sharing of intellectual property. Optionally, the source may specify that a percentage of advertising revenues received from advertisements presented in conjunction with its intellectual property be granted to the source.

Additional example data structures, databases, processes and user interfaces will now be described. As noted above, various user interfaces may be provided that enable various palette types to be defined. Example palettes (sometimes referred to herein as collections) may include color palettes, content palettes, asset (e.g., logos, images, text, brands, etc.) palettes, font palettes, effect palettes, and the like. In addition, user interfaces may be provided that enable a user to specify assets that may not be used together, content that may not be used together, colors that may not be used together, fonts that may not be used together, and/or effects that may not be used together.

Certain user interfaces and processes will be described that enables one or more palettes to be assigned to a group.

For example, one or more groups of palettes may be defined for a given brand, sub-brand, or product, and the group of palettes may be assigned an identifier to enable a user to quickly locate the appropriate palettes.

Figure 16A:

Referring to FIG. 16A, an example user interface is provided that enables a user to specify palettes/collections that may be used for a specific design area (sometimes referred to herein as a "slot"). After a user selects an item (e.g., a physical product or a digital asset) for which end user permissions are to be specified, the system accesses associated metadata for the item, including the number of design areas/slots, the position of the slots with respect to the item, one or more images of the item (e.g., an image of the front of the item (e.g., the front of a t-shirt) and an image of the back of the item (e.g., the back of the t-shirt)). The item images may be rendered in the user interface. Metadata indicating pre-specified permitted colors for the item may be accessed and corresponding menu entries rendered (e.g., with corresponding colored discs or other icons). The item color specified when the design was created and saved may be used as the default garment color for the item template.

A list of slots identified for the item may be displayed in association with corresponding controls. A given slot may have a slot name displayed (e.g., slot 1, left arm slot, chest slot, etc.) in association with an asset specified as a default asset. For a given slot, the controls may enable a user to select one or more previously specified collections/groups of assets via a select collection control. Optionally, the user may be enabled to select collections from multiple stores/brands, as discussed elsewhere herein. When the user selects the select collection control, a menu of previously defined asset collections may be accessed, and one or more of the names of the asset collections may be displayed from which the user can select. Controls may be provided that enable a user to scroll through the names of the asset collections. The names of the asset collection may include a text description (e.g., a team name, a roster year, a series name, etc.) and/or a unique identifier. A "swappable" control may be provided for each slot that enables the user to specify whether an end user can or cannot swap an asset.

An exception interface may be provided via which the user can select assets which may not be combined for a given slot or for all slots. In addition, a control may be provided that enables a user to delete an exception. The user inputs may be stored in association with the template. Optionally, the user may save different versions of a given template with different collections assigned to a given slot and/or different exceptions. A control may be provided which enables the user to specify a default template, which will be displayed to end users when they access a corresponding online store.

For example, with reference to "slot 1" illustrated in the figure, an example collection name may include a team name and the phrase "logos", to indicate that the collection includes logos (e.g., a default logo, a current logo, historical logos used in the past, etc.) of the named team. Selected collections may be listed in association with the slot. A control is provided ("swappable") via which the user can specify if an end user can swap assets for a corresponding slot. For example, if a team logo collection is selected, and swapping is enabled, then an end user can swap, for the corresponding slot, a given logo from the team logo collection with another logo from the team logo collection. If the swappable control is set to non-swappable, the user is inhibited from assigning collections to the slot, and only a single asset may be assigned to the slot.

By way of further example, with reference to "slot 2" illustrated in FIG. 16A, the selected collection names may include: a team name and the phrase "current roster", to indicate that the collection includes names and numbers of the current players of the named team; the team name and the phrase "2004 roster", to indicate that the collection includes the names and numbers of the players of the named team in 2004; and the team name and the phrase "1989 roster", to indicate that the collection includes the names and numbers of the players of the named team in 1989. As with slot 1, a control is provided ("swappable") via which the user can specify if an end user can swap assets for a given slot.

A template exceptions area includes controls via which the user can indicate which assets (e.g., logos, images, text, brands, etc.) cannot be used with which other assets. For example, a user may want to prohibit an end user from combining a current team logo with the name of a player from a roster from a year prior to the first use of the currently used logo.

A given asset may be associated with a unique identifier. When an exception is created, the exception specification may generate a record of the unique identifiers of the assets that may not be combined or used together. Then, if there is a first asset in a first slot, the system may search through the exception records using the unique identifier of the first asset in the first slot to identify the unique identifiers of assets that may not be used in combination with the first asset. The user may then be inhibited from using those assets in combination with the first asset. For example, even if those exception assets are displayed in a menu of assets, the end user may be prevented from selecting the exception assets, and the exception assets may be greyed out.

Figures 1, 16B:
Figures 2, 16B:
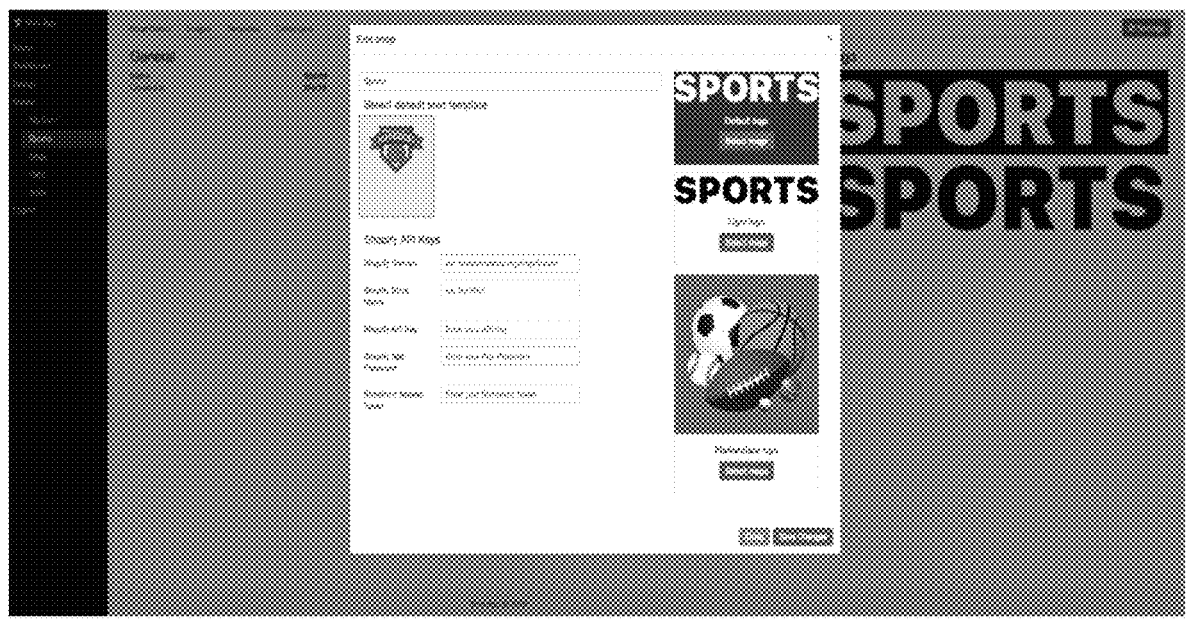

Thus, with reference to the end-user example user interface illustrated in FIG. 16B, when an end user visits an online catalog (which may be specifically associated with a brand, such as a sports team), a template of a selected item may be displayed (e.g., a t-shirt in this example, although an item may be another physical or digital item, such as those discussed elsewhere herein). A template, including an image of the item rendered with one or more default assets, may be displayed. For example, if the default asset is a team logo, a template of the t-shirt with the team's logo may be displayed. A control may be provided enabling the user to view another side or perspective of the item. The user may then swap one or more assets into one or more predefined asset slots. In the illustrated example, an end user can activate a flip or rotate control, and the back of the t-shirt will be displayed. Optionally, a default asset (e.g., a player name and corresponding number) may be displayed on the back of the t-shirt. An interface may be provided enabling the end user to switch to any one of the player names and numbers that are included in the previously selected roster collections (the 2004 roster and 1989 roster in this example). Optionally, if an end user is accessing the user interface via a device with a touch screen, the end user can use a finger or stylus on the touch screen to swipe though the different assets (name and number in this example), optionally in a predefined order.

Similarly, if the end user is viewing the front of the t-shirt, the end user can switch (e.g., swipe through) the logos included in the team logo collection (e.g., a default logo, a contemporary logo, a throwback, old logo, etc.).

In the illustrated example, if the default logo is selected/displayed on the front of the t-shirt, then the system enables any player name/number from the selected roster collections to be used on the back of the t-shirt. However, exception conditions have been defined so that the current, contemporary logo may only be used with the names/number in the current roster collection, and the throwback logo may only be used with the names/number in the 1989 or 2004 roster collections.

As noted above, the user may save different versions of a given template. FIG. 16B-2 illustrates an example user interface that displays different versions of a given template, wherein different versions have different assets displayed in at least one slot. The user can select a given template version and specify which template is to be the default template, which will be displayed to end users when they access a corresponding online store.

Figure 16C:
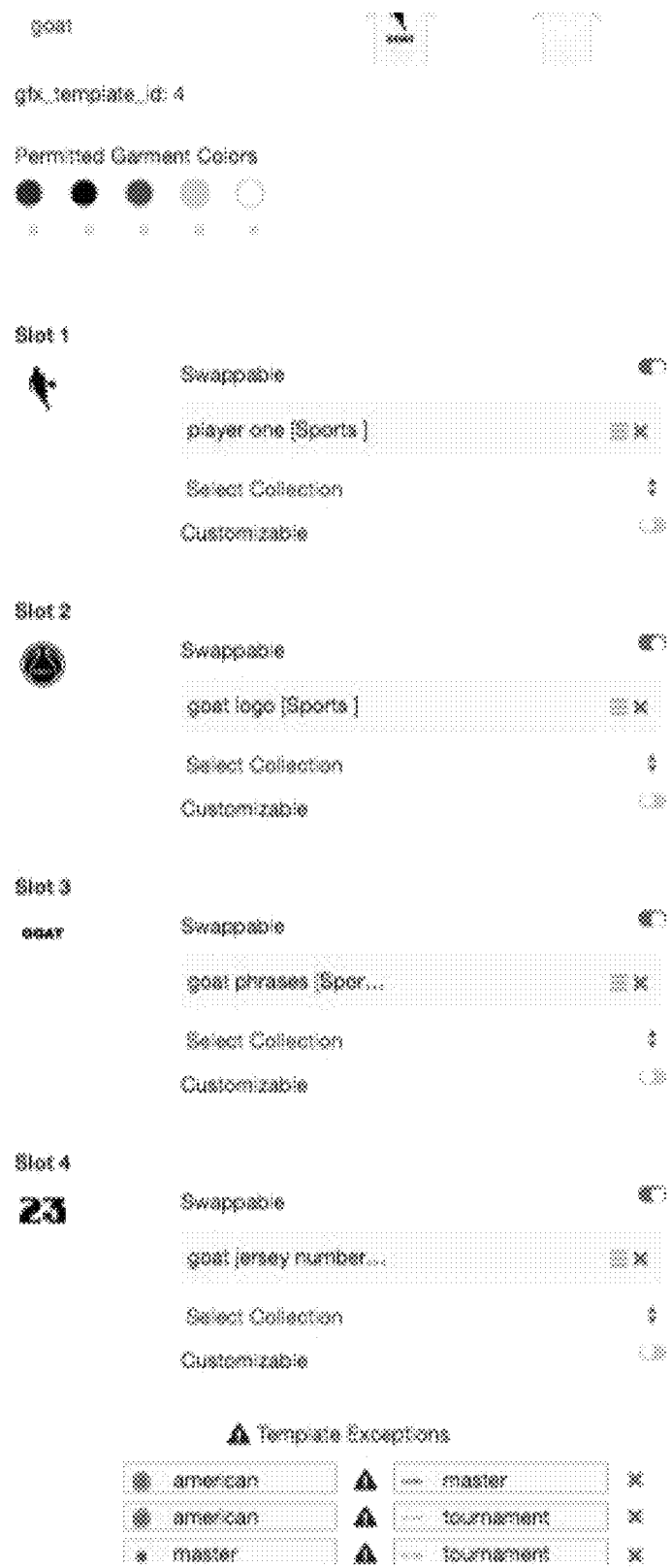

Referring to FIG. 16C, another example user interface is provided that enables a user to specify collections that may be used for a specific item slot. In this example, the asset collections are associated with a particular player (e.g., graphics associated with the player, logos of teams that the player has played on, phrases associated with the player, jersey numbers that have been assigned to the player at the various teams, etc.) as will be described in greater detail.

In this example, the item is a t-shirt and four slots have been defined. A first collection of assets (e.g., graphics or photographs of or associated with a particular player) has been selected for use with slot 1 (a first design area on the front of the t-shirt). A default graphic is displayed in association with the slot identifier (slot 1 in this example). A second collection of assets (e.g., team logos associated with the particular player) has been selected for use with slot 2 (a second design area on the front of the t-shirt). A default team logo is displayed in association with the slot identifier (slot 2 in this example). A third collection of assets (e.g., phrases associated with the particular player) has been selected for use with slot 3 (a third design area on the front of the t-shirt). A default phrase is displayed in association with the slot identifier (slot 3 in this example). A fourth collection of assets (e.g., jersey numbers associated with the particular player) has been selected for use with slot 4 (a design area on the back of the t-shirt). A default jersey number is displayed in association with the slot identifier (slot 4 in this example).

As similarly discussed above, a template exceptions area includes controls via which the user can indicate which assets (e.g., logos, images, text, brands, etc.) cannot be used with which other assets. For example, a user may want to prohibit an end user from combining a phrase associated with a first player with a jersey number that is associated with a different player.

Thus, with reference to the end-user example user interfaces illustrated in FIGS. 16D-1 to 16D-4, an interface may be presented when an end user visits an on online catalog (which may be a Greatest Of All Time (G.O.A.T) store, which could, for example, represent certain major league teams and their players). A user may select a particular player from a menu of players and select an item, and a template of a selected item may be displayed (e.g., a t-shirt in this example, although an item may be another physical or digital item, such as those discussed elsewhere herein).

As illustrated in FIG. 16D-1, a template, including an image of the item rendered with one or more default assets, may be displayed. In the illustrated example, the default assets may include a certain graphic of the player, a logo, and text rendered on an image of a front of the t-shirt. If the user selects a default asset presented in a given slot (e.g., by touching the asset if a touch screen device is being used or by pointing and clicking on the asset via a mouse or touchpad), some or all of the assets included in the collection(s) assigned to that slot are displayed. For example, as similarly discussed above, the assets in the assigned collection may be displayed via a scrolling menu, where the user can swipe on the menu of collection and the menu will scroll to display additional assets. In the illustrated example, the user has selected a logo in slot 1 (as defined using an interface similar to that illustrated in FIG. 16C), and the assets in the collection specified via the interface illustrated in FIG. 16C are displayed. The user can select an asset from the scrolling menu (e.g., by touching, pointing at, or pointing at and clicking on the asset). The selected asset will then be displayed in the corresponding slot in place of the default asset, as illustrated in FIG. 16D-2.

With reference to FIG. 16D-3, the user has selected the text in slot 3 (as defined using an interface similar to that illustrated in FIG. 16C), and the assets in the collection specified via the interface illustrated in FIG. 16C are displayed. The user can select a phrase asset from the scrolling menu. The selected phrase asset will then be displayed in the corresponding slot in place of the default phrase asset, as illustrated in FIG. 16D-3.

With reference to FIG. 16D-4, the user has selected a graphic/photograph in slot 1 (as defined using an interface similar to that illustrated in FIG. 16C), and the assets in the collection specified via the interface illustrated in FIG. 16C are displayed. The user can select a graphic/photograph asset from the scrolling menu. The selected graphic asset will then be displayed in the corresponding slot in place of the default graphic/photograph asset, as illustrated in FIG. 16D-4. A rotate control is provided, which when activated causes a view of another side or perspective of the item to be displayed, as illustrated in FIG. 16D-5.

With reference to FIG. 16D-5, the user has selected a jersey number in slot 4 (as defined using an interface similar to that illustrated in FIG. 16C), and the jersey number assets in the collection specified via the interface illustrated in FIG. 16C are displayed. The user can select a jersey number asset from the scrolling menu. The selected jersey number asset will then be displayed in the corresponding slot in place of the default jersey number asset.

Figures 1, 16E:
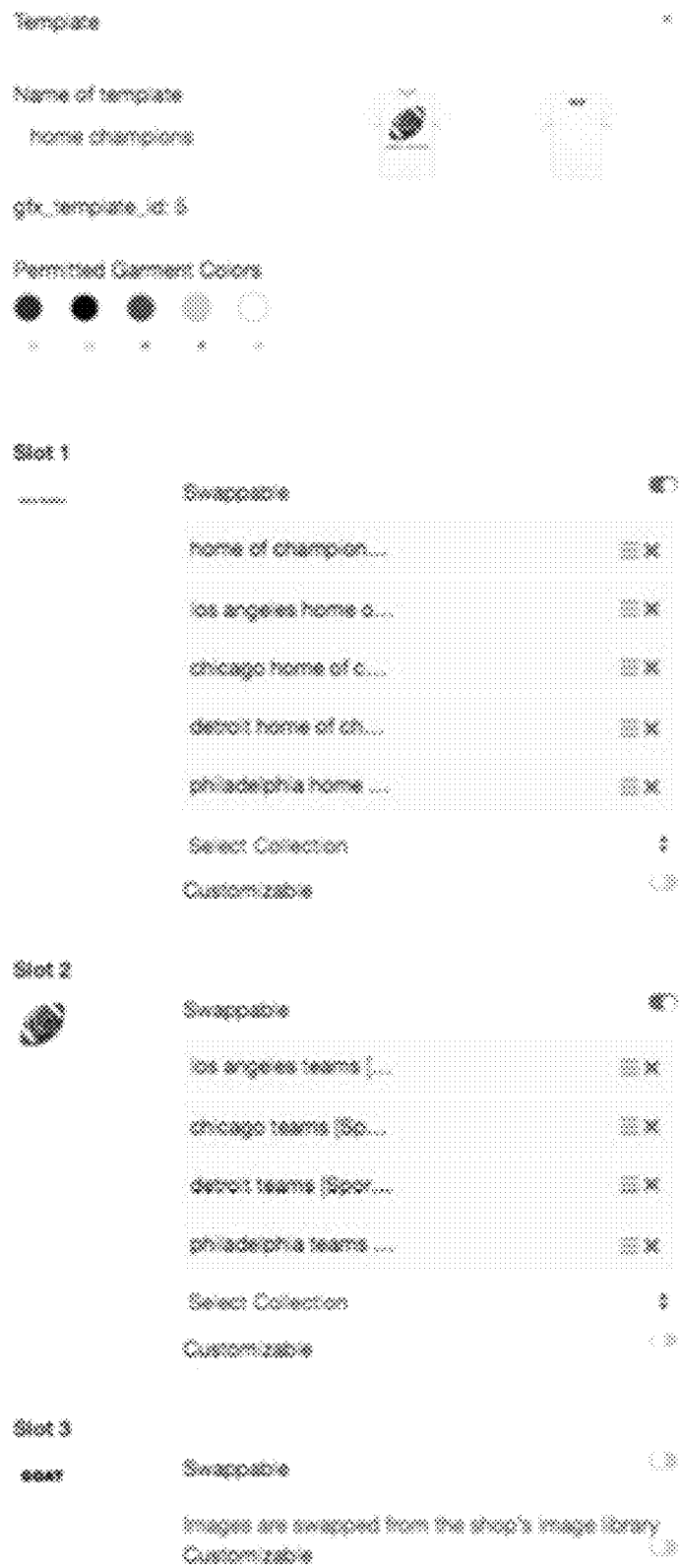
Figures 2, 16E:
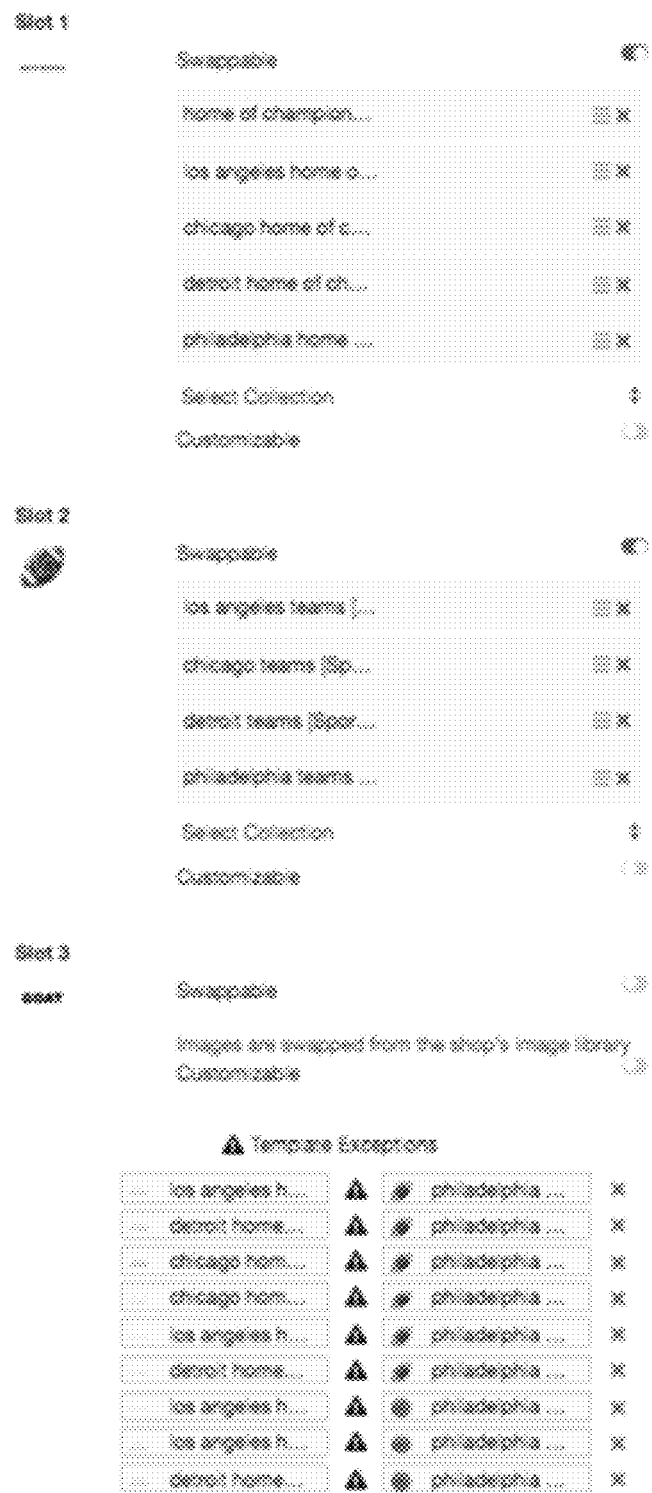

Referring to FIGS. 16E-1, 16E-2, another example user interface is provided that enables a user to specify collections that may be used for a specific item slot. In this example, the asset collections are associated with a particular team (e.g., logos associated with the team, phrases associated with the team, graphics or phrases associated with the city in which the team is based), as will be described in greater detail.

In this example, the item is a t-shirt and three slots have been defined. A first collection of assets (e.g., logos associated with a particular team) has been selected for use with slot 1 (a first design area on the front of the t-shirt). A default graphic is displayed in association with the slot identifier (slot 1 in this example). A second collection of assets (e.g., phrases associated with the particular team) has been selected for use with slot 2 (a second design area on the front of the t-shirt). A default team phrase is displayed in association with the slot identifier (slot 2 in this example). A third collection of assets (e.g., phrases associated with a city that is associated with a team) has been selected for use with slot 3 (a third design area on the back of the t-shirt). A default city phrase is displayed in association with the slot identifier (slot 3 in this example).

As similarly discussed above, template exceptions area includes controls via which the user can indicate which assets (e.g., logos, images, text, brands, etc.) cannot be used with which other assets. For example, a user may want to prohibit an end user from combining a team logo with a city phrase of a city in which the team is not based.

Figures 1, 16F:
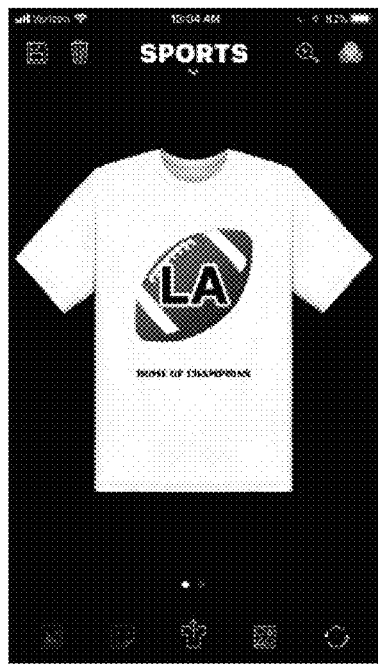
Figures 2, 16F:
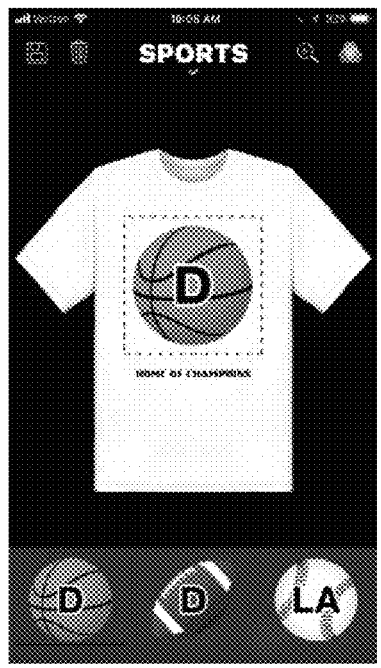
Figures 3, 16F:
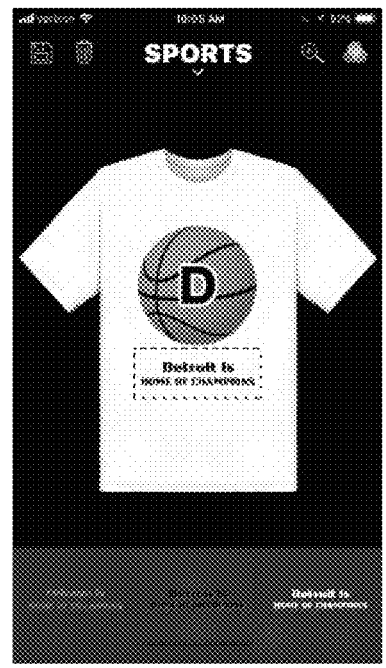

Thus, with reference to the end-user example user interfaces illustrated in FIGS. 16F-1 to 16F-6, an interface may be presented when an end user visits an on online catalog (which may be a team store or a Greatest Of All Time (G.O.A.T) store, which could, for example, represent certain major league teams and their cities). For example, a user may select a city from a menu of cities, and may then be presented with a menu of teams in or associated with the city. A user may select a particular team from the menu of teams and select an item, and a template of the selected item may be displayed (e.g., a t-shirt in this example, although an item may be another physical or digital item, such as those discussed elsewhere herein), and the item may be displayed with certain default assets.

As illustrated in FIG. 16F-1, a template, including an image of the item rendered with one or more default assets, may be displayed. In the illustrated example, the default assets may include a certain team logo rendered on an image of the front of a t-shirt. By way of further example, the default assets may include text rendered on the image of the front of a t-shirt. As similarly discussed above, if the user selects a default asset presented in a given slot (e.g., by touching the asset if a touch screen device is being used or by pointing and clicking on the asset via a mouse or touchpad), some or all of the assets included in the collection(s) assigned to that slot are displayed via a scrolling menu. In the illustrated example, the user has selected a team logo in slot 1 (as defined using an interface similar to that illustrated in FIG. 16E), and the specified assets in the collection (e.g., specified via an interface similar to that illustrated in FIG. 16E are displayed). As similarly discussed above, the user can select an asset from the scrolling menu (e.g., by touching, pointing at, or pointing at and clicking on the asset), as illustrated in FIG. 16F-2. The assets may include the logos of other teams located in the selected city. In addition, if the user has selected a different color for the item, and the item is rendered in the corresponding color. With reference to FIGS. 16F-2 and 16F-3, the user has selected a team logo from the scrolling menu and the selected logo is displayed in slot 1.

With reference to FIG. 16F-3, the user has selected city-related text in slot 3 (as defined using an interface similar to that illustrated in FIG. 16E), and the specified assets in the collection (e.g., specified via an interface similar to the interface illustrated in FIG. 16E) are displayed. The user can select a city phrase asset from the scrolling menu. The selected city phrase asset will then be displayed in the corresponding slot in place of the default phrase asset, as illustrated in FIG. 16F-3. The user may decide to again swap the logo displayed in slot 1, as illustrated in FIG. 16F-4. The user may decide to again swap the text displayed in slot 3, as illustrated in FIG. 16F-5.

With reference to FIG. 16F-6, the user has again selected the team logo in slot 1, and the specified assets in the collection (e.g., specified via an interface similar to the interface illustrated in FIG. 16E) are displayed.

Referring to FIG. 16G, another example user interface is provided that enables a user to specify collections that may be used for a specific item slot. In this example, the asset collections are associated with different stores or brands and may be combined in accordance with specified exceptions (e.g., characters associated with different franchises or online stores, graphics associated with different franchises or online stores, phrases associated with different franchises or online stores, etc.), as will be described in greater detail.

In this example, the item is a t-shirt and five slots have been defined. One collection of assets has been associated with a first slot (images for a specified store's image gallery).

Three collections of assets are associated with a second slot. In this example, the first collection includes a collection of hero/good character images for a first brand/store/franchise. the second collection includes a collection of hero/good character images for a second brand/store/franchise. The third collection includes a collection of hero/good character images for a third brand/store/franchise. A default graphic is displayed in association with the slot identifier (slot 2 in this example).

Three collections of assets are associated with a third slot. In this example, the first collection includes a collection of evil character images for the first brand/store/franchise. the second collection includes a collection of bad character images for the second brand/store/franchise. The third collection includes a collection of bad character images for the third brand/store/franchise. A default graphic is displayed in association with the slot identifier (slot 3 in this example).

One collection of assets has been associated with a fourth slot (images for a specified store's image gallery). One collection of assets has been associated with a fifth slot (good vs. evil phrases for the first brand/store/franchise).

As similarly discussed above, a template exceptions area includes controls via which the user can indicate which assets (e.g., characters, phrases, etc.) cannot be used with which other assets. For example, if the theme of the template is good vs. evil, a user may want to prohibit an end user from combining two good characters, or an image of a character as a young person and an image of the same character as an old person. By way of further example, if the assets are images of animals, the user may want to prevent an end user from combining two types of animals (e.g., a dog and a horse).

Thus, with reference to the end-user example user interfaces illustrated in FIGS. 16H-1 to 16H-3, an interface may be presented when an end user visits an on online catalog (which may be an online store that enables a user to customize items by combining characters from different movies/shows/franchises). A user may select an item from a menu of items, and a template of a selected item may be displayed (e.g., a t-shirt in this example, although an item may be another physical or digital item, such as those discussed elsewhere herein).

As illustrated in FIG. 16H-1, a template, including an image of the item rendered with one or more default assets, may be displayed. In the illustrated example, the default assets may include two different types of animals. In other examples, the default assets may a first character from a first franchise, a second character from a second franchise, and a phrase associated with the first franchise. If the user selects a default asset presented in a given slot (e.g., by touching the asset if a touch screen device is being used or by pointing and clicking on the asset via a mouse or touchpad), some or all of the assets included in the collection(s) assigned to that slot are displayed via a scrolling menu. In the illustrated example, the user has selected a dog for one slot (as defined using an interface similar to that illustrated in FIG. 16G), and the animal assets in the collections for that slot are displayed. The user can select an asset from the scrolling menu (e.g., by touching, pointing at, or pointing at and clicking on the asset), as illustrated in FIG. 16H-1.

With reference to FIG. 16H-2, in the illustrated example, the user has selected an asset (e.g., a cat) in a slot, and the assets in the collections for that slot are displayed. The user can select an asset from the scrolling menu, as illustrated in FIG. 16H-2.

When there are two slots (e.g., for two different images of different animals), if the user selects a first slot, a corresponding menu of assets is displayed for the selected slot. However, assets in the menu of assets that are prohibited from being combined with an asset already in a second slot, are displayed with an indication (e.g., greyed out, displayed with less intensity, etc.) that they may not be selected by the user.

By way of illustration, a given asset may be stored in association with a unique identifier. If a given asset is in a first slot, and a user selects a second slot, the collections associated with the second slot may be identified. In addition, exception records associated with the asset in the first slot may be accessed (using the unique asset identifier), and assets that the given asset may not be combined or used with may be identified, as similarly discussed elsewhere herein.

With reference to FIG. 16H-3, in the illustrated example, a first image of a dog has been selected and is displayed in a first slot. The user has now selected a second slot, and the assets in the collections specified for the second slot are displayed (e.g., different images of horses). The user can select an asset from the scrolling menu, as illustrated in FIG. 16H-3. However, assets that are prohibited from being combined with the image of the dog currently displayed in the first slot are displayed with an indication (e.g., greyed out, displayed with less intensity, etc.) that they may not be selected.

For example, with reference to FIG. 16H-4, the user can prohibit the "cat 4" image from being combined with the "dog 4" image, and prohibit the "dog 4" image from being combined with the "horse 4" image. The user can activate the "add new" control to specify additional prohibited combinations. The user can activate a delete control displayed in association with a specified prohibited combination to delete the prohibition.

Figures 1, 16I:
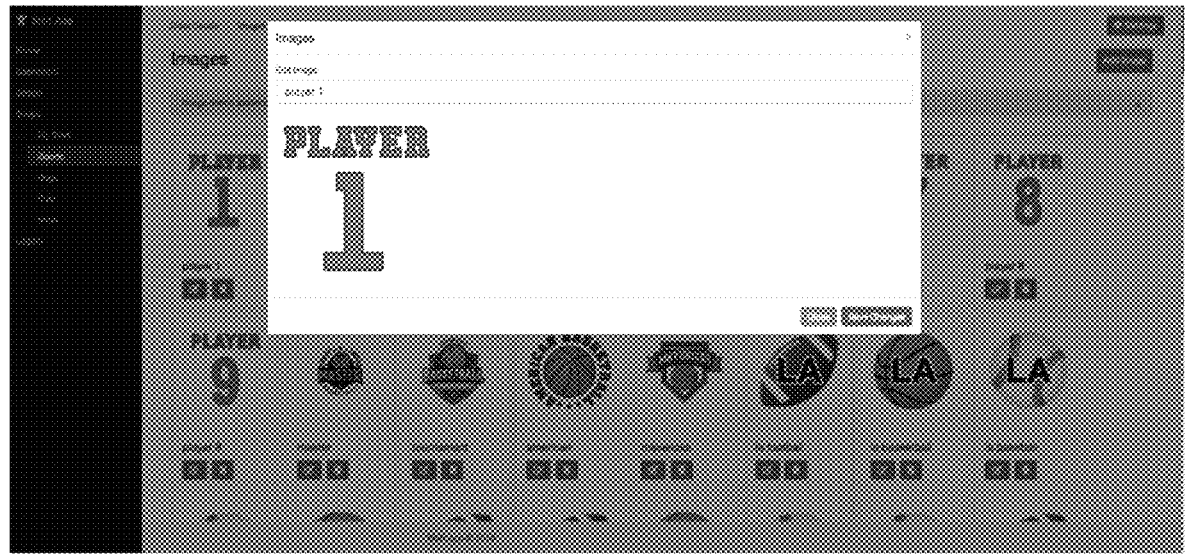
Figures 2, 16I:
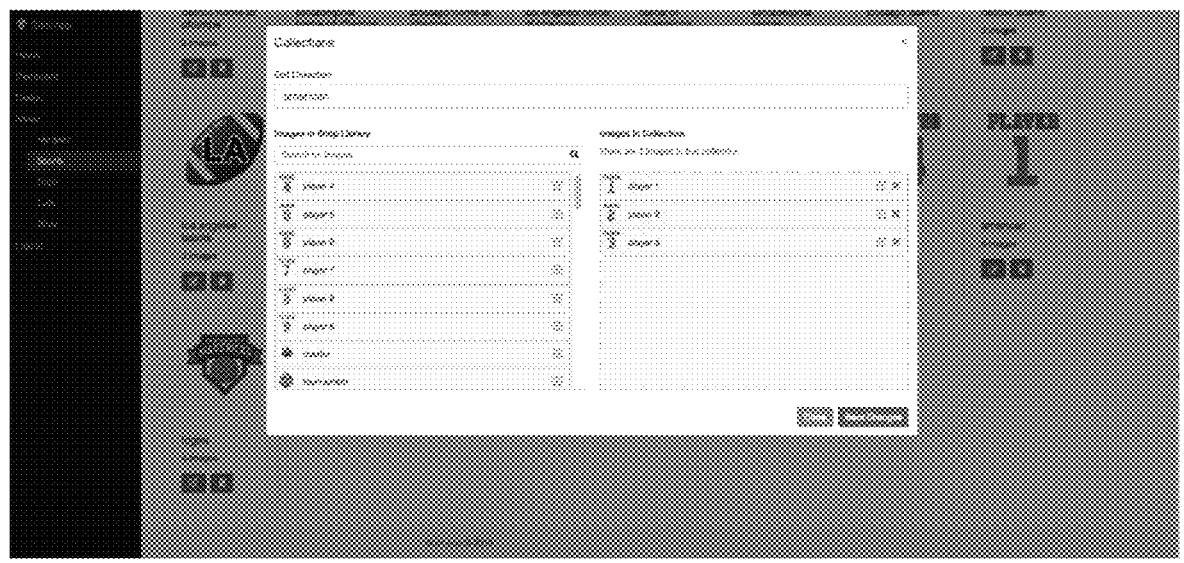
Figure 16M:
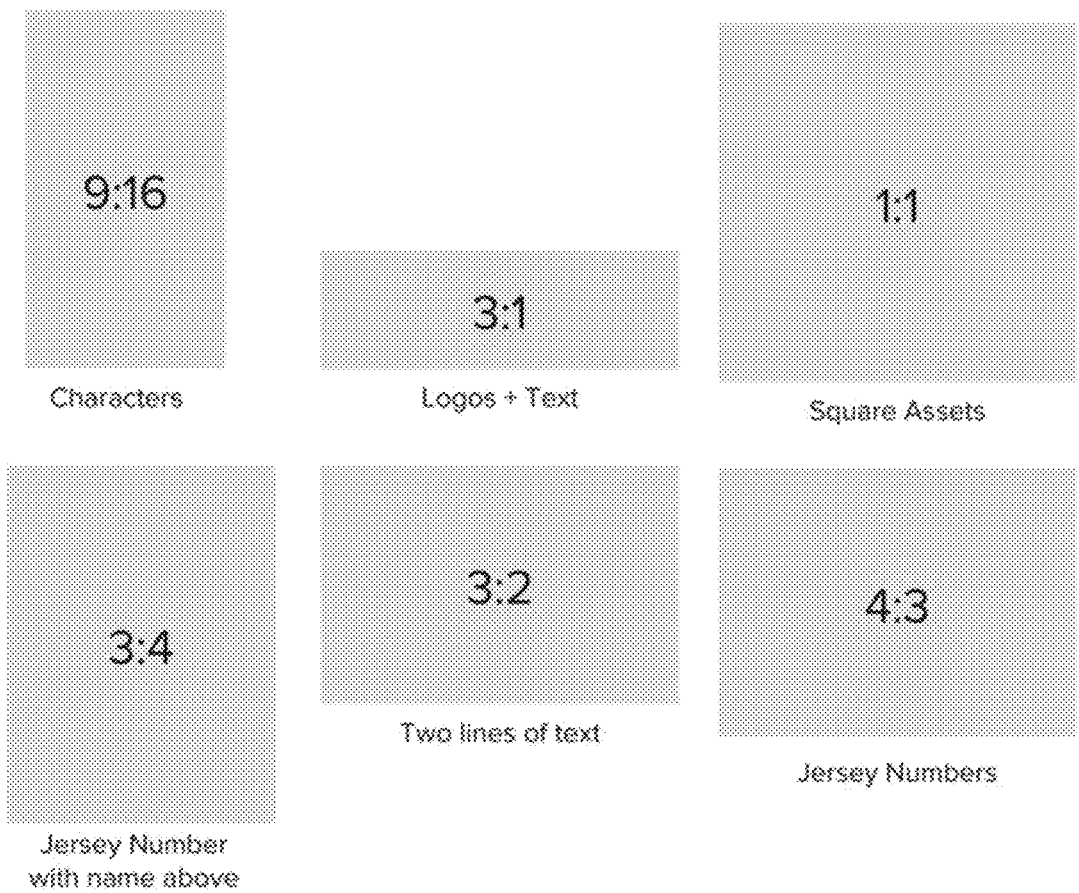
Figure 17:
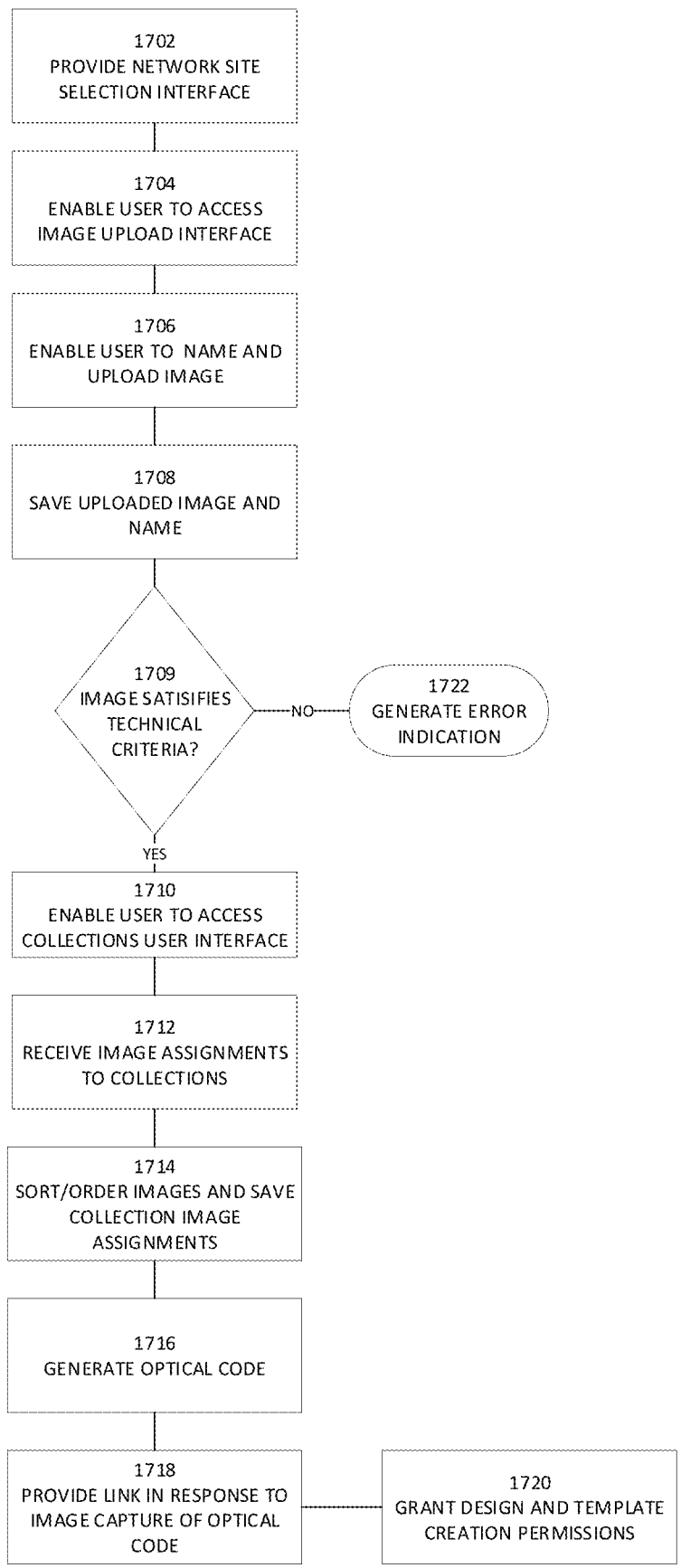

Certain example processes will now be described. The processes may be performed in real time. FIG. 17 illustrates an example process for uploading images and providing creation permissions. At block 1702, a user interface is provided via which the user can select a network accessible site (e.g., an online store) to which images are to be added. At block 1704, a user interface is provided via which a user can select an interface for uploading images (e.g., an images tab in a tabbed interface). At block 1706, in response to a user selecting an "Add Image" control, the user interface illustrated in FIG. 16I-1 is displayed. A field is provided via which the user can name an image, and a file picker control is provided via which the user can select the image file. In response to the user activating a save control, at block 1708, the image and image name are uploaded and stored in association with the selected store. The user can repeat the process to upload additional images. At block 1709, the process optionally examines the images to ensure that they comply with one or more pre-specified technical image criteria, such as aspect ratio, image size (in pixels and/or in bytes), and/or file format. For example, metadata describing the image (e.g., height metadata, width metadata, compression type, etc.) may be compared with the image criteria, and if the metadata fails to satisfy the image criteria a compliance failure may be identified. Optionally, as illustrated in FIG. 16M, different aspect ratios may be specified depending on a specified use of a given image. For example, the following aspect ratios may be specified:

9:16 for character images
3:1 for logos and text
1:1 for square assets
3:4 for a player name with a jersey number below
4:3 for a jersey number (without a player name)
3:2 for two lines of text If an image fails to satisfy a given image criterion (e.g., a determined by dividing the width metadata by the height metadata), at block 1722 a corresponding error indication may be selected and provided to the user. The error indication may identify which criteria were not met, and may optionally include recommendations on how to modify or replace the image so that images satisfy the technical image criteria.

At block 1710, a collections user interface is provided via which a user can assign uploaded images to different image collections, as desired. For example, the user interface may display uploaded images and enable the user to drag one or more images to a desired collection (e.g., a collection of logos, characters, graphics, etc.), as illustrated in FIG. 16I-2. At block 1712, the assignments of images to a collection are received and stored in memory. At block 1714, the process optionally orders/arranges the images in the order in which they are added to a collection so that images at the top of the collection will appear first when assigned to a slot. a user interface enables the user to name or edit the name of a given collection. A save control which enables the user to save the changes and additions to the collections.

Figures 1, 16J:
Figures 2, 16J:
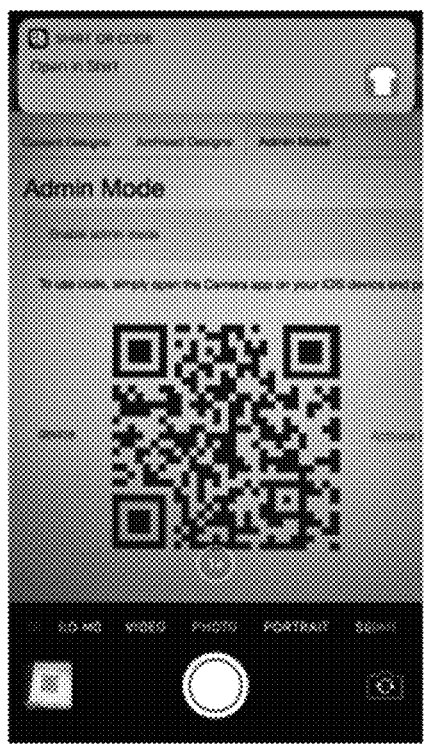
Figures 3, 16J:
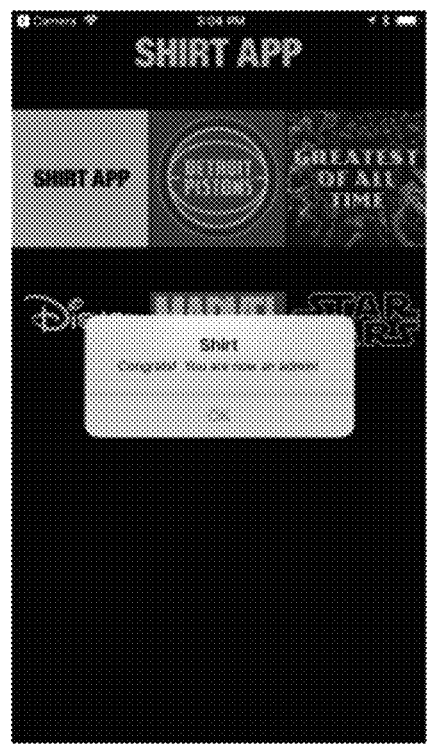

At block 1716 and with reference to FIGS. 16J-1, 16J-2, 16J-3, an optical machine readable code, such as a barcode (e.g., a QR code), EAN-13 code, EAN-8 code, UPC-A code, UPC-E code, Code 128, ITF-14 code, Code39 code, Codabar code, GS1 Databar code, Datamatrix code, PDF417 code, Aztec code, etc.), may be used to grant administrator privileges that enable a user to define designs and templates. The optical code may be displayed via an application or webpage (e.g., via an administrator mode webpage), as illustrated in FIG. 16J-1. A user may capture an image of the optical code using a user device, such as a camera-equipped mobile phone or tablet, as illustrated in FIG. 16J-2. At block 1718, a link corresponding to the optical code may be accessed and displayed. The link provided on the user device may have been encoded in the optical code or the optical code may include a link to a remote resource hosted by the system, which in turn may return a different link to the user device for display to the user. In response to the user activating the link (e.g., by tapping the link if displayed on a touch screen of the user device), an application (e.g., a mobile device/phone app) is accessed and opened, and the administration mode is activated, as illustrated in FIG. 16J-3. The user is now enabled to create designs and publish the designs as templates.

Figure 18:
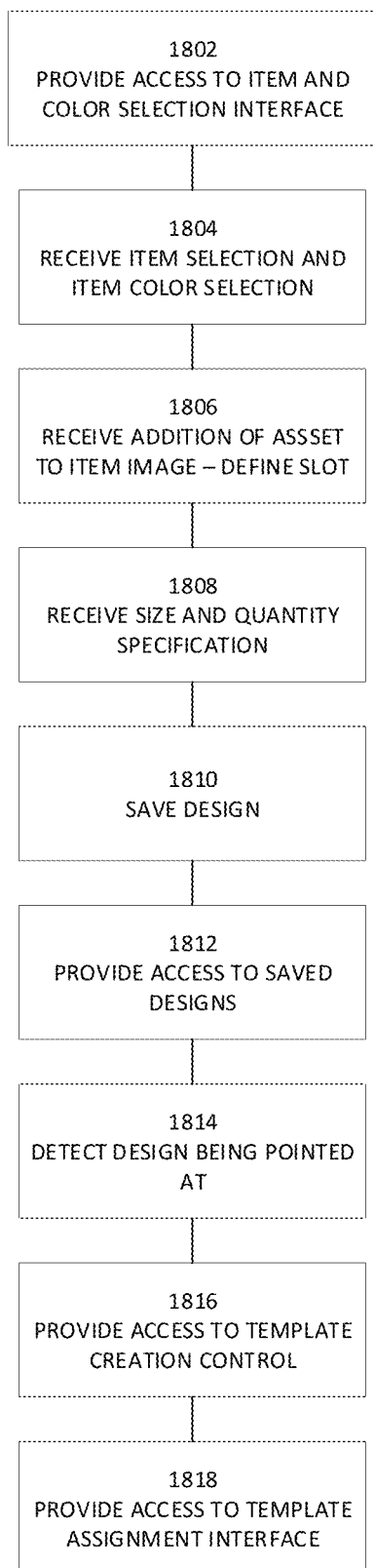

An example process will now be described for creating a design with reference to FIG. 18. At block 1802, a user interface is provided for display via which the user can select a base item (e.g., a garment, such as a t-shirt). A menu of colors is provided via which the user can assign a default color to the item. At block 1804, the user selection of an item and of a default color is received. At block 1806, a user adds an asset to an image of the item (see, e.g., FIG. 16K-1). The process automatically defines the area to which the asset is added as a slot. For example, the process may determine that x-y coordinates of each corner or vertex of the asset and define that area within the corners as a slot. Optionally, the slot may be defined so as to be larger than the asset (e.g., a predetermined number of pixels above and/or to the left or right of the asset). As discussed herein, a user can define a slot as swappable or un-swappable and can assign collections to the slot via corresponding controls.

Figures 1, 16K:
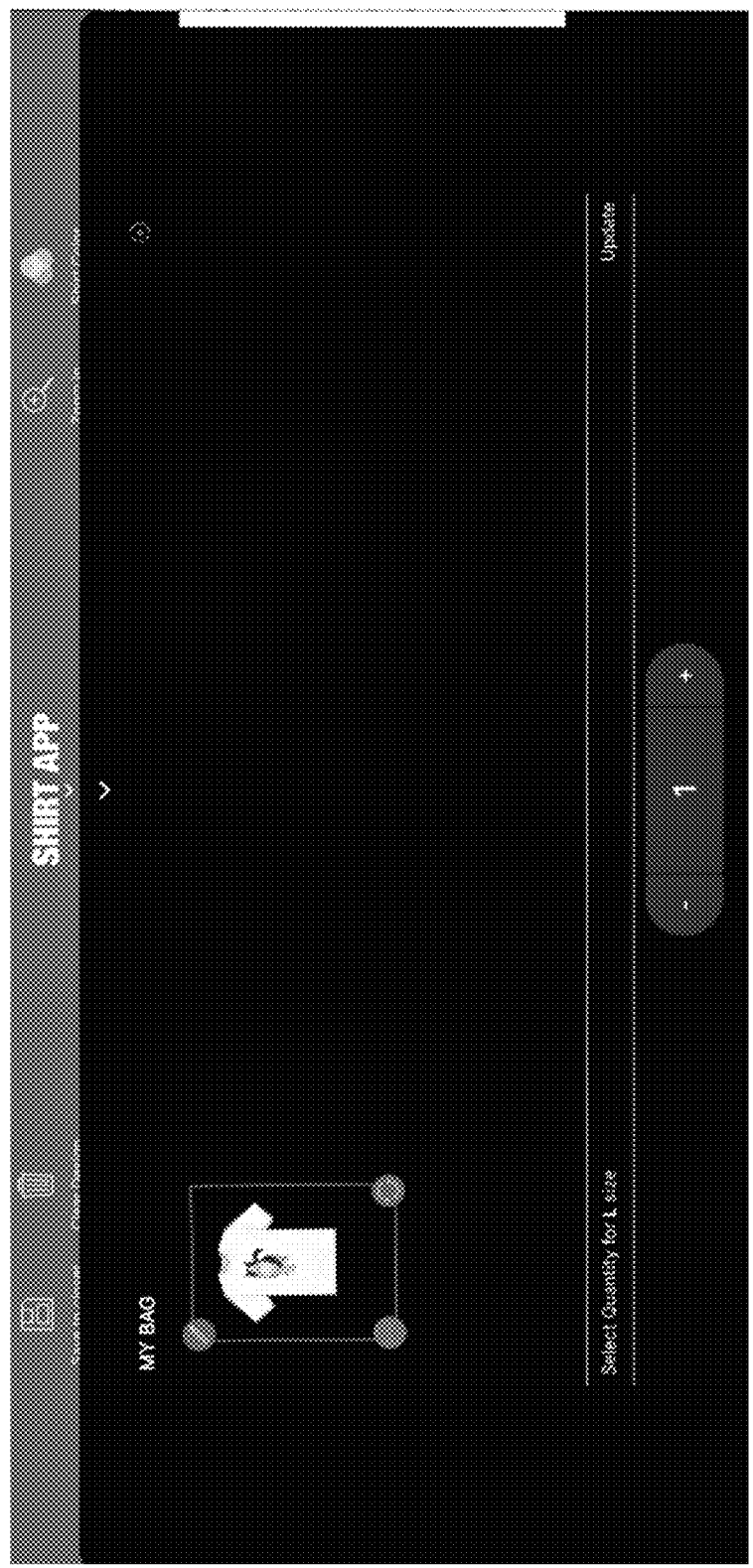
Figures 2, 16K:
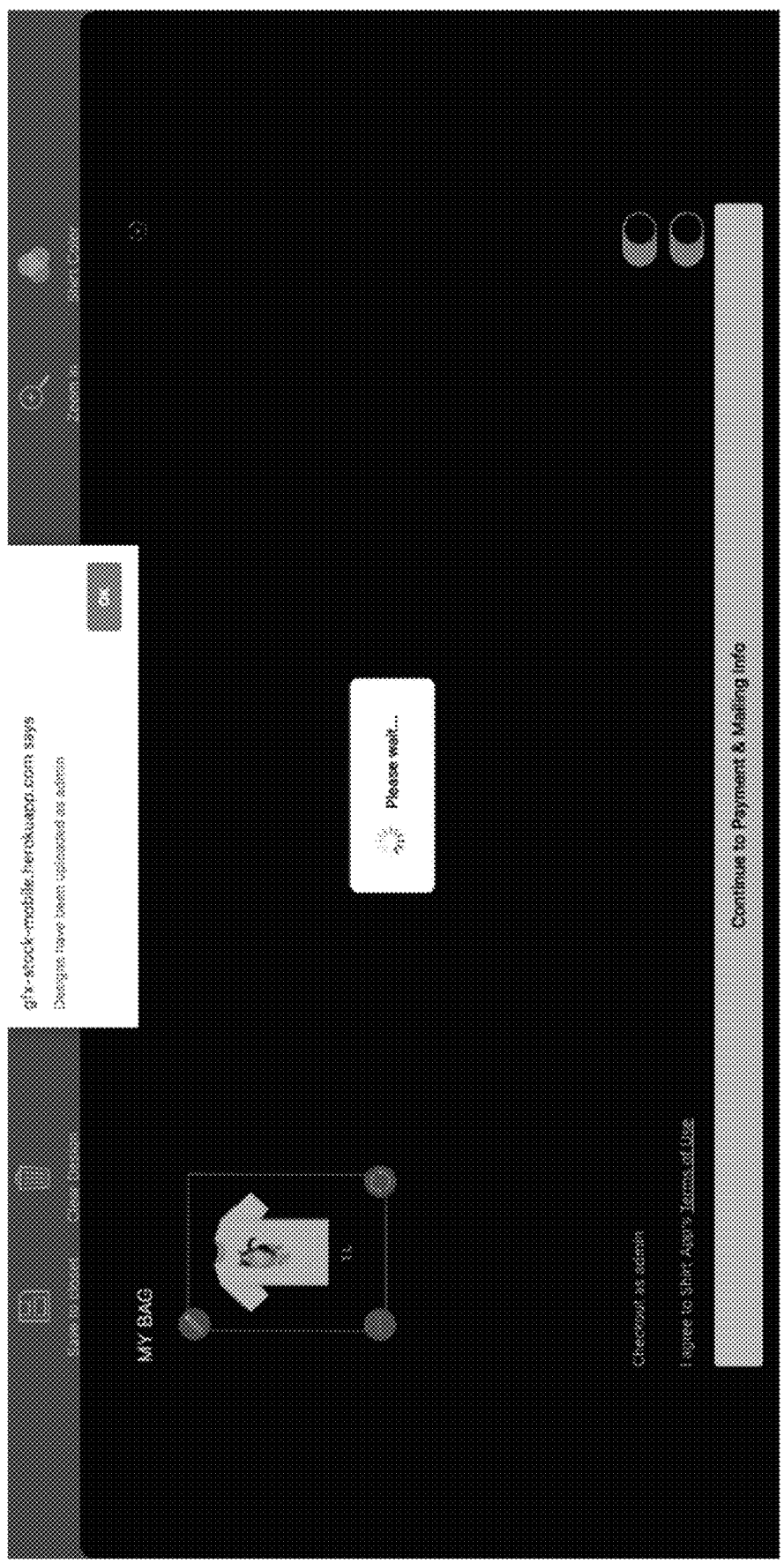

At block 1808, if the item is to be available in different size, a size interface is provided via which the user can specify the size(s) the item is to be made available in (see, e.g., FIG. 16K-1). If the item is to be made available in specific quantities, a quantity interface via which the user can specify such quantity. At 1810, in response to the user activating a save control or the like, the design is saved (see, e.g., FIG. 16K-2).

Figures 1, 16L:
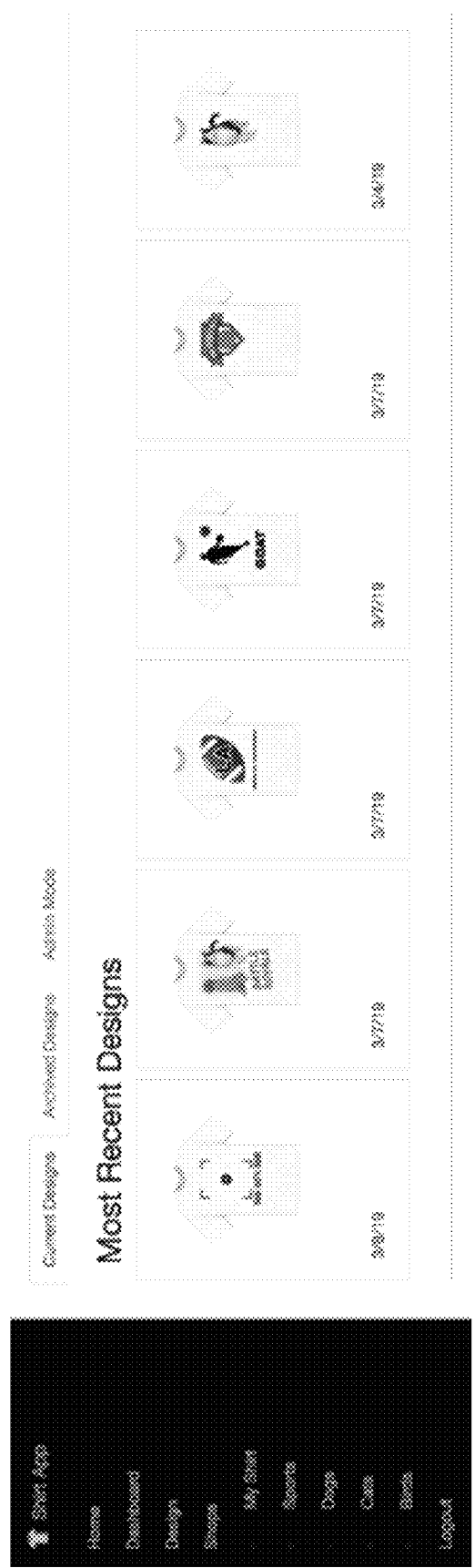
Figures 2, 16L:
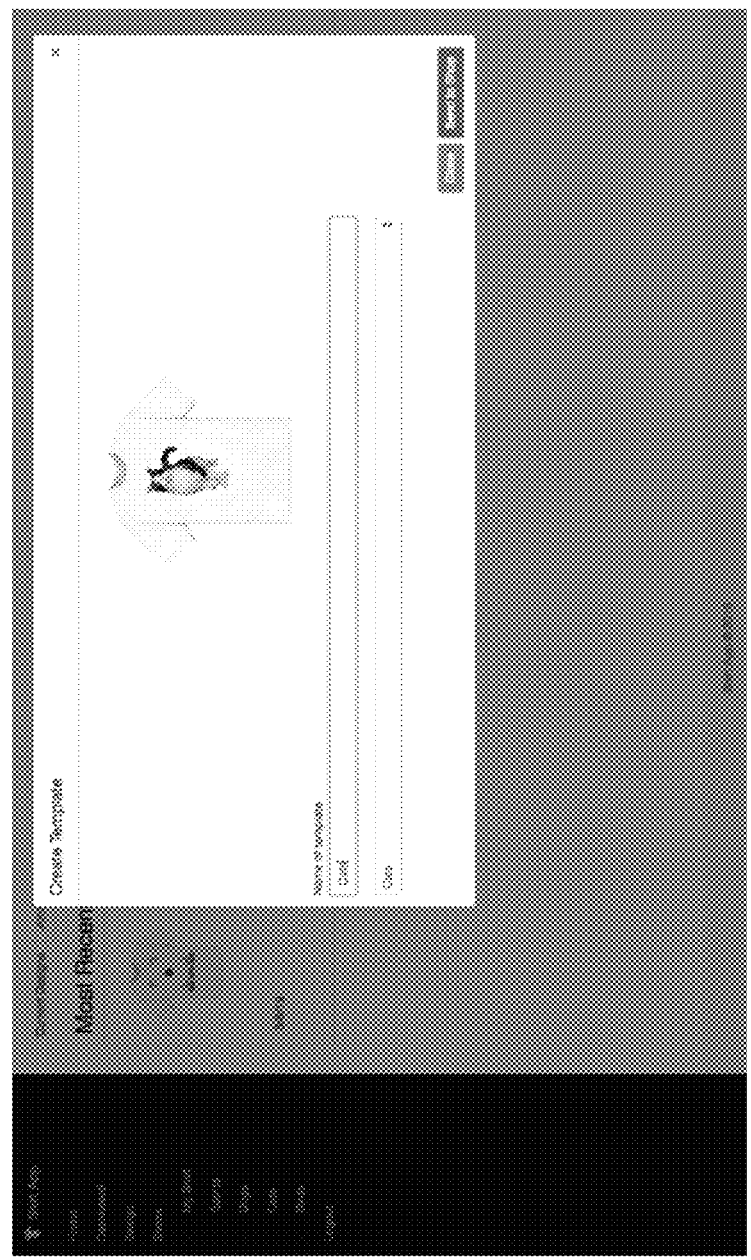

At block 1812, the user can access a design user interface which presents saved designs, as illustrated in FIG. 16L-1. At block 1814, the process detects that the user is pointing at one of the presented designs (e.g., hovers over the design with a mouse/trackpad cursor or using a finger). For example, the process may detect the X,Y coordinates of the user pointing mechanism and compare them to the X,Y coordinates of displayed designs, and when an overlap is detected, the process determines that the coordinate of the displayed design that overlaps that of the pointing coordinate is the selected design. In response, at block 1816, a "create template" control is displayed overlaying the design (which provides an efficient way of utilizing display real estate to display designs and controls). In response to the user selecting the template creation control, at block 1818, a user interface is displayed configured to receive a template name, as illustrated in FIG. 16L-2. The user interface may further enable the user to assign the template to a store for which the user has administrator privileges. The design and store assignment may be saved.

Figure 19:
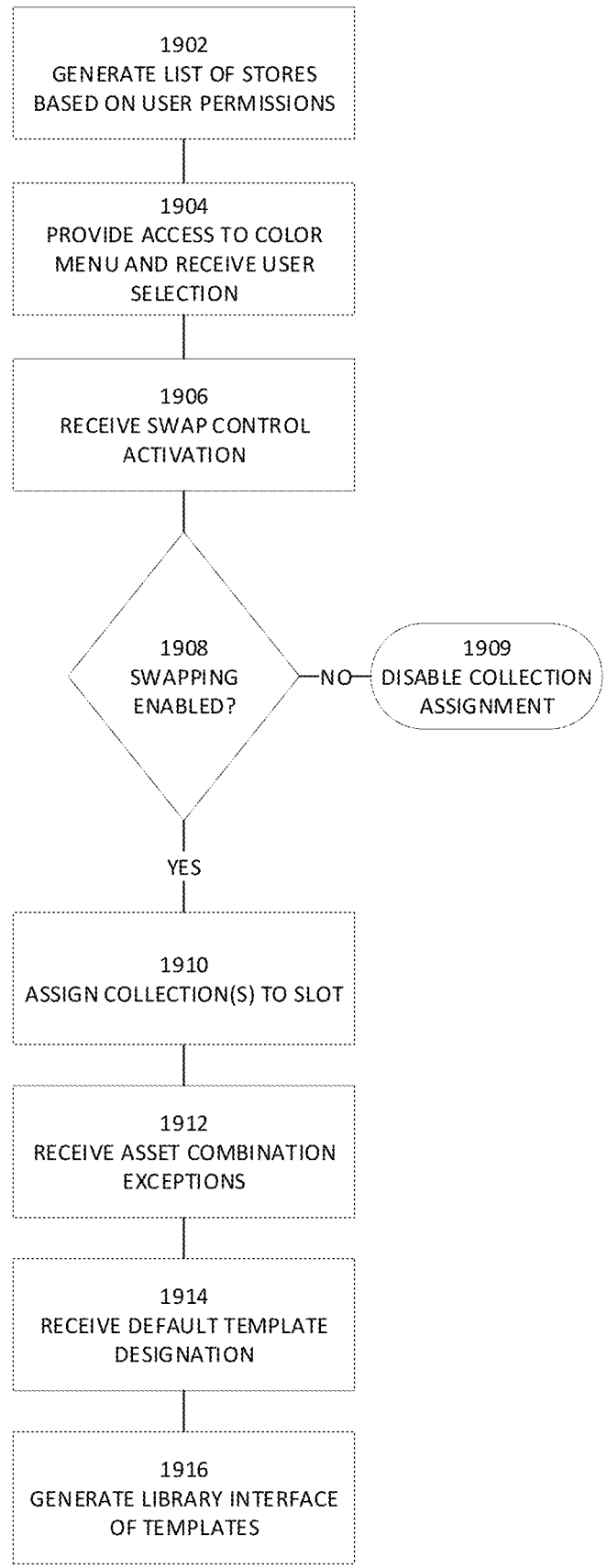

FIG. 19 illustrates an example process for configuring a template. At block 1902, a list of stores to which a user has design/template creation permissions is displayed and a user store selection is received. A list of previously created designs may be displayed. The designs may be associated with one or more specified items (e.g., garments, such as a t-shirt, sweatshirt, etc.). A template edit control is provided, and selection of the template edit control is received. The selected template (including an image of the item and previously assigned/default assets) may be rendered on the user device. At block 1904, an item color menu/palette may be presented via a user interface, and a user color selection is received. If no color is selected, then the color previously assigned to the item (e.g., when the design for the item was created) may be used as the default color for the item. At block 1906, a user selection of a swap control, which can be set to enable or disable swapping of assets for a given slot (design area), is received via the user interface (see, e.g., FIG. 16A).

At block 1908, in response to the swap control being set to swappable, a collection selection menu is enabled via which the user can select which asset collections (e.g., image or text collections) are to be made accessible to an end user for swapping assets for the slot. If the user has disabled asset swapping, then at block 1909, the ability to assign asset collections to the slot is optionally disabled, and the user may only assign a single asset to the slot. Optionally, if the user has been granted the corresponding permissions, the collection selection menu may include asset collections assigned to other stores. For example, the process may access the permissions of the user, determine which stores' collections the user is permitted to access, and include those collections in the collection selection menu. At block 1910, a user selection of one or more collections may be assigned to the slot, and the assignment may be saved in association with the item template (see, e.g., FIG. 16A). The user may optionally specify which asset is to be used as a default asset.

At block 1912, one or more asset combination exceptions are received from the user via the user interface via an exceptions user interface. An asset combination exception may identify which assets in the assigned collections for the slot may not be combined (used in combination) with other assets other slots. A user may also delete a specified exception by activating an exception deletion control. The specified exceptions may be saved in association with the template. For example, a unique identifier associated with a given asset may be stored in association with a list of unique identifiers of other assets with which the given asset may not be combined. The foregoing process may be repeated multiple times for other slots. The template may then be saved with collection-to-slot associations stored. The foregoing acts may be repeated one or more times to create additional templates. At block 1914, a default control selection may be received from the user in association with a given template. The default template may then be displayed to end users when accessing the corresponding online store. At block 1916, the user may access a template library user interface displaying templates saved for a given store. The user may then edit a select template using the process described above.

Figure 20:
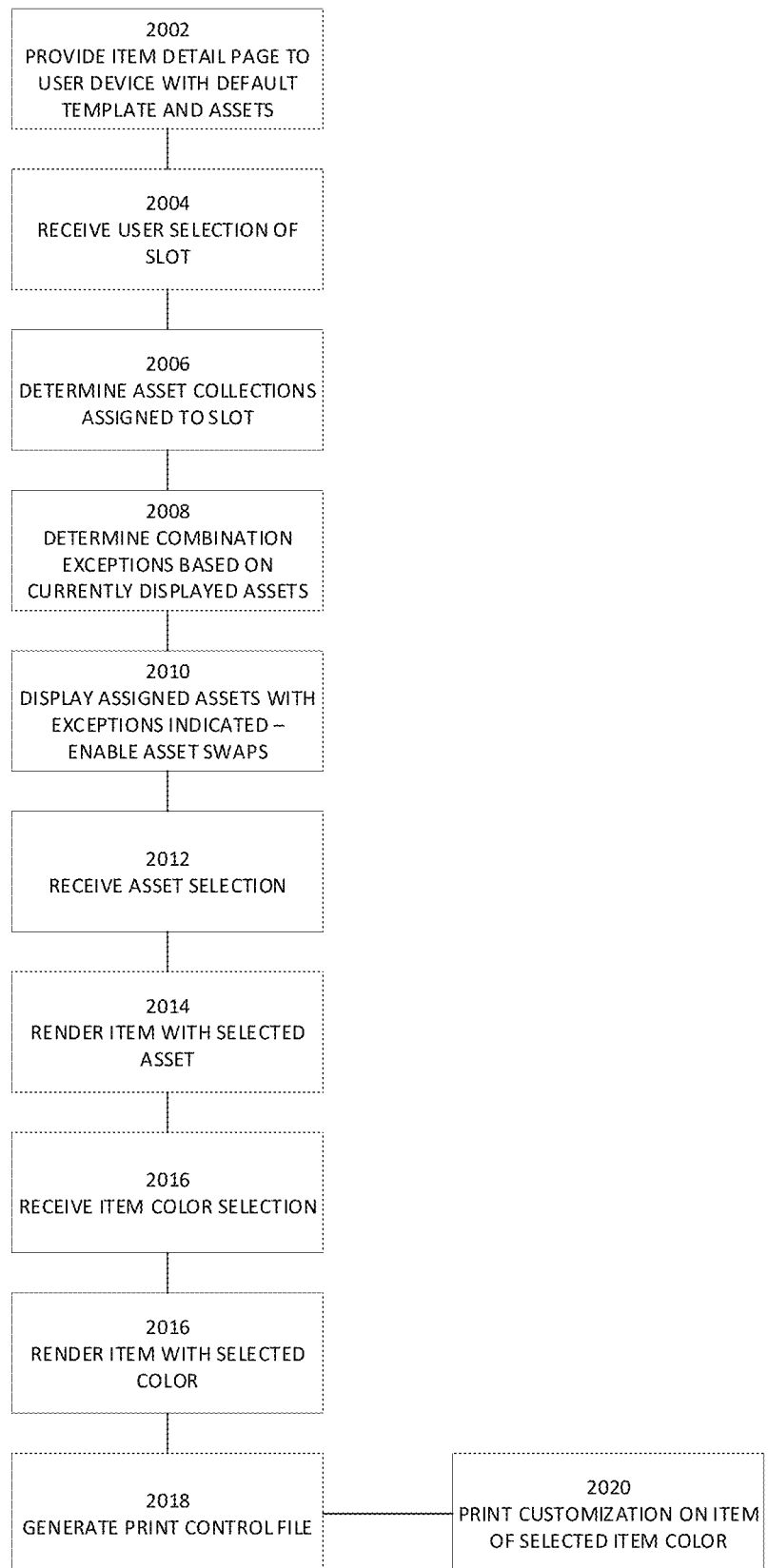
Figure 21:
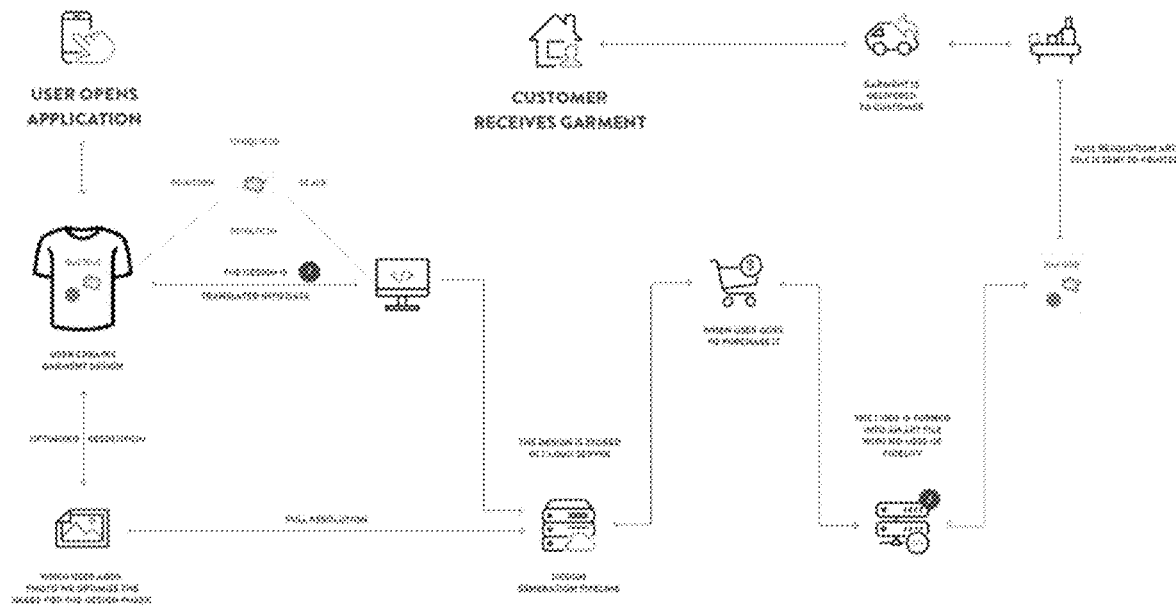

FIG. 20 illustrates an example process that enables an end user (e.g., purchasing an item, such as an item of clothing, a backpack, cup, a towel, a pillow, etc.) to customize an item using collections assigned to slots, subject to specified asset collection exceptions, as discussed above. At block 2002, an item detail interface is generated and provided to a device of an end user. The item detail interface may be generated in response to a user selecting a thumbnail or other representation of the item from an interactive catalog. The item may be, for example an article of clothing (e.g., a t-shirt in this example) or other item (e.g., a backpack, a cup, a pillow case, etc.). An image of the item may be rendered with a default template, including one or more slots populated with one or more default templates. The slots may optionally be identified using a border or other indicator. The color of the item depicted in the image may be a previously specified default item color. The item detail interface may include or provide access to a variety of item customization tools (see, e.g., FIG. 16H-1).

At block 2004, a user selection of a slot is detected. For example, if the user is accessing the user interface via a device equipped with a touch screen, the user may select a slot by tapping on a slot (e.g., by tapping on an asset displayed at the slot). The process may detect the X,Y coordinates of the user touch (or other pointing mechanism) and compare them to the X,Y coordinates of slots, and when an overlap is detected, the process determines that the coordinate of the slot that overlaps that of the pointing coordinate is the selected slot. The selected slot may optionally be emphasized (e.g., with a border surrounding the slot, as illustrated in FIG. 16H-1). At block 2006, a slot identifier associated with the selected slot is utilized to identify asset collections assigned to the selected slot. At block 2008, the slot identifier associated with the selected slot is utilized to identify asset combination exceptions assigned to the selected slot.

At block 2010, a menu of assets included in the collection(s) assigned to the slot is generated. The process further identifies other assets displayed with respect to the item image. Using the identified asset combination exceptions assigned to the selected slot and the identified other displayed assets (e.g., in other slots), a determination is made as to whether there is an exception/prohibition on combining any of the assets included in the collection(s)

assigned to the slot with any of the other displayed assets. Based on any identified prohibitions, the prohibited assets in the collection are excluded from a menu of available assets being displayed on the user device. Optionally instead, such prohibited assets are displayed but graphically indicated as being unavailable (e.g., for example, such prohibited assets may be greyed out) (see, e.g., FIG. 16H-3). The menu of assets may be a rotatable/scrollable (in a backwards or forwards direction) menu which the user can scroll through by swiping the menu backwards or forward with a finger or other pointing device. At block 2012, a user selection of an available asset from the asset menu is detected. The user may make the selection by tapping the asset. The image of the item, with the selected asset in the selected slot, is rendered on the user device, where the selected asset replaces the previous (e.g., default) asset in that slot. Optionally, asset controls are provided which enable the user to edit the asset (e.g., rotate, resize, move, change color, other edits described herein, etc.). The foregoing process may be repeated for the previously selected slot or for other slots.

If the user activates an acquisition control (e.g., a purchase control), a print file may be generated for printing the assets (including any user customizations) on a physical embodiment of the selected item. The print file may include separate image files for each asset or a single image file corresponding to a plurality of assists. The print file may be used by a printer to print the assets on the item.

Figure 21:
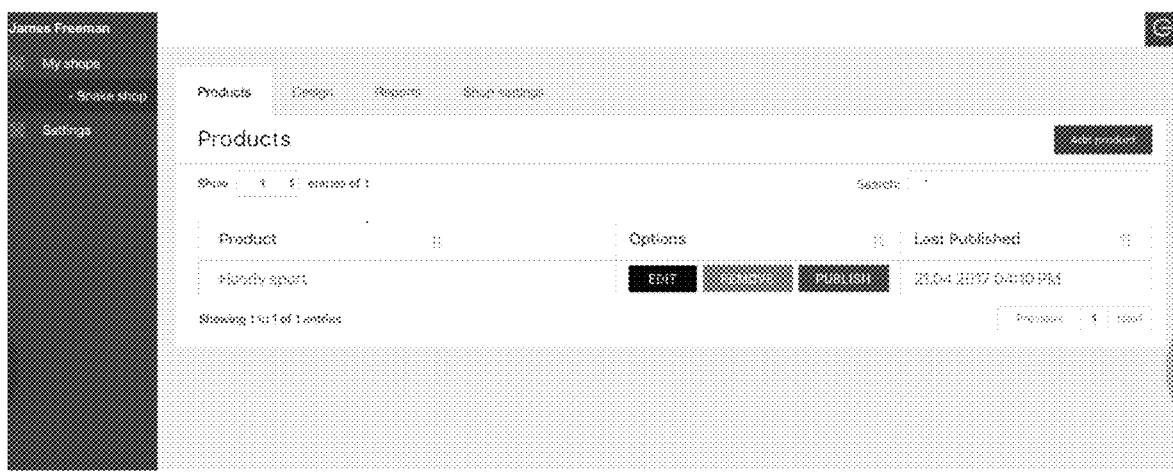
FIGS. 17-21 illustrate example processes.

FIG. 21 illustrates an example process of generating items customized using the CAD system disclosed herein, including generating art files for printing. A user opens an application (e.g., a phone app, a computer app, an application accessed via a browser, etc.), which is then executed. The user utilizes user interfaces accessed via the application (examples of which are discussed elsewhere herein) to create a customized item design (e.g., for a t-shirt, hoodie, backpack, etc.) as described elsewhere herein (e.g., by selecting an item, selecting a template, modifying a template, etc.). The process translates the user design into a data file that includes a unique identifier for the design, position information (e.g., x, y coordinates, pixel number, etc.) for each design element being used in the item design, rotation data (e.g., number of degrees of rotation from the horizontal or vertical) for each design element being used in the item design, and the scale/size for each design element being used in the item design.

This rich data included in the data file enables an editor to be optimized for a better user experience while capturing full resolution data and assets (e.g., design elements). The data can be aggregated and processed to generate analytics and performance metrics (as described elsewhere herein). Optionally, the data may also be used to generate and provide (via the application) recommendations to users as to design elements, templates, items, and/or item colors. For example, aggregated data may be used to determine popularity of design elements, identify the most and least popular design elements (and rank all design elements in terms of popularity), the popularity of positions of the design elements with respect to positioning on an item, the popularity of different scales, and/or the like. The aggregated data may be provided to train, using supervised or unsupervised training, a learning engine (e.g., a convolutional deep neural network such as that discussed elsewhere herein), which in turn may be used in designing new templates and otherwise generating new designs. For example, the deep neural network may be used to predict what design elements and design element combinations (including new design elements not previously sold or offered) users are likely to purchase, and based on the predictions automatically generate templates including those design elements and design element combination users are likely to purchase (e.g., with a likelihood of greater than a threshold percentage of users).

If a user adds a user-provided image (e.g., a photograph) to be used in customizing an item, the process optimizes the image for the design phase. The user customized design and any user-supplied image is received (optionally at full resolution) by a design generation pipeline. The design generation pipeline may be executed server-side, via a cloud system.

If the user purchases the item, the data file is processed into an art file, optionally with no loss or no material loss of fidelity. The full resolution art file is transmitted to a printer which prints the art file on the item. The item is then transported to the user who receives the item.

The foregoing process and architecture provide a scalable solution without burdening the user's device that does not suffer from a loss of fidelity.

Thus, aspects of the disclosure relate to enhancement in the computer aided design and customization of physical and digital items.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. For example, a click may be in the form of a user touch (via finger or stylus) on a touch screen, or in the form of a user moving a cursor (using a mouse of keyboard navigation keys) to a displayed object and activating a physical control (e.g., a mouse button or keyboard key). User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A computer implemented method of customizing an article of clothing having at least two sides, the method comprising:
    enabling a first user to define a template for customization of at least one garment, via a template definition interface, including a plurality of design elements comprising one or more images and/or one or more items of text at respective positions;
    enabling the first user to inhibit modification of one or more design elements by an end user and to permit modification of one or more design elements by an end user;
    receiving a first template defined by the first user for customization of at least one garment, the first template comprising a first image at a first location, a second image at a second location, and a first item of text at a third location;

providing to a computing device of a first end user, the computing device comprising a display, access to an interactive catalog comprising a plurality of different garments;

receiving a selection by the first end user of a first garment from the interactive catalog comprising a plurality of different garments;

causing an image of a first side of the first garment selected by the first end user to be rendered by the computing device of the first end user, with the first image displayed at the first location, the second image displayed at the second location, and the first item of text at the third location in accordance with the first template;

providing an interface rendered by the computing device of the first end user that enables the first end user to modify the template;

receiving, from the computing device of the first end user, a selection of a first color from a specified set of text colors via the interface that enables the first end user to modify the template;

changing, in real time, the color of the first item of text, to the color selected by the first end user from the specified set of text colors;

receiving via the interface that enables the first end user to modify the template, from the computing device of the first end user, an instruction to replace the first image with a third image provided by the first end user;

causing, in real time, the third image to replace the first image in the rendering on the first end user computing device display on the image of the first side of the first garment;

enabling, via the interface that enables the first end user to modify the template, the first end user to cause a background color in the third image to be removed;

enabling, via the interface that enables the first end user to modify the template, the first end user to change a size of at least one image displayed on the image of the first side of the first garment using a drag operation;

providing a control enabling the first end user to cause the second side of the first garment to be displayed;

enabling the first end user to select a garment size from a specified set of garment sizes;

receiving a garment size selection from the first end user;

enabling the first end user to select a garment color from a specified set of garment colors;

receiving a garment color selection from the first end user;

causing the first template, as modified by the first end user via the interface that enables the first end user to modify the template, to be rendered on the first side of the first garment with the image of the first side of the first garment in the garment color selected by the first end user;

generating a print file corresponding to the first template, as modified by the first end user;

transmitting the print file over a network to a printer system to be printed on a physical instantiation of the first garment having the garment color selected by the first end user in the garment size selected by the first end user;

receiving from the first user a first customization rule specifying prohibited subject matter;

receiving, from the computing device of a given end user, an instruction to replace at least one template image with a fourth image provided by the given end user;

inspecting the fourth image, using a convolutional neural network, to determine if the fourth image contains subject matter that violates that first customization rule, the convolutional neural network comprising a input layer, an output layer, hidden layers between the input and output layers, and a pooling layer, wherein the convolutional neural network is configured as a feedforward network with a shared-weights architecture and with translation invariance characteristics; and at least partly in response to determining, using the convolutional neural network, that the fourth image contains subject matter that violates the first customization rule, generating a corresponding notification to the given end user and inhibiting the printing and/or visualization of the fourth image on at least one item.

2. The method as defined in claim 1, the method further comprising:

providing a user interface that enables an exception condition to be specified, wherein a first given content item may be used by a given end user to customize a given item independently from a second given content item, and the second given content item may be used by the given end user to customize the given item independently from the first given content item, but wherein the first given content item and the second given content item are inhibited from being used together to customize the given item.

3. The method as defined in claim 1, the method further comprising:

providing for display a user interface configured to enable a user to specify a plurality of types of prohibited content, including at least adult content and violent content;

receiving, from the computing device of a given end user, an instruction to add at least one image to a given template;

inspecting the at least one image, using a learning engine, to determine if the at least one image contains the at least one type of prohibited content;

at least partly in response to determining, using the learning engine, that the at least one image contains the at least one type of prohibited content, generating a corresponding notification to the given user and inhibiting the printing and/or visualization of the at least one image on at least one item.

4. The method as defined in claim 1, the method further comprising:

enabling the first user to associate different collections of design elements to different design areas of a second template;

receiving a second template defined by the first user for customization of at least one garment, the second template comprising a fourth image at a first location of the second template, and a fifth image at a second location of the second template;

receiving an association of a first collection of design elements with the first location of the second template from the first user;

receiving an association of a second collection of design elements with the second location of the second template from the first user;

receiving an indication from the first user enabling end users to replace the fourth image with an end user-selected design element from the first collection of design elements;

receiving an indication from the first user enabling end users to replace the fifth image with an end user-selected design element from the second collection of design elements;

providing to a computing device of a second end user access to the interactive catalog comprising a plurality of different garments;

receiving a selection by the second end user of a second garment from the interactive catalog comprising a plurality of different garments;

causing an image of a first side of the second garment selected by the second end user to be rendered by the computing device of the second end user, with the fourth image displayed at the first location of the second template and the fifth image displayed at the second location of the second template, in accordance with the second template;

providing an interface configured to be rendered by the computing device of the second end user that enables the second end user to modify the second template;

receiving via the interface that enables the second end user to modify the second template, from the computing device of the second end user, an instruction to replace the fourth image with an image selected by the second end user from the first collection of design elements associated with the first location of the second template;

causing, in real time, the image selected by the second end user from the first collection of design elements associated with the first location of the second template to replace the fourth image in the rendering on the second end user computing device display on the image of the first side of the second garment;

receiving via the interface that enables the second end user to modify the second template, from the computing device of the second end user, an instruction to replace the fifth image with an image selected by the second end user from the second collection of design elements associated with the second location of the second template;

causing, in real time, the image selected by the second end user from the second collection of design elements associated with the second location to replace the fifth image in the rendering on the second user computing device display on the image of the first side of the second garment;

generating a print file corresponding to the second template, as modified by the second end user; and transmitting the print file corresponding to the second template, as modified by the second end user to a given printer system to be printed on a physical instantiation of the second garment.

5. The method as defined in claim 1, the method further comprising:

identifying a popularity of images used to customize items; and sorting a set of images using the identified popularity;

providing an end user with access to the set of images sorted using the identified popularity; and enabling the end user to select at least one image from the set of sorted images; and using the selected image from the set of sorted images to customize at least one item.

6. The method as defined in claim 1, the method further comprising:

determining placement of content items by a plurality of end users with respect to at least a first product type;

identifying a popularity of a plurality of the locations of the first product type with respect to placement of the content items; and generating a map that provides a visualization of the popularity of the plurality of the locations of the first product type with respect to placement of the content items.

7. The method as defined in claim 1, the method further comprising:

determining how many times corresponding combinations of content items were used to customize products;

ranking at least a portion of the combinations of content items;

filtering out those combinations of content items whose usage in customizing products fail to satisfy a first threshold; and causing a user interface to be rendered displaying at least a portion of those combinations of content items whose usage in customizing products satisfy the first threshold.

8. The method as defined in claim 1, the method further comprising:

causing an image associated with an expiration time to be displayed via a device of an end user, the image selectable by the end user to customize item; and causing expiration timing information to be presented by the end user device in association with the image.

9. The method as defined in claim 1, the method further comprising:

providing a user interface enabling a user to specify whether a given content item is removable by a given end user;

providing a user interface enabling a user to specify whether a given content item is resizable by a given end user;

providing a user interface enabling a user to drag a given content item to a desired location on an image of a given item; and providing a user interface enabling a user to remove the background of at least one image.

10. A computer implemented method of customizing an article of clothing having at least two sides, the method comprising:

enabling a first user to define a template for customization of at least one garment, via a template definition interface, including a plurality of design elements comprising one or more images and/or one or more items of text at respective positions;

enabling the first user to inhibit modification of one or more design elements by an end user and to permit modification of one or more design elements by an end user;

receiving a first template defined by the first user for customization of at least one garment, the first template comprising a first image at a first location, a second image at a second location, and a first item of text at a third location;

providing to a computing device of a first end user, the computing device comprising a display, access to an interactive catalog comprising a plurality of different garments;

receiving a selection by the first end user of a first garment from the interactive catalog comprising a plurality of different garments;

causing an image of a first side of the first garment selected by the first end user to be rendered by the computing device of the first end user, with the first image displayed at the first location, the second image displayed at the second location, and the first item of text at the third location in accordance with the first template;

providing an interface rendered by the computing device of the first end user that enables the first end user to modify the template;

receiving, from the computing device of the first end user, a selection of a first color from a specified set of text colors via the interface that enables the first end user to modify the template;

changing, in real time, the color of the first item of text, to the color selected by the first end user from the specified set of text colors;

receiving via the interface that enables the first end user to modify the template, from the computing device of the first end user, an instruction to replace the first image with a third image provided by the first end user;

causing, in real time, the third image to replace the first image in the rendering on the first end user computing device display on the image of the first side of the first garment;

enabling, via the interface that enables the first end user to modify the template, the first end user to cause a color of at least a portion of at least one image to be removed;

enabling, via the interface that enables the first end user to modify the template, the first end user to change a size of at least one image displayed on the image of the first side of the first garment using a drag operation;

providing a control enabling the first end user to cause the second side of the first garment to be displayed;

enabling the first end user to select a garment size from a specified set of garment sizes;

receiving a garment size selection from the first end user;

enabling the first end user to select a garment color from a specified set of garment colors;

receiving a garment color selection from the first end user;

causing the first template, as modified by the first end user via the interface that enables the first end user to modify the template, to be rendered on the first side of the first garment with the image of the first side of the first garment in the garment color selected by the first end user;

generating a print file corresponding to the first template, as modified by the first end user; and transmitting the print file to a printer system to be printed on a physical instantiation of the first garment having the garment color selected by the first end user in the garment size selected by the first end user;

providing a swap enable control configured to enable the first user to specify, for a given design area, whether a corresponding content item in the given design area is permitted to be swapped by an end user with a different content item or whether the end user is prohibited from swapping the corresponding item with the different content item; and in response to determining that the swap control for a given design area is set to prohibit the end user from swapping the corresponding content item in the given design area, inhibiting the end user from swapping the corresponding content item in the given design area.

11. A system, comprising:

a computing device; a network interface;

non-transitory computer readable memory having program instructions stored thereon that when executed by the computing device cause the computing device to:

enable a first user to define a template for customization of at least one garment, via a template definition interface, including a plurality of design elements comprising one or more images and/or one or more items of text at respective positions;

receive, via the network interface, a definition of a first template from the first user, the first template comprising at least a first image at a first location;

provide to a computing device of a first end user, the computing device comprising a display, access to an image of a first garment from an interactive catalog;

cause an image of a first side of the first garment to be rendered by the computing device of the first end user, with the first image displayed at the first location in accordance with the first template;

provide an interface rendered by the computing device of the first end user that enables the first end user to modify the template;

enable, via the interface that enables the first end user to modify the template, to modify at a first item of template text;

receive, from the computing device of the first end user, a selection of a first color from a specified set of text colors via the interface that enables the first end user to modify the template;

change the color of the first item of template text, to the color selected by the first end user from the specified set of text colors;

receive via the interface that enables the first end user to modify the template, from the computing device of the first end user, an instruction to add a second image provided by the first end user to the template;

cause the image of a first side of the first garment to be rendered by the computing device of the first end user, with the second image displayed at a second location specified by the first end user;

enable, via the interface that enables the first end user to modify the template, the first end user to cause a background color of second image to be removed;

enable, via the interface that enables the first end user to modify the template, the first end user to change a size of at least one image displayed on the image of the first side of the first garment using a drag operation;

provide a control enabling the first end user to cause the second side of the first garment to be displayed;

enable the first end user to select a garment size from a specified set of garment sizes;

receive a garment size selection from the first end user;

generate a print file corresponding to the first template, as modified by the first end user;

transmit the print file over a network to a printer system to be printed on a physical instantiation of the first garment in the garment size selected by the first end user;

receive from the first user a first customization rule specifying prohibited subject matter;

receive, from the computing device of a given end user, an instruction to replace at least one template image with a third image provided by the given end user;

inspecting the third image, using a convolutional neural network, to determine if the third image contains subject matter that violates that first customization rule, the convolutional neural network comprising a input layer, an output layer, hidden layers between the input and output layers, wherein the convolutional neural network is configured as a feedforward network with a shared-weights architecture and with translation invariance characteristics; and at least partly in response to determining, using the convolutional neural network, that the third image contains subject matter that violates the first customization rule, generate a corresponding notification to the given end use.

12. The system as defined in claim 11, the operations further comprising:

provide a user interface that enables an exception condition to be specified, wherein a first given content item may be used by a given end user to customize a given item independently from a second given content item, and the second given content item may be used by the given end user to customize the given item independently from the first given content item, but wherein the first given content item and the second given content item are inhibited from being used together to customize the given item.

13. The system as defined in claim 11, the operations further comprising:

provide for display a user interface configured to enable a user to specify a plurality of types of prohibited content, including at least adult content and/or violent content;

receive, from the computing device of a given user, an instruction to add at least one image to a given template;

inspect the at least one image, using a learning engine, to determine if the at least one image contains the at least one type of prohibited content;

at least partly in response to determining, using the learning engine, that the at least one image contains the at least one type of prohibited content, generate a corresponding notification to the given user and inhibiting the printing and/or visualization of the at least one image on at least one item.

14. The system as defined in claim 11, the operations further comprising:

enable the first user to associate different collections of design elements to different design areas of a second template;

receive a definition of a second template from the first user for customization of at least one garment, the second template comprising a third image at a first location of the second template, and a fourth image at a second location of the second template;

receive an association of a first collection of design elements with the first location of the second template from the first user;

receive an association of a second collection of design elements with the second location of the second template from the first user;

receive a selection by the second end user of a second garment;

cause an image of a first side of the second garment selected by the second end user to be rendered by the computing device of the second end user, with the third image displayed at the first location of the second template and the fourth image displayed at the second location of the second template, in accordance with the second template;

provide an interface rendered by the computing device of the second end user that enables the second end user to modify the second template;

receive via the interface that enables the second end user to modify the second template, from the computing device of the second end user, an instruction to replace the third image with an image selected by the second end user from the first collection of design elements associated with the first location of the second template;

cause the image selected by the second end user from the first collection of design elements associated with the first location of the second template to replace the third image in the rendering on the second end user computing device display on the image of the first side of the second garment;

receive via the interface that enables the second end user to modify the second template, from the computing device of the second end user, an instruction to replace the fourth image with an image selected by the second end user from the second collection of design elements associated with the second location;

cause the image selected by the second end user from the second collection of design elements associated with the second location to replace the fourth image in the rendering on the second user computing device display on the image of the first side of the second garment;

generate a print file corresponding to the second template, as modified by the second end user; and transmit the print file corresponding to the second template, as modified by the second end user to a given printer system to be printed on a physical instantiation of the second garment.

15. The system as defined in claim 11, the operations further comprising:

identify a popularity of images used to customize items; and sort a set of images using the identified popularity;

provide an end user with access to the set of images sorted using the identified popularity; and enable the end user to select at least one image from the set of sorted images; and use the selected image from the set of sorted images to customize at least one item.

16. The system as defined in claim 11, the operations further comprising:

determine placement of content items by a plurality of end users with respect to at least a first product type;

identify a popularity of a plurality of the locations of the first product type with respect to placement of the content items; and generate a map that provides a visualization of the popularity of the plurality of the locations of the first product type with respect to placement of the content items.

17. The system as defined in claim 11, the operations further comprising:

determining how many times corresponding combinations of content items were used to customize products;

rank at least a portion of the combinations of content items;

filter out those combinations of content items whose usage in customizing products fail to satisfy a first threshold; and cause a user interface to be rendered displaying at least a portion of those combinations of content items whose usage in customizing products satisfy the first threshold.

18. The system as defined in claim 11, the operations further comprising:

cause an image associated with an expiration time to be displayed via a device of an end user, the image selectable by the end user to customize item; and cause expiration timing information to be presented by the end user device in association with the image.

19. The system as defined in claim 11, the operations further comprising:
provide a user interface enabling a user to specify whether a given content item is removable by a given end user;
provide a user interface enabling a user to specify whether a given content item is resizable by a given end user;
provide a user interface enabling a user to drag a given content item to a desired location on an image of a given item; and
provide a user interface enabling a user to remove the background of at least one image.

20. A system, comprising: a computing device; a network interface;
non-transitory computer readable memory having program instructions stored thereon that when executed by the computing device cause the computing device to:
enable a first user to define a template for customization of at least one garment, via a template definition interface, including a plurality of design elements comprising one or more images and/or one or more items of text at respective positions;
receive, via the network interface, a definition of a first template from the first user, the first template comprising at least a first image at a first location;
provide to a computing device of a first end user, the computing device comprising a display, access to an image of a first garment from an interactive catalog;
cause an image of a first side of the first garment to be rendered by the computing device of the first end user, with the first image displayed at the first location in accordance with the first template;
provide an interface rendered by the computing device of the first end user that enables the first end user to modify the template;
enable, via the interface that enables the first end user to modify the template, to modify at a first item of template text;
receive, from the computing device of the first end user, a selection of a first color from a specified set of text colors via the interface that enables the first end user to modify the template;
change the color of the first item of template text, to the color selected by the first end user from the specified set of text colors;
receive via the interface that enables the first end user to modify the template, from the computing device of the first end user, an instruction to replace the first image with a second image provided by the first end user;
cause the second image to replace the first image on the first end user computing device display on the image of the first side of the first garment;
enable, via the interface that enables the first end user to modify the template, the first end user to cause a color of at least a portion of at least one image to be removed;
enable, via the interface that enables the first end user to modify the template, the first end user to change a size of at least one image displayed on the image of the first side of the first garment using a drag operation;
provide a control enabling the first end user to cause the second side of the first garment to be displayed;
enable the first end user to select a garment size from a specified set of garment sizes;
receive a garment size selection from the first end user;
generate a print file corresponding to the first template, as modified by the first end user; and transmit the print file to a printer system to be printed on a physical instantiation of the first garment in the garment size selected by the first end user;
provide a swap enable control configured to enable the first user to specify, for a given design area, whether a corresponding content item in the given design area is permitted to be swapped by an end user with a different content item or whether the end user is prohibited from swapping the corresponding item with the different content item; and
in response to determining that the swap control for a given design area is set to prohibit the end user from swapping the corresponding content item in the given design area, inhibiting the end user from swapping the corresponding content item in the given design area.

21. Non-transitory computer readable memory having program instructions stored thereon that when executed by a computing device cause the computing device to perform operations comprising:
enable a first user to define a template for customization of at least one item, via a template definition interface, including a plurality of design elements comprising one or more images and/or one or more items of text at respective positions;
receive a definition of a first template from the first user, the first template comprising at least a first image at a first location;
provide to a computing device of a first end user, the computing device comprising a display, access to an image of a first item from an interactive catalog;
cause an image of a first side of the first item to be rendered by the computing device of the first end user, with the first image displayed at the first location in accordance with the first template;
provide an interface rendered by the computing device of the first end user that enables the first end user to modify the template;
enable, via the interface that enables the first end user to modify the template, to modify at a first item of template text;
receive, from the computing device of the first end user, a selection of a first color from a specified set of text colors via the interface that enables the first end user to modify the template;
change the color of the first item of template text, to the color selected by the first end user from the specified set of text colors;
receive via the interface that enables the first end user to modify the template, from the computing device of the first end user, an instruction to add a second image provided by the first end user to the template;
cause the image of a first side of the first item to be rendered by the computing device of the first end user, with the second image displayed at a second location specified by the first end user;
enable, via the interface that enables the first end user to modify the template, the first end user to cause a background color of second image to be removed;
enable, via the interface that enables the first end user to modify the template, the first end user to change a size of at least one image displayed on the image of the first side of the first item using a drag operation;
provide a control enabling the first end user to cause the second side of the first item to be displayed;
enable the first end user to select a item size from a specified set of item sizes;
receive a item size selection from the first end user;

generate a print file corresponding to the first template, as modified by the first end user; and transmit the print file to a printer system to be printed on a physical instantiation of the first item in the item size selected by the first end user;

receive from the first user a first customization rule specifying prohibited subject matter:

receive, from the computing device of a given end user, an instruction to replace at least one template image with a third image provided by the given end user;

inspecting the third image, using a convolutional neural network, to determine if the third image contains subject matter that violates that first customization rule, wherein the convolutional neural network is configured as a feedforward network with a shared-weights architecture and with translation invariance characteristics;

at least partly in response to determining, using the convolutional neural network, that the third image contains subject matter that violates the first customization rule, generate a corresponding notification to the given end use.

22. The non-transitory computer readable memory as defined in claim 21, the operations further comprising:

provide a user interface that enables an exception condition to be specified, wherein a first given content item may be used by a given end user to customize a given item independently from a second given content item, and the second given content item may be used by the given end user to customize the given item independently from the first given content item, but wherein the first given content item and the second given content item are inhibited from being used together to customize the given item.

23. The non-transitory computer readable memory as defined in claim 21, the operations further comprising:

provide for display a user interface configured to enable a user to specify a plurality of types of prohibited content, including at least adult content and/or violent content;

receive, from the computing device of a given user, an instruction to add at least one image to a given template;

inspect the at least one image, using a learning engine, to determine if the at least one image contains the at least one type of prohibited content;

at least partly in response to determining, using the learning engine, that the at least one image contains the at least one type of prohibited content, generate a corresponding notification to the given user and inhibiting the printing and/or visualization of the at least one image on at least one item.

24. The non-transitory computer readable memory as defined in claim 21, the operations further comprising:

enable the first user to associate different collections of design elements to different design areas of a second template;

receive a definition of a second template from the first user for customization of at least one item, the second template comprising a third image at a first location of the second template, and a fourth image at a second location of the second template;

receive an association of a first collection of design elements with the first location of the second template from the first user;

receive an association of a second collection of design elements with the second location of the second template from the first user;

receive a selection by the second end user of a second item;

cause an image of a first side of the second item selected by the second end user to be rendered by the computing device of the second end user, with the third image displayed at the first location of the second template and the fourth image displayed at the second location of the second template, in accordance with the second template;

provide an interface rendered by the computing device of the second end user that enables the second end user to modify the second template;

receive via the interface that enables the second end user to modify the second template, from the computing device of the second end user, an instruction to replace the third image with an image selected by the second end user from the first collection of design elements associated with the first location of the second template;

cause the image selected by the second end user from the first collection of design elements associated with the first location of the second template to replace the third image in the rendering on the second end user computing device display on the image of the first side of the second item;

receive via the interface that enables the second end user to modify the second template, from the computing device of the second end user, an instruction to replace the fourth image with an image selected by the second end user from the second collection of design elements associated with the second location;

cause the image selected by the second end user from the second collection of design elements associated with the second location to replace the fourth image in the rendering on the second user computing device display on the image of the first side of the second item;

generate a print file corresponding to the second template, as modified by the second end user; and transmit the print file corresponding to the second template, as modified by the second end user to a given printer system to be printed on a physical instantiation of the second item.

25. The non-transitory computer readable memory as defined in claim 21, the operations further comprising:

identify a popularity of images used to customize items; and sort a set of images using the identified popularity;

provide an end user with access to the set of images sorted using the identified popularity; and enable the end user to select at least one image from the set of sorted images; and use the selected image from the set of sorted images to customize at least one item.

26. The non-transitory computer readable memory as defined in claim 21, the operations further comprising:

determine placement of content items by a plurality of end users with respect to at least a first product type;

identify a popularity of a plurality of the locations of the first product type with respect to placement of the content items; and generate a map that provides a visualization of the popularity of the plurality of the locations of the first product type with respect to placement of the content items.

27. The non-transitory computer readable memory as defined in claim 21, the operations further comprising:

determining how many times corresponding combinations of content items were used to customize products;

rank at least a portion of the combinations of content items;

filter out those combinations of content items whose usage in customizing products fail to satisfy a first threshold; and cause a user interface to be rendered displaying at least a portion of those combinations of content items whose usage in customizing products satisfy the first threshold.

28. The non-transitory computer readable memory as defined in claim 21, the operations further comprising:

cause an image associated with an expiration time to be displayed via a device of an end user, the image selectable by the end user to customize item; and cause expiration timing information to be presented by the end user device in association with the image.

29. The non-transitory computer readable memory as defined in claim 21, the operations further comprising:

provide a user interface enabling a user to specify whether a given content item is removable by a given end user;

provide a user interface enabling a user to specify whether a given content item is resizable by a given end user;

provide a user interface enabling a user to drag a given content item to a desired location on an image of a given item; and provide a user interface enabling a user to remove the background of at least one image.

30. Non-transitory computer readable memory having program instructions stored thereon that when executed by a computing device cause the computing device to perform operations comprising:

enable a first user to define a template for customization of at least one item, via a template definition interface, including a plurality of design elements comprising one or more images and/or one or more items of text at respective positions;

receive, via a network interface, a definition of a first template from the first user, the first template comprising at least a first image at a first location;

provide to a computing device of a first end user, the computing device comprising a display, access to an image of a first item from an interactive catalog;

cause an image of a first side of the first item to be rendered by the computing device of the first end user, with the first image displayed at the first location in accordance with the first template;

provide an interface rendered by the computing device of the first end user that enables the first end user to modify the template;

enable, via the interface that enables the first end user to modify the template, to modify at a first item of template text;

receive, from the computing device of the first end user, a selection of a first color from a specified set of text colors via the interface that enables the first end user to modify the template;

change the color of the first item of template text, to the color selected by the first end user from the specified set of text colors;

receive via the interface that enables the first end user to modify the template, from the computing device of the first end user, an instruction to replace the first image with a second image provided by the first end user;

cause the second image to replace the first image on the first end user computing device display on the image of the first side of the first item;

enable, via the interface that enables the first end user to modify the template, the first end user to cause a color of at least a portion of at least one image to be removed;

enable, via the interface that enables the first end user to modify the template, the first end user to change a size of at least one image displayed on the image of the first side of the first item using a drag operation;

provide a control enabling the first end user to cause the second side of the first item to be displayed;

enable the first end user to select a item size from a specified set of item sizes;

receive a item size selection from the first end user;

generate a print file corresponding to the first template, as modified by the first end user; and transmit the print file to a printer system to be printed on a physical instantiation of the first item in the item size selected by the first end user;

provide a swap enable control configured to enable the first user to specify, for a given design area, whether a corresponding content item in the given design area is permitted to be swapped by an end user with a different content item or whether the end user is prohibited from swapping the corresponding item with the different content item; and in response to determining that the swap control for a given design area is set to prohibit the end user from swapping the corresponding content item in the given design area, inhibiting the end user from swapping the corresponding content item in the given design area.

\* \* \* \* \*